US012602865B2

(12) United States Patent
McKenzie et al.

(10) Patent No.: US 12,602,865 B2
(45) Date of Patent: Apr. 14, 2026

(54) METHODS FOR DEPTH CONFLICT MITIGATION IN A THREE-DIMENSIONAL ENVIRONMENT

(71) Applicant: Apple Inc., Cupertino, CA (US)

(72) Inventors: Christopher D. McKenzie, Burlingame, CA (US); Benjamin Hylak, San Francisco, CA (US); Conner J. Brooks, San Francisco, CA (US); Adrian P. Lindberg, Karlstad (SE); Bryce L. Schmidtchen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 18/473,184

(22) Filed: Sep. 22, 2023

(65) Prior Publication Data

US 2024/0104843 A1 Mar. 28, 2024

Related U.S. Application Data

(60) Provisional application No. 63/506,070, filed on Jun. 3, 2023, provisional application No. 63/376,870, filed on Sep. 23, 2022.

(51) Int. Cl.
*G06T 17/00* (2006.01)
*G06T 7/20* (2017.01)

(52) U.S. Cl.
CPC .............. *G06T 17/00* (2013.01); *G06T 7/20* (2013.01)

(58) Field of Classification Search
None
See application file for complete search history.

(56) References Cited

U.S. PATENT DOCUMENTS

| | | | |
|---|---|---|---|
| 5,422,812 | A | 6/1995 | Knoll et al. |
| 6,323,846 | B1 | 11/2001 | Westerman et al. |
| 6,570,557 | B1 | 5/2003 | Westerman et al. |

(Continued)

FOREIGN PATENT DOCUMENTS

| | | |
|---|---|---|
| AU | 2022348895 A1 | 4/2024 |
| EP | 2458486 A1 | 5/2012 |

(Continued)

OTHER PUBLICATIONS

Kim W, Xiong S. Pseudo-haptic button for improving user experience of mid-air interaction in VR. International Journal of Human-Computer Studies. Dec. 1, 2022;168:102907. (available online Aug. 2022 (Year: 2022).*

(Continued)

*Primary Examiner* — Zhengxi Liu
(74) *Attorney, Agent, or Firm* — Kubota & Basol LLP

(57) ABSTRACT

In some embodiments, a computer system facilitates depth conflict mitigation for a virtual object that is in contact with one or more physical objects in a three-dimensional environment by reducing visual prominence of one or more portions of the virtual object. In some embodiments, a computer system adjusts the visibility of one or more virtual objects in a three-dimensional environment by applying a visual effect to the one or more virtual objects in response to detecting one or more portions of a user. In some embodiments, a computer system modifies visual prominence in accordance with a level of engagement with a virtual object.

39 Claims, 77 Drawing Sheets

(56) References Cited

U.S. PATENT DOCUMENTS

| | | |
|---|---|---|
| 6,677,932 B1 | 1/2004 | Westerman |
| 6,968,511 B1 | 11/2005 | Robertson et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 8,730,156 B2 | 5/2014 | Weising et al. |
| 9,158,115 B1 | 10/2015 | Worley et al. |
| 9,348,458 B2 | 5/2016 | Hotelling et al. |
| 9,426,193 B2 | 8/2016 | Goodman |
| 9,563,331 B2 | 2/2017 | Poulos et al. |
| 9,619,105 B1 | 4/2017 | Dal Mutto |
| 9,870,130 B2 | 1/2018 | Schubert et al. |
| 9,933,937 B2 | 4/2018 | Lemay et al. |
| 10,139,985 B2 | 11/2018 | Mildrew et al. |
| 10,163,198 B2 | 12/2018 | Rochford et al. |
| 10,186,086 B2 | 1/2019 | Giraldi et al. |
| 10,331,205 B2 | 6/2019 | Kim et al. |
| 10,402,081 B1 | 9/2019 | Andersen et al. |
| 10,540,005 B2 | 1/2020 | Yoon et al. |
| 10,564,714 B2 | 2/2020 | Marggraff et al. |
| 10,565,761 B2 | 2/2020 | Deluca et al. |
| 10,708,965 B1 | 7/2020 | Subramanian et al. |
| 10,877,645 B2 | 12/2020 | Lee et al. |
| 11,023,035 B1 | 6/2021 | Atlas et al. |
| 11,132,840 B2 | 9/2021 | Sarangdhar et al. |
| 11,176,755 B1 | 11/2021 | Tichenor et al. |
| 11,243,734 B2 | 2/2022 | Boissière et al. |
| 11,379,033 B2 | 7/2022 | O'hern et al. |
| 11,500,510 B2 | 11/2022 | Tokuchi et al. |
| 11,682,180 B1 | 6/2023 | Willkie |
| 11,730,226 B2 | 8/2023 | Stolarz et al. |
| 11,842,454 B1 | 12/2023 | Lin et al. |
| 11,861,056 B2 | 1/2024 | Burns et al. |
| 11,868,582 B2 | 1/2024 | Kim et al. |
| 11,875,162 B2 | 1/2024 | Garstenauer et al. |
| 11,948,263 B1 | 4/2024 | Rudman et al. |
| 11,972,092 B2 | 4/2024 | Zurmoehle et al. |
| 12,020,387 B2 | 6/2024 | Maharaja |
| 12,182,325 B2 | 12/2024 | Calderone et al. |
| 12,254,127 B2 | 3/2025 | Burns et al. |
| 12,321,515 B2 | 6/2025 | Calderone et al. |
| 12,408,804 B2 | 9/2025 | Schneider et al. |
| 2002/0015024 A1 | 2/2002 | Westerman et al. |
| 2005/0190059 A1 | 9/2005 | Wehrenberg |
| 2006/0017692 A1 | 1/2006 | Wehrenberg et al. |
| 2006/0033724 A1 | 2/2006 | Chaudhri et al. |
| 2006/0197753 A1 | 9/2006 | Hotelling |
| 2009/0254843 A1 | 10/2009 | Van et al. |
| 2010/0293504 A1 | 11/2010 | Hachiya |
| 2011/0289691 A1 | 12/2011 | LaflÈche et al. |
| 2012/0038751 A1 | 2/2012 | Yuan et al. |
| 2013/0088516 A1 | 4/2013 | Ota et al. |
| 2013/0191160 A1 | 7/2013 | Oran |
| 2013/0207963 A1 | 8/2013 | Stirbu et al. |
| 2013/0249922 A1 | 9/2013 | Hachiya |
| 2013/0293468 A1 | 11/2013 | Perez et al. |
| 2013/0345975 A1 | 12/2013 | Vulcano et al. |
| 2014/0002444 A1 | 1/2014 | Bennett et al. |
| 2014/0181683 A1 | 6/2014 | Lim et al. |
| 2014/0267400 A1 | 9/2014 | Mabbutt et al. |
| 2014/0268925 A1 | 9/2014 | Lee et al. |
| 2014/0298273 A1 | 10/2014 | Blackstone et al. |
| 2014/0375683 A1 | 12/2014 | Salter et al. |
| 2015/0058718 A1 | 2/2015 | Kim et al. |
| 2015/0193982 A1 | 7/2015 | Mihelich et al. |
| 2015/0221132 A1 | 8/2015 | Kruglick |
| 2015/0277699 A1 | 10/2015 | Algreatly |
| 2015/0370404 A1* | 12/2015 | Hu .................... G06F 3/04166 |
| | | 345/174 |
| 2016/0025971 A1 | 1/2016 | Crow et al. |
| 2016/0028961 A1* | 1/2016 | Thurairatnam ....... G06F 3/0482 |
| | | 348/333.01 |
| 2016/0050642 A1 | 2/2016 | Brown et al. |
| 2016/0085301 A1 | 3/2016 | Lopez |
| 2016/0363774 A1 | 12/2016 | Kawasima |
| 2016/0370858 A1 | 12/2016 | LeppÄnen et al. |
| 2016/0379418 A1 | 12/2016 | Osborn et al. |
| 2017/0052373 A1 | 2/2017 | Memmott et al. |
| 2017/0052393 A1 | 2/2017 | Kweon |
| 2017/0061694 A1 | 3/2017 | Giraldi et al. |
| 2017/0090566 A1 | 3/2017 | George-svahn et al. |
| 2017/0115728 A1 | 4/2017 | Park et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0206692 A1 | 7/2017 | Sheaffer et al. |
| 2017/0214782 A1 | 7/2017 | Brinda |
| 2018/0077383 A1 | 3/2018 | Akao et al. |
| 2018/0084287 A1 | 3/2018 | Shimura |
| 2018/0095542 A1 | 4/2018 | Mallinson |
| 2018/0165853 A1 | 6/2018 | Inagi et al. |
| 2018/0300952 A1 | 10/2018 | Evans et al. |
| 2018/0350119 A1 | 12/2018 | Kocharlakota et al. |
| 2019/0004683 A1 | 1/2019 | Pahud et al. |
| 2019/0018498 A1* | 1/2019 | West .................... G06F 3/012 |
| 2019/0188918 A1 | 6/2019 | Brewer et al. |
| 2019/0228503 A1 | 7/2019 | Tokuchi |
| 2019/0266774 A1 | 8/2019 | Sommerlade et al. |
| 2019/0302977 A1 | 10/2019 | Pendergast et al. |
| 2019/0332250 A1 | 10/2019 | Lee et al. |
| 2019/0362560 A1 | 11/2019 | Choi et al. |
| 2019/0369569 A1 | 12/2019 | Olsen et al. |
| 2019/0392830 A1 | 12/2019 | Abdollahian |
| 2020/0026922 A1 | 1/2020 | Pekelny et al. |
| 2020/0038120 A1 | 2/2020 | Ziraknejad et al. |
| 2020/0051527 A1 | 2/2020 | Ngo |
| 2020/0112711 A1 | 4/2020 | Enriquez et al. |
| 2020/0201444 A1 | 6/2020 | Stoyles et al. |
| 2020/0257484 A1 | 8/2020 | Qian et al. |
| 2020/0258481 A1 | 8/2020 | Woo et al. |
| 2020/0319704 A1 | 10/2020 | Kathuria et al. |
| 2020/0328913 A1 | 10/2020 | Wyas et al. |
| 2020/0412862 A1 | 12/2020 | Oh et al. |
| 2021/0011556 A1 | 1/2021 | Atlas et al. |
| 2021/0055789 A1 | 2/2021 | Tsai et al. |
| 2021/0067418 A1 | 3/2021 | Ely et al. |
| 2021/0090348 A1 | 3/2021 | Croxford et al. |
| 2021/0096726 A1 | 4/2021 | Faulkner et al. |
| 2021/0102820 A1 | 4/2021 | Le et al. |
| 2021/0142552 A1 | 5/2021 | Kimura et al. |
| 2021/0158624 A1 | 5/2021 | Moon et al. |
| 2021/0173536 A1 | 6/2021 | Kondo |
| 2021/0227601 A1 | 7/2021 | Eom et al. |
| 2021/0279957 A1 | 9/2021 | Eder et al. |
| 2021/0287439 A1 | 9/2021 | Goodrich et al. |
| 2021/0312713 A1 | 10/2021 | Peri et al. |
| 2021/0312717 A1 | 10/2021 | Mao |
| 2021/0326094 A1 | 10/2021 | Buerli et al. |
| 2021/0331069 A1 | 10/2021 | Gustafson et al. |
| 2021/0333864 A1 | 10/2021 | Harvey et al. |
| 2021/0358294 A1 | 11/2021 | Parashar et al. |
| 2021/0366440 A1 | 11/2021 | Burns et al. |
| 2021/0400744 A1 | 12/2021 | Chen et al. |
| 2021/0405760 A1 | 12/2021 | Schoen |
| 2022/0086205 A1 | 3/2022 | Lebeau et al. |
| 2022/0124286 A1 | 4/2022 | Punwani et al. |
| 2022/0179503 A1 | 6/2022 | Timonen et al. |
| 2022/0239718 A1 | 7/2022 | Song et al. |
| 2022/0244536 A1 | 8/2022 | Sha et al. |
| 2022/0252882 A1 | 8/2022 | Berliner et al. |
| 2022/0253125 A1 | 8/2022 | Wallen et al. |
| 2022/0287676 A1 | 9/2022 | Steines et al. |
| 2022/0291808 A1 | 9/2022 | Stevens et al. |
| 2022/0303680 A1 | 9/2022 | Ahmed et al. |
| 2022/0391158 A1 | 12/2022 | Lemmens et al. |

(56) References Cited

U.S. PATENT DOCUMENTS

| | | | |
|---|---|---|---|
| 2023/0114080 A1 | 4/2023 | Yang et al. |
| 2023/0120052 A1 | 4/2023 | Wallen et al. |
| 2023/0176806 A1 | 6/2023 | Chen et al. |
| 2023/0206572 A1 | 6/2023 | Pazmino et al. |
| 2023/0341932 A1 | 10/2023 | Silva et al. |
| 2023/0343049 A1 | 10/2023 | Boesel et al. |
| 2023/0351702 A1 | 11/2023 | Tan et al. |
| 2023/0353398 A1 | 11/2023 | White |
| 2023/0360264 A1 | 11/2023 | Wu et al. |
| 2023/0368475 A1 | 11/2023 | Chan et al. |
| 2023/0400958 A1 | 12/2023 | Morrison et al. |
| 2024/0103681 A1 | 3/2024 | Broughton et al. |
| 2024/0103685 A1 | 3/2024 | Pazmino et al. |
| 2024/0103686 A1 | 3/2024 | Pazmino et al. |
| 2024/0104870 A1 | 3/2024 | Fuste Lleixa et al. |
| 2024/0126362 A1 | 4/2024 | Burns et al. |
| 2024/0135612 A1 | 4/2024 | Hold-Geoffroy et al. |
| 2024/0152245 A1 | 5/2024 | Broughton et al. |
| 2024/0203066 A1 | 6/2024 | Kawashima et al. |
| 2024/0233288 A1 | 7/2024 | Stauber et al. |
| 2024/0273838 A1 | 8/2024 | Palangie et al. |
| 2024/0281109 A1 | 8/2024 | Manjunath et al. |
| 2024/0361832 A1 | 10/2024 | Calderone et al. |
| 2024/0361833 A1 | 10/2024 | Calderone et al. |
| 2025/0005864 A1 | 1/2025 | Dessero et al. |
| 2025/0077066 A1 | 3/2025 | Lutter |
| 2025/0111626 A1 | 4/2025 | Deliz Centeno et al. |
| 2025/0165069 A1 | 5/2025 | Calderone et al. |
| 2025/0278907 A1 | 9/2025 | Pazmino et al. |
| 2025/0306727 A1 | 10/2025 | Kawashima et al. |
| 2025/0322612 A1 | 10/2025 | Cerra et al. |

FOREIGN PATENT DOCUMENTS

| | | |
|---|---|---|
| EP | 2893297 A1 | 7/2015 |
| EP | 4155867 A1 | 3/2023 |
| JP | 2022175629 A | 11/2022 |
| JP | 2023052278 A | 4/2023 |
| KR | 20200140378 A | 12/2020 |
| WO | 2013169849 A2 | 11/2013 |
| WO | 2014105276 A1 | 7/2014 |
| WO | 2018090060 A1 | 5/2018 |
| WO | 2021061349 A1 | 4/2021 |
| WO | 2021203856 A1 | 10/2021 |
| WO | 2022055821 A1 | 3/2022 |
| WO | 2022067343 A2 | 3/2022 |
| WO | 2022208797 A1 | 10/2022 |
| WO | 2024064036 A1 | 3/2024 |
| WO | 2024064373 A1 | 3/2024 |

OTHER PUBLICATIONS

Bermejo C, Lee LH, Chojecki P, Przewozny D, Hui P. Exploring button designs for mid-air interaction in virtual reality: A hexametric evaluation of key representations and multi-modal cues. Proceedings of the ACM on Human-Computer Interaction. May 27, 2021;5(EICS):1-26. (Year: 2021).*

LeapMotion, "VR Design Best Practices," 2015 (Year: 2015).*

Dudley JJ, Vertanen K, Kristensson PO. Fast and precise touch-based text entry for head-mounted augmented reality with variable occlusion. ACM Transactions on Computer-Human Interaction (TOCHI). Dec. 13, 2018;25(6):1-40. (Year: 2018).*

Speicher M, Ehrlich J, Gentile V, Degraen D, Sorce S, KrÃ¼ger A. Pseudo-haptic controls for mid-air finger-based menu interaction . InExtended Abstracts of the 2019 CHI Conference on Human Factors in Computing Systems May 2, 2019 (pp. 1-6). (Year: 2019).*

Lee LH, Braud T, Bijarbooneh FH, Hui P. UbiPoint: towards non-intrusive mid-air interaction for hardware constrained smart glasses . InProceedings of the 11th ACM Multimedia Systems Conference May 27, 2020 (pp. 190-201). (Year: 2020).*

Extended European Search Report received for European Patent Application No. 25179367.5, mailed on Jul. 1, 2025, 10 pages.

Extended European Search Report received for European Patent Application No. 24158036.4, mailed on Jul. 18, 2024, 12 pages.

Extended European Search Report received for European Patent Application No. 24171800.6, mailed on Sep. 5, 2024, 15 pages.

Extended European Search Report received for European Patent Application No. 24171804.8, mailed on Sep. 5, 2024, 13 pages.

How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.

International Search Report received for PCT Patent Application No. PCT/US2022/082379, mailed on May 30, 2023, 7 pages.

International Search Report received for PCT Patent Application No. PCT/US2023/019309, mailed on Sep. 1, 2023, 6 pages.

International Search Report received for PCT Patent Application No. PCT/US2023/074957, mailed on Jan. 30, 2024, 7 pages.

International Search Report received for PCT Patent Application No. PCT/US2023/074968, mailed on Feb. 26, 2024, 7 pages.

International Search Report received for PCT Patent Application No. PCT/US2024/030661, mailed on Nov. 4, 2024, 5 pages.

Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.

Apple, "Use Continuity to Connect Your Mac, iPhone, iPad, and Apple Watch", Apple Support, Available online at <https://support. apple.com/en-us/HT204681>, [Retrieved from Internet on Dec. 23, 2022], 4 pages.

Berard, Francois, "A Study on Two-Dimensional Scrolling with Head Motion", CLIPS-IMAG Technical Report. France, Ref: <TR-IMAG-CLIPS-IHM-199901>, Retrieved from: <http://iihm.imag. fr/publs/1999/TR199901_PWindowRate.pdf>, Retrieved on Dec. 26, 2024, Jan. 8, 1999, 7 pages.

Didehkhorshid, et al., "Text Input in Virtual Reality Using a Tracked Drawing Tablet", HCII 2020, LNCS 12428, 2020, pp. 314-329.

Edmiston, et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.

Ghosh, et al., "NotifiVIR: Exploring Interruptions and Notifications in Virtual Reality", IEEE transactions on visualization and computer graphics, vol. 24, No. 4, Apr. 2018, pp. 1447-1456.

Headmaster Introduction, "If You Can Move Your Head, You Can Move Your World", Retrieved from: <https://www.microsoft.com/ buxtoncollection/a/pdf/HeadMaster%20Introduction.pdf)>, Retrieved on Dec. 26, 2024, 4 pages.

Huang, et al., "Proxy-Based Security Audit System for Remote Desktop Access", Computer Communications and Networks, ICCCN 2009. Proceedings of 18th International Conference on, IEEE, Piscataway, NJ, USA, Aug. 3, 2009, 5 pages.

Lin, et al., "Ubii: Physical World Interaction Through Augmented Reality", Publisher: IEEE, vol. 16, No. 3, DOI:10.1109/TMC.2016. 2567378, May 13, 2016, pp. 872-885.

Medeiros, et al., "Promoting Reality Awareness in Virtual Reality through Proxemics", IEEE Virtual Reality and 3D User Interfaces (VR), Mar. 27-Apr. 1, 2021, 11 pages.

Metalnwood, "Using a Tablet for Touch Control, with VR Headset On. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.

Pfeuffer, et al., "Gaze+touch vs. Touch: What's the Trade-off When Using Gaze to Extend Touch to Remote Displays?", Advances in Databases and Information Systems, Aug. 30, 2015, pp. 349-367.

Sun, et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.

Tolle, et al., "Design of Head Movement Controller System (HEMOCS) for Control Mobile Application through Head Pose Movement Detection", Retrieved from:<https://www.google.com/url?sa=t &source=web&rct=j&opi=89978449&url=https://online-journals. org/index.php/i-jim/article/download/5552/4029/19224&ved=

(56)          References Cited

OTHER PUBLICATIONS

2ahUKEwj-w86vga-HAxUJJDQIHYMNDNw4HhAWegQILhAB &usg=AOvVaw3HR1t7v8Rx7osc1lp0UfOh>, DOI: <httpdx.doi.org/ 10.3991/.

Wood, Tyriel, "The Hololens 2 Tour!—Discovering a World of Holograms", YouTube [online]. YouTube, Mar. 23, 2021 [retrieved on Dec. 7, 2023], Retrieved from the Internet: <URL: https://www. youtube.com/watch?v=rMks7sMzPxl>, 2 pages.

Writtenhouse, Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.

Supplemental Notice of Allowability received for U.S. Appl. No. 18/473,261, mailed on Sep. 30, 2025, 2 pages.

Non-Final Office Action received for U.S. Appl. No. 18/916,583, mailed on Oct. 2, 2025, 18 pages.

Non-Final Office Action received for U.S. Appl. No. 17/933,020, mailed on Oct. 1, 2025, 28 pages.

Notice of Allowance received for U.S. Appl. No. 18/153,943, mailed on Oct. 7, 2025, 9 pages.

Notice of Allowance received for U.S. Appl. No. 18/473,262, mailed on Oct. 7, 2025, 8 pages.

Notice of Allowance received for U.S. Appl. No. 18/988,115, mailed on Oct. 7, 2025, 5 pages.

Notice of Allowance received for U.S. Appl. No. 18/473,179, mailed on Oct. 6, 2025, 8 pages.

Notice of Allowance received for U.S. Appl. No. 18/471,729, mailed on Oct. 10, 2025, 7 pages.

Notice of Allowance received for U.S. Appl. No. 18/473,182, mailed on Oct. 21, 2025, 8 pages.

Non-Final Office Action received for U.S. Appl. No. 18/515,191, mailed on Oct. 21, 2025, 20 pages.

Final Office Action received for U.S. Appl. No. 18/473,260, mailed on Oct. 22, 2025, 38 pages.

International Search Report received for PCT Patent Application No. PCT/US2025/032549, mailed on Oct. 23, 2025, 7 pages.

* cited by examiner

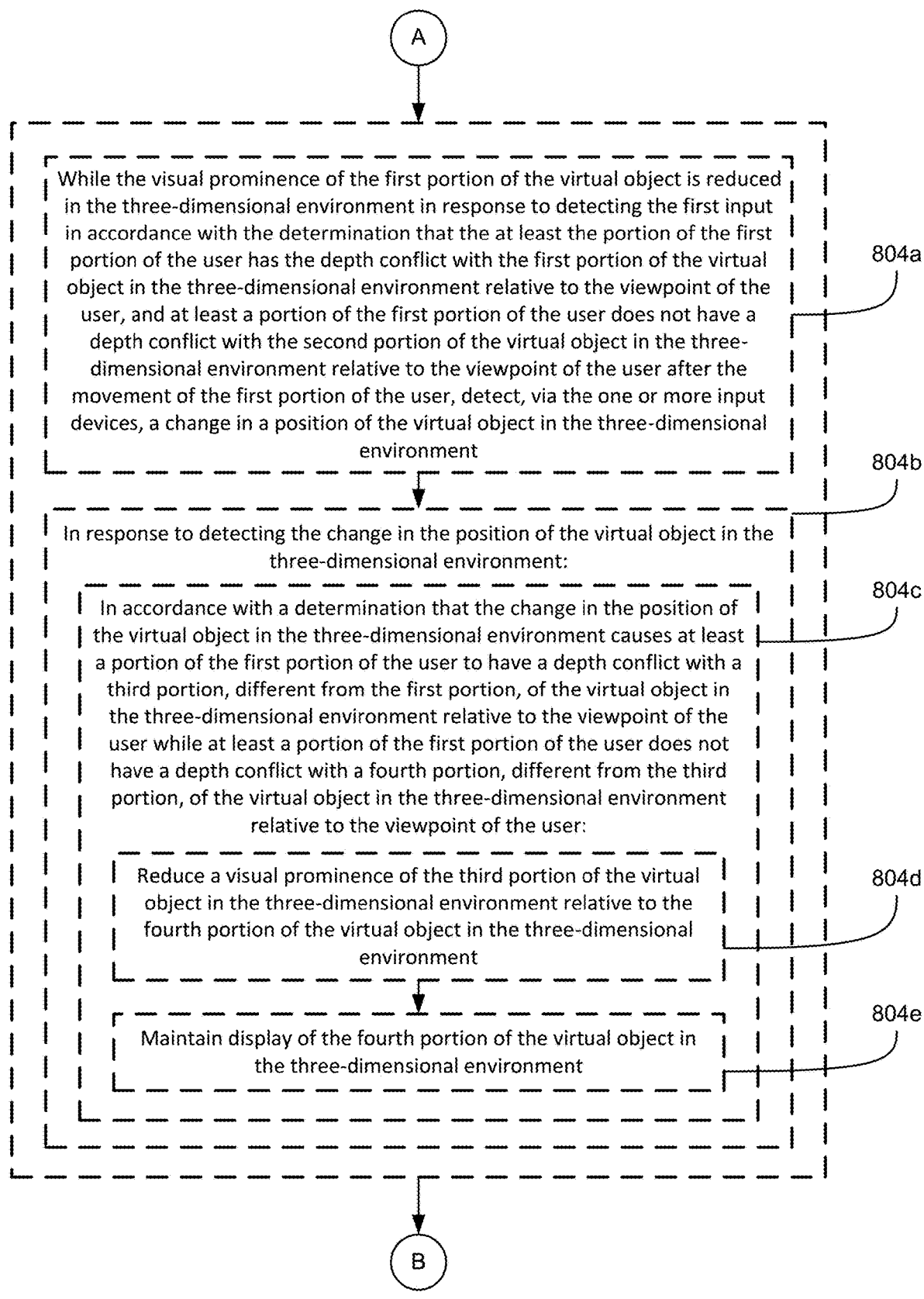

While the visual prominence of the first portion of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detect, via the one or more input devices, a change in a position of the virtual object in the three-dimensional environment 804a In response to detecting the change in the position of the virtual object in the three-dimensional environment:

804b

In accordance with a determination that the change in the position of the virtual object in the three-dimensional environment causes at least a portion of the first portion of the user to have a depth conflict with a third portion, different from the first portion, of the virtual object in the three-dimensional environment relative to the viewpoint of the user while at least a portion of the first portion of the user does not have a depth conflict with a fourth portion, different from the third portion, of the virtual object in the three-dimensional environment relative to the viewpoint of the user:

804c

Reduce a visual prominence of the third portion of the virtual object in the three-dimensional environment relative to the fourth portion of the virtual object in the three-dimensional environment 804d Maintain display of the fourth portion of the virtual object in the three-dimensional environment 804e

FIG. 8B

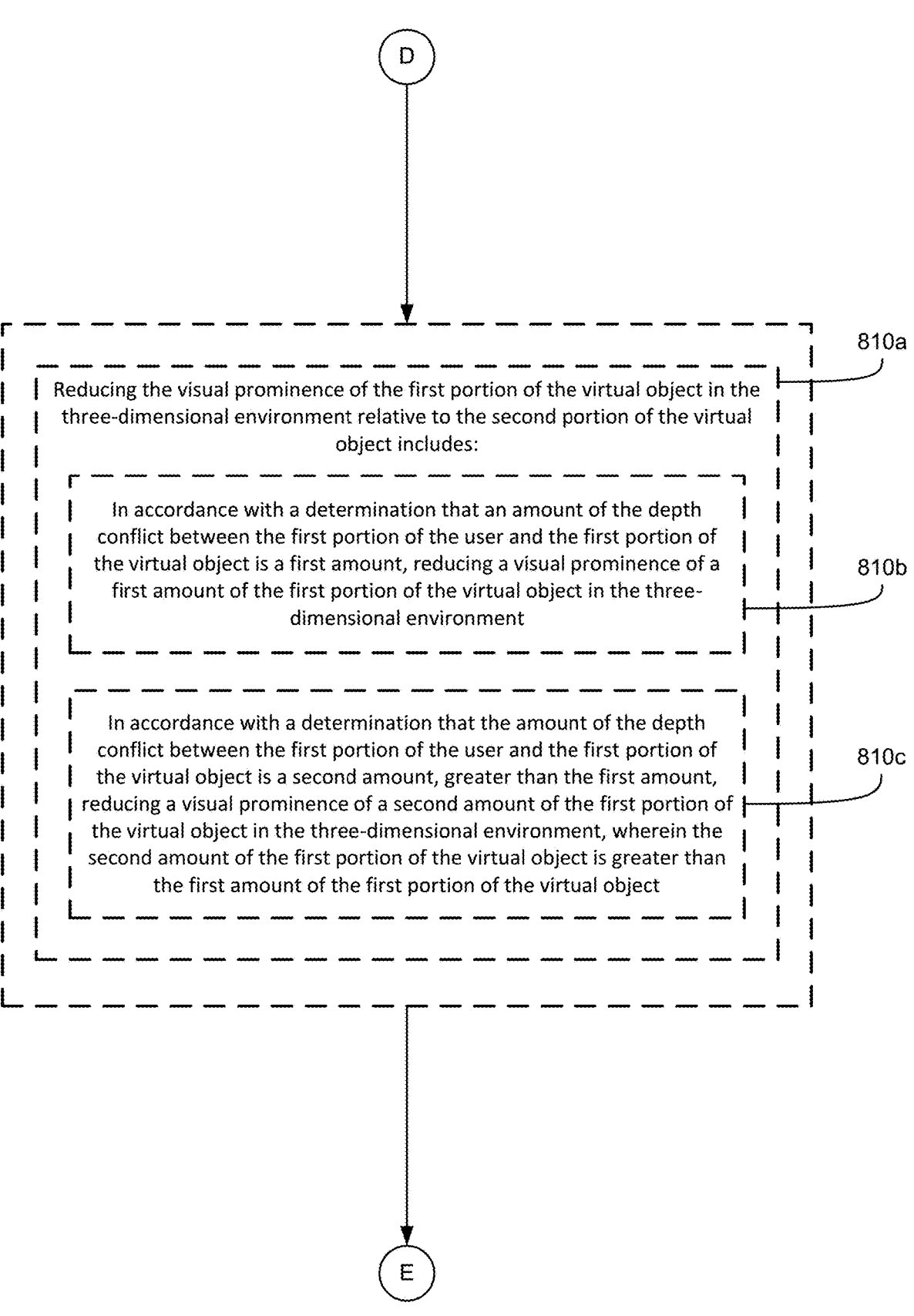

D

Reducing the visual prominence of the first portion of the virtual object in the three-dimensional environment relative to the second portion of the virtual object includes:                                                                      810a In accordance with a determination that an amount of the depth conflict between the first portion of the user and the first portion of the virtual object is a first amount, reducing a visual prominence of a first amount of the first portion of the virtual object in the three-dimensional environment                                                                                        810b In accordance with a determination that the amount of the depth conflict between the first portion of the user and the first portion of the virtual object is a second amount, greater than the first amount, reducing a visual prominence of a second amount of the first portion of the virtual object in the three-dimensional environment, wherein the second amount of the first portion of the virtual object is greater than the first amount of the first portion of the virtual object                                        810c

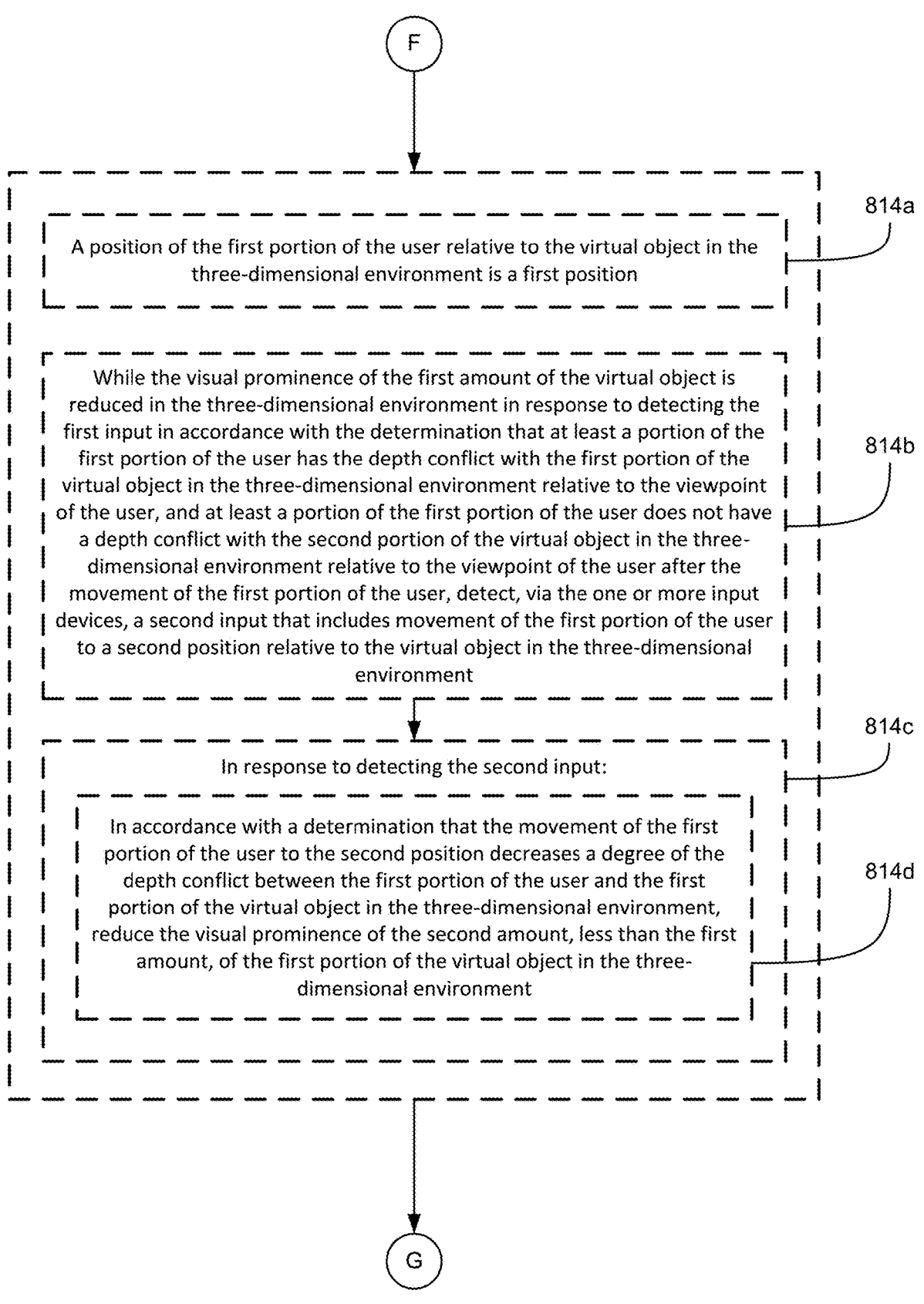

F

A position of the first portion of the user relative to the virtual object in the three-dimensional environment is a first position 814a While the visual prominence of the first amount of the virtual object is reduced in the three-dimensional environment in response to detecting the first input in accordance with the determination that at least a portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detect, via the one or more input devices, a second input that includes movement of the first portion of the user to a second position relative to the virtual object in the three-dimensional environment 814b In response to detecting the second input:

814c

In accordance with a determination that the movement of the first portion of the user to the second position decreases a degree of the depth conflict between the first portion of the user and the first portion of the virtual object in the three-dimensional environment, reduce the visual prominence of the second amount, less than the first amount, of the first portion of the virtual object in the three-dimensional environment 814d

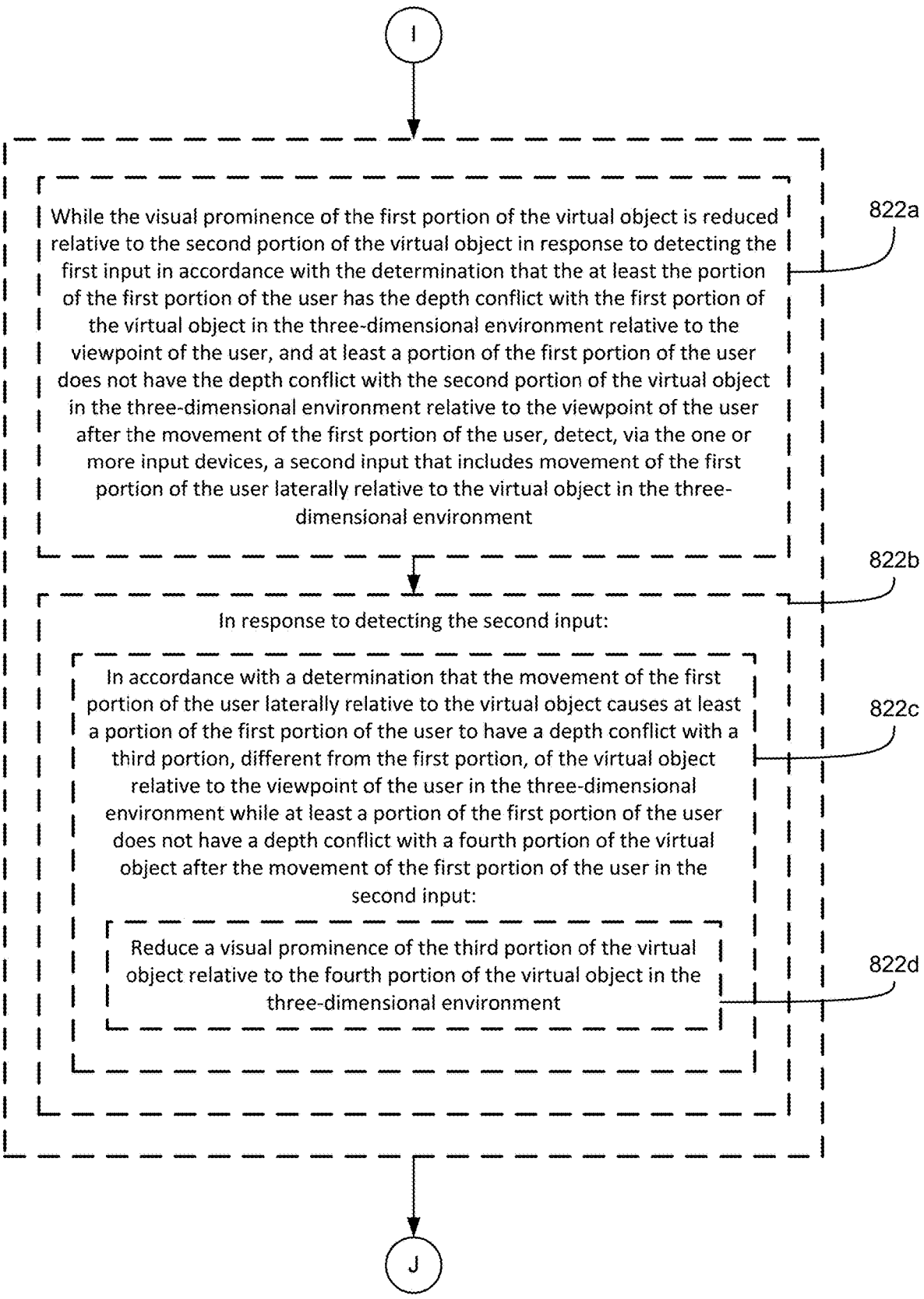

While the visual prominence of the first portion of the virtual object is reduced relative to the second portion of the virtual object in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have the depth conflict with the second portion of the virtual object in the three-dimensional environment relative to the viewpoint of the user after the movement of the first portion of the user, detect, via the one or more input devices, a second input that includes movement of the first portion of the user laterally relative to the virtual object in the three-dimensional environment 822a In response to detecting the second input:

822b

In accordance with a determination that the movement of the first portion of the user laterally relative to the virtual object causes at least a portion of the first portion of the user to have a depth conflict with a third portion, different from the first portion, of the virtual object relative to the viewpoint of the user in the three-dimensional environment while at least a portion of the first portion of the user does not have a depth conflict with a fourth portion of the virtual object after the movement of the first portion of the user in the second input:

822c

Reduce a visual prominence of the third portion of the virtual object relative to the fourth portion of the virtual object in the three-dimensional environment 822d

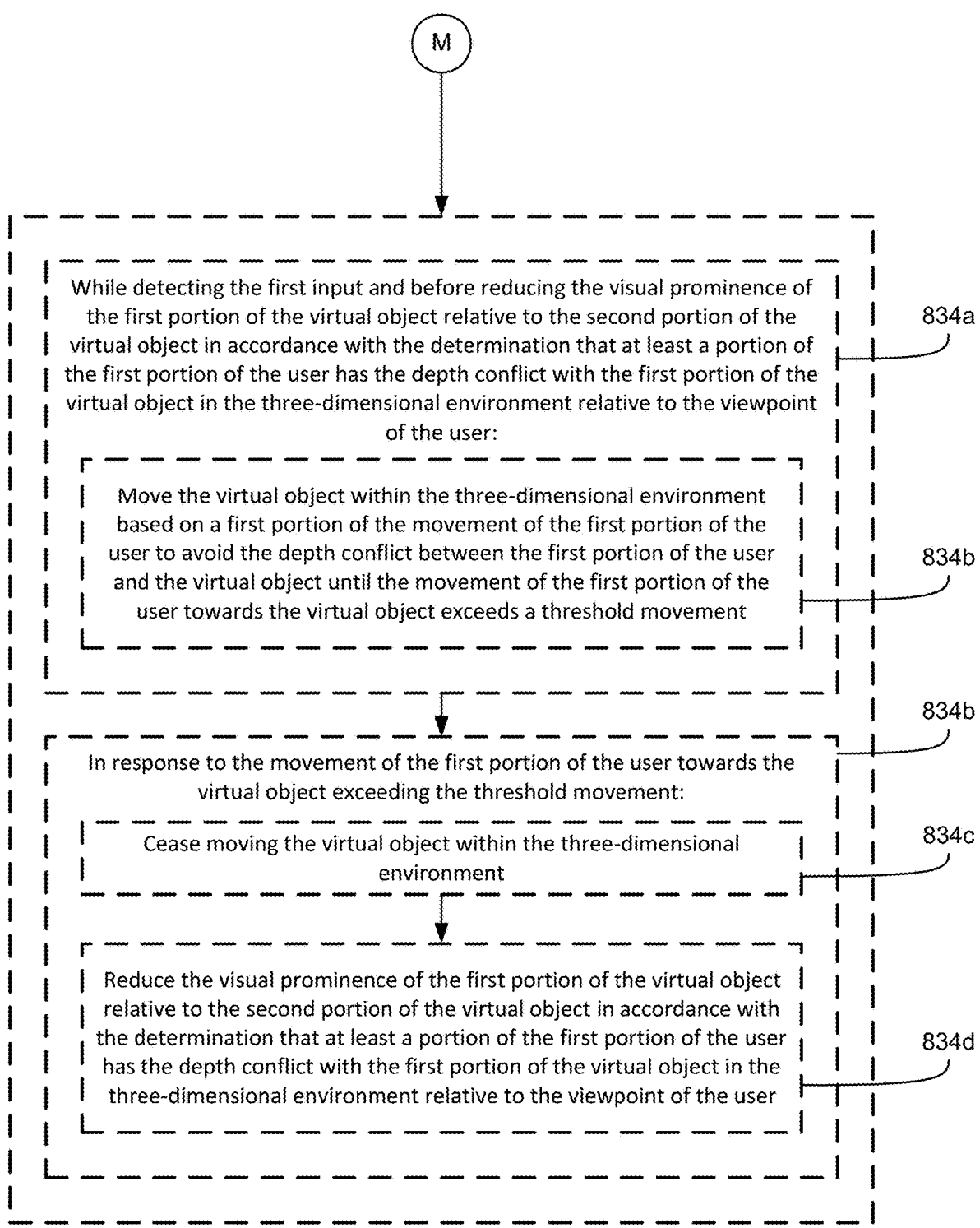

M

While detecting the first input and before reducing the visual prominence of the first portion of the virtual object relative to the second portion of the virtual object in accordance with the determination that at least a portion of the first portion of the user has the depth conflict with the first portion of the virtual object in the three-dimensional environment relative to the viewpoint of the user:          834a Move the virtual object within the three-dimensional environment based on a first portion of the movement of the first portion of the user to avoid the depth conflict between the first portion of the user and the virtual object until the movement of the first portion of the user towards the virtual object exceeds a threshold movement          834b 834b In response to the movement of the first portion of the user towards the virtual object exceeding the threshold movement:

Cease moving the virtual object within the three-dimensional environment          834c Reduce the visual prominence of the first portion of the virtual object relative to the second portion of the virtual object in accordance with the determination that at least a portion of the first portion of the user has the depth conflict with the first portion of the virtual object in the three-dimensional environment relative to the viewpoint of the user          834d

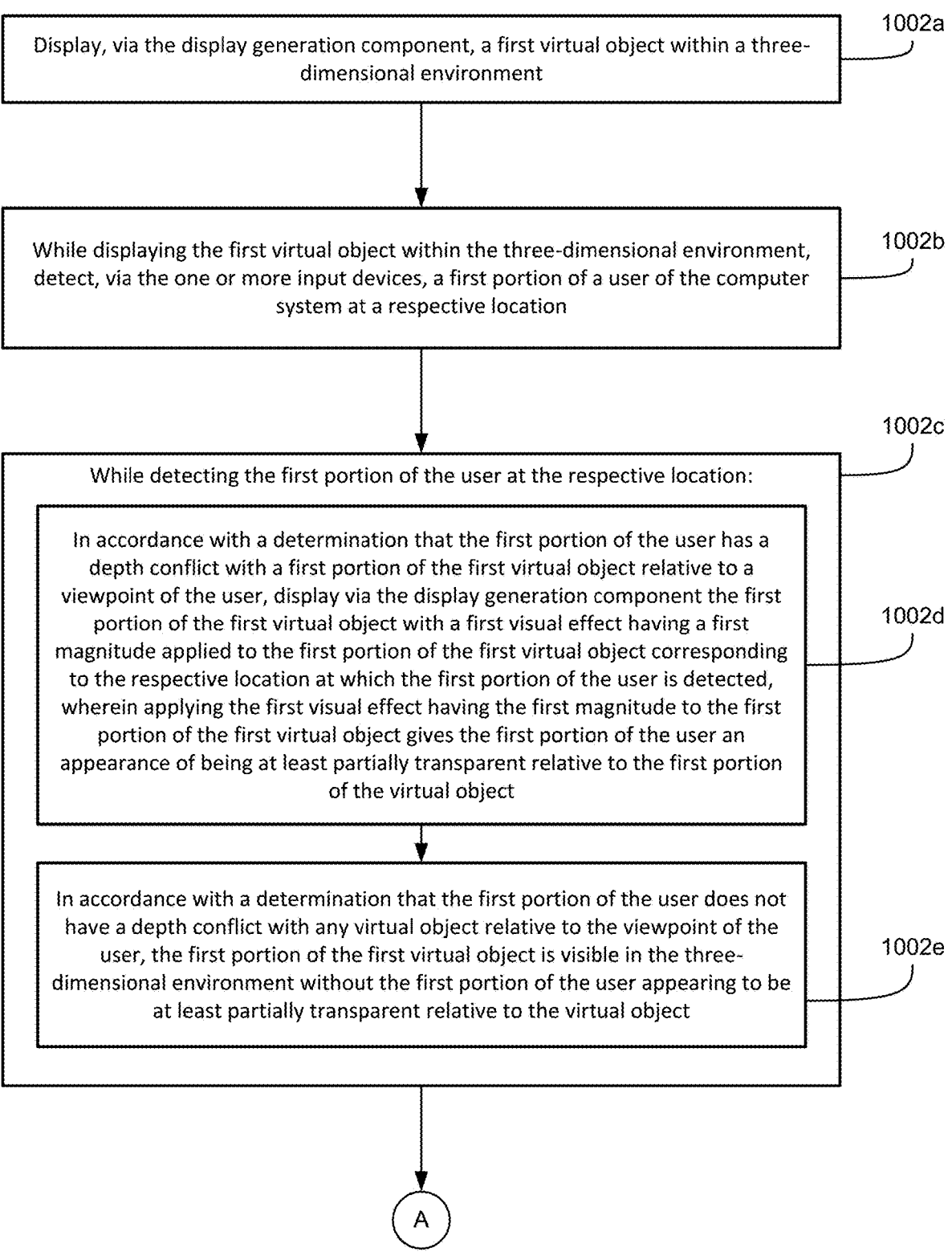

Display, via the display generation component, a first virtual object within a three-dimensional environment
1002a While displaying the first virtual object within the three-dimensional environment, detect, via the one or more input devices, a first portion of a user of the computer system at a respective location
1002b While detecting the first portion of the user at the respective location:
1002c In accordance with a determination that the first portion of the user has a depth conflict with a first portion of the first virtual object relative to a viewpoint of the user, display via the display generation component the first portion of the first virtual object with a first visual effect having a first magnitude applied to the first portion of the first virtual object corresponding to the respective location at which the first portion of the user is detected, wherein applying the first visual effect having the first magnitude to the first portion of the first virtual object gives the first portion of the user an appearance of being at least partially transparent relative to the first portion of the virtual object
1002d In accordance with a determination that the first portion of the user does not have a depth conflict with any virtual object relative to the viewpoint of the user, the first portion of the first virtual object is visible in the three-dimensional environment without the first portion of the user appearing to be at least partially transparent relative to the virtual object
1002e

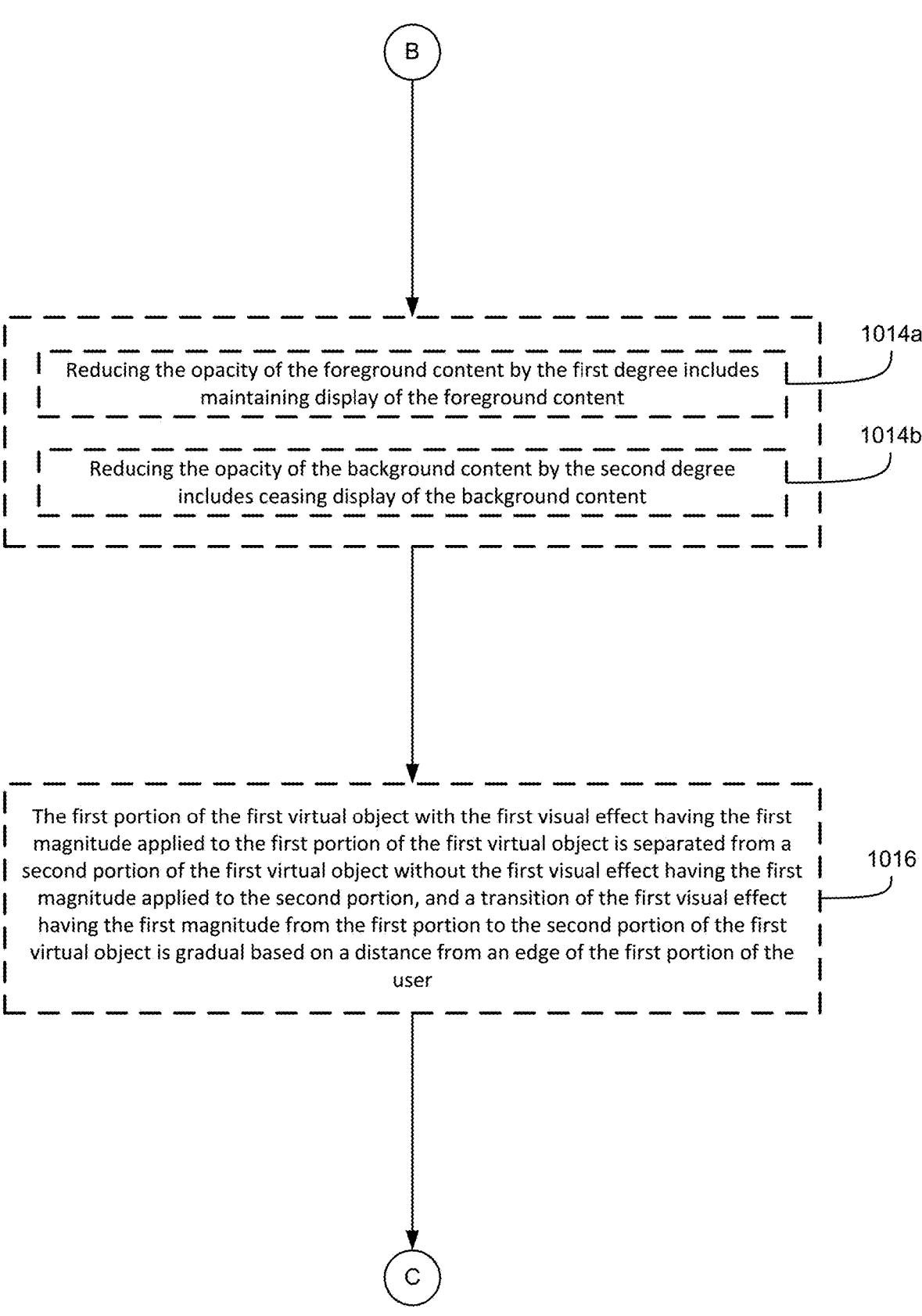

B

Reducing the opacity of the foreground content by the first degree includes maintaining display of the foreground content    1014a Reducing the opacity of the background content by the second degree includes ceasing display of the background content    1014b The first portion of the first virtual object with the first visual effect having the first magnitude applied to the first portion of the first virtual object is separated from a second portion of the first virtual object without the first visual effect having the first magnitude applied to the second portion, and a transition of the first visual effect having the first magnitude from the first portion to the second portion of the first virtual object is gradual based on a distance from an edge of the first portion of the user    1016

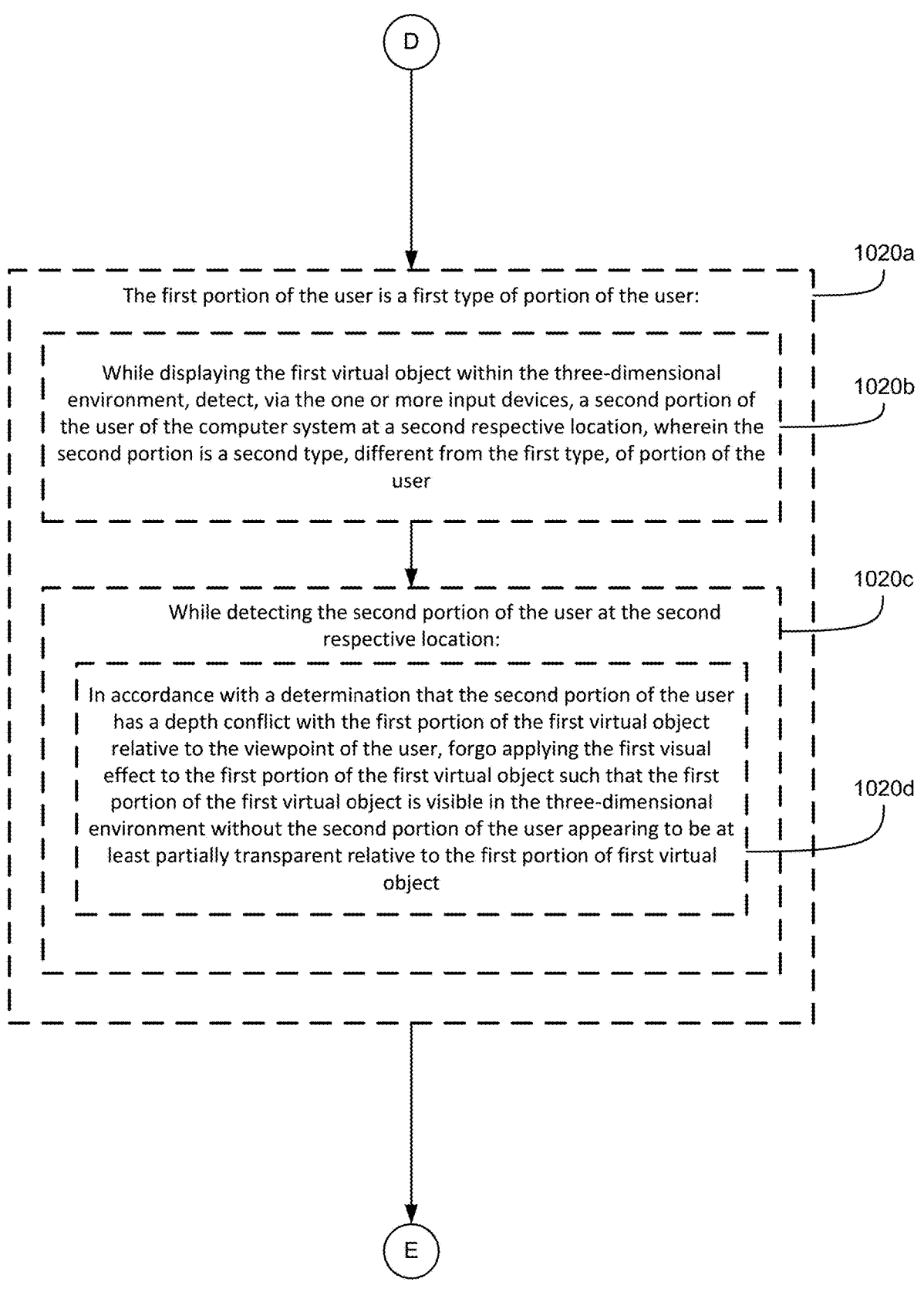

D

The first portion of the user is a first type of portion of the user:

While displaying the first virtual object within the three-dimensional environment, detect, via the one or more input devices, a second portion of the user of the computer system at a second respective location, wherein the second portion is a second type, different from the first type, of portion of the user 1020a 1020b While detecting the second portion of the user at the second respective location:

In accordance with a determination that the second portion of the user has a depth conflict with the first portion of the first virtual object relative to the viewpoint of the user, forgo applying the first visual effect to the first portion of the first virtual object such that the first portion of the first virtual object is visible in the three-dimensional environment without the second portion of the user appearing to be at least partially transparent relative to the first portion of first virtual object 1020c 1020d

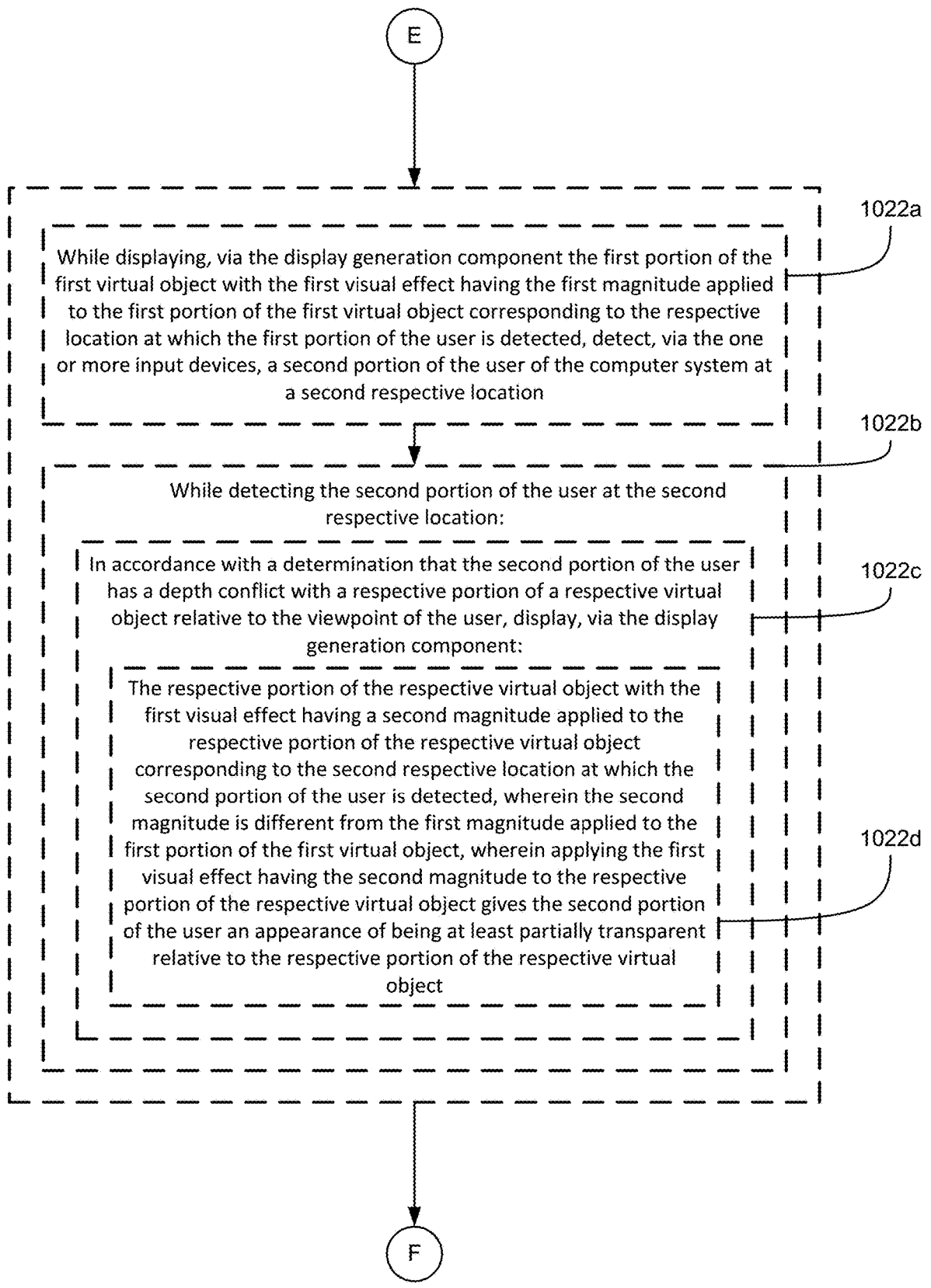

E

1022a

While displaying, via the display generation component the first portion of the first virtual object with the first visual effect having the first magnitude applied to the first portion of the first virtual object corresponding to the respective location at which the first portion of the user is detected, detect, via the one or more input devices, a second portion of the user of the computer system at a second respective location 1022b While detecting the second portion of the user at the second respective location:

In accordance with a determination that the second portion of the user has a depth conflict with a respective portion of a respective virtual object relative to the viewpoint of the user, display, via the display generation component:

1022c

The respective portion of the respective virtual object with the first visual effect having a second magnitude applied to the respective portion of the respective virtual object corresponding to the second respective location at which the second portion of the user is detected, wherein the second magnitude is different from the first magnitude applied to the first portion of the first virtual object, wherein applying the first visual effect having the second magnitude to the respective portion of the respective virtual object gives the second portion of the user an appearance of being at least partially transparent relative to the respective portion of the respective virtual object 1022d

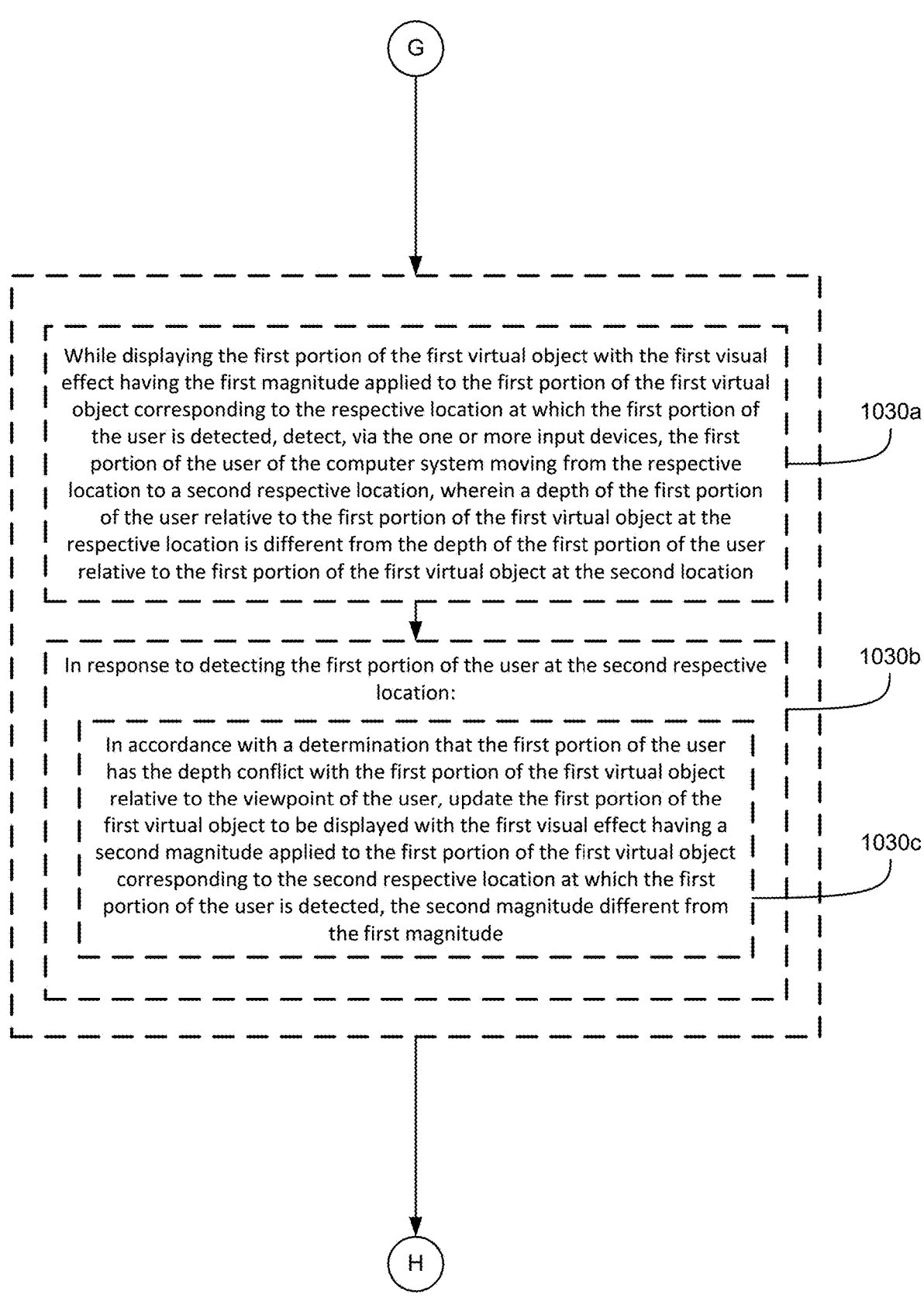

G

While displaying the first portion of the first virtual object with the first visual effect having the first magnitude applied to the first portion of the first virtual object corresponding to the respective location at which the first portion of the user is detected, detect, via the one or more input devices, the first portion of the user of the computer system moving from the respective location to a second respective location, wherein a depth of the first portion of the user relative to the first portion of the first virtual object at the respective location is different from the depth of the first portion of the user relative to the first portion of the first virtual object at the second location 1030a In response to detecting the first portion of the user at the second respective location:

1030b

In accordance with a determination that the first portion of the user has the depth conflict with the first portion of the first virtual object relative to the viewpoint of the user, update the first portion of the first virtual object to be displayed with the first visual effect having a second magnitude applied to the first portion of the first virtual object corresponding to the second respective location at which the first portion of the user is detected, the second magnitude different from the first magnitude 1030c

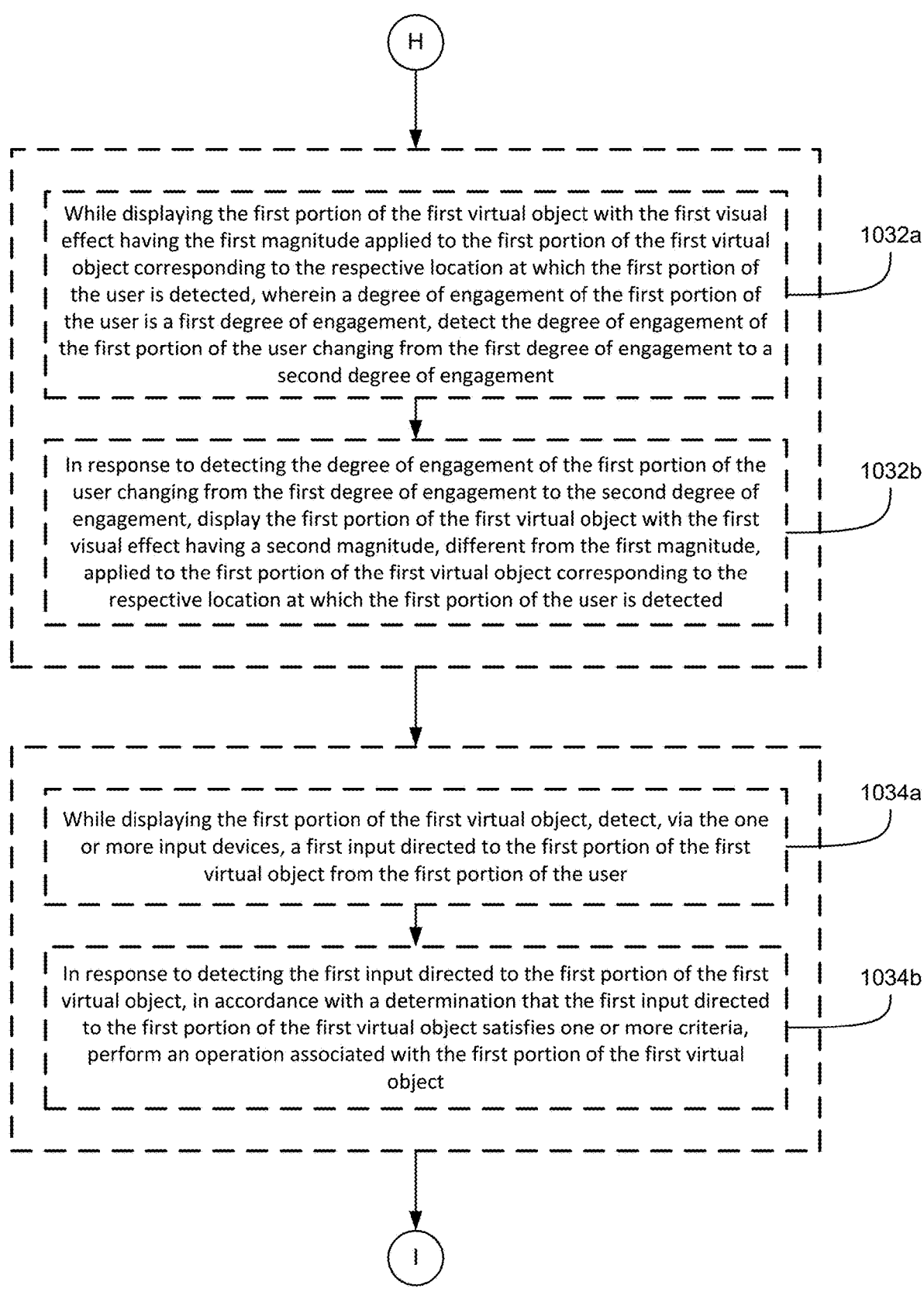

H

While displaying the first portion of the first virtual object with the first visual effect having the first magnitude applied to the first portion of the first virtual object corresponding to the respective location at which the first portion of the user is detected, wherein a degree of engagement of the first portion of the user is a first degree of engagement, detect the degree of engagement of the first portion of the user changing from the first degree of engagement to a second degree of engagement 1032a In response to detecting the degree of engagement of the first portion of the user changing from the first degree of engagement to the second degree of engagement, display the first portion of the first virtual object with the first visual effect having a second magnitude, different from the first magnitude, applied to the first portion of the first virtual object corresponding to the respective location at which the first portion of the user is detected 1032b While displaying the first portion of the first virtual object, detect, via the one or more input devices, a first input directed to the first portion of the first virtual object from the first portion of the user 1034a In response to detecting the first input directed to the first portion of the first virtual object, in accordance with a determination that the first input directed to the first portion of the first virtual object satisfies one or more criteria, perform an operation associated with the first portion of the first virtual object 1034b

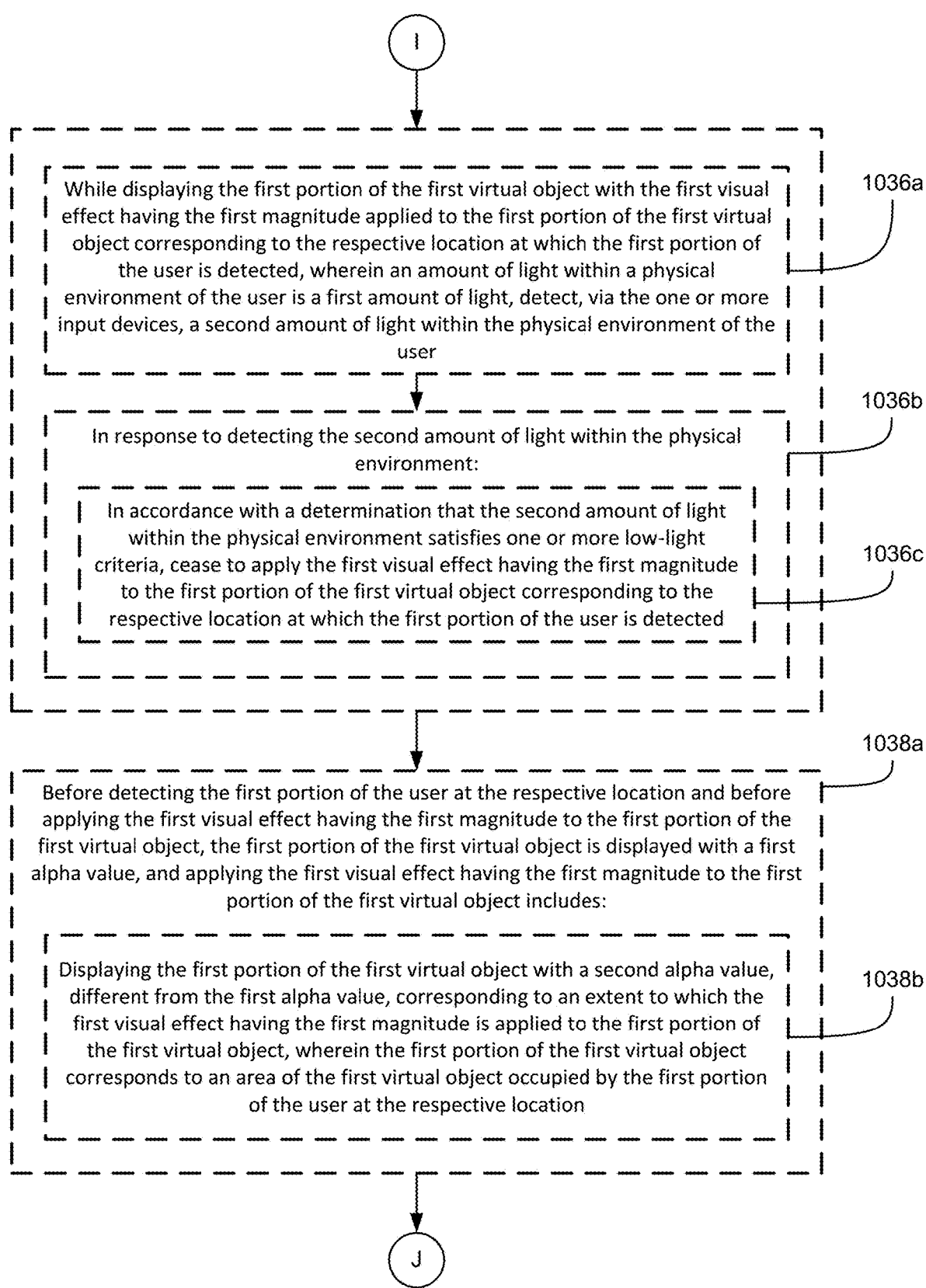

I

While displaying the first portion of the first virtual object with the first visual effect having the first magnitude applied to the first portion of the first virtual object corresponding to the respective location at which the first portion of the user is detected, wherein an amount of light within a physical environment of the user is a first amount of light, detect, via the one or more input devices, a second amount of light within the physical environment of the user 1036a In response to detecting the second amount of light within the physical environment:

1036b

In accordance with a determination that the second amount of light within the physical environment satisfies one or more low-light criteria, cease to apply the first visual effect having the first magnitude to the first portion of the first virtual object corresponding to the respective location at which the first portion of the user is detected 1036c Before detecting the first portion of the user at the respective location and before applying the first visual effect having the first magnitude to the first portion of the first virtual object, the first portion of the first virtual object is displayed with a first alpha value, and applying the first visual effect having the first magnitude to the first portion of the first virtual object includes:

1038a

Displaying the first portion of the first virtual object with a second alpha value, different from the first alpha value, corresponding to an extent to which the first visual effect having the first magnitude is applied to the first portion of the first virtual object, wherein the first portion of the first virtual object corresponds to an area of the first virtual object occupied by the first portion of the user at the respective location 1038b

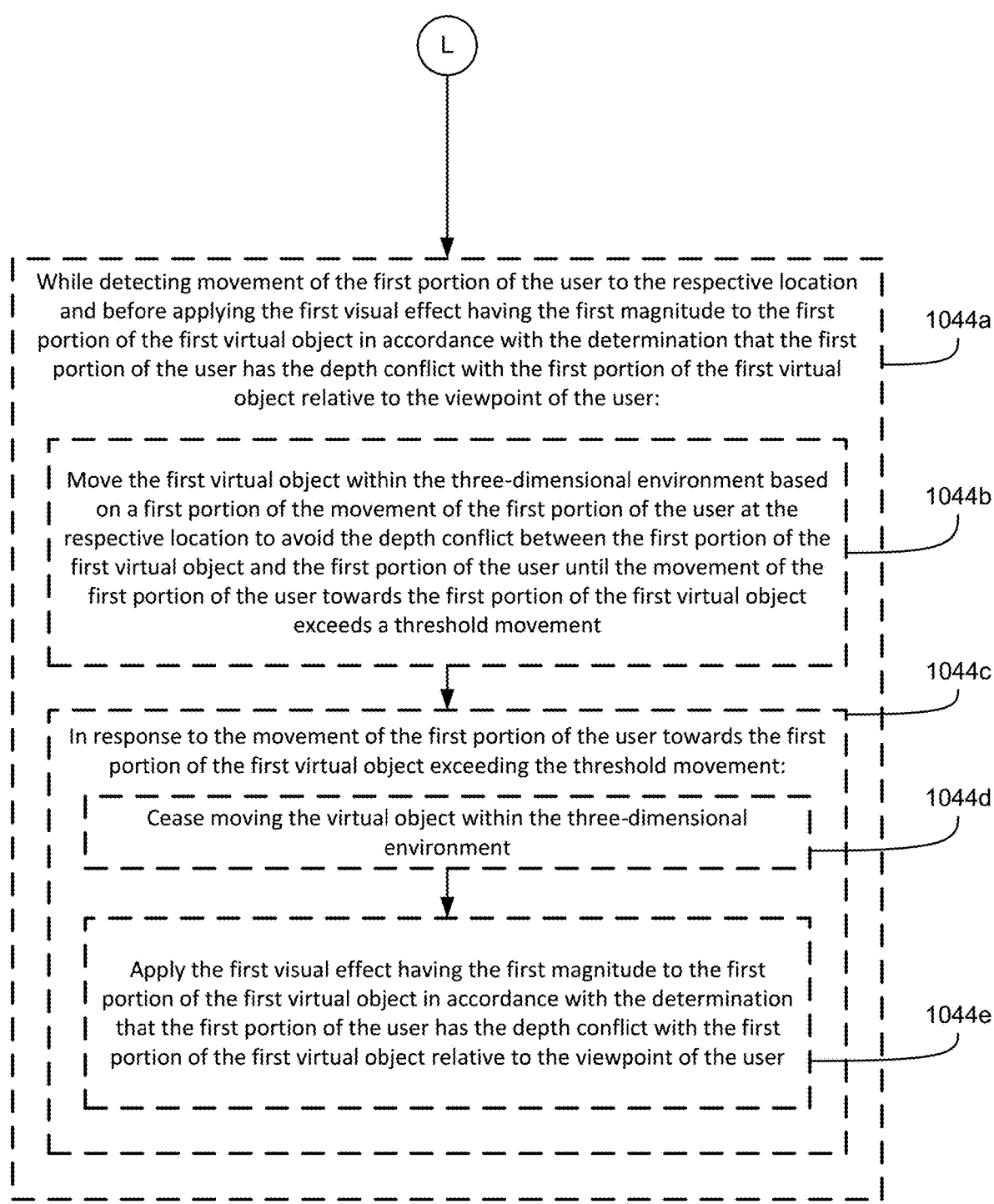

L

While detecting movement of the first portion of the user to the respective location and before applying the first visual effect having the first magnitude to the first portion of the first virtual object in accordance with the determination that the first portion of the user has the depth conflict with the first portion of the first virtual object relative to the viewpoint of the user:                                    1044a Move the first virtual object within the three-dimensional environment based on a first portion of the movement of the first portion of the user at the respective location to avoid the depth conflict between the first portion of the first virtual object and the first portion of the user until the movement of the first portion of the user towards the first portion of the first virtual object exceeds a threshold movement                                    1044b In response to the movement of the first portion of the user towards the first portion of the first virtual object exceeding the threshold movement:                                    1044c Cease moving the virtual object within the three-dimensional environment                                    1044d Apply the first visual effect having the first magnitude to the first portion of the first virtual object in accordance with the determination that the first portion of the user has the depth conflict with the first portion of the first virtual object relative to the viewpoint of the user                                    1044e

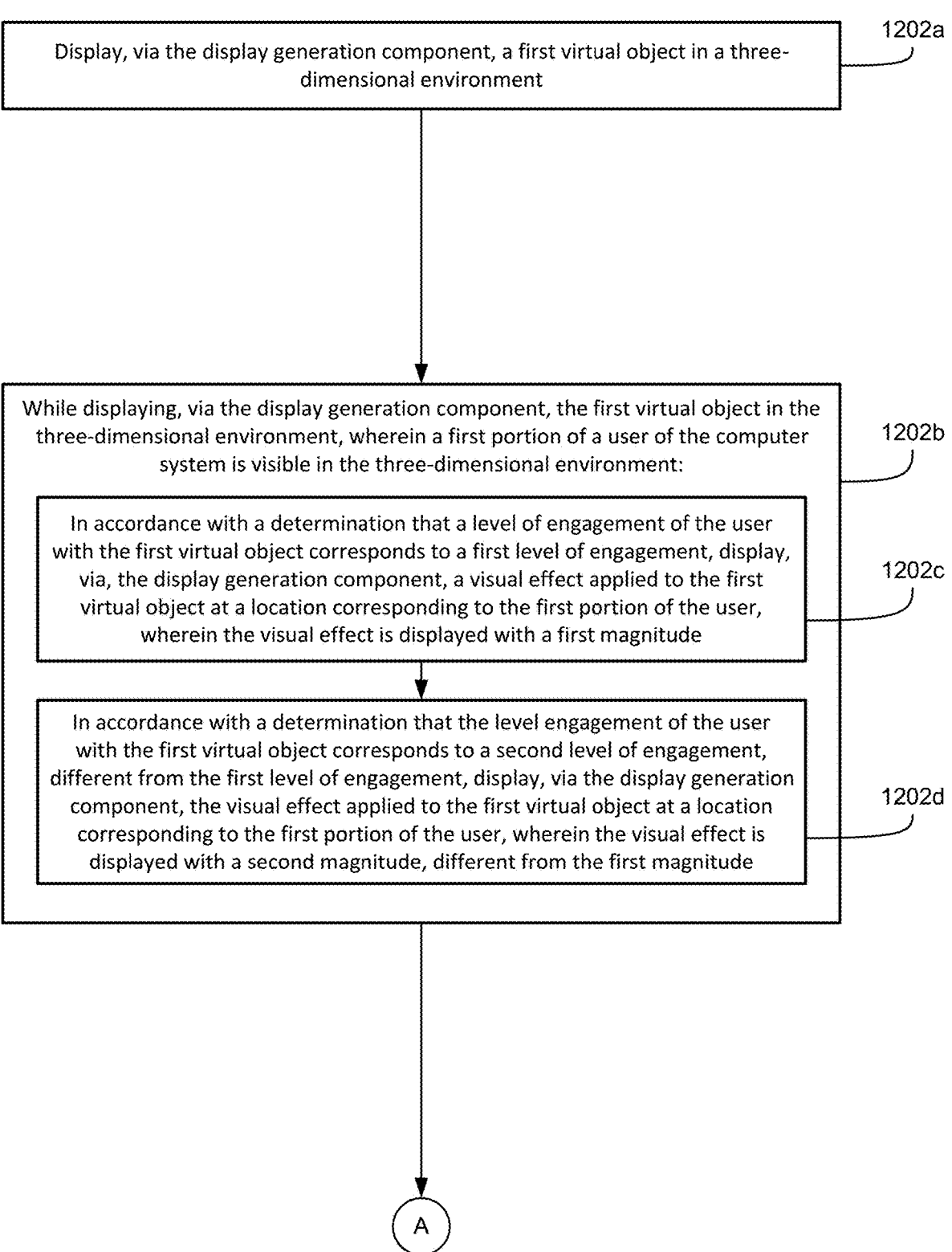

Display, via the display generation component, a first virtual object in a three-dimensional environment — 1202a While displaying, via the display generation component, the first virtual object in the three-dimensional environment, wherein a first portion of a user of the computer system is visible in the three-dimensional environment: — 1202b In accordance with a determination that a level of engagement of the user with the first virtual object corresponds to a first level of engagement, display, via, the display generation component, a visual effect applied to the first virtual object at a location corresponding to the first portion of the user, wherein the visual effect is displayed with a first magnitude — 1202c In accordance with a determination that the level engagement of the user with the first virtual object corresponds to a second level of engagement, different from the first level of engagement, display, via the display generation component, the visual effect applied to the first virtual object at a location corresponding to the first portion of the user, wherein the visual effect is displayed with a second magnitude, different from the first magnitude — 1202d

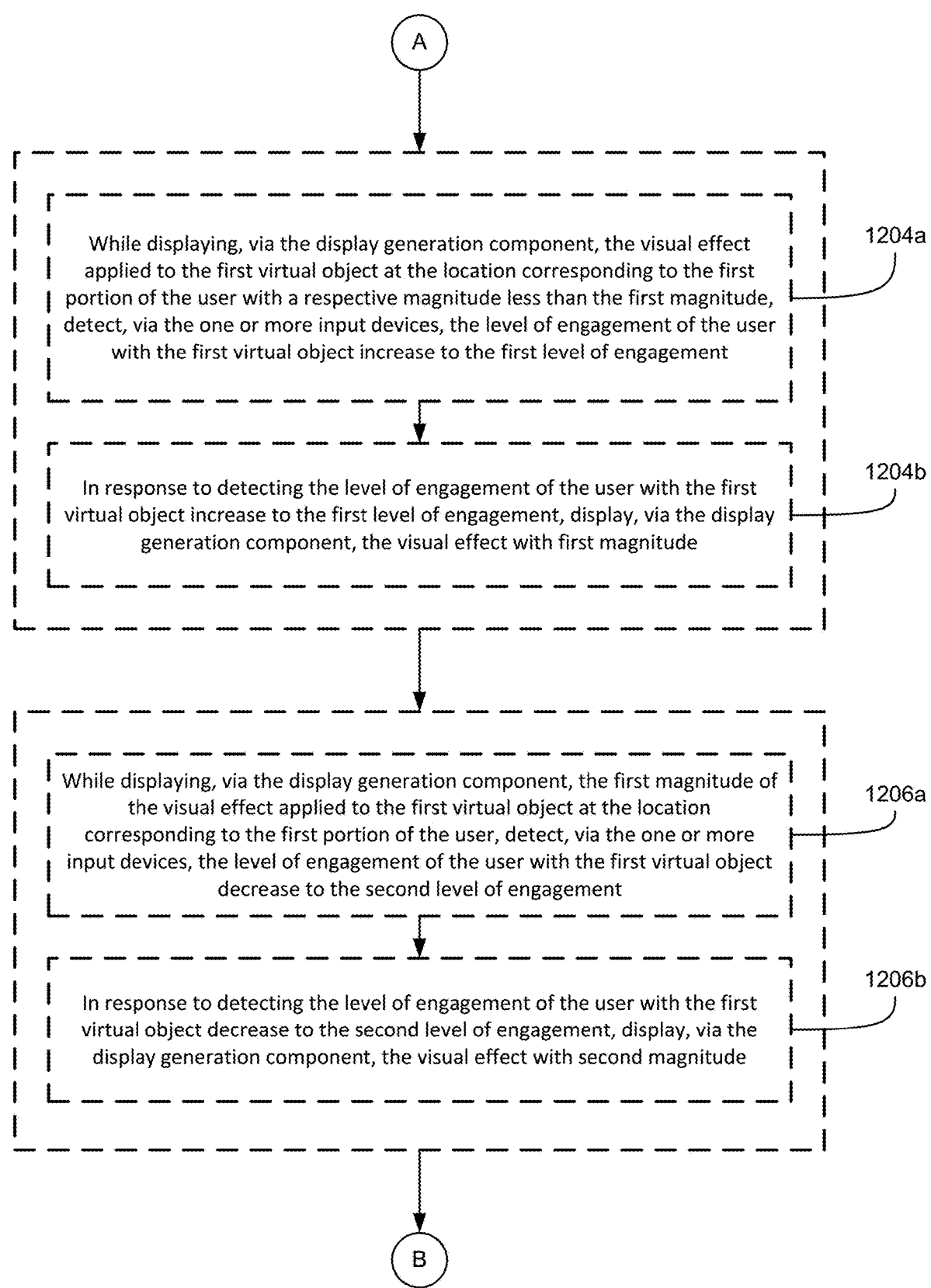

A

While displaying, via the display generation component, the visual effect applied to the first virtual object at the location corresponding to the first portion of the user with a respective magnitude less than the first magnitude, detect, via the one or more input devices, the level of engagement of the user with the first virtual object increase to the first level of engagement 1204a In response to detecting the level of engagement of the user with the first virtual object increase to the first level of engagement, display, via the display generation component, the visual effect with first magnitude 1204b While displaying, via the display generation component, the first magnitude of the visual effect applied to the first virtual object at the location corresponding to the first portion of the user, detect, via the one or more input devices, the level of engagement of the user with the first virtual object decrease to the second level of engagement 1206a In response to detecting the level of engagement of the user with the first virtual object decrease to the second level of engagement, display, via the display generation component, the visual effect with second magnitude 1206b

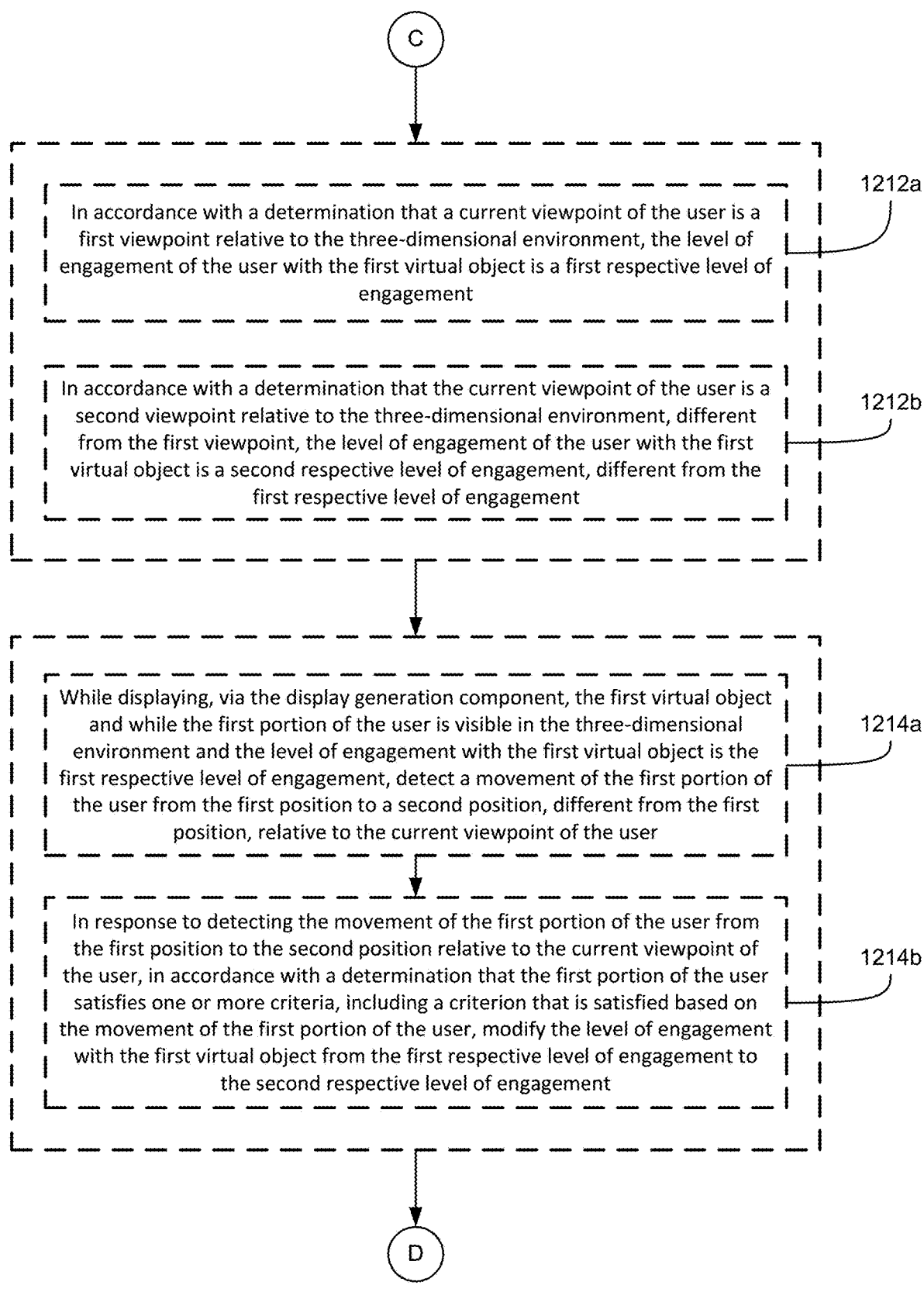

C

In accordance with a determination that a current viewpoint of the user is a first viewpoint relative to the three-dimensional environment, the level of engagement of the user with the first virtual object is a first respective level of engagement — 1212a In accordance with a determination that the current viewpoint of the user is a second viewpoint relative to the three-dimensional environment, different from the first viewpoint, the level of engagement of the user with the first virtual object is a second respective level of engagement, different from the first respective level of engagement — 1212b While displaying, via the display generation component, the first virtual object and while the first portion of the user is visible in the three-dimensional environment and the level of engagement with the first virtual object is the first respective level of engagement, detect a movement of the first portion of the user from the first position to a second position, different from the first position, relative to the current viewpoint of the user — 1214a In response to detecting the movement of the first portion of the user from the first position to the second position relative to the current viewpoint of the user, in accordance with a determination that the first portion of the user satisfies one or more criteria, including a criterion that is satisfied based on the movement of the first portion of the user, modify the level of engagement with the first virtual object from the first respective level of engagement to the second respective level of engagement — 1214b

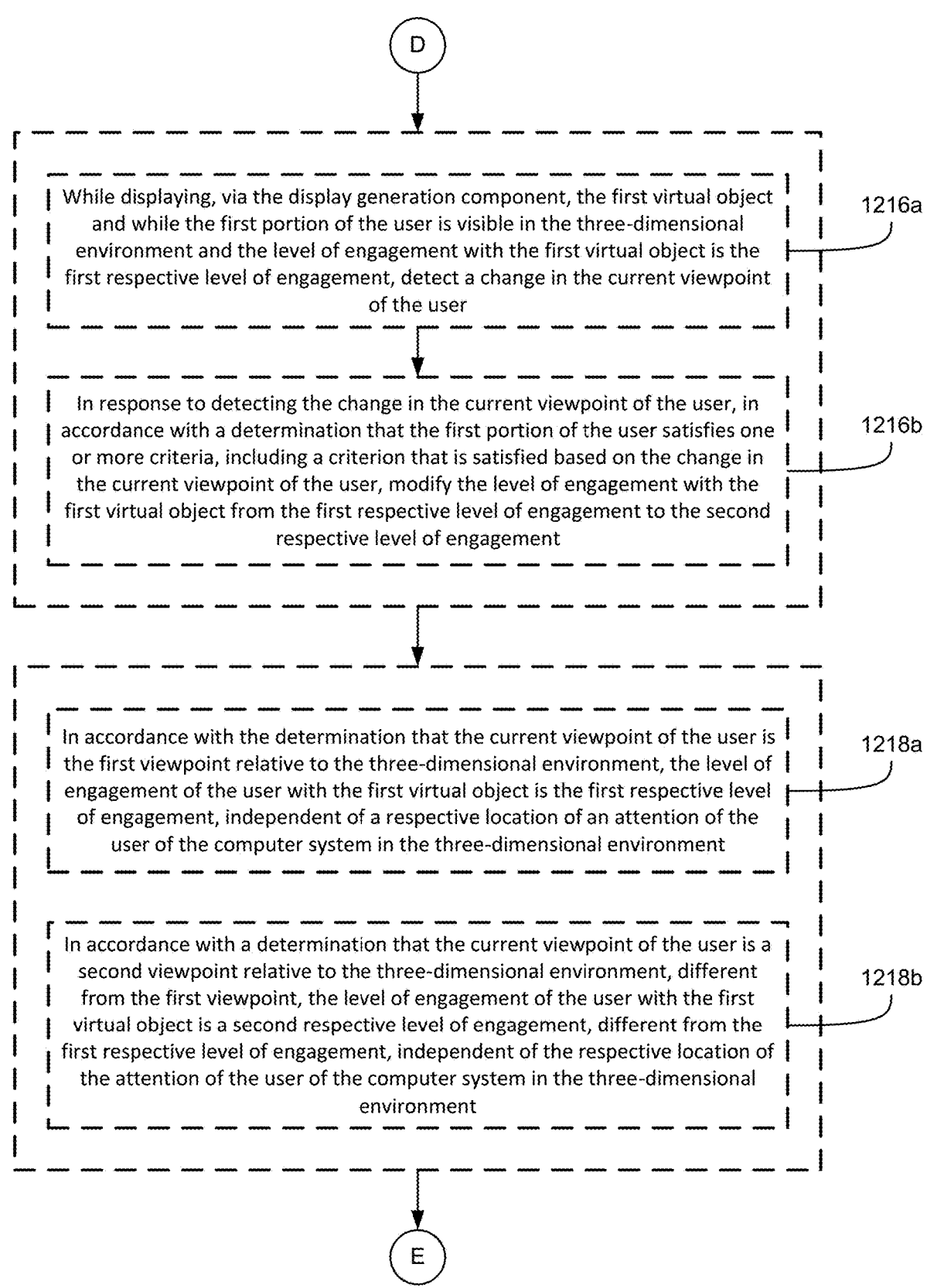

(D)

While displaying, via the display generation component, the first virtual object and while the first portion of the user is visible in the three-dimensional environment and the level of engagement with the first virtual object is the first respective level of engagement, detect a change in the current viewpoint of the user                                                                                            1216a In response to detecting the change in the current viewpoint of the user, in accordance with a determination that the first portion of the user satisfies one or more criteria, including a criterion that is satisfied based on the change in the current viewpoint of the user, modify the level of engagement with the first virtual object from the first respective level of engagement to the second respective level of engagement                                                       1216b In accordance with the determination that the current viewpoint of the user is the first viewpoint relative to the three-dimensional environment, the level of engagement of the user with the first virtual object is the first respective level of engagement, independent of a respective location of an attention of the user of the computer system in the three-dimensional environment                                                1218a In accordance with a determination that the current viewpoint of the user is a second viewpoint relative to the three-dimensional environment, different from the first viewpoint, the level of engagement of the user with the first virtual object is a second respective level of engagement, different from the first respective level of engagement, independent of the respective location of the attention of the user of the computer system in the three-dimensional environment                                                       1218b (E)

FIG. 12E

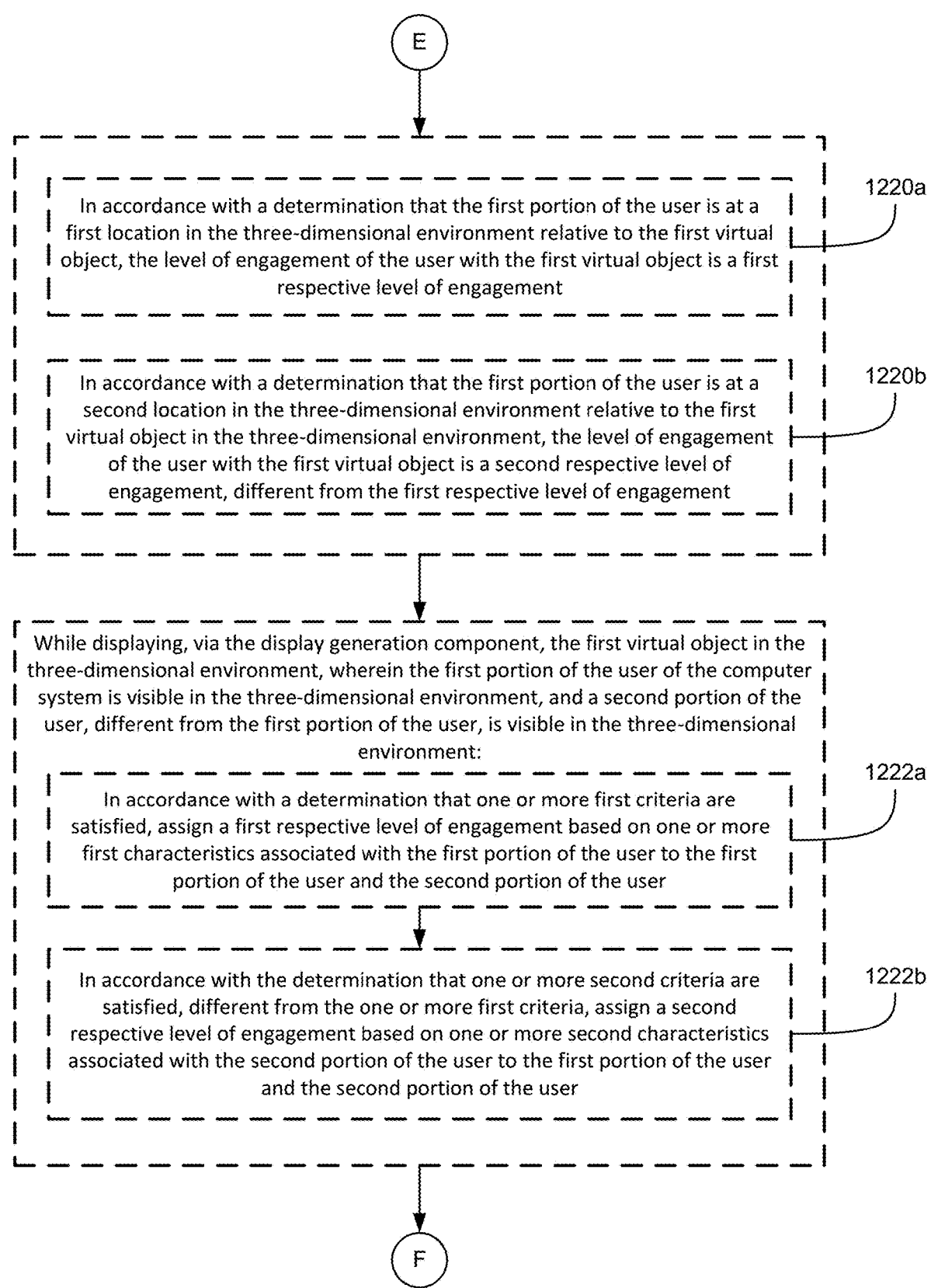

E

In accordance with a determination that the first portion of the user is at a first location in the three-dimensional environment relative to the first virtual object, the level of engagement of the user with the first virtual object is a first respective level of engagement — 1220a In accordance with a determination that the first portion of the user is at a second location in the three-dimensional environment relative to the first virtual object in the three-dimensional environment, the level of engagement of the user with the first virtual object is a second respective level of engagement, different from the first respective level of engagement — 1220b While displaying, via the display generation component, the first virtual object in the three-dimensional environment, wherein the first portion of the user of the computer system is visible in the three-dimensional environment, and a second portion of the user, different from the first portion of the user, is visible in the three-dimensional environment:

In accordance with a determination that one or more first criteria are satisfied, assign a first respective level of engagement based on one or more first characteristics associated with the first portion of the user to the first portion of the user and the second portion of the user — 1222a In accordance with the determination that one or more second criteria are satisfied, different from the one or more first criteria, assign a second respective level of engagement based on one or more second characteristics associated with the second portion of the user to the first portion of the user and the second portion of the user — 1222b

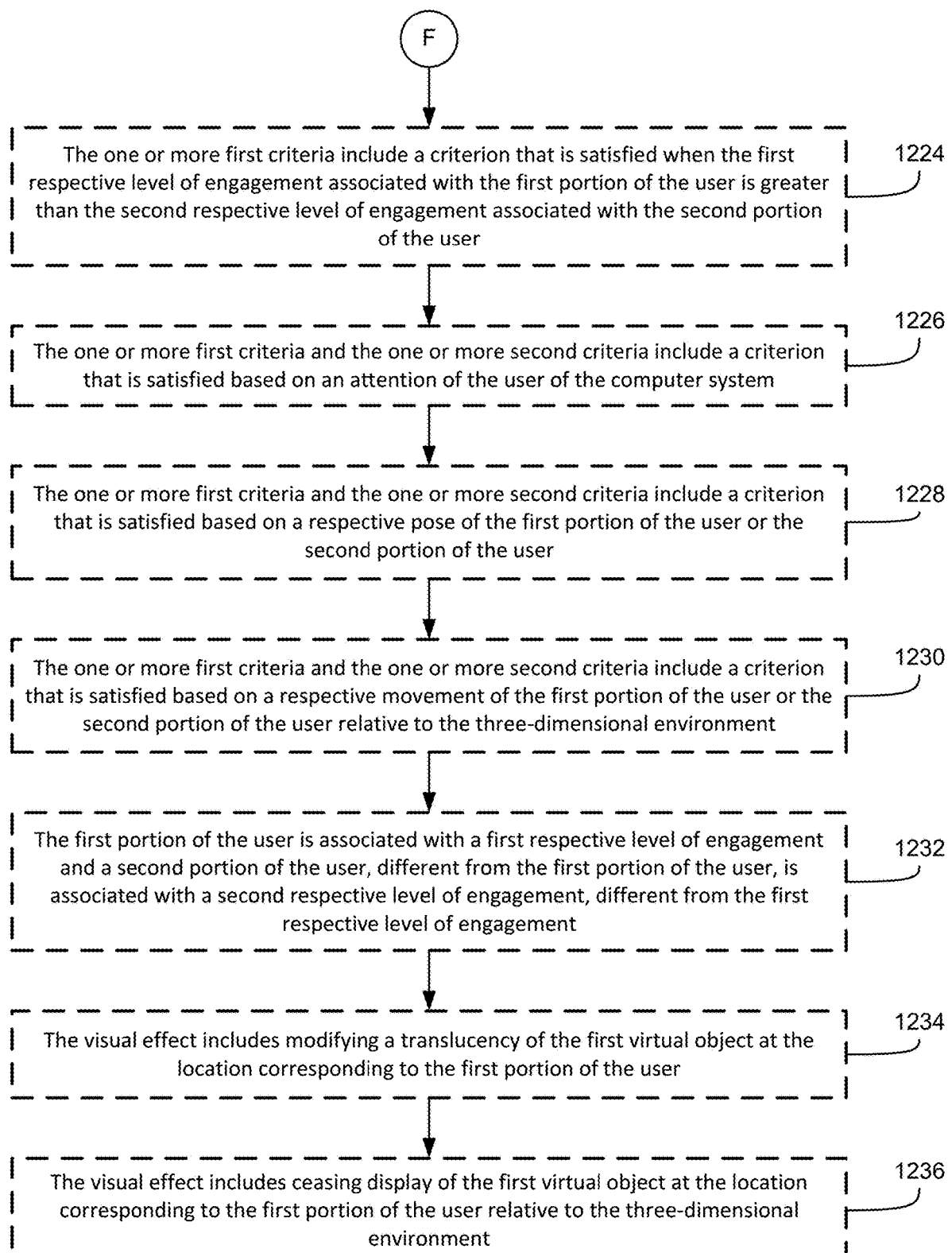

F

The one or more first criteria include a criterion that is satisfied when the first respective level of engagement associated with the first portion of the user is greater than the second respective level of engagement associated with the second portion of the user — 1224

The one or more first criteria and the one or more second criteria include a criterion that is satisfied based on an attention of the user of the computer system — 1226

The one or more first criteria and the one or more second criteria include a criterion that is satisfied based on a respective pose of the first portion of the user or the second portion of the user — 1228

The one or more first criteria and the one or more second criteria include a criterion that is satisfied based on a respective movement of the first portion of the user or the second portion of the user relative to the three-dimensional environment — 1230

The first portion of the user is associated with a first respective level of engagement and a second portion of the user, different from the first portion of the user, is associated with a second respective level of engagement, different from the first respective level of engagement — 1232

The visual effect includes modifying a translucency of the first virtual object at the location corresponding to the first portion of the user — 1234

The visual effect includes ceasing display of the first virtual object at the location corresponding to the first portion of the user relative to the three-dimensional environment — 1236

FIG. 12G

METHODS FOR DEPTH CONFLICT MITIGATION IN A THREE-DIMENSIONAL ENVIRONMENT

CROSS-REFERENCE TO RELATED APPLICATIONS

This application claims the benefit of U.S. Provisional Application No. 63/376,870, filed Sep. 23, 2022, and U.S. Provisional Application No. 63/506,070, filed Jun. 3, 2023, the contents of which are herein incorporated by reference in their entireties for all purposes.

TECHNICAL FIELD

This relates generally to computer systems that provide computer-generated experiences, including, but no limited to, electronic devices that provide virtual reality and mixed reality experiences via a display generation component.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with content in a three-dimensional environment. Such methods and interfaces may complement or replace conventional methods for interacting with content in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system facilitates depth conflict mitigation for a virtual object that is in contact with one or more physical objects in a three-dimensional environment by reducing visual prominence of one or more portions of the virtual object. In some embodiments, a computer system adjusts the visibility of one or more virtual objects in a three-dimensional environment by applying a visual effect to the one or more virtual objects in response to detecting one or more portions of a user. In some embodiments, a computer system modifies visual prominence in accordance with a level of engagement with a virtual object.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the FIGS.

FIGS. 10A-10M is a flowchart illustrating an exemplary method of adjusting the visibility of one or more virtual objects in a three-dimensional environment by applying a visual effect to the one or more virtual object in response to detecting one or more portions of a user in accordance with some embodiments.

FIGS. 12A-12G is a flowchart illustrating an exemplary method of examples of a computer system facilitating depth conflict mitigation for one or more virtual objects in accordance with user engagement in a three-dimensional environment in accordance with some embodiments.

DESCRIPTION OF EMBODIMENTS

Figure 1B:
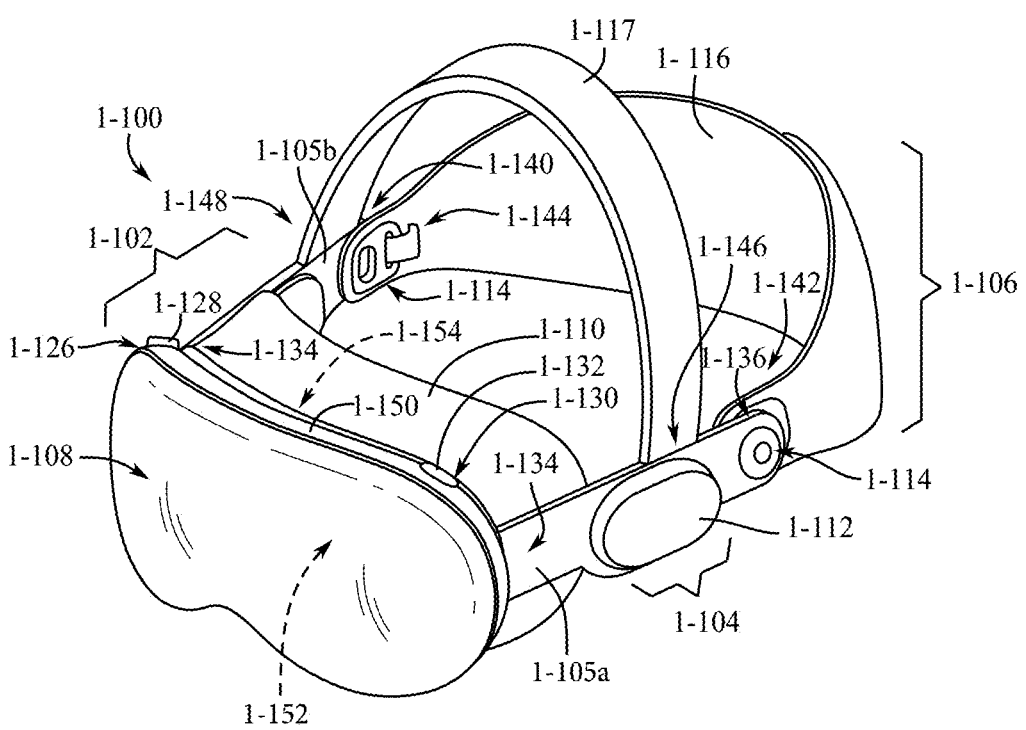
FIGS. 1B-1P are examples of a computer system for providing XR experiences in the operating environment of FIG. 1A.

The present disclosure relates to user interfaces for providing a computer generated (CGR) experience to a user, in accordance with some embodiments.

The systems, methods, and GUIs described herein provide improved ways for an electronic device to facilitate interaction with and manipulate objects in a three-dimensional environment.

In some embodiments, a computer system displays a three-dimensional environment including one or more virtual objects. In some embodiments, the computer system detects movement of a first portion of a user of the computer system relative to a first virtual object within the three-dimensional environment. In some embodiments, if the computer system determines that at least a portion of the first virtual object encounters a depth conflict with the first portion of the user after the movement of the first portion of the user, the computer system reduces visual prominence of the portion of the first virtual object that has the depth conflict with the first portion of the user in the three-dimensional environment. In some embodiments, reducing the visual prominence of the portion of the first virtual object enables the first portion of the user with which the first virtual object has the depth conflict to be visible relative to a viewpoint of the user, thus mitigating the depth conflict between the first virtual object and the first portion of the user in the three-dimensional environment.

In some embodiments, a computer system displays a three-dimensional environment including one or more virtual objects. In some embodiments, the computer system detects movement of a first portion of a user of the computer system relative to a first virtual object within the three-dimensional environment. In some embodiments, if the computer system determines that at a first portion of the first virtual object encounters a depth conflict with the first portion of the user after the movement of the first portion of the user, the computer system applies a visual effect to the first portion of the first virtual object that has the depth conflict with the first portion of the user in the three-dimensional environment. In some embodiments, applying the visual effect to the first portion of the first virtual object that has the depth conflict with the first portion of the user in the three-dimensional environment gives the first portion of the user an appearance of being at least partially transparent relative to the first portion of the virtual object.

In some embodiments, a computer system displays a three-dimensional environment including one or more virtual objects. In some embodiments, the computer system detects a level of engagement with a first virtual object associated with a respective portion of the user's body having a depth conflict with the first virtual object. In some embodiments, the computer system modifies a visual effect applied to at least a portion of the first virtual object with respect to the respective portion of the user's body. In some embodiments, the modification of the visual effect is a reducing in visual prominence of the at least portion of the first virtual object. In some embodiments, if the level of engagement with the first virtual object is increased, the corresponding degree of visual effect is increased. In some embodiments, if the level of engagement with the first virtual object is decreased, the corresponding degree of visual effect is decreased.

FIGS. 1A-6B provide a description of example computer systems for providing XR experiences to users (such as described below with respect to methods 800, 1000, and/or 1200). FIGS. 7A-7H illustrate example techniques for facilitating depth conflict mitigation for one or more virtual objects in a three-dimensional environment in accordance with some embodiments. FIGS. 8A-8N is a flow diagram of methods of facilitating depth conflict mitigation for a virtual object in a three-dimensional environment by reducing visual prominence of one or more portions of the virtual object in accordance with some embodiments. The user interfaces in FIGS. 7A-7H are used to illustrate the processes in FIGS. 8A-8N. FIGS. 9A-9H illustrate example techniques for adjusting the visibility of one or more virtual objects in a three-dimensional environment by applying a visual effect to the one or more virtual objects in response to detecting one or more portions of a user in accordance with some embodiments. FIGS. 10A-10M is a flow diagram of methods of adjusting the visibility of one or more virtual objects in a three-dimensional environment by applying a visual effect to the one or more virtual objects in response to detecting one or more portions of a user in accordance with some embodiments. The user interfaces in FIGS. 9A-9H are used to illustrate the processes in FIGS. 10A-10M. FIGS. 11A-11G illustrate example techniques for facilitating depth conflict mitigation for one or more virtual objects in accordance with user engagement in a three-dimensional environment in accordance with some embodiments. FIGS. 12A-12G is a flow diagram of methods of examples of a facilitating depth conflict mitigation for one or more virtual objects in accordance with user engagement in a three-dimensional environment in accordance with some embodiments. The user interfaces in FIGS. 11A-11G are used to illustrate the processes in FIGS. 12A-12G.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR Include Virtual Reality and Mixed Reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photo-realistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specfies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or pro-jected) via the one or more display generation components are based on a field of view of one or more cameras in communication with the display generation components which typcially move with the display generation compo-nents (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display gen-eration components is updated based on the viewpoint of the user (e.g., displayed positions and poses of the virtual objects are updated based on the movement of the viewpoint of the user)). For display generation components with opti-cal passthrough, portions of the physical environment that are visible (e.g., optically visible through one or more partially or fully transparent portions of the display genera-tion component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environ-ment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environ-ment) are visually de-emphasized (e.g., dimmed, blurred, and/or displayed with increased transparency) more than one or more second background objects, and one or more third background objects cease to be displayed. In some embodi-ments, a level of immersion includes an associated degree to which the virtual content displayed by the computer system (e.g., the virtual environment and/or the virtual content) obscures background content (e.g., content other than the virtual environment and/or the virtual content) around/be-hind the virtual content, optionally including the number of items of background content displayed and/or the visual characteristics (e.g., colors, contrast, and/or opacity) with which the background content is displayed, the angular range of the virtual content displayed via the display gen-eration component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodi-ments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is option-ally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immer-sion is displayed without concurrently displaying the back-ground content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objets such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environement or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movment of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1A:
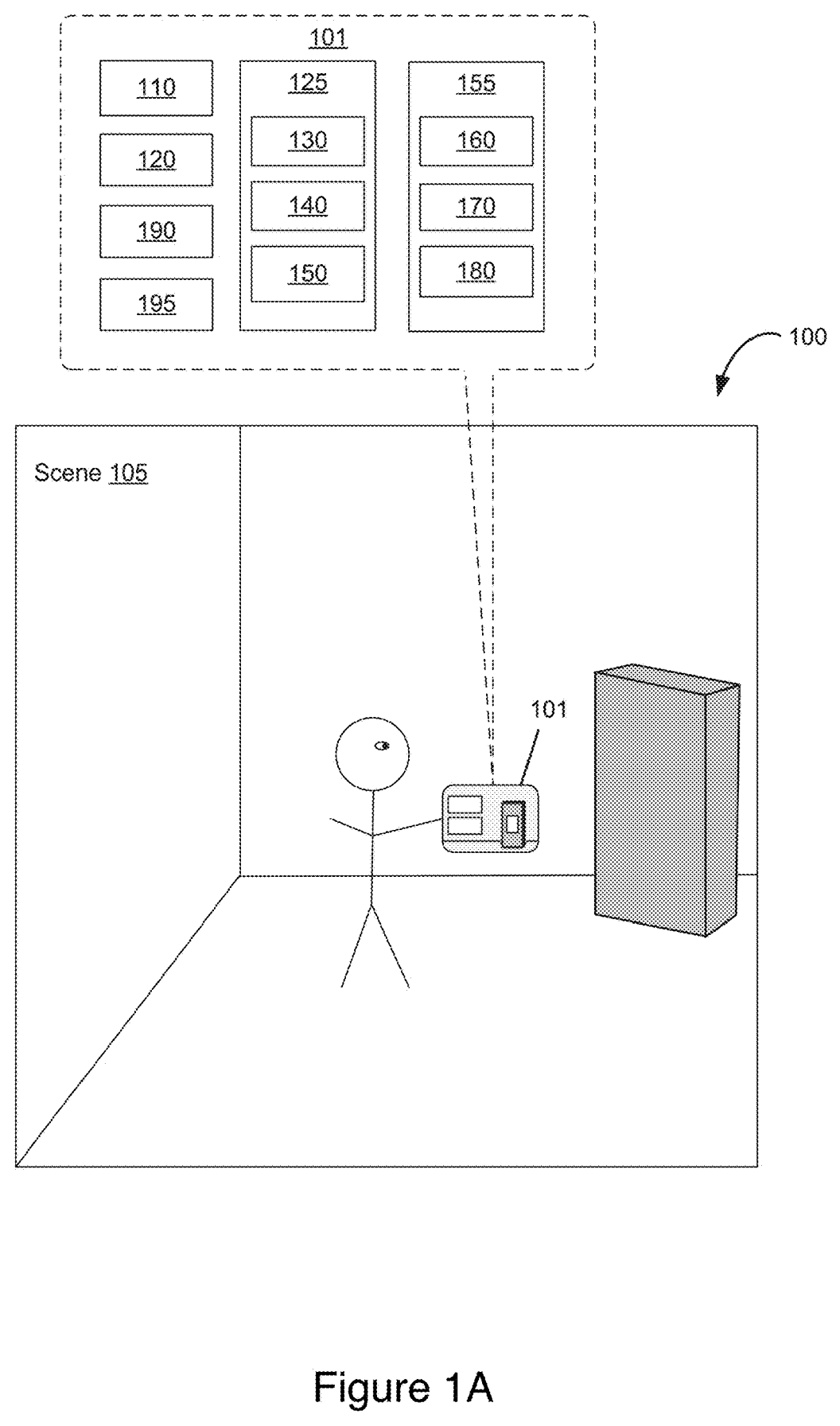
Figure 1C:
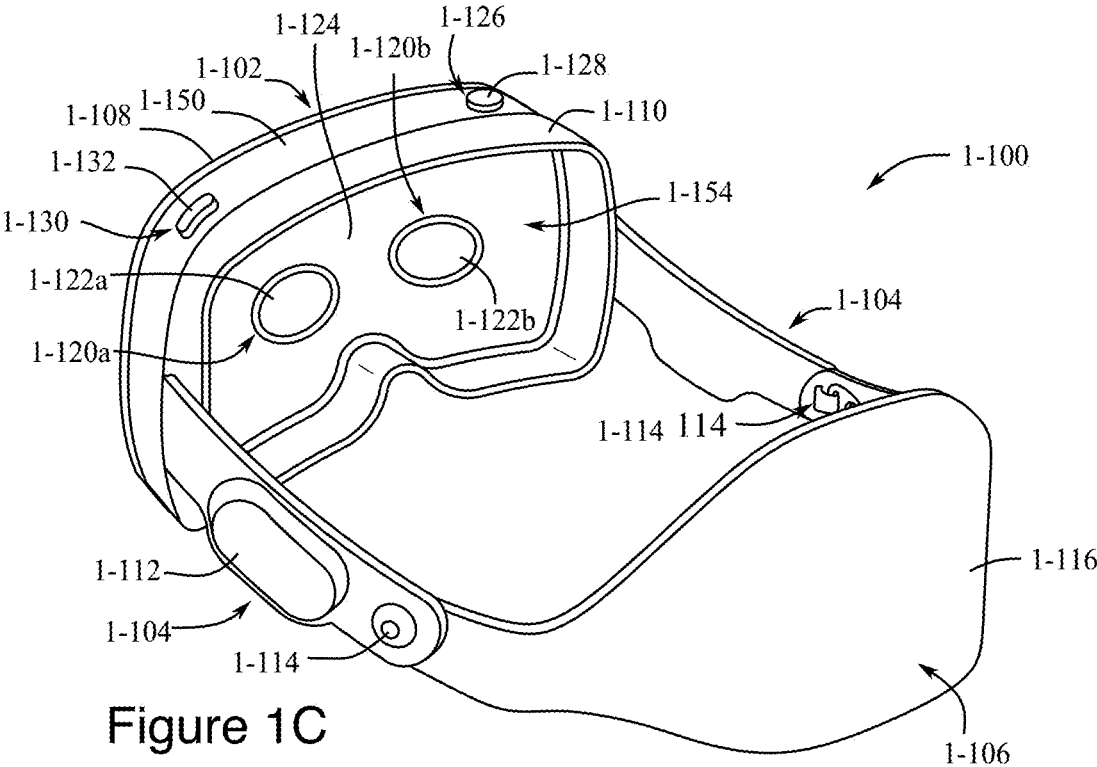
FIG. 1A is a block diagram illustrating an operating environment of a computer system for providing XR experiences in accordance with some embodiments.
FIGS. 9A-9H1 illustrate examples of a computer system adjusting the visibility of one or more virtual objects in a three-dimensional environment by applying a visual effect to the one or more virtual objects in response to detecting one or more portions of a user in accordance with some embodiments.
Figure 1D:
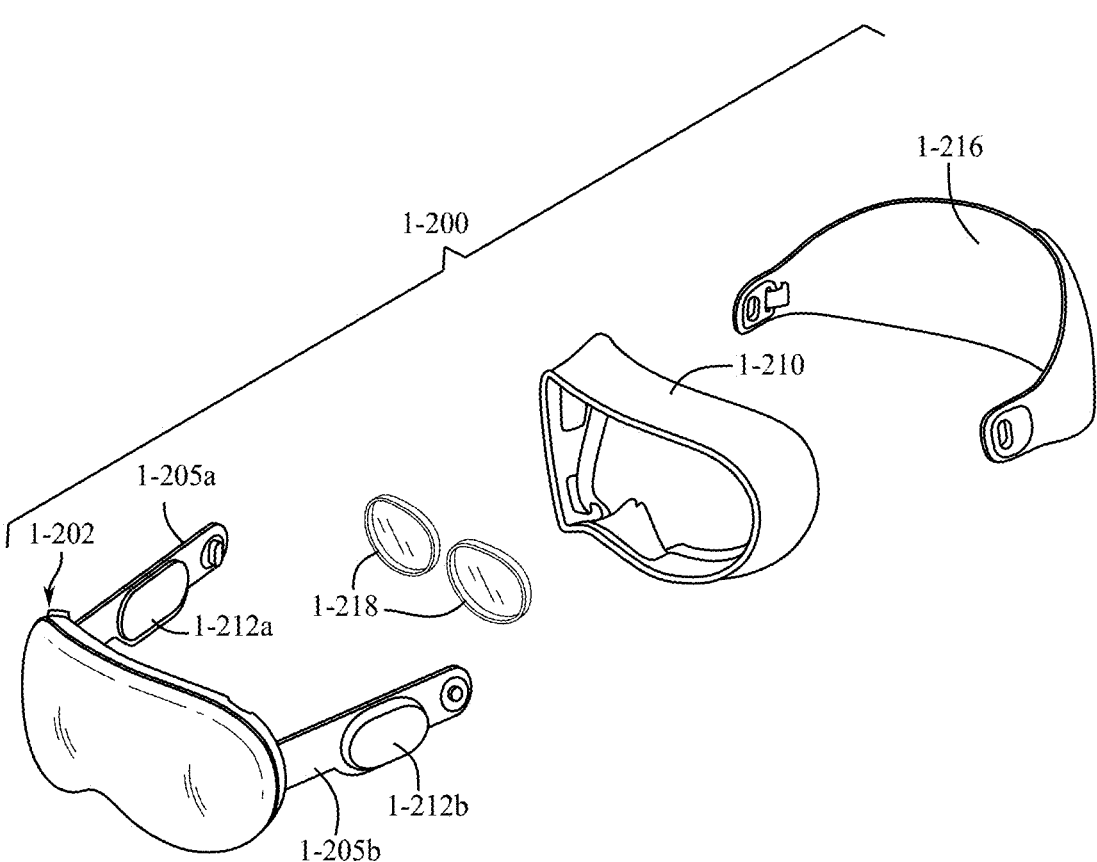
Figure 1E:
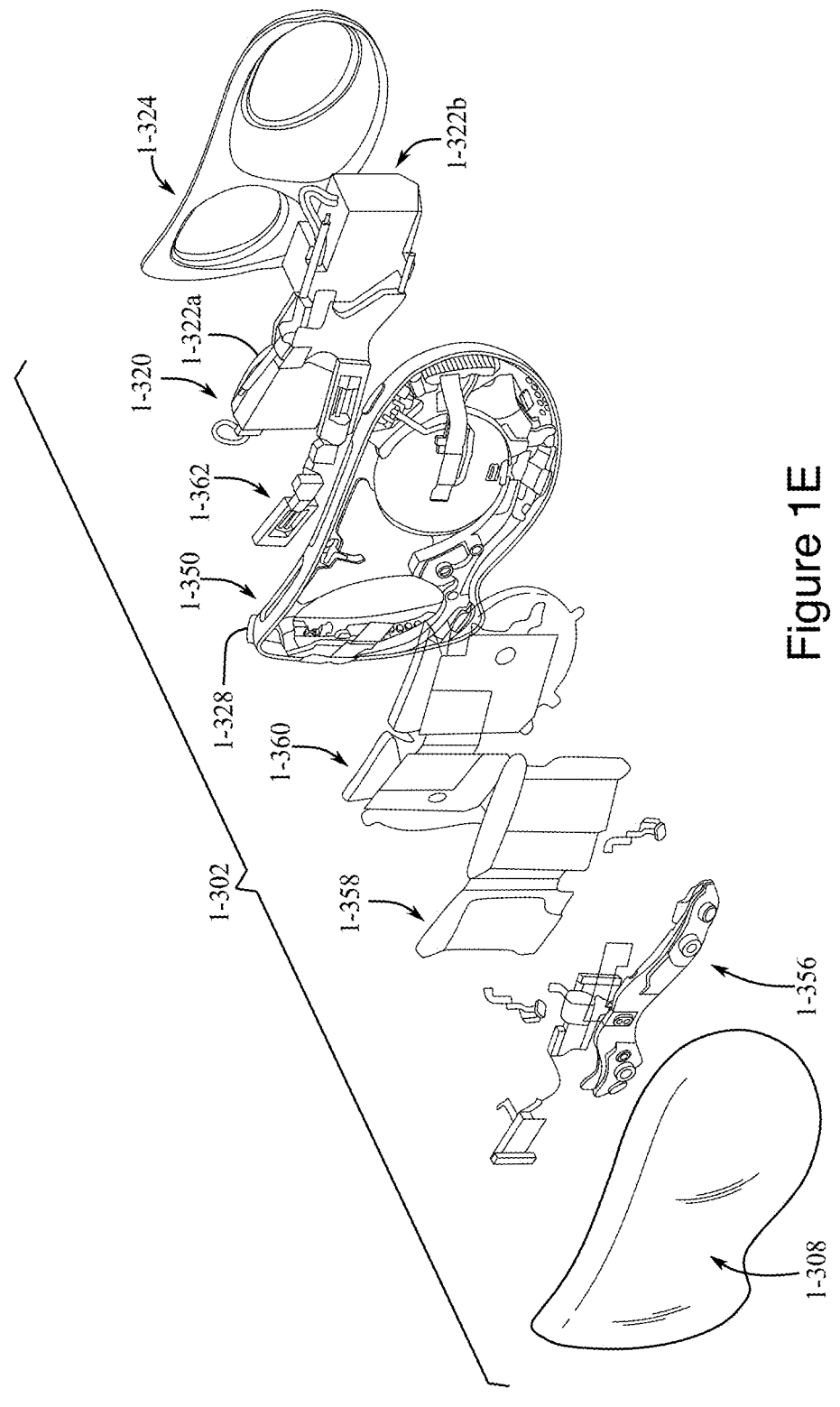
Figure 1F:
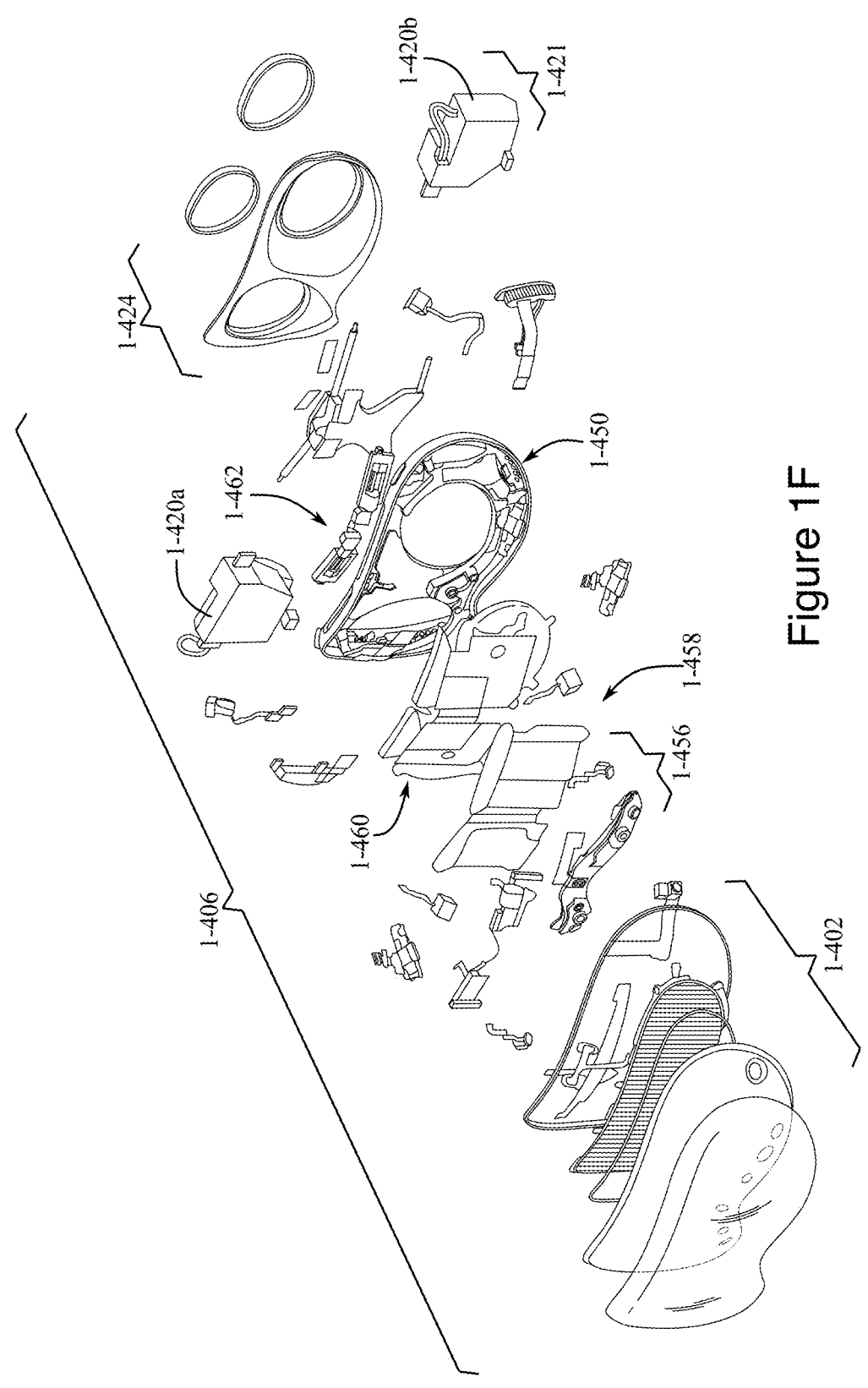
Figure 1G:
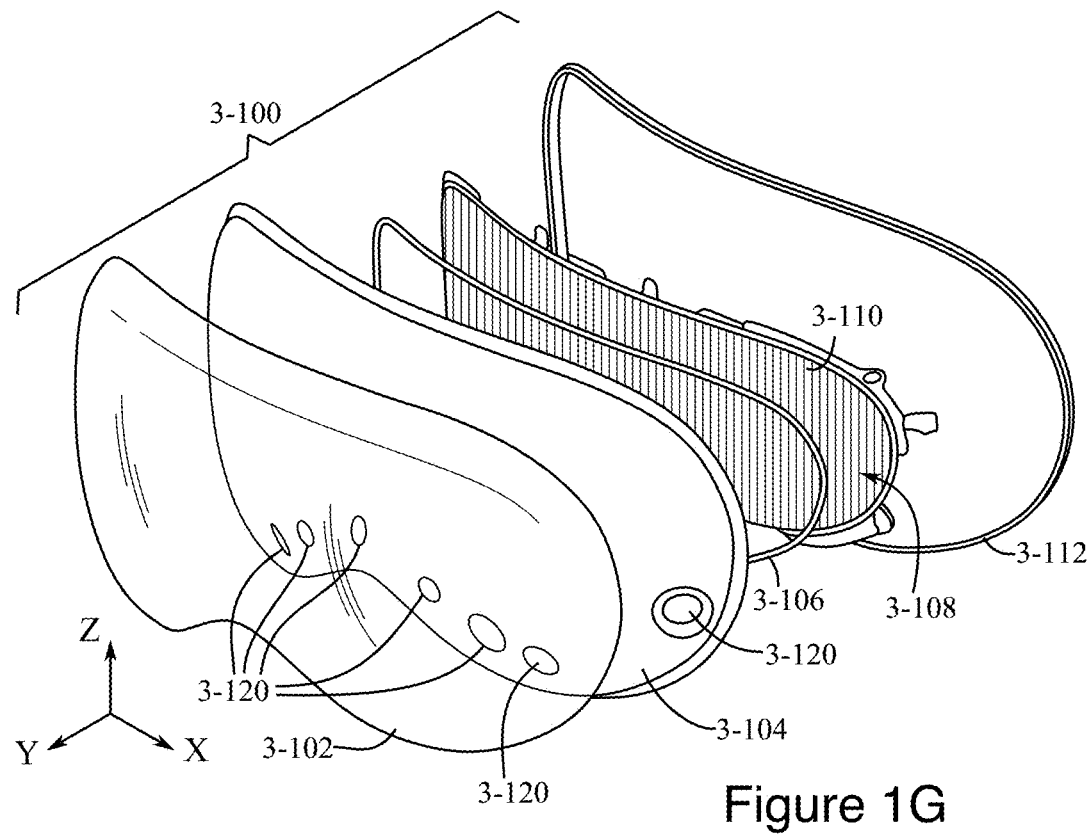
Figure 1H:
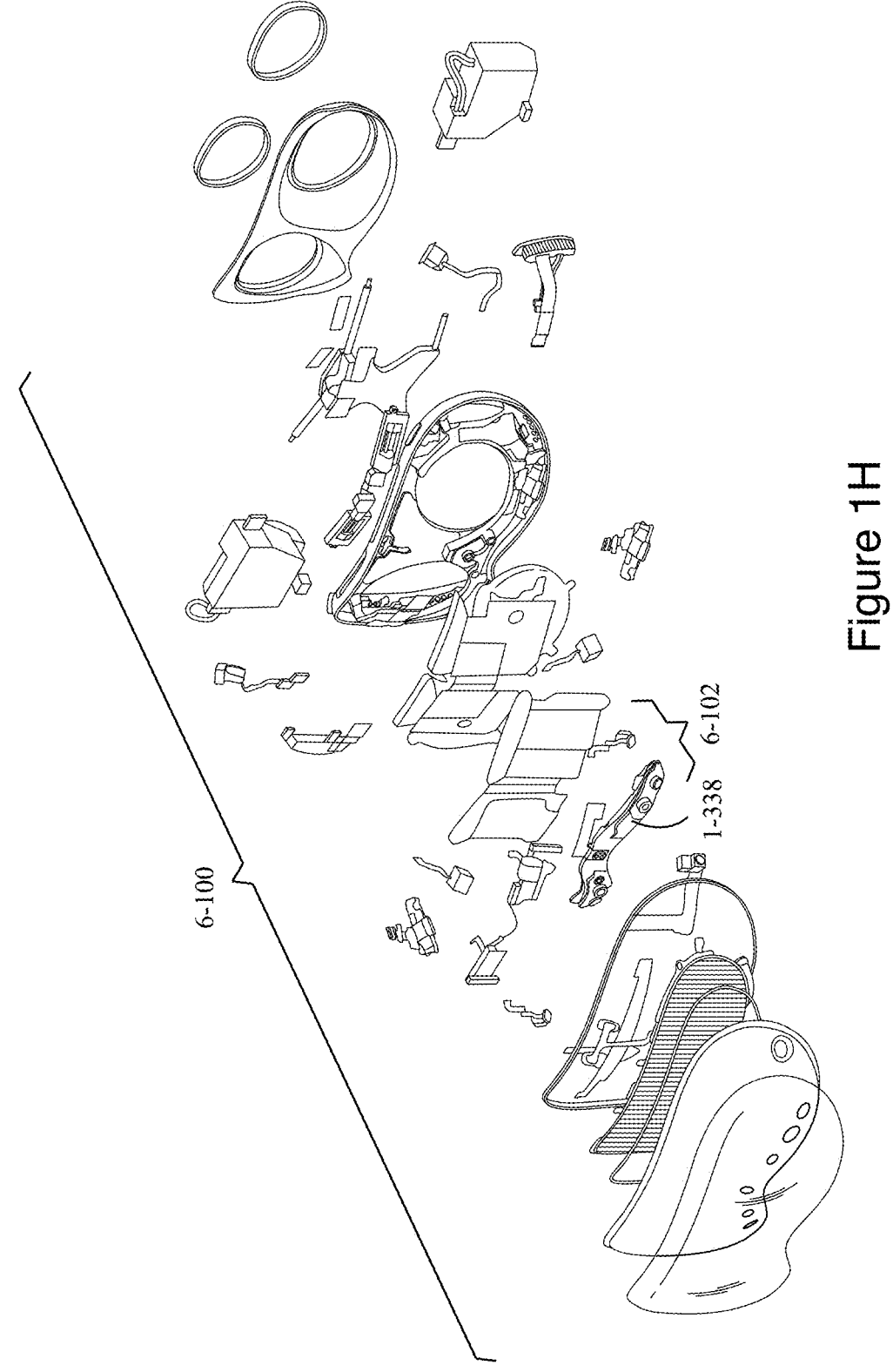
Figure 1I:
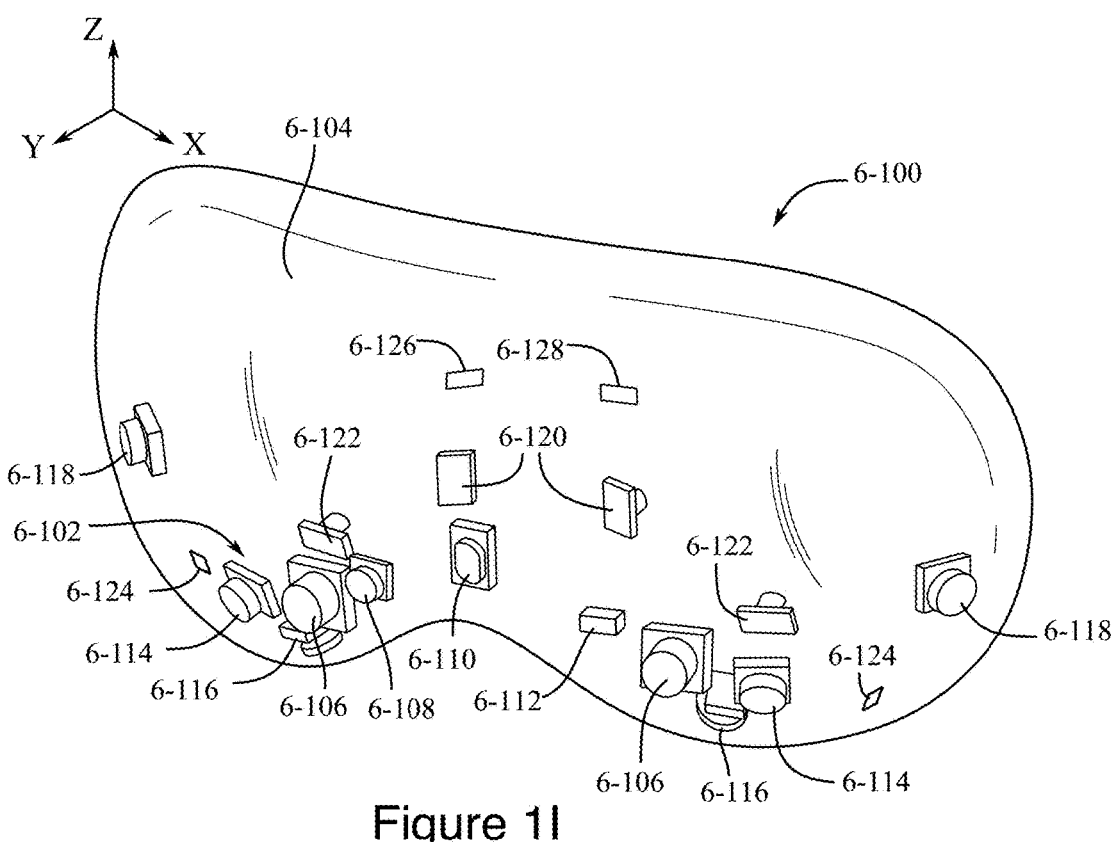
Figure 1J:
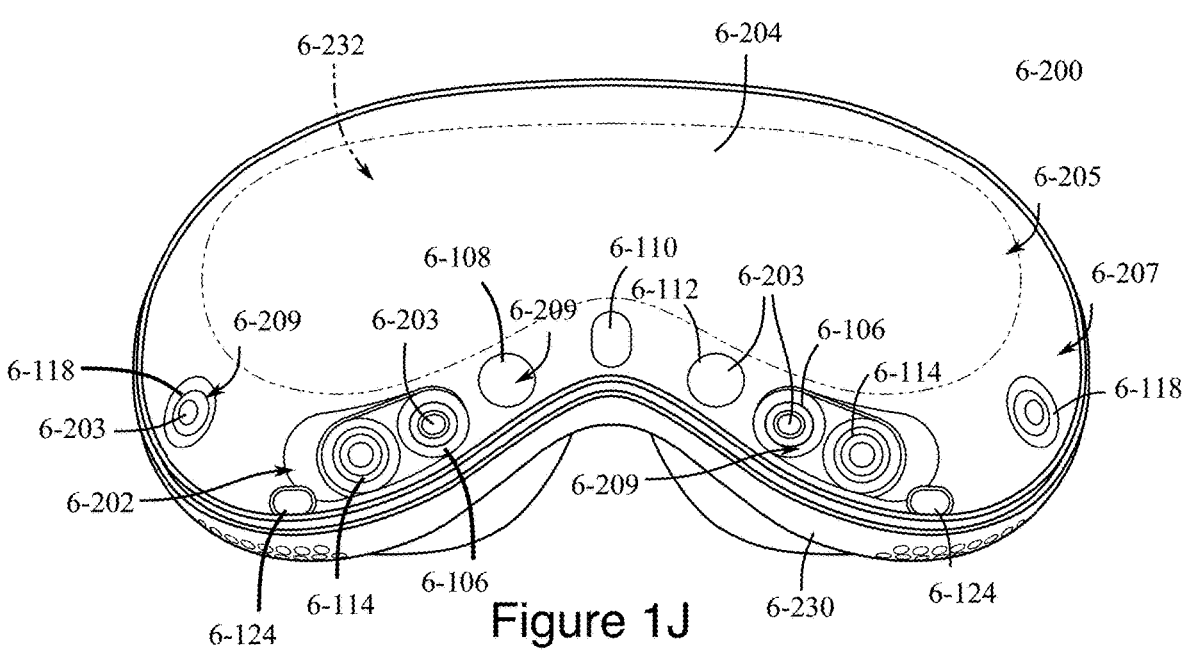
Figure 1K:
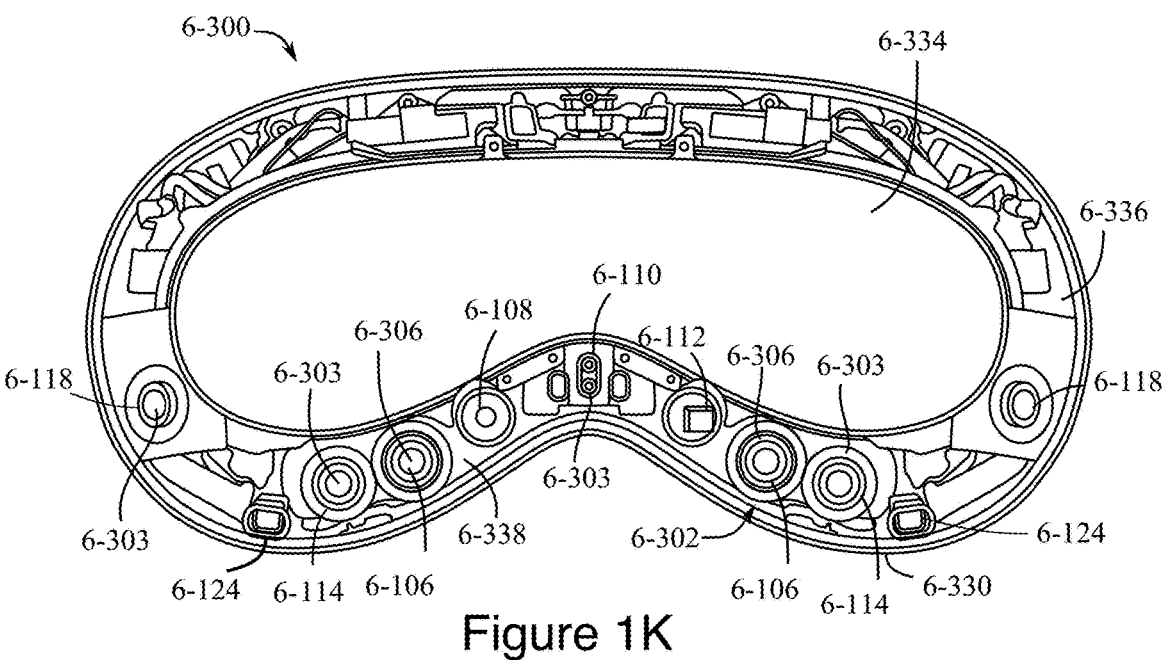
Figure 1L:
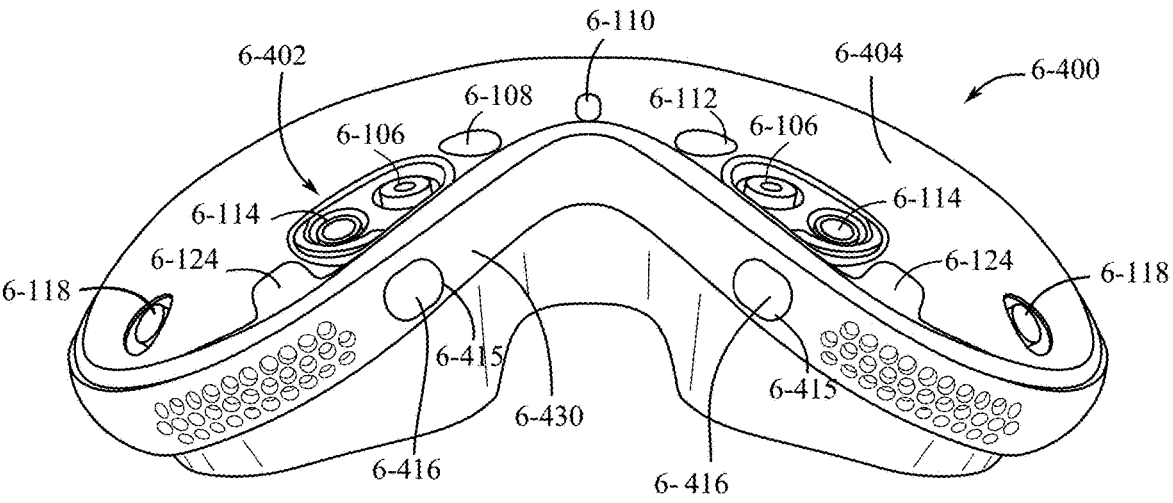
Figure 1M:
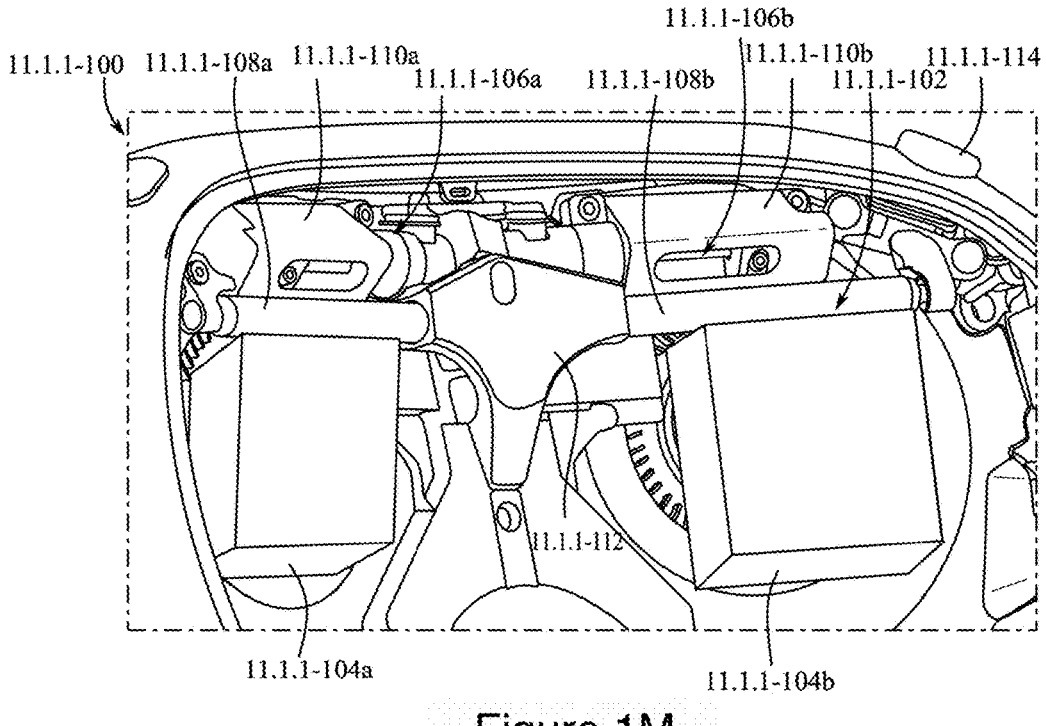
Figure 1N:
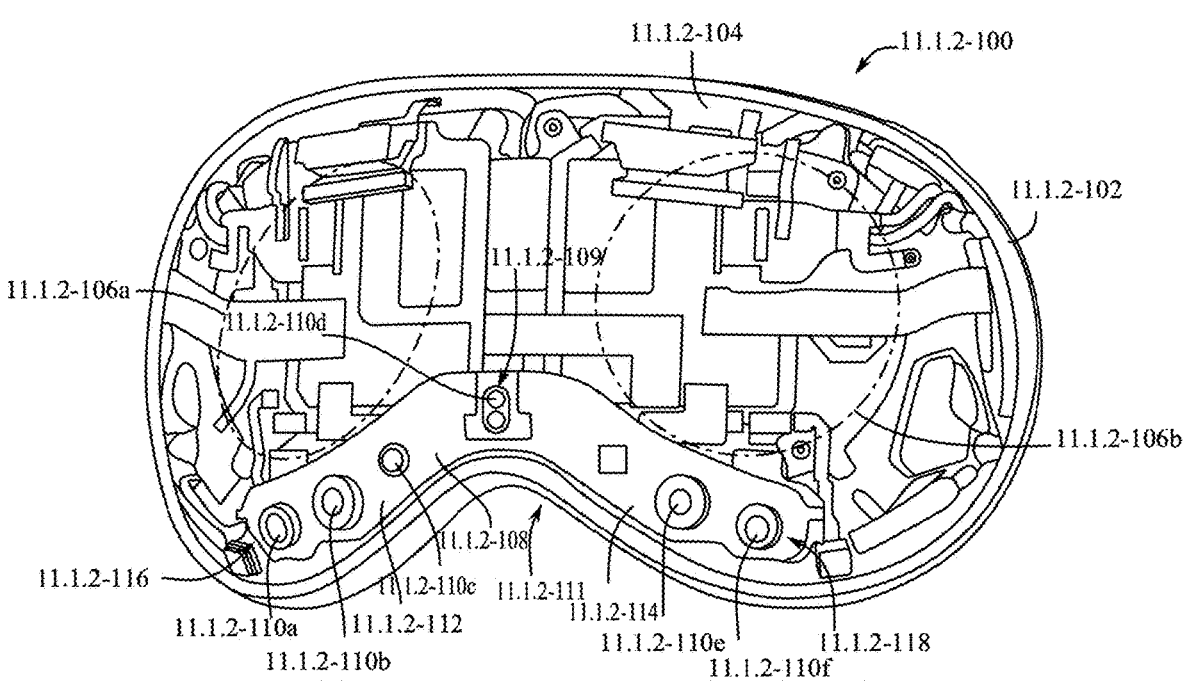
Figures 1O, 1P:
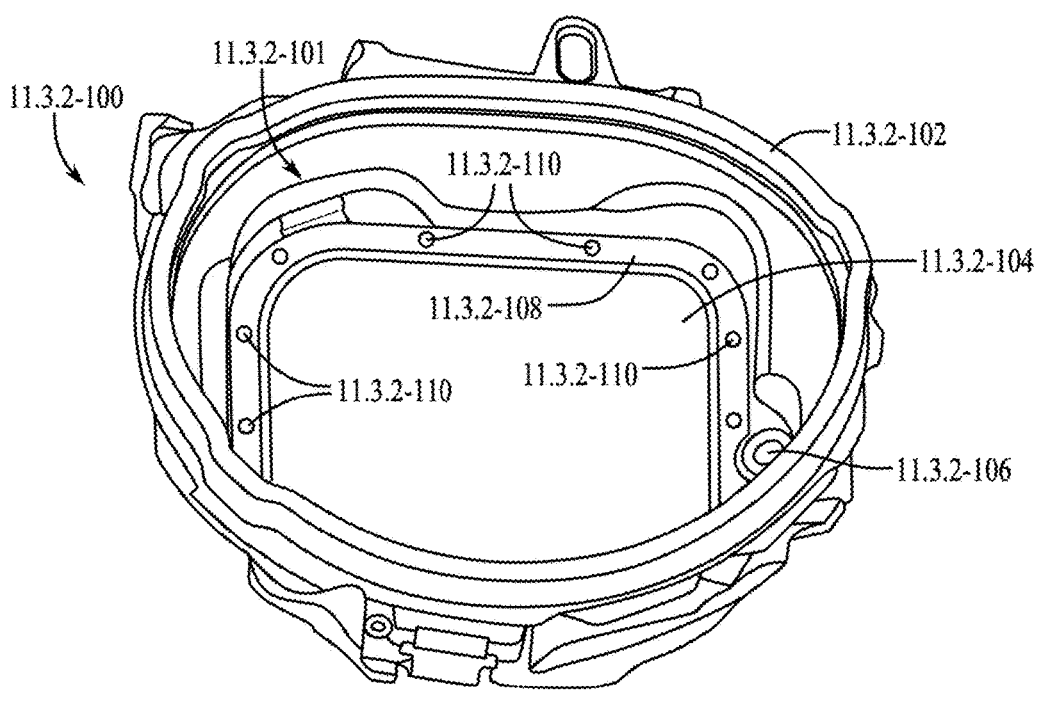

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* include plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin, for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein.

Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104a-b slidably engaging/coupled to respective guide-rods 11.1.1-108a-b and motors 11.1.1-110a-b of left and right adjustment subsystems 11.1.1-106a-b. The IPD adjustment system 11.1.1-102 can be coupled to a bracket 11.1.1-112 and include a button 11.1.1-114 in electrical communication with the motors 11.1.1-110a-b. In at least one example, the button 11.1.1-114 can electrically communicate with the first and second motors 11.1.1-110a-b via a processor or other circuitry components to cause the first and second motors

11.1.1-110a-b to activate and cause the first and second optical modules 11.1.1-104a-b, respectively, to change position relative to one another.

In at least one example, the first and second optical modules 11.1.1-104a-b can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104a-b to match the inter-pupillary distance of the user's eyes. The optical modules 11.1.1-104a-b can also include one or more cameras or other sensors/sensor systems for imaging and measuring the IPD of the user such that the optical modules 11.1.1-104a-b can be adjusted to match the IPD.

In one example, the user can manipulate the button 11.1.1-114 to cause an automatic positional adjustment of the first and second optical modules 11.1.1-104a-b. In one example, the user can manipulate the button 11.1.1-114 to cause a manual adjustment such that the optical modules 11.1.1-104a-b move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104a-b via the motors 11.1.1-110a-b is provided by an electrical power source. In one example, the adjustment and movement of the optical modules 11.1.1-104a-b via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106a, 11.1.2-106b. The apertures 11.1.2-106a-b are shown in dotted lines in FIG. 1N because a view of the apertures 11.1.2-106a-b can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106a-b.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106a-b such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110a-f. Each sensor of the plurality of sensors 11.1.2-110a-f can include various types of sensors, including cameras, IR sensors, and so forth. In some examples, one or more of the sensors 11.1.2-110a-f can be used for object recognition in three-dimensional space such that it is important to maintain a precise relative position of two or more of the plurality of sensors 11.1.2-110a-f. The cantilevered nature of the mounting bracket 11.1.2-108 can protect the sensors 11.1.2-110a-f from damage and altered positioning in the case of accidental drops by the user. Because the sensors 11.1.2-110a-f are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110a-f coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
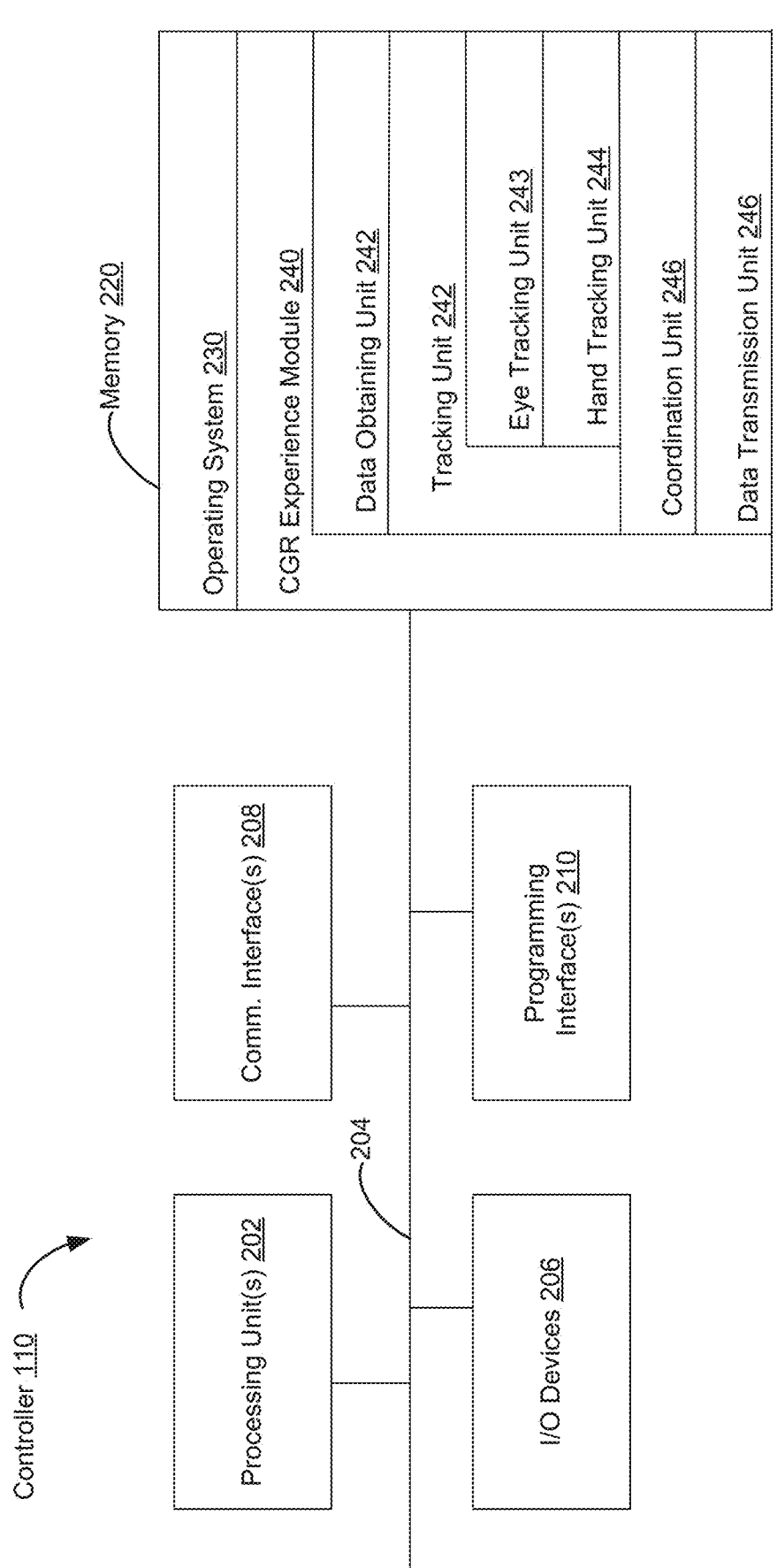
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLU-ETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
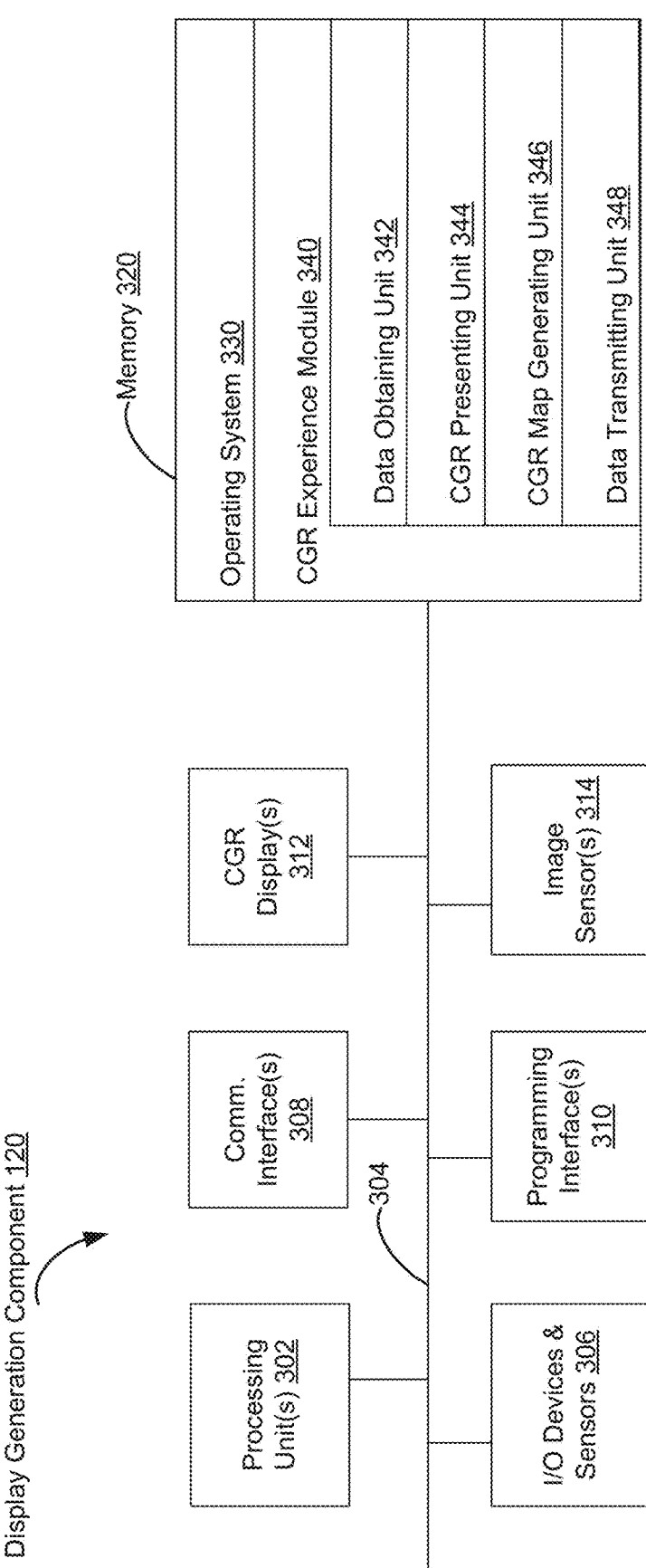
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
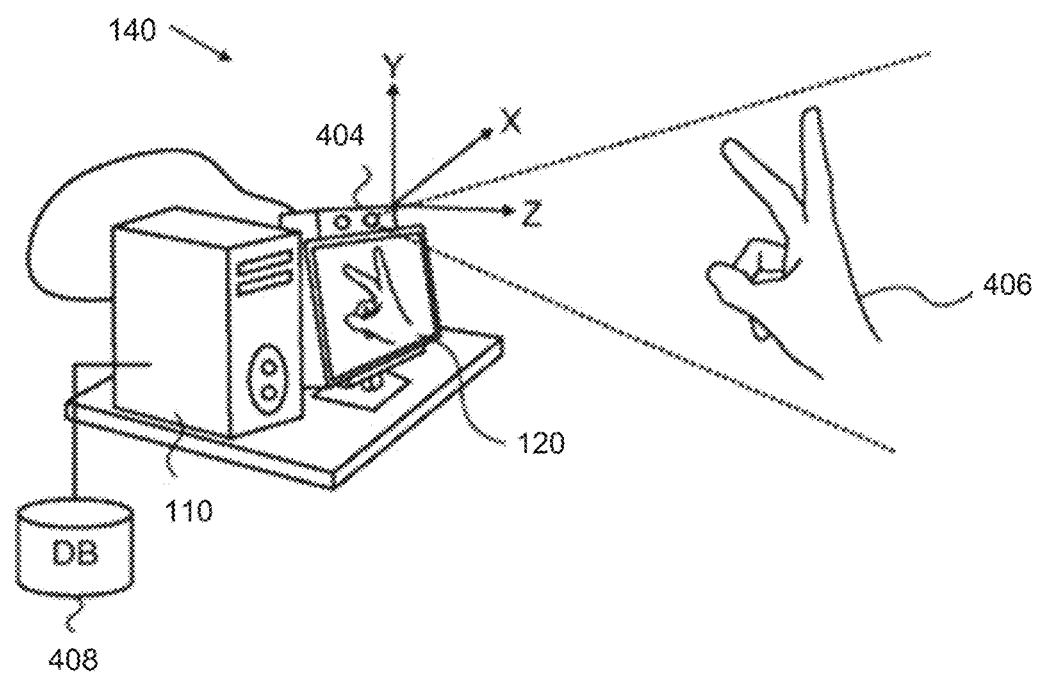
FIG. 4 is a block diagram illustrating a hand tracking unit of a computer system that is configured to capture gesture inputs of the user in accordance with some embodiments.
Figure 4:
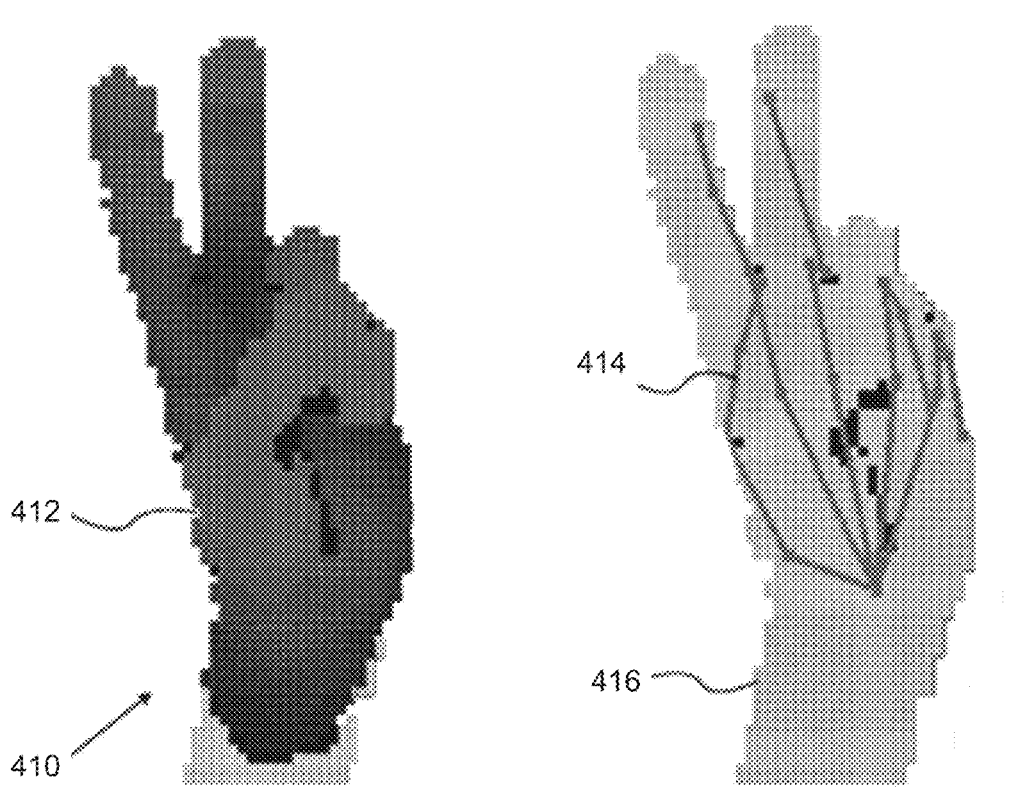

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a pre-defined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
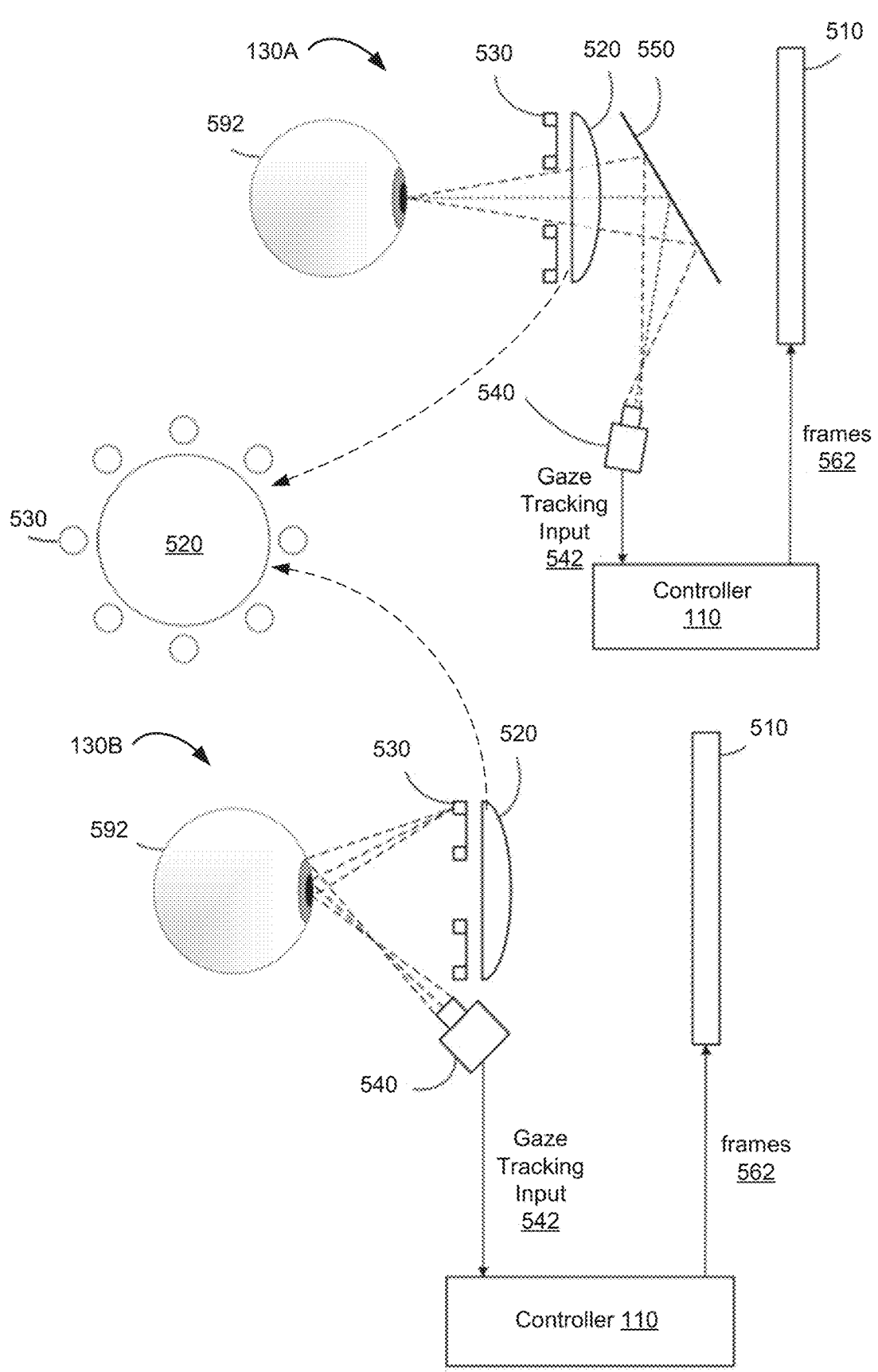
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6A:
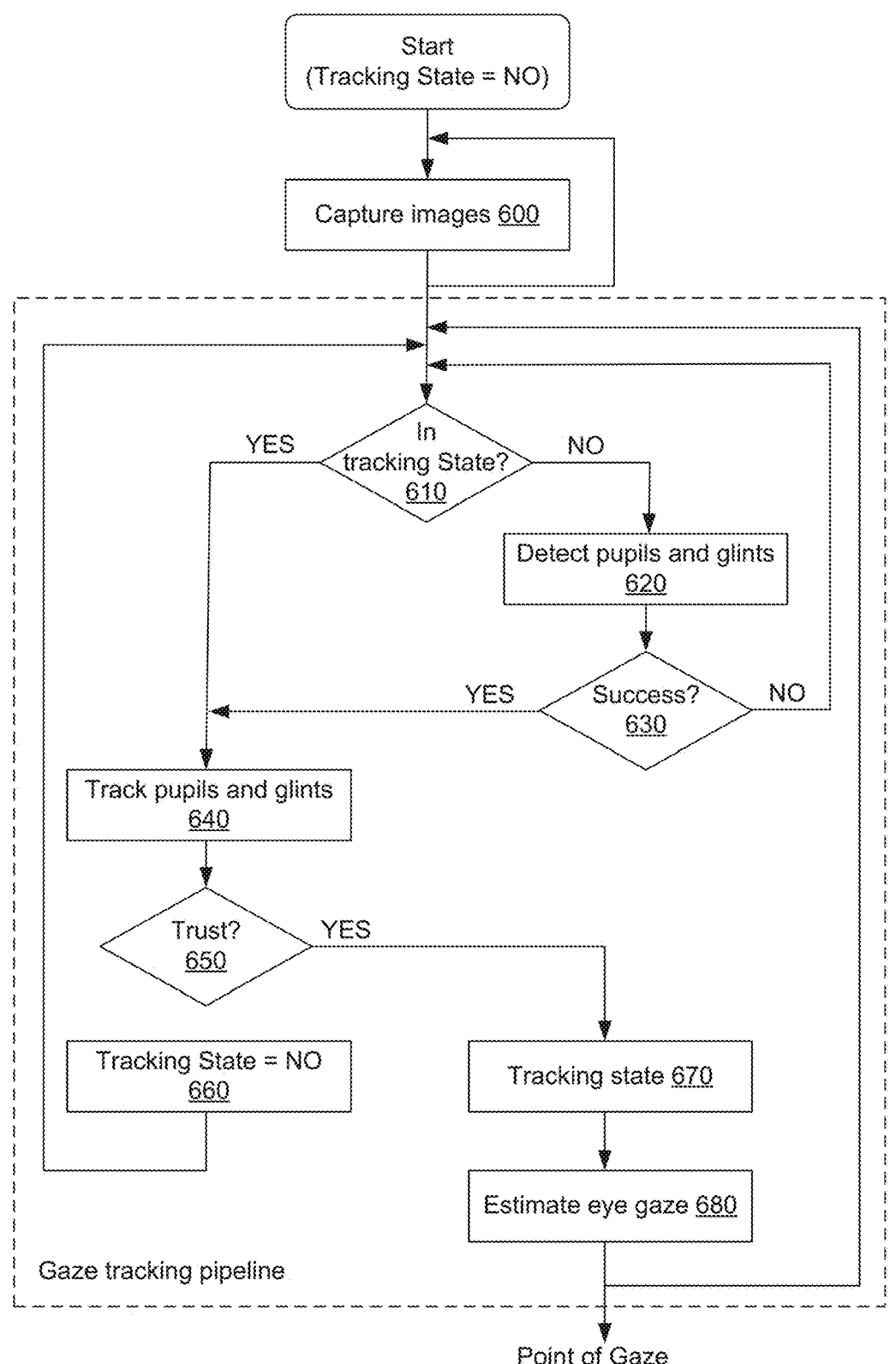
FIG. 6A is a flowchart illustrating a glint-assisted gaze tracking pipeline in accordance with some embodiments.

FIG. 6A illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6A, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6A is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

Figure 6B:
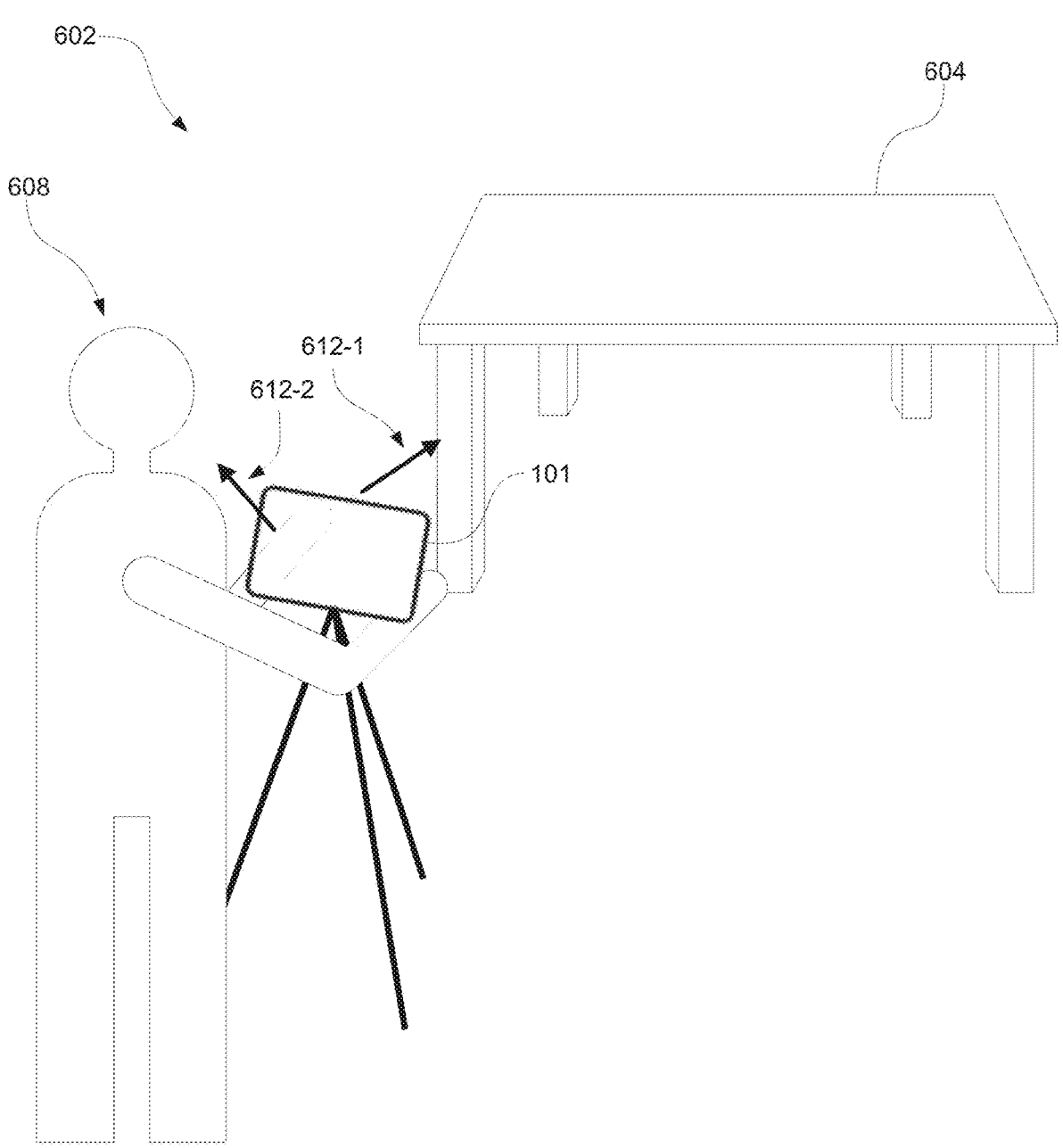
FIG. 6B illustrates an exemplary environment of an electronic device providing a CGR experience in accordance with some embodiments.

FIG. 6B illustrates an exemplary environment of an electronic device 101 providing a XR experience in accordance with some embodiments. In FIG. 6B, real world environment 602 includes electronic device 101, user 608, and a real world object (e.g., table 604). As shown in FIG. 6B, electronic device 101 is optionally mounted on a tripod or otherwise secured in real world environment 602 such that one or more hands of user 608 are free (e.g., user 608 is optionally not holding device 101 with one or more hands). As described above, device 101 optionally has one or more groups of sensors positioned on different sides of device 101. For example, device 101 optionally includes sensor group 612-1 and sensor group 612-2 located on the "back" and "front" sides of device 101, respectively (e.g., which are able to capture information from the respective sides of device 101). As used herein, the front side of device 101 is the side that is facing user 608, and the back side of device 101 is the side facing away from user 608.

In some embodiments, sensor group 612-2 includes an eye tracking unit (e.g., eye tracking unit 245 described above with reference to FIG. 2) that includes one or more sensors for tracking the eyes and/or gaze of the user such that the eye tracking unit is able to "look" at user 608 and track the eye(s) of user 608 in the manners previously described. In some embodiments, the eye tracking unit of device 101 is able to capture the movements, orientation, and/or gaze of the eyes of user 608 and treat the movements, orientation, and/or gaze as inputs.

In some embodiments, sensor group 612-1 includes a hand tracking unit (e.g., hand tracking unit 243 described above with reference to FIG. 2) that is able to track one or more hands of user 608 that are held on the "back" side of device 101, as shown in FIG. 6B. In some embodiments, the hand tracking unit is optionally included in sensor group 612-2 such that user 608 is able to additionally or alternatively hold one or more hands on the "front" side of device 101 while device 101 tracks the position of the one or more hands. As described above, the hand tracking unit of device 101 is able to capture the movements, positions, and/or gestures of the one or more hands of user 608 and treat the movements, positions, and/or gestures as inputs.

In some embodiments, sensor group 612-1 optionally includes one or more sensors configured to capture images of real world environment 602, including table 604 (e.g., such as image sensors 404 described above with reference to FIG. 4). As described above, device 101 is able to capture images of portions (e.g., some or all) of real world environment 602 and present the captured portions of real world environment 602 to the user via one or more display generation components of device 101 (e.g., the display of device 101, which is optionally located on the side of device 101 that is facing the user, opposite of the side of device 101 that is facing the captured portions of real world environment 602).

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7H illustrate examples of a computer system facilitating depth conflict mitigation for one or more virtual objects in a three-dimensional environment in accordance with some embodiments.

Figure 7A:
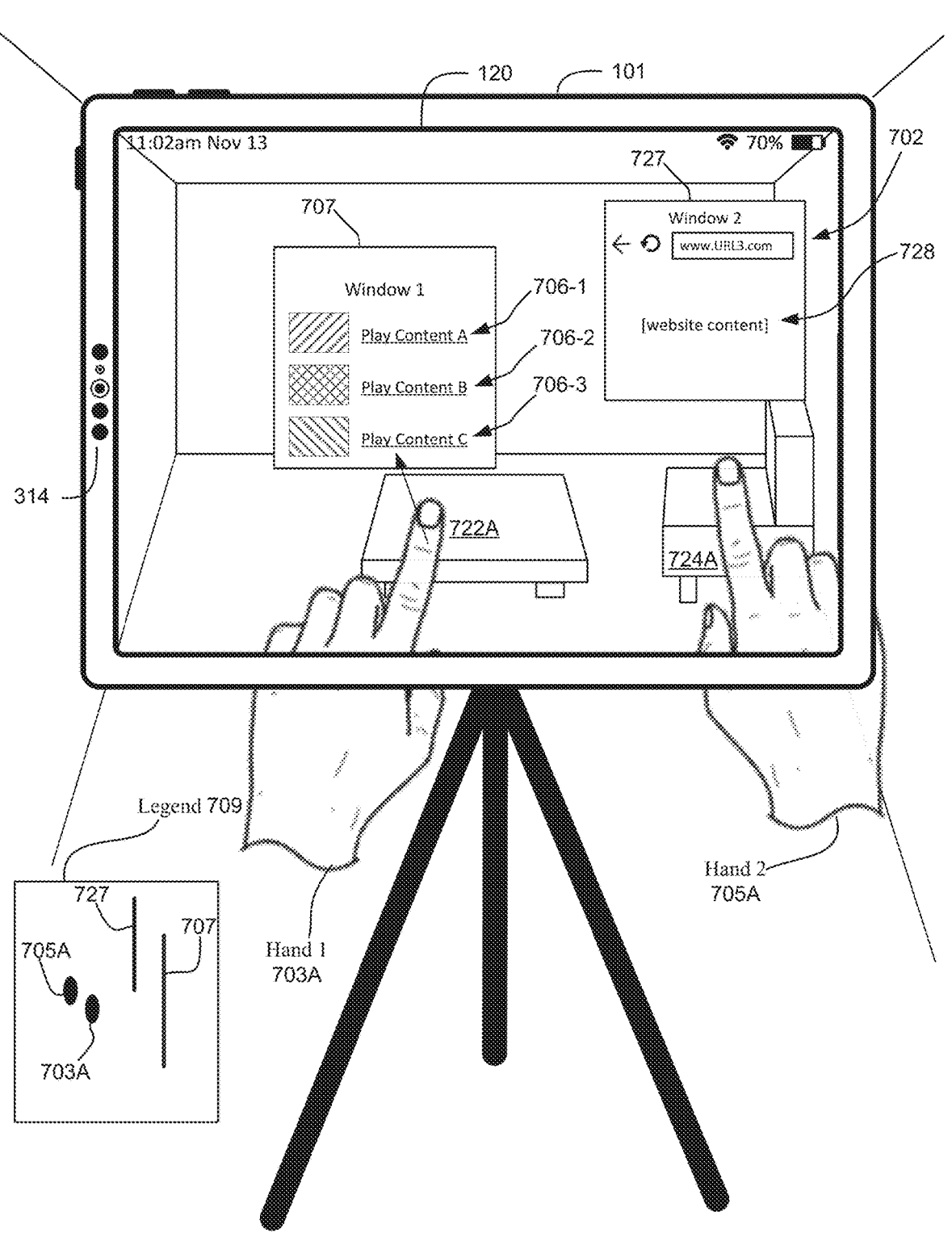
FIGS. 7A-7H illustrate examples of a computer system facilitating depth conflict mitigation for one or more virtual objects in a three-dimensional environment in accordance with some embodiments.
Figures 1, 7C:
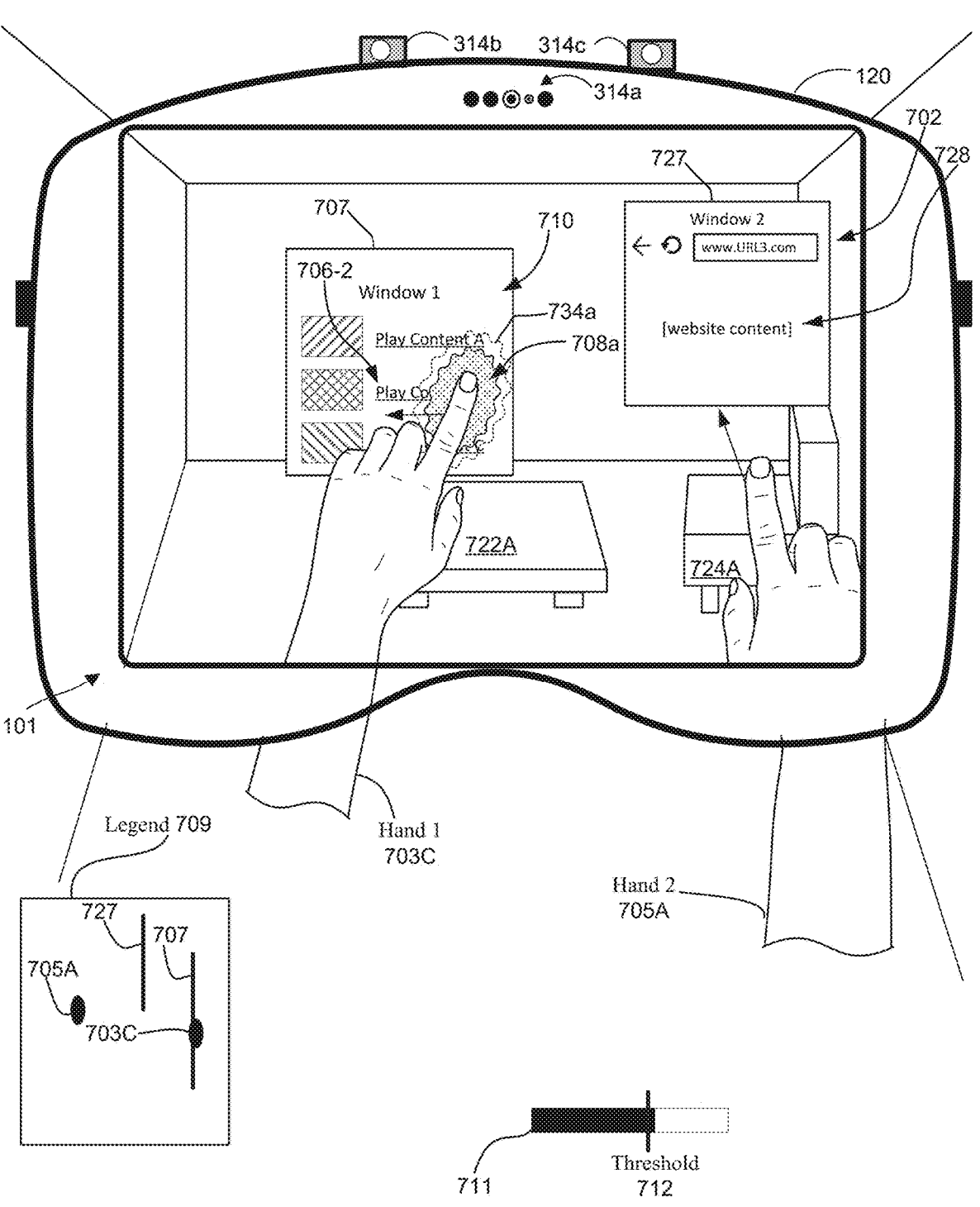
Figure 8A:
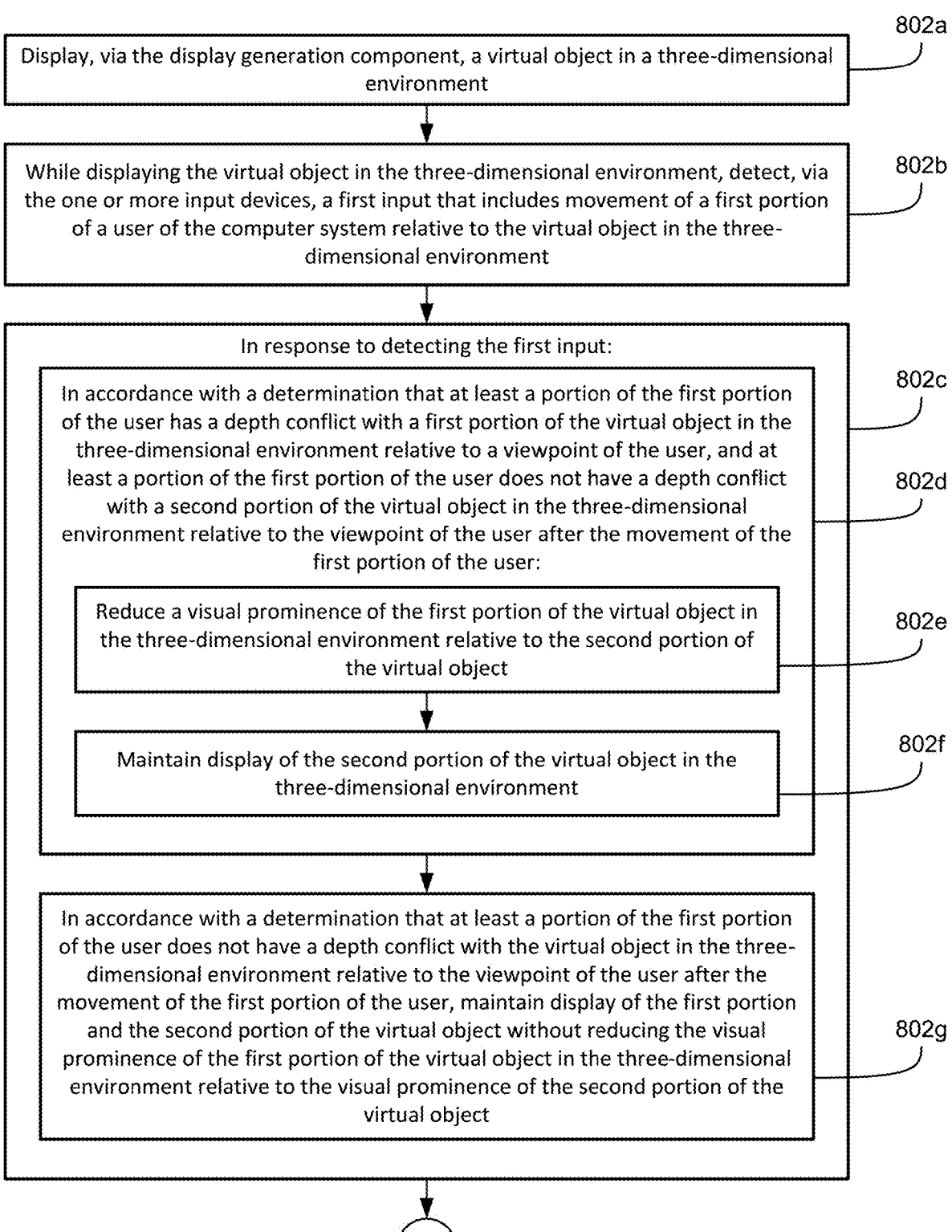
FIGS. 8A-8N is a flowchart illustrating an exemplary method of facilitating depth conflict mitigation for a virtual object in a three-dimensional environment by reducing visual prominence of one or more portions of the virtual object in accordance with some embodiments.
Figure 8C:
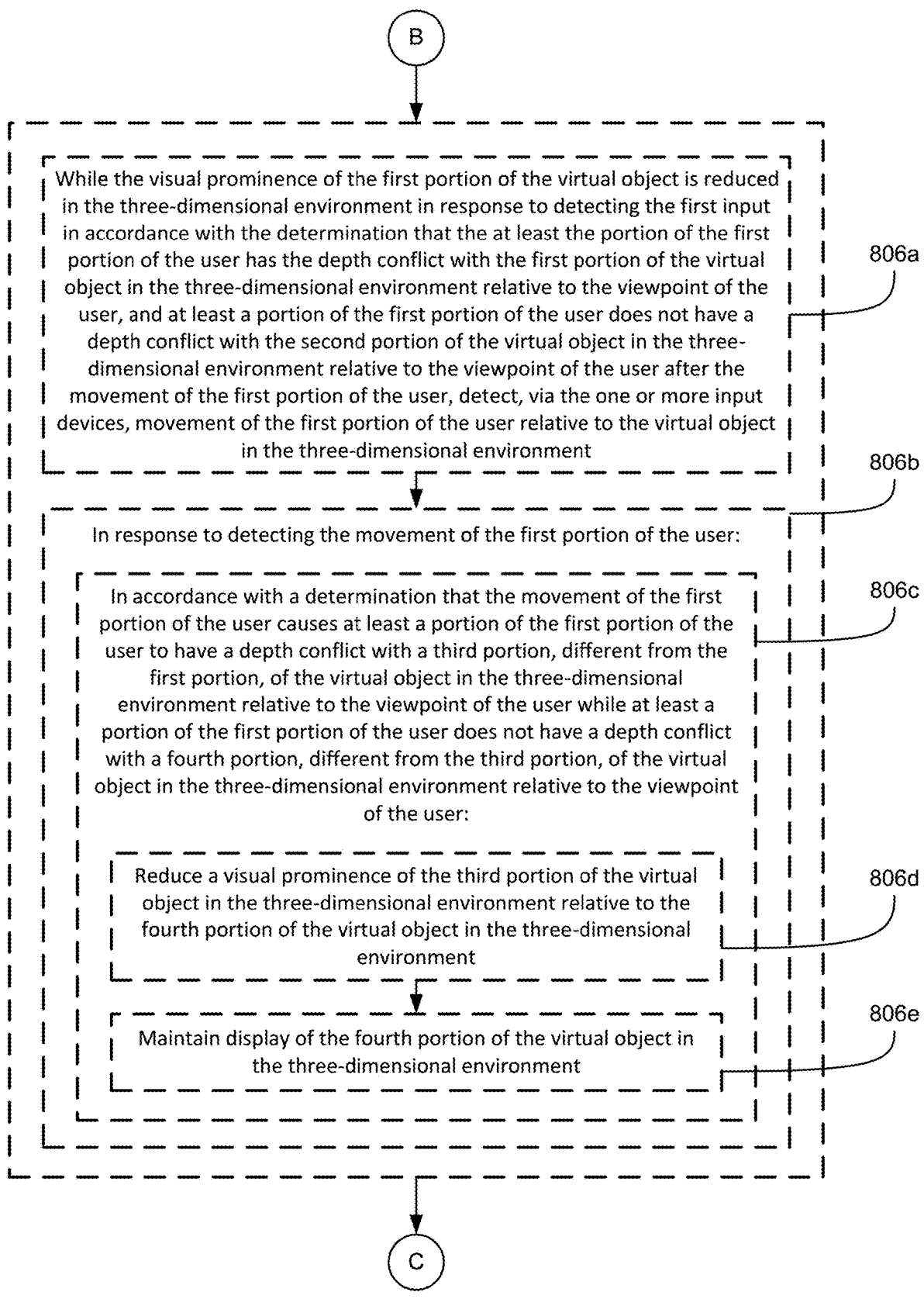
Figure 8D:
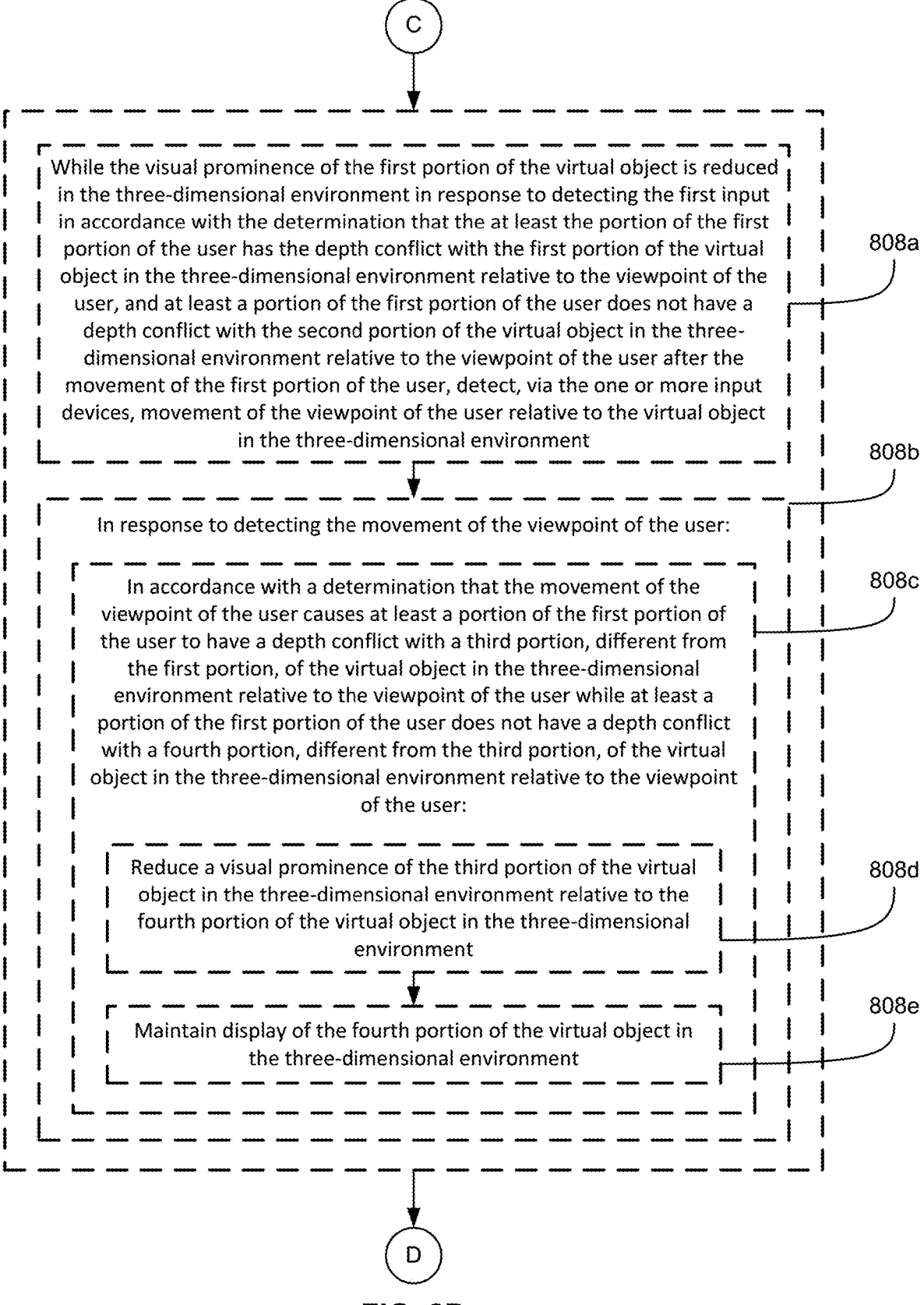
Figure 8F:
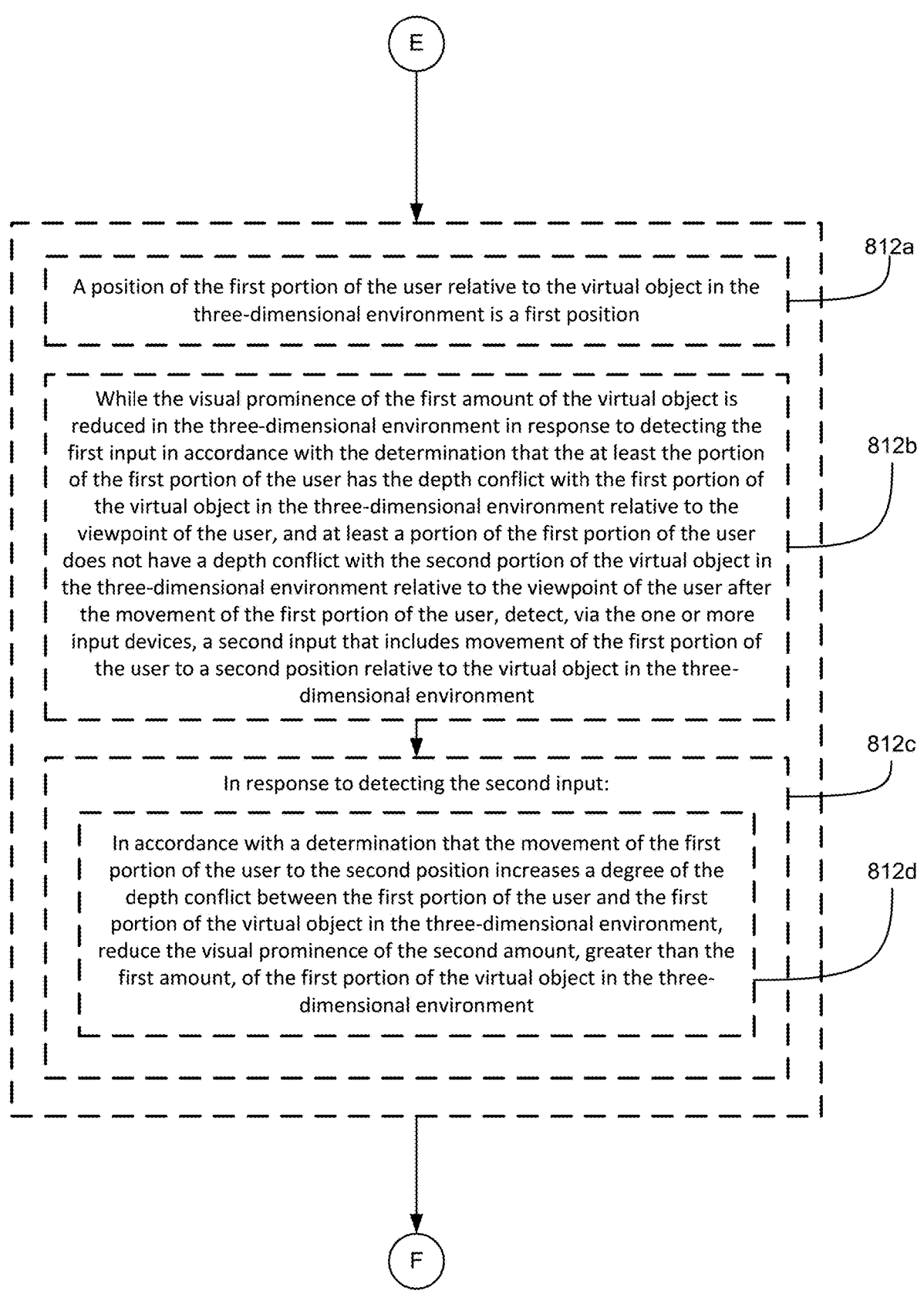
Figure 8H:
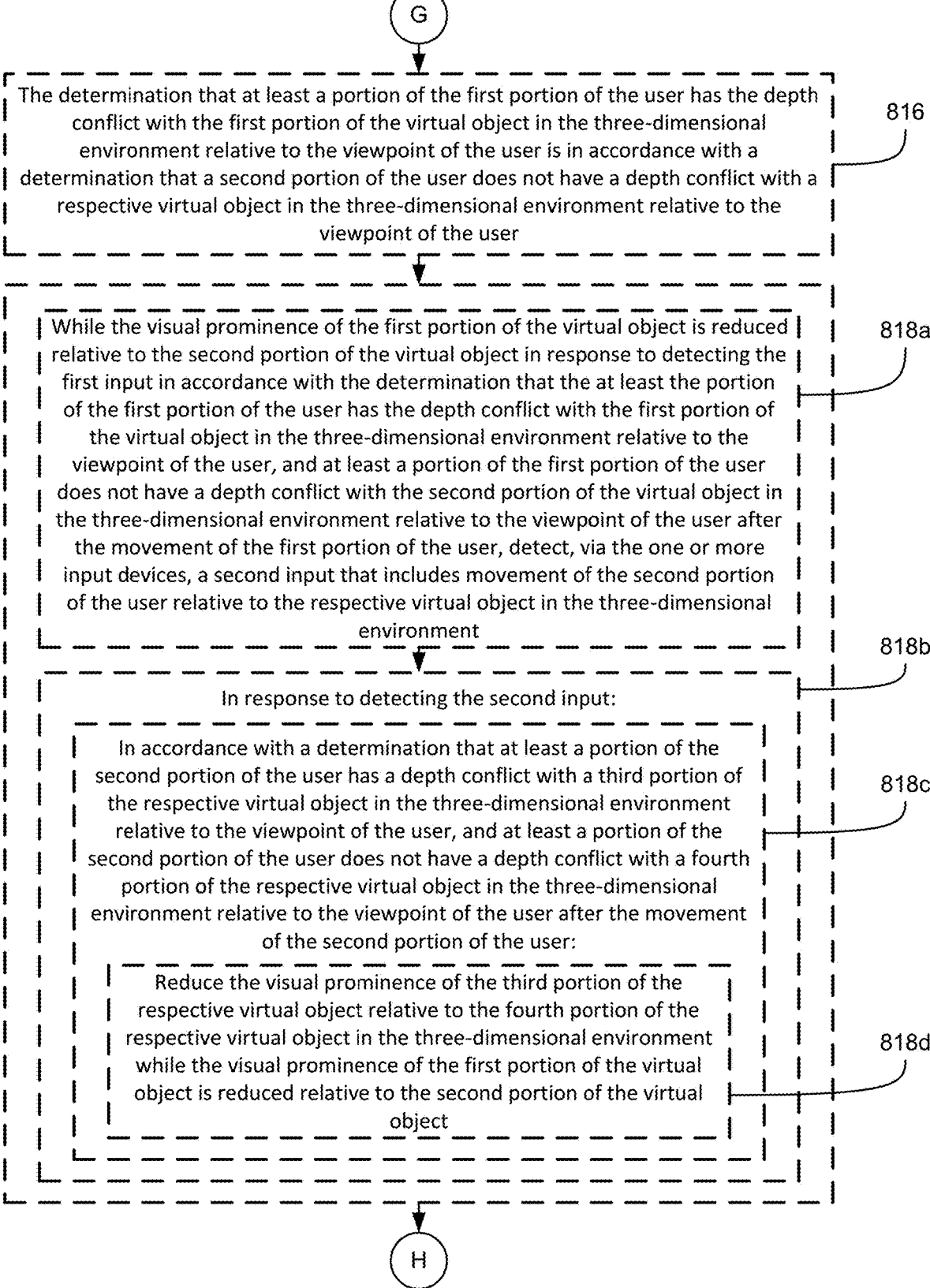
Figure 8I:
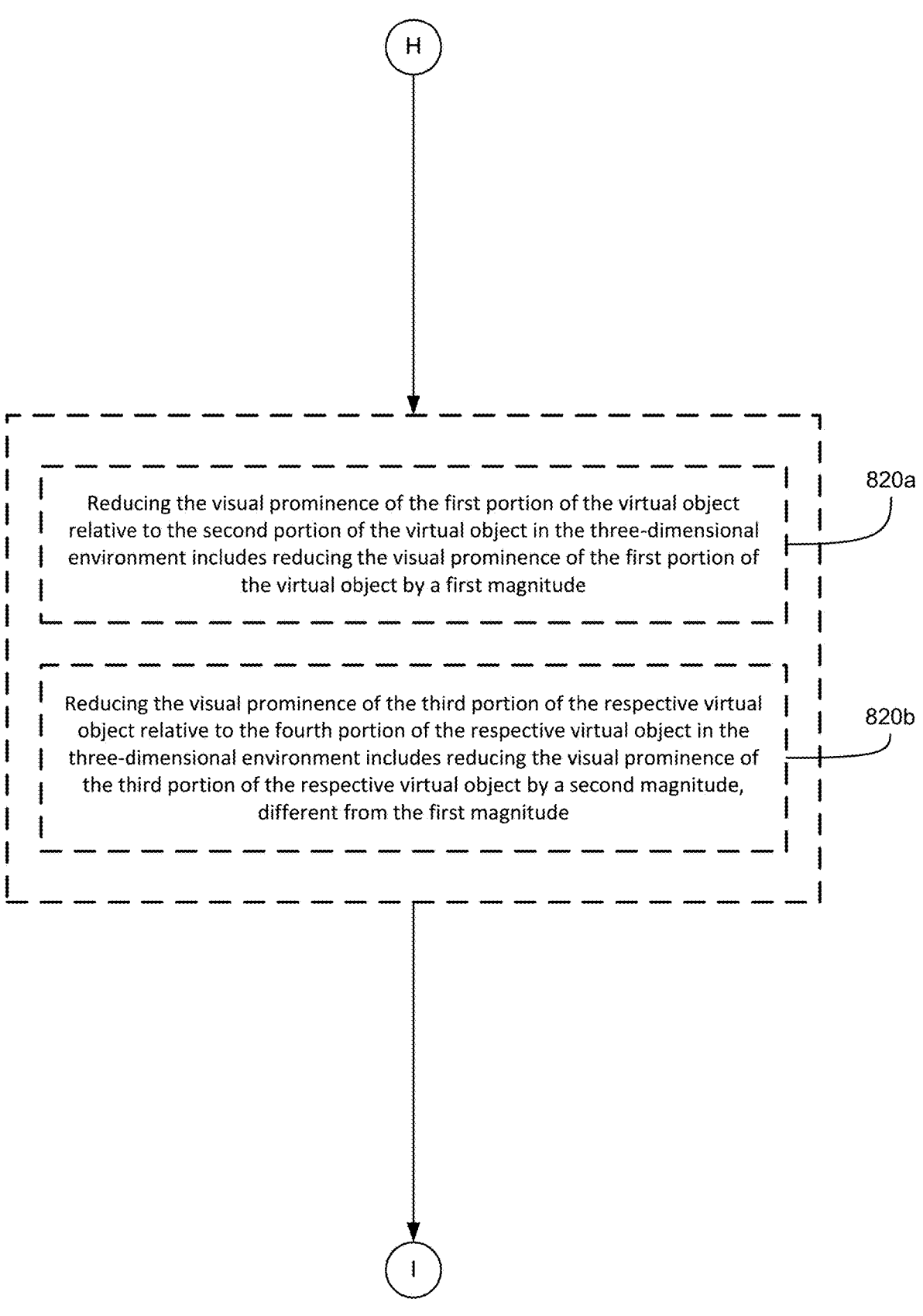
Figure 8K:
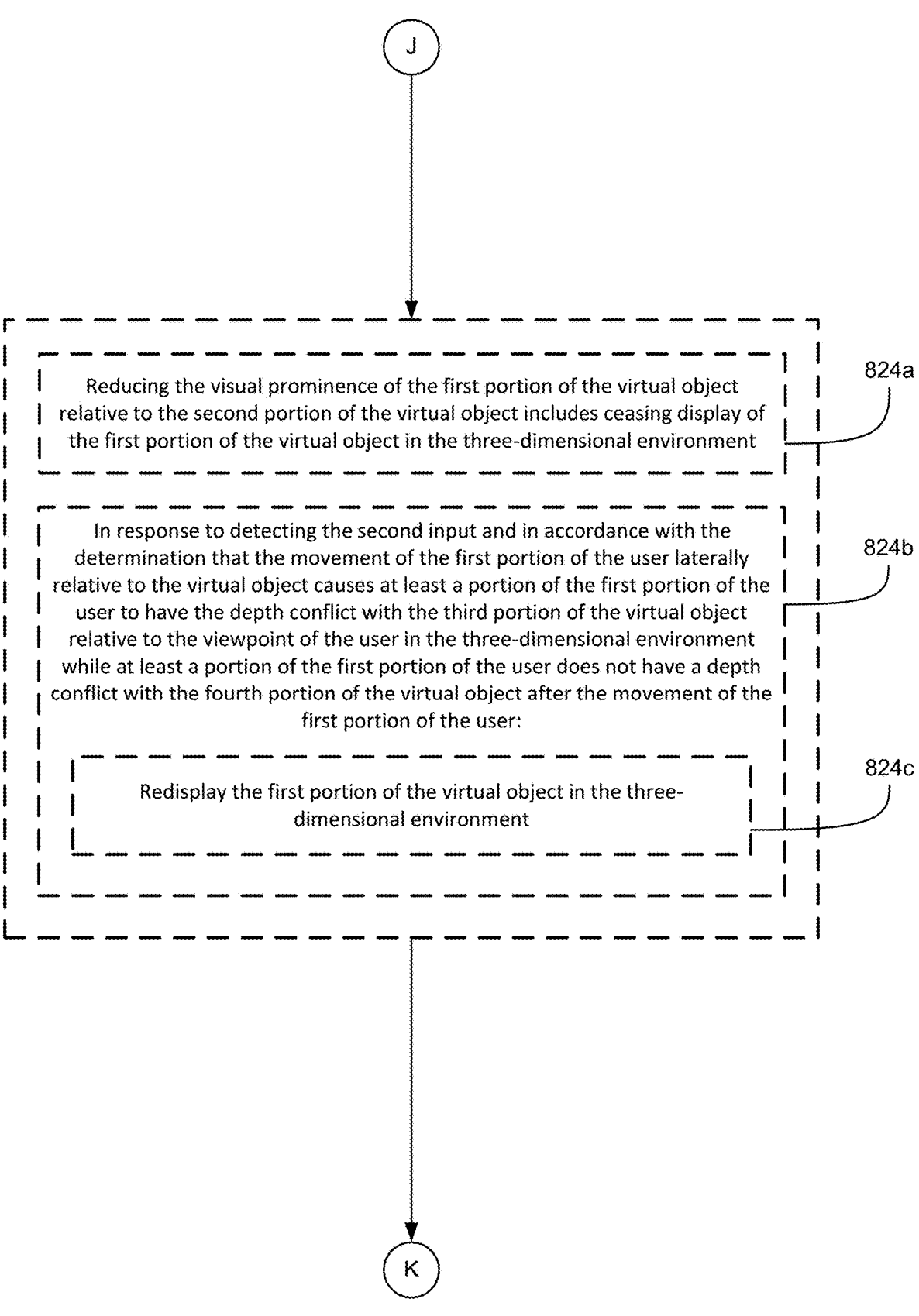
Figure 8L:
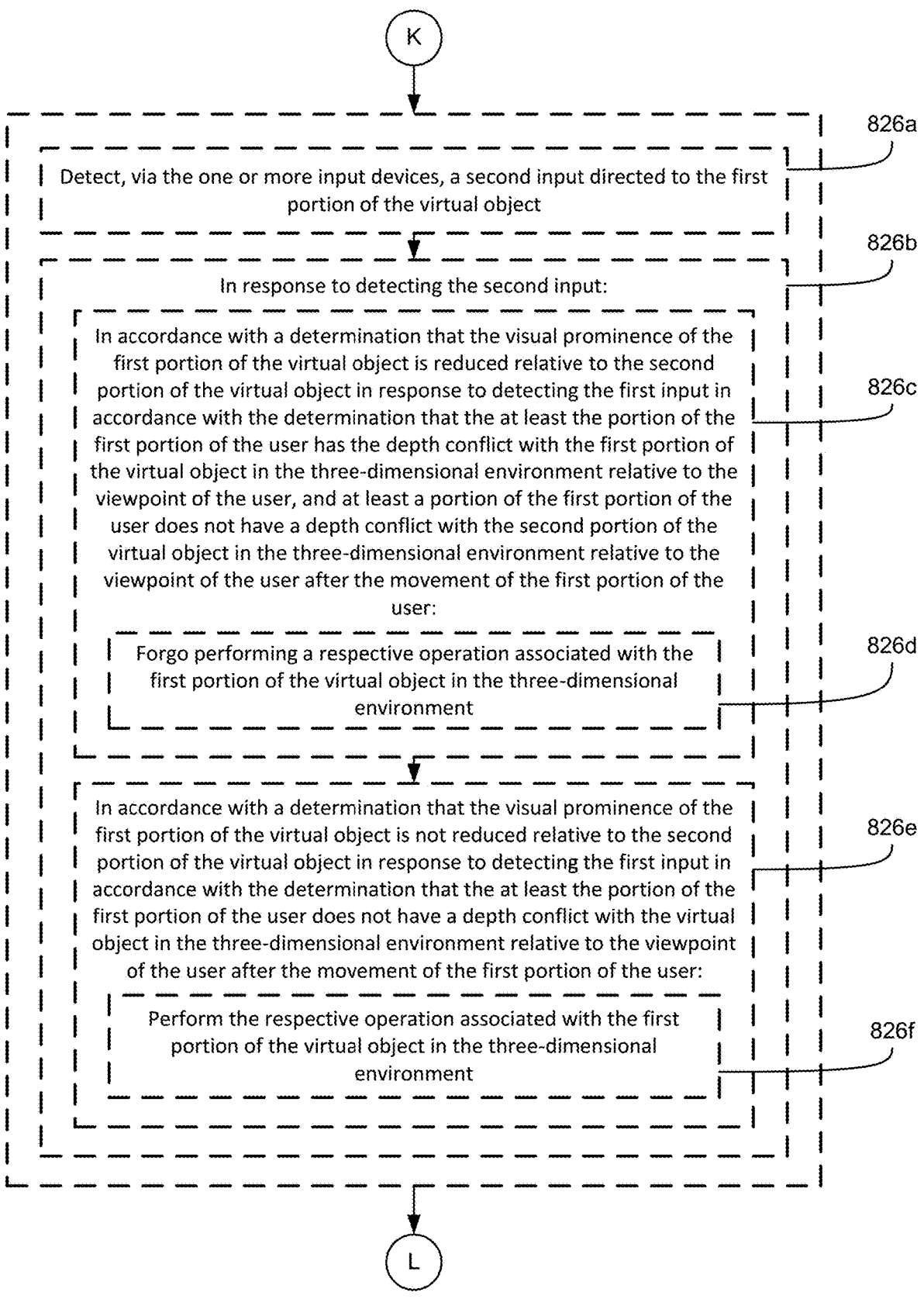
Figure 8M:
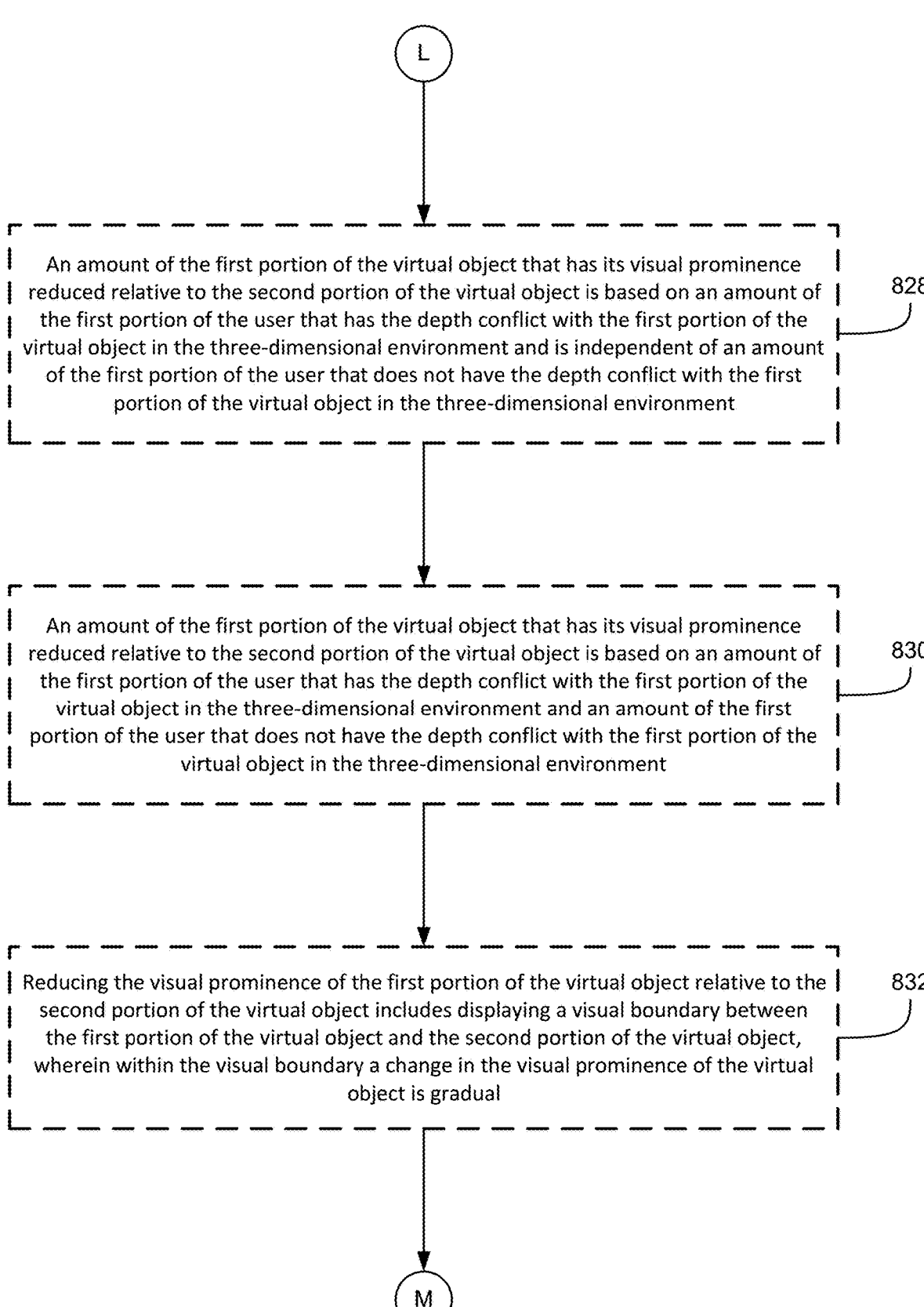

FIG. 7A illustrates a computer system 101 (e.g., an electronic device mounted atop a tripod, as similarly shown in FIG. 6B) displaying, via a display generation component (e.g., display generation component 120 of FIG. 1), a three-dimensional environment 702 from a viewpoint of the user of the computer system 101 (e.g., facing the back wall of the physical environment in which computer system 101 is located). In some embodiments, computer system 101 includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or attention (e.g., gaze) of the user (e.g., internal sensors facing inwards towards the face of the user).

As shown in FIG. 7A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 702 or the physical environment is visible via the display generation component 120. For example, three-dimensional environment 702 includes a representation 722a of a coffee table, which is optionally a representation of a physical coffee table in the physical environment, and three-dimensional environment 702 includes a representation 724a of sofa, which is optionally a representation of a physical sofa in the physical environment.

In FIG. 7A, three-dimensional environment 702 also includes virtual objects 707 ("Window 1"), and 727 ("Window 2"). Virtual objects 707 and 727 are optionally at different distances from the viewpoint of the user in three-dimensional environment 702. For example, in FIG. 7A, virtual object 727 is located at a first location that is closer to the viewpoint of the user than a second location at which virtual object 707 is located in three-dimensional environment 702, as reflected in side view legend 709. In some embodiments, virtual objects 707 and 727 are optionally one or more of user interfaces of applications containing content, three-dimensional objects (e.g., virtual clocks, virtual balls, virtual cars, etc.) or any other element displayed by computer system 101 that is not included in the physical environment of display generation component 120. For example, as shown in FIG. 7A, virtual object 707 is optionally a user interface of a media browsing application. In some embodiments, as shown in FIG. 7A, virtual object 707 includes a plurality of selectable options corresponding to a plurality of content items (e.g., movies, episodes, podcasts, and/or music). As shown in FIG. 7A as an example, the virtual object 707 includes a first selectable option 706-1 that is selectable to cause the computer system 101 to initiate playback of a first content item ("Content A"), a second selectable option 706-2 that is selectable to cause the computer system 101 to initiate playback of a second content item ("Content B"), and/or a third selectable option 706-3 that is selectable to cause the computer system 101 to initiate playback of a third content item ("Content C"). Additionally, in FIG. 7A, virtual object 727 is optionally a user interface of a web-browsing application. For example, as shown in FIG. 7A, virtual object 727 is displaying content 728 (e.g., text, images, video, and/or audio) associated with a respective website ("www.URL3.com").

In some embodiments, virtual objects are displayed in three-dimensional environment 702 with respective orientations relative to the viewpoint of user (e.g., prior to receiving input interacting with the virtual objects, which will be described later, in three-dimensional environment 702). As shown in FIG. 7A, virtual object 707 and virtual object 727 have a first orientation in three-dimensional environment 702. For example, the front-facing surface/portions of virtual object 707 and virtual object 727 are oriented toward the viewpoint of the user in the three-dimensional environment 702. It should be understood that the orientations of the virtual objects 707 and 727 in FIG. 7A are merely exemplary and that other orientations are possible; for example, the virtual objects are optionally displayed with a different orientation in three-dimensional environment 702.

In some embodiments, the computer system 101 mitigates a depth conflict between a virtual object and a portion of the user of the computer system 101 in the three-dimensional environment 702. For example, as discussed in more detail below, in response to determining that movement of a hand of the user (e.g., such as hand 703a or hand 705a) within the three-dimensional environment 702 causes the virtual object to contact and/or intersect with the hand of the user within the three-dimensional environment 702, the computer system 101 changes an appearance of the virtual object to resolve or reduce the depth conflict between the virtual object and the hand of the user. Additional details of the above and below with respect to resolving depth conflicts are provided with reference to methods 800, 1000 and/or 1200.

In FIG. 7A, the computer system 101 detects movement of hand 703a ("Hand 1") in the three-dimensional environment 702 (e.g., in a respective direction and/or with a respective magnitude (e.g., of speed and/or distance)). For example, as shown in FIG. 7A, the computer system 101 detects hand 703*a* move forward in the three-dimensional environment 702 (e.g., away from the user) and toward the location of the virtual object 707 in the three-dimensional environment 702 relative to the virtual object 707. In some embodiments, the computer system 101 detects the hand 703*a* move without detecting input from hand 705*a*. For example, the computer system 101 detects the hand 703*a* move in the three-dimensional environment 702 without detecting movement of the hand (e.g., air gesture, touch gesture, or hand input) 705*a*. In some embodiments, the computer system 101 detects the movement of the hand (e.g., air gesture, touch gesture, or hand input) 703*a* irrespective of attention (e.g., based on gaze) of the user of the computer system 101. It should be understood that while multiple hands and corresponding inputs are illustrated in FIGS. 7A-7H, such hands and inputs need not be detected by computer system 101 concurrently; rather, in some embodiments, computer system 101 independently responds to the hands and/or inputs illustrated and described in response to detecting such hands and/or inputs independently.

In some embodiments, as mentioned above, the virtual object 709*a* can encounter a depth conflict in the three-dimensional environment 702. For example, as described herein, movement of the hand (e.g., air gesture, touch gesture, or hand input) 703*a* within the three-dimensional environment 702 may cause a simulated location of the virtual object 707 to contact and/or intersect with the hand 703*a* in the three-dimensional environment 702 relative to the viewpoint of the user. In some embodiments, the virtual object 709*a* encounters a depth conflict with a portion of the three-dimensional environment 702 when the virtual object 709*a* is first displayed in the three-dimensional environment 702. It should be understood that when a virtual object is being described as intersecting with and/or contacting a portion of the user (e.g., a hand of the user), the intersection is a virtual intersection that describes an apparent spatial or depth conflict that would occur if the virtual object were displayed at a respective location relative to the portion of the user.

Figure 7B:
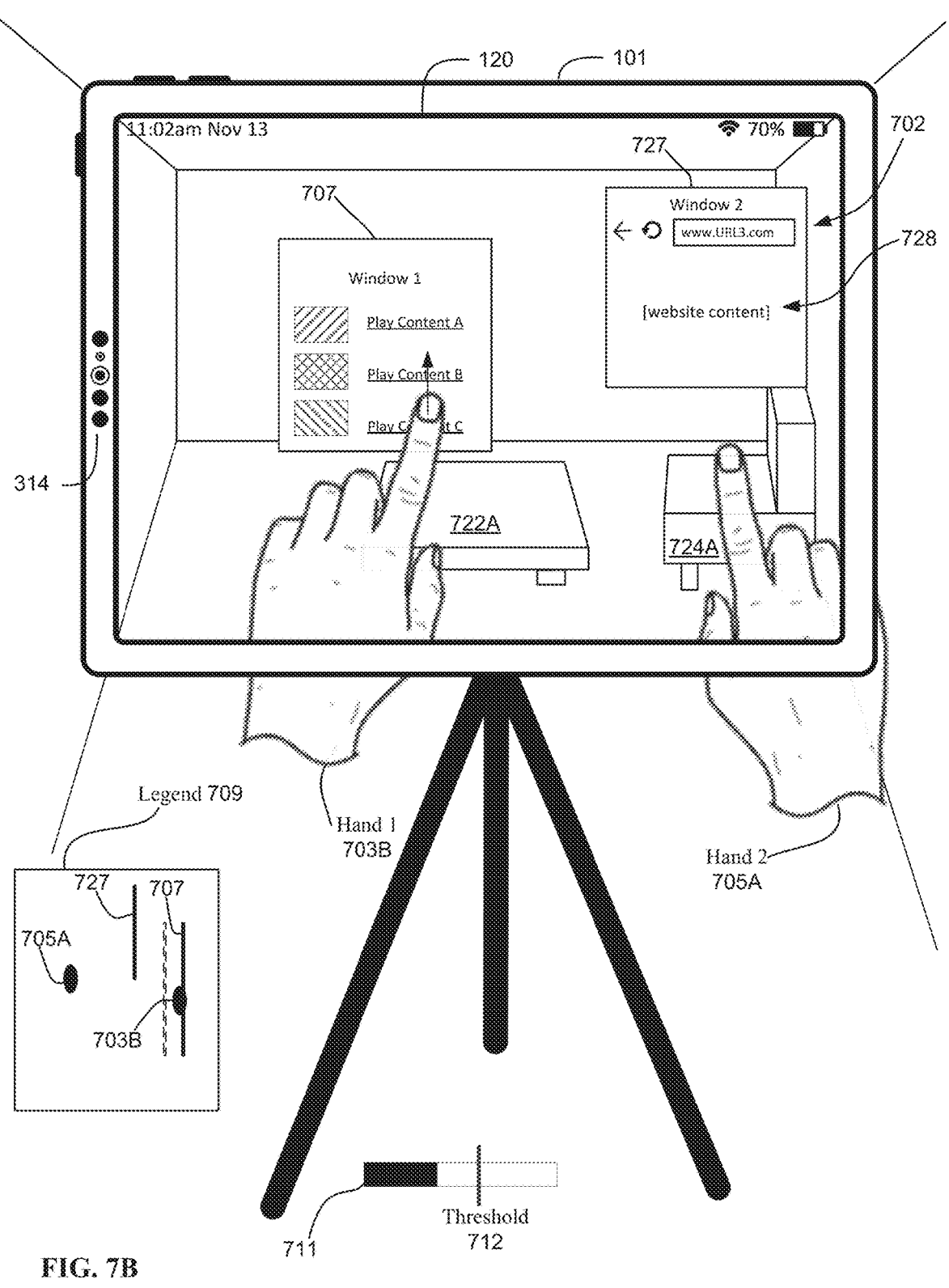

In some embodiments, movement of the hand (e.g., air gesture, touch gesture, or hand input) 703*a* of the user within the three-dimensional environment relative to the virtual object 707 causes the virtual object 707 to move in the three-dimensional environment 702 based on the movement of the hand (e.g., air gesture, touch gesture, or hand input) 703*a*. For example, as discussed above, when the computer system 101 detects the hand 703*a* move forward and through the location of the virtual object 707 relative to the viewpoint of the user, the computer system 101 determines that the movement causes the hand 703*a* to encounter a depth conflict with (e.g., at least partially contact) the virtual object 707 in the three-dimensional environment 702, as shown in FIG. 7B. In some embodiments, when the hand 703*a* contacts the virtual object 707 in the three-dimensional environment 702, the computer system 101 detects the hand 703*a* continues moving backward in the three-dimensional environment 702 (e.g., away from the viewpoint of the user). In some embodiments, the movement of the hand (e.g., air gesture, touch gesture, or hand input) 703*a* while the hand 703*a* is contacting the virtual object 707 in the three-dimensional environment 702 causes the computer system 101 to move the virtual object 707 based on the movement of the hand (e.g., air gesture, touch gesture, or hand input) 703*a*. For example, as shown in the legend 709 in FIG. 7B, the computer system 101 moves the virtual object 707 backward in the three-dimensional environment 702 (e.g., away from the viewpoint of the user) in accordance with the movement of the hand (e.g., air gesture, touch gesture, or hand input) 703*a*.

In some embodiments, the computer system 101 moves the virtual object 707 in the three-dimensional environment 702 based on the movement of the hand (e.g., air gesture, touch gesture, or hand input) 703*a* until the movement of the hand (e.g., air gesture, touch gesture, or hand input) 703*a* exceeds a movement threshold into the virtual object 707 (e.g., based on a degree of the depth conflict between the virtual object 707 and the hand 703*a*). For example, as shown in FIG. 7B, the depth conflict between the virtual object 707 and the hand 703*a* caused by the movement of the hand (e.g., air gesture, touch gesture, or hand input) 703*a* relative to the virtual object 707 in the three-dimensional environment 702 is below a depth conflict threshold (e.g., an amount of depth conflict, such as 5, 10, 12, 15, 20, 25, 30, 40, or 50%), as represented by threshold 712 in tracker 711. In some embodiments, if the movement of the hand (e.g., air gesture, touch gesture, or hand input) 703*a* relative to the virtual object 707 in the three-dimensional environment 702 exceeds the depth conflict threshold 712, the computer system 101 changes a visual appearance of a portion of the virtual object 707 to resolve or reduce the depth conflict in the three-dimensional environment 702, as described in more detail below.

Figure 7C:
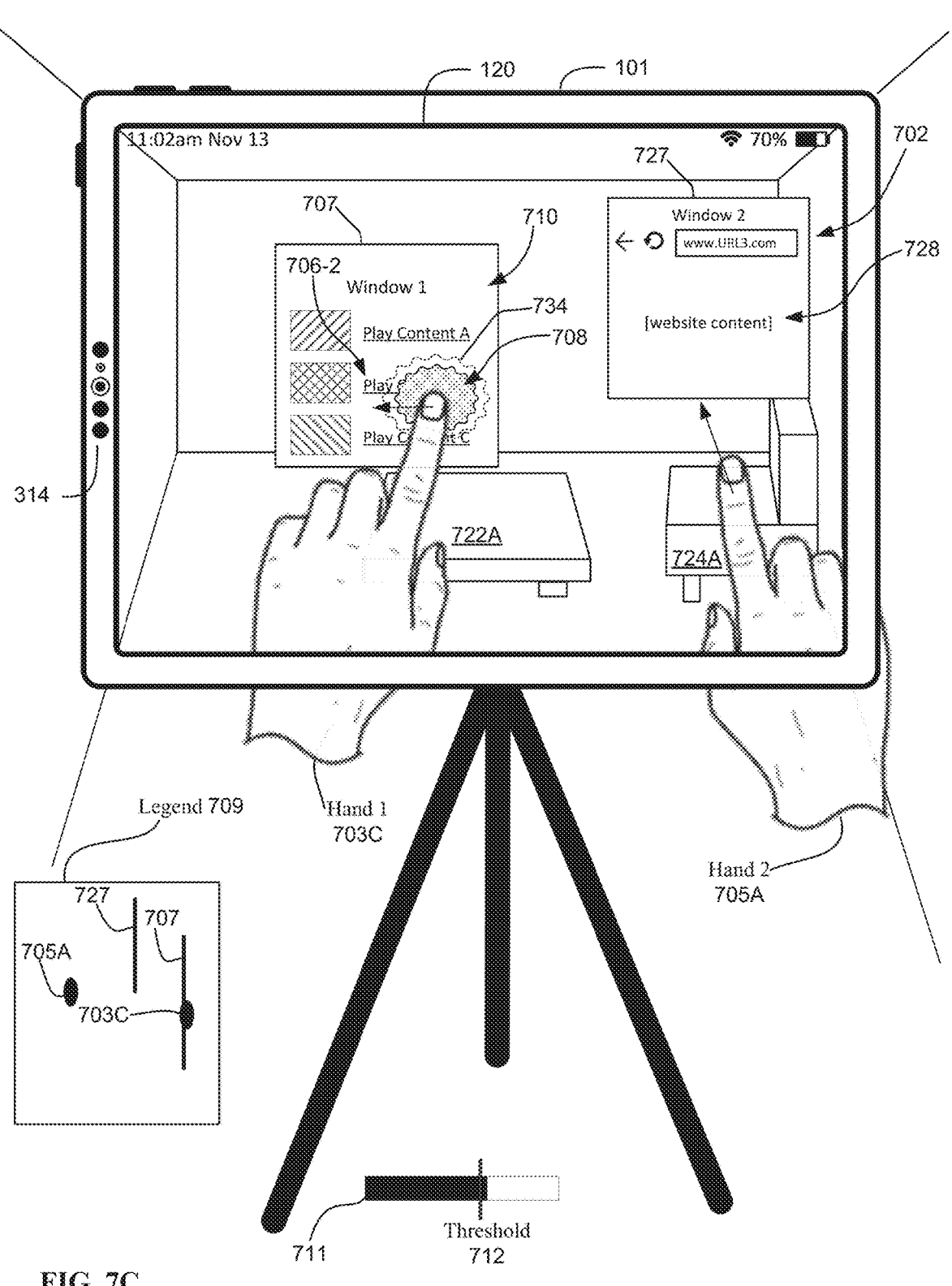

In FIG. 7B, the computer system 101 detects the hand 703*b* of the user continue moving through the location of the virtual object 707 in the three-dimensional environment 702 relative to the viewpoint of the user. For example, as shown in FIG. 7B, while the hand 703*b* of the user has the depth conflict with the virtual object 707, the computer system 101 detects the hand 703*b* move relative to the virtual object 707 such that the degree of the depth conflict between the hand 703*b* and the virtual object 707 changes (e.g., increases) in the three-dimensional environment 702. In some embodiments, as shown in FIG. 7C, the movement of the hand (e.g., air gesture, touch gesture, or hand input) 703*b* relative to the virtual object 707 in the three-dimensional environment 702 causes the depth conflict between the virtual object 707 and the hand 703*b* to exceed the depth conflict threshold 712 discussed above, as indicated in the tracker 711. For example, as shown in FIG. 7C, the movement of the hand (e.g., air gesture, touch gesture, or hand input) 703*b* of the user causes more than the threshold amount of the virtual object 707 to have the depth conflict in the three-dimensional environment 702 relative to the viewpoint of the user.

In some embodiments, when the computer system 101 determines that the depth conflict between the virtual object 707 and the hand 703*b* exceeds the depth conflict threshold discussed above, the computer system 101 changes a visual appearance of a portion of the virtual object 707, as shown in FIG. 7C. For example, the computer system 101 changes a visual appearance of a first portion 708 of the virtual object 707 that has the depth conflict with the hand 703*b* in the three-dimensional environment 702. In some embodiments, changing the visual appearance of the first portion 708 of the virtual object 707 includes changing visual properties of the first portion 708 of the virtual object 707, such as opacity, brightness, coloration, and/or saturation of the first portion 708 of the virtual object 707, that is contacting/intersecting the hand 703*b* in the three-dimensional environment 702. In some embodiments, changing the visual appearance of the first portion 708 of the virtual object 707 includes ceasing display of the first portion 708 of the virtual object 707 in the three-dimensional environment 702. For example, as shown in FIG. 7C, a portion of the selectable option 706-2 included in the first portion 708 of the virtual object 707 is no longer displayed in the three-dimensional environment 702. Additionally, portions of the three-dimensional environment 702 (e.g., including the physical environment surrounding the display generation component 120) optionally become visible through the first portion 708 of the virtual object 707 when the first portion 708 is no longer displayed. In some embodiments, changing the visual appearance of the first portion 708 reduces a visual prominence of the first portion 708 of the virtual object 707 relative to a second portion 710 of the virtual object 707 that does not have a depth conflict in the three-dimensional environment 702. For example, as shown in FIG. 7C, the second portion 710 of the virtual object 707 does not have a depth conflict in the three-dimensional environment 702 (e.g., because the second portion 710 of the virtual object 707 is not at least partially contacting the hand 703*b* (or any other portion of the user)). Accordingly, the computer system 101 optionally maintains display of the second portion 710 of the virtual object 707 (e.g., does not change a visual appearance of the second portion 710) when changing the visual appearance of the first portion 708 of the virtual object 707 in the three-dimensional environment 702.

In some embodiments, changing the visual appearance of the virtual object 707 includes displaying a visual boundary (e.g., a feathered visual boundary) 734 between the first portion 708 and the second portion 710 of the virtual object 707 in the three-dimensional environment 702. For example, as shown in FIG. 7C, the visual boundary 734 visually separates the first portion 708 that has the depth conflict in the three-dimensional environment 702 from the second portion 710 of the virtual object 707 that does not have a depth conflict. In some embodiments, the computer system 101 gradually (e.g., over a time period of 0.5, 1, 2, 3, 4, 5, 8, or 10 seconds) changes the visual appearance of the first portion 708 of the virtual object 707 along the visual boundary 734 in the three-dimensional environment 702. For examples, the change in the visual appearance gradually grows in magnitude (e.g., size) in the virtual object 707 from the point of contact between the virtual object 707 and the hand 703*b* to the visual boundary 734 between the first portion 708 and the second portion 710. In some embodiments, as shown in FIG. 7C, changing the visual appearance of the first portion 708 of the virtual object 707 mitigates (e.g., resolves or reduces) the depth conflict between the virtual object 707 and the hand 703*b*. For example, as shown in FIG. 7C, changing the visual properties of the first portion 708 and/or ceasing display of the first portion 708 of the virtual object 707 in the three-dimensional environment 702 enables a portion of the hand 703*b* (e.g., one or more fingers of the hand 703*b*) that is contacting the virtual object 707 to be visible through the virtual object 707 despite the presence of the depth conflict in the three-dimensional environment 702. Additional details regarding changing the visual appearance of the virtual object 707 to reduce or resolve the depth conflict in the three-dimensional environment 702 are provided below in methods 800, 1000, and/or 1200.

As mentioned above, in some embodiments, the virtual object 707 is or includes content, such as one or more user interfaces. Accordingly, in FIG. 7C, when the computer system 101 optionally maintains display of the second portion 710 of the virtual object 707, the computer system 101 maintains display of the content included within the second portion 710 of the virtual object 707 in the three-dimensional environment 702, such as the selectable option (e.g., 706-1 in FIG. 7A) associated with Content A. Additionally, when the computer system 101 changes the visual appearance of the first portion 708 of the virtual object 707 to resolve or reduce the depth conflict with the hand 703*b*, at least a portion of the content included within the first portion 708 of the virtual object 707 changes in visual appearance. For example, when the computer system 101 changes the amount of opacity, brightness, coloration, and/or saturation of the first portion 708 of the virtual object 707 and/or ceases display of the first portion 708 of the virtual object 707, a portion of the content included in the first portion 708 is no longer visible in the three-dimensional environment 702, such as a portion of the selectable option 706-2, relative to the viewpoint of the user, as shown in FIG. 7C. In some embodiments, the change in the visual appearance of the first portion 708 of the virtual object 707 applies to the content in the first portion 708 but not the content in the second portion 710 of the virtual object 707.

It should be understood that the change in appearance of the first portion 708 of the virtual object 707 shown in FIG. 7C is exemplary and that, in some embodiments, a larger amount or a smaller amount of the first portion 708 of the virtual object 707 is displayed with the changed visual appearance than that shown in FIG. 7C. For example, the amount of the first portion 708 of the virtual object 707 that is displayed with the changed visual appearance is larger or smaller (e.g., by 5, 10, 15, 20, 25, 30, 40, 50, or 60%) than the amount of the first portion 708 of the virtual object 707 that has the depth conflict in the three-dimensional environment 702.

In some embodiments, an amount of the virtual object 707 that is displayed with the changed visual appearance is based on an amount of the hand 703*b* of the user that has the depth conflict with the virtual object 707 in the three-dimensional environment 702. For example, in FIG. 7C, the amount of the first portion 708 of the virtual object 707 that is displayed with the changed visual appearance is based on an amount of the hand 703*b* that is contacting the virtual object 707 irrespective of an amount of the hand 703*b* that is not contacting the virtual object 707 in the three-dimensional environment 702. In FIG. 7C, the amount of the first portion 708 of the virtual object 707 that is displayed with the changed visual characteristics and/or is no longer displayed corresponds to (e.g., is equal to or proportional to) a size of a first finger of the hand 703*b* (e.g., corresponds to the size of the index finger of the hand 703*b*) that is contacting/intersecting the first portion of the virtual object 707 in the three-dimensional environment 702. In some embodiments, the amount of the virtual object 707 that is displayed with the changed visual appearance is based on a size of the hand 703*b* that has the depth conflict with the virtual object 707 in the three-dimensional environment 702, as described in more detail below.

In FIG. 7C, the computer system 101 detects movement of the hand (e.g., air gesture, touch gesture, or hand input) 703*c* while the hand 703*c* has the depth conflict with the virtual object 707 in the three-dimensional environment. For example, as shown in FIG. 7C, the computer system 101 detects the hand 703*c* move rightward relative to the viewpoint of the user while the hand 703*c* is contacting/intersecting the first portion 708 of the virtual object (e.g., while the first portion 708 is displayed with the changed visual appearance) in the three-dimensional environment 702. In some embodiments, the computer system 101 detects the movement of the hand (e.g., air gesture, touch gesture, or hand input) 703*c* without detecting a change in the degree of depth conflict between the hand 703*c* and the first portion

708 of the virtual object 707. Additionally, in FIG. 7C, the computer system 101 detects movement of hand 705*a* ("Hand 2") relative to the virtual object 727 in the three-dimensional environment 702. For example, as shown in FIG. 7C, the computer system 101 detects the hand 705*a* move away from the user and toward the virtual object 727 in the three-dimensional environment 702 relative to the viewpoint of the user. As similarly described above, the computer system 101 optionally detects the movements of the hands 703*c* and 705*a* irrespective of the attention of the user.

FIG. 7C-1 illustrates similar and/or the same concepts as those shown in FIG. 7C (with many of the same reference numbers). It is understood that unless indicated below, elements shown in FIG. 7C-1 that have the same reference numbers as elements shown in FIGS. 7A-7H have one or more or all of the same characteristics. FIG. 7C-1 includes computer system 101, which includes (or is the same as) display generation component 120. In some embodiments, computer system 101 and display generation component 120 have one or more of the characteristics of computer system 101 shown in FIGS. 7C and 7A-7H and display generation component 120 shown in FIGS. 1 and 3, respectively, and in some embodiments, computer system 101 and display generation component 120 shown in FIGS. 7A-7H have one or more of the characteristics of computer system 101 and display generation component 120 shown in FIG. 7C-1.

In FIG. 7C-1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 7A-7H.

In FIG. 7C-1, display generation component 120 is illustrated as displaying content that optionally corresponds to the content that is described as being displayed and/or visible via display generation component 120 with reference to FIGS. 7A-7H. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 7C-1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 7C-1. Because display generation component 120 is optionally a head-mounted device, the field of view of display generation component 120 is optionally the same as or similar to the field of view of the user.

In FIG. 7C-1, the user is depicted as performing an air pinch gesture (e.g., with Hand 1 703C or Hand 2 705A) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 7A-7H.

In some embodiments, computer system 101 responds to user inputs as described with reference to FIGS. 7A-7H.

In the example of FIG. 7C-1, because the user's hand is within the field of view of display generation component 120, it is visible within the three-dimensional environment. That is, the user can optionally see, in the three-dimensional environment, any portion of their own body that is within the field of view of display generation component 120. Further, as described herein, the size and/or shape of the portion 708*a* (e.g., corresponding to portion 708 in FIGS. 7A-7H) of object 707 whose visual appearance is modified due to conflict with hand 703*c* is based on the size and/or shape of the portion of hand 703*c* that has the conflict with object 707. For example, in FIG. 7C-1, portion 708*a* is elongated and oriented corresponding to the size, shape and/or orientation of the finger of hand 703*c* that has the conflict with object 707. It is understood than one or more or all aspects of the present disclosure as shown in, or described with reference to FIGS. 7A-7H and/or described with reference to the corresponding method(s) are optionally implemented on computer system 101 and display generation unit 120 in a manner similar or analogous to that shown in FIG. 7C-1.

Figure 7D:
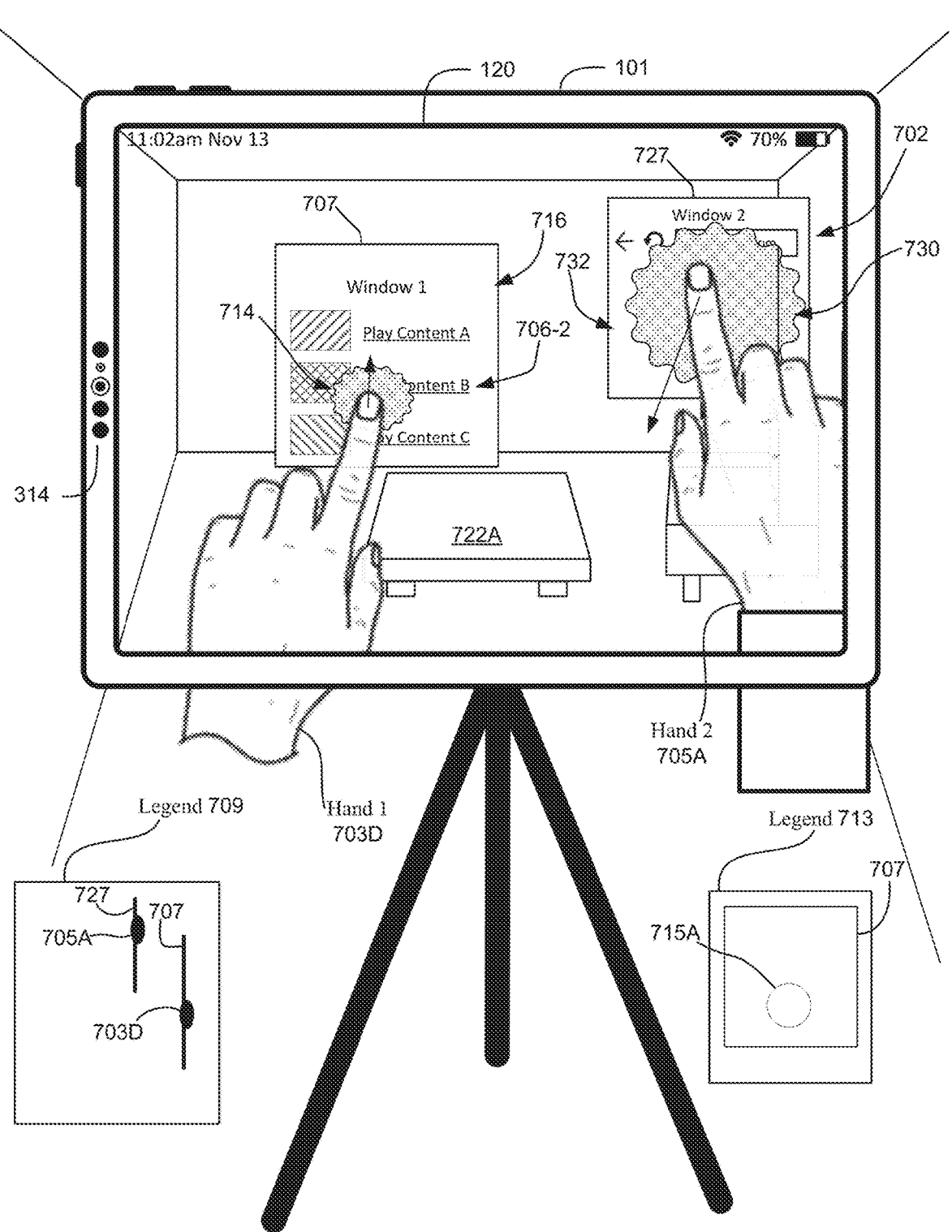

In some embodiments, as shown in FIG. 7D, in response to detecting the movement of the hand (e.g., air gesture, touch gesture, or hand input) 703*c* relative to the virtual object 707, the computer system 101 changes a visual appearance of a third portion 714 of the virtual object 707 in the three-dimensional environment 702. For example, as shown in FIG. 7D, the computer system 101 changes visual properties (e.g., brightness, translucency, saturation, and/or coloration) of and/or ceases display of the third portion 714 of the virtual object 707 in accordance with the determination that the hand 703*c* is contacting/intersecting the third portion 714 of the virtual object 707 after the movement of the hand (e.g., air gesture, touch gesture, or hand input) 703*c* relative to the virtual object 707 in the three-dimensional environment 702. In some embodiments, as similarly discussed above, when the computer system 101 changes the visual appearance of the third portion 714 of the virtual object 707, portions of the three-dimensional environment (including the physical environment surrounding the display generation component) behind the virtual object 707 become visible through the third portion 714 of the virtual object 707. As similarly discussed above, in some embodiments, the computer system 101 changes the visual appearance of the third portion 714 of the virtual object 707 to resolve or reduce the depth conflict between the third portion 714 of the virtual object 707 and the hand 703*c* in the three-dimensional environment 702. Additionally, as shown in FIG. 7D, the computer system 101 maintains display of a fourth portion 716 of the virtual object 707 in accordance with a determination that the fourth portion 716 does not have a depth conflict in the three-dimensional environment 702 after the movement of the hand (e.g., air gesture, touch gesture, or hand input) 703*c*, as similarly discussed above. For example, the computer system 101 forgoes changing the visual appearance of the fourth portion 716 of the virtual object 707, as shown in FIG. 7D.

In some embodiments, as shown in FIG. 7D, the computer system 101 adjusts the change in visual appearance of at least a portion of the first portion (e.g., 708 in FIG. 7C) of the virtual object 707 in response to detecting the movement of the hand (e.g., air gesture, touch gesture, or hand input) 703c. For example, as shown in FIG. 7C, the movement of the hand (e.g., air gesture, touch gesture, or hand input) 703c causes at least a portion of the first portion of the virtual object 707 to no longer have a depth conflict in the three-dimensional environment 702 (e.g., to no longer be contacting/intersecting a portion of the hand 703c of the user). In some embodiments, adjusting the change in visual appearance of the at least the portion of the first portion of the virtual object 707 includes redisplaying at least a portion of the first portion of the virtual object 707. For example, as shown in FIG. 7D, the computer system 101 redisplays a portion of the selectable option 706-2 included in the first portion of the virtual object 707 in the three-dimensional environment 702. Further, in some embodiments, when the computer system 101 adjusts the change in the visual appearance of at least a portion of the first portion of the virtual object 707, the portion of the three-dimensional environment (including the physical environment surrounding the display generation component 120) 702 behind the virtual object 707 that was visible through the first portion of the virtual object 707 (e.g., as described with reference to FIG. 7C) is no longer visible through the first portion of the virtual object 707, as shown in FIG. 7C.

Additionally, in some embodiments, in response to detecting the movement of the hand (e.g., air gesture, touch gesture, or hand input) 705a relative to the virtual object 727 in the three-dimensional environment 702, the computer system determines that a first portion 730 of the virtual object 727 encounters a depth conflict with the hand 705a in the three-dimensional environment 702, as shown in FIG. 7D. For example, as shown in the legend 709, the computer system 101 determines that the movement of the hand (e.g., air gesture, touch gesture, or hand input) 705a toward the virtual object 727 in the three-dimensional environment 702 causes the first portion 730 of the virtual object 727 to at least partially contact/intersect the hand 705a after the movement of the hand (e.g., air gesture, touch gesture, or hand input) 705a. In some embodiments, as similarly discussed above, when the computer system 101 determines that the hand 705a has the depth conflict with the first portion 730 of the virtual object 727, the computer system 101 changes the visual appearance of the first portion 730 of the virtual object 727 in the three-dimensional environment 702 to resolve or reduce the depth conflict between the virtual object 727 and the hand 705a. For example, the computer system 101 changes visual properties (e.g., brightness, opacity, saturation, and/or coloration) of and/or ceases display of the first portion 730 of the virtual object 727 (e.g., a portion of the website content included in the first portion 730 of the virtual object 727), which enables the hand 705a to continue to be visible through the first portion 730 of the virtual object 727. Further, in some embodiments, when the computer system 101 changes the visual appearance of the first portion 730 of the virtual object 727 in the three-dimensional environment 702, portions of the three-dimensional environment 702 (including the physical environment surrounding the display generation component 120) behind the virtual object 727 relative to the viewpoint of the user become visible through the first portion 730 of the virtual object 727, as shown in FIG. 7D. Additionally, in some embodiments, in accordance with a determination that the movement of the hand (e.g., air gesture, touch gesture, or hand input) 705a relative to the virtual object 727 does not cause a fourth portion 732 of the virtual object 727 to encounter a depth conflict in the three-dimensional environment 702, the computer system 101 maintains display of the fourth portion 732 of the virtual object 727 in the three-dimensional environment 702. For example, as similarly discussed above, the computer system 101 does not change a visual appearance of the fourth portion 732 of the virtual object 727 in the three-dimensional environment 702.

In some embodiments, as similarly discussed above, an amount of the third portion 714 of the virtual object 707 that is displayed with the changed visual appearance in the three-dimensional environment 702 is based on an amount of the hand 703c that has the depth conflict with the virtual object 707 in the three-dimensional environment 702. Alternatively, as mentioned previously above, in some embodiments, an amount of a portion of a virtual object that is displayed with the changed visual appearance in the three-dimensional environment 702 is based on a size of the hand of the user that has the depth conflict with the virtual object in the three-dimensional environment 702. For example, as described above, the first portion 730 of the virtual object 727 has a depth conflict with the hand 705a of the user in the three-dimensional environment 702. In some embodiments, an amount of the first portion 730 of the virtual object 727 that is displayed with the changed visual appearance in the three-dimensional environment 702 is based on the size of the hand 705a, rather than strictly the portion of the hand 705a that is contacting/intersecting the virtual object 727 in the three-dimensional environment 702. For example, in FIG. 7D, even though a first portion (e.g., one or more fingers) of the hand 705a is contacting the virtual object 727 in the three-dimensional environment 702, the amount of the first portion 730 of the virtual object 727 corresponds to (e.g., is equal to or proportional to) the first portion of the hand 705a and a second portion (e.g., others of the one or more fingers and/or a palm) of the hand 705a that are not contacting/intersecting the virtual object 727 in the three-dimensional environment 702. Accordingly, in some embodiments, as shown in FIG. 7D, the amount of the first portion 730 of the virtual object 727 that is displayed with the changed visual appearance is greater than the amount of the hand 705a that is actually contacting/intersecting the virtual object 727 in the three-dimensional environment 702.

As similarly described above, in some embodiments, a degree of the depth conflict in the three-dimensional environment 702 is based on a magnitude (e.g., amount) of the portion (e.g., hand) of the user that is contacting/intersecting a virtual object in the three-dimensional environment 702. For example, as shown in FIG. 7D, when the third portion 714 of the virtual object 707 encounters the depth conflict with the hand 703c after the movement of the hand (e.g., air gesture, touch gesture, or hand input) 703c relative to the virtual object 707, the hand 703c contacts/intersects the third portion 714 of the virtual object 707 by a first magnitude (e.g., first amount), as indicated by circle 715a in legend 713. As an example, in the legend 713, the circle 715a expresses the first magnitude as a first surface area of the virtual object 707 with which the hand 703c is contacting/intersecting in the three-dimensional environment 702. In some embodiments, as described below, the computer system 101 increases the portion of the virtual object 707 that is displayed with the changed visual appearance in the three-dimensional environment 702 in response to detecting a change of the magnitude of the portion of the hand 703c that has the depth conflict with the virtual object 707 in the three-dimensional environment 702.

In FIG. 7D, the computer system 101 detects movement of the hand (e.g., air gesture, touch gesture, or hand input) 703d farther into/through the virtual object 707 relative to the viewpoint of the user. For example, as shown in FIG. 7D, while the hand 703*d* is contacting/intersecting the third portion 714 of the virtual object 707, the computer system 101 detects the hand 703*d* move away from the user and behind the virtual object 707 in the three-dimensional environment 702 relative to the viewpoint of the user. Additionally, in FIG. 7D, the computer system 101 detects movement of the hand (e.g., air gesture, touch gesture, or hand input) 705*a* away from the virtual object 727 relative to the virtual object 727 in the three-dimensional environment 702. For example, as shown in FIG. 7D, while the hand 705*a* is contacting/intersecting the first portion 730 of the virtual object 727, the computer system 101 detects the hand 705*a* move toward the user and in front of the virtual object 727 in the three-dimensional environment 702 relative to the viewpoint of the user. In some embodiments, the computer system 101 detects the movement of the hand (e.g., air gesture, touch gesture, or hand input)s 703*d* and 705*a* irrespective of the attention of the user.

Figure 7E:
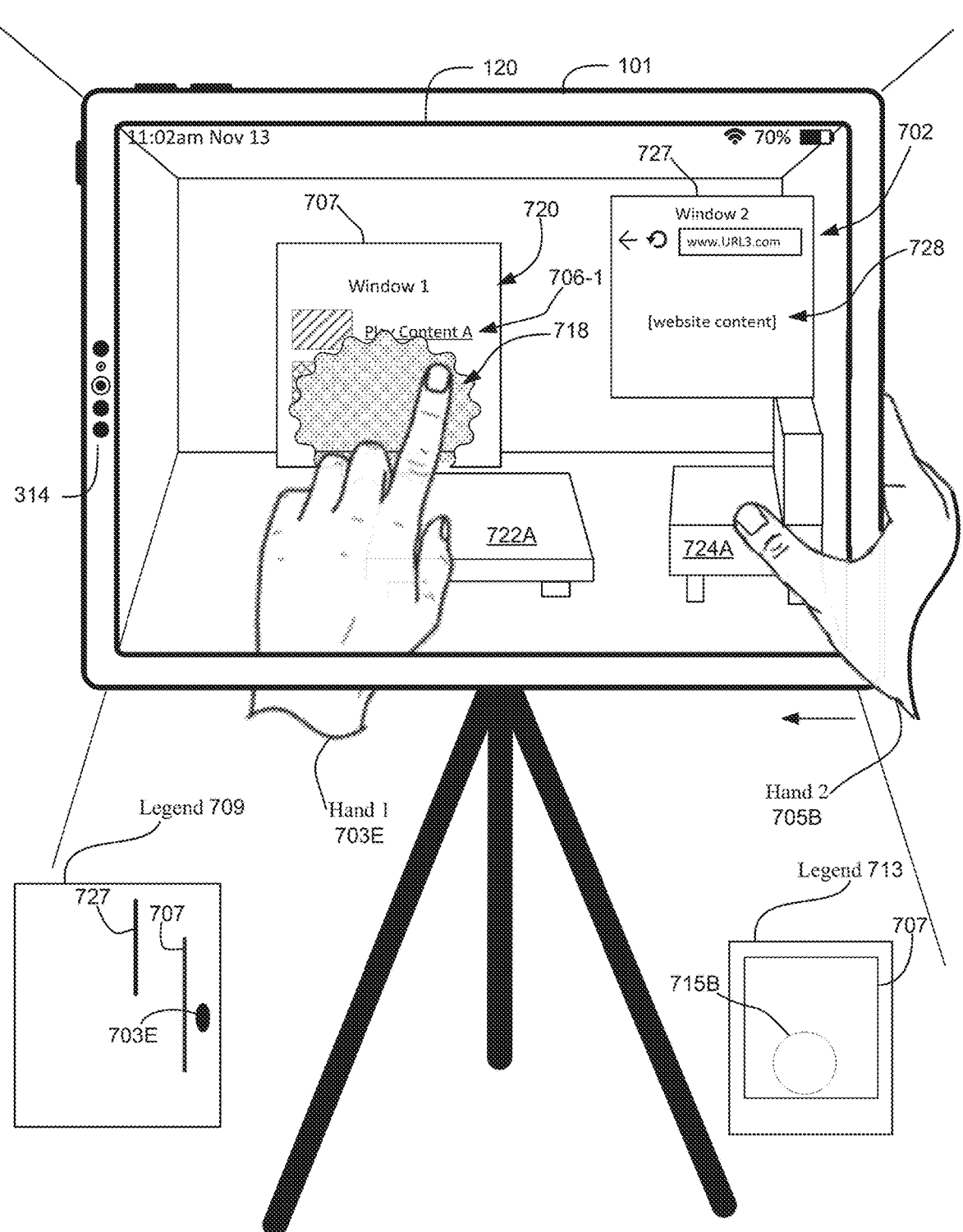

In some embodiments, in response to detecting the movement of the hand (e.g., air gesture, touch gesture, or hand input) 703*d* farther from the viewpoint of the user and into the virtual object 707 in the three-dimensional environment 702, the computer system 101 determines that the magnitude (e.g., amount) of the portion of the hand 703*d* contacting/intersecting the virtual object 707 changes in the three-dimensional environment 702. For example, as shown in the legend 709 in FIG. 7E, the computer system 101 detects the movement of the hand (e.g., air gesture, touch gesture, or hand input) 703*d* through the virtual object 707 and behind the virtual object 707 relative to the viewpoint of the user. In some embodiments, as shown in FIG. 7E, the computer system 101 determines that the magnitude of the portion of the hand 703*d* contacting/intersecting the virtual object 707 increases to a second magnitude, as indicated by circle 715*b* in the legend 713. For example, as indicated by the circle 715*b* in the legend 713 in FIG. 7E, when the hand 703*d* moves farther into the virtual object 707 and behind the virtual object 707, the hand 703*d* contacts/intersects a greater surface area (e.g., greater than the surface area indicated by the circle 715*a* in FIG. 7D) of the virtual object 707 in the three-dimensional environment 702.

In some embodiments, in accordance with the determination that the movement of the hand (e.g., air gesture, touch gesture, or hand input) 703*d* increases the magnitude of the portion of the hand 703*d* that is contacting/intersecting the virtual object 707 in the three-dimensional environment 702, the computer system 101 determines that the degree of the depth conflict between the hand 703*d* and the virtual object 707 increases in the three-dimensional environment 702. For example, as shown in FIG. 7E, the movement of the hand (e.g., air gesture, touch gesture, or hand input) 703*d* behind the virtual object 707 relative to the viewpoint of the user causes the hand 703*e* to encounter a depth conflict with a fifth portion 718 of the virtual object 707 in the three-dimensional environment 702. It should be understood that, in FIG. 7E, while the hand 703*e* is not necessarily contacting/intersecting the fifth portion 718 of the virtual object 707 when the hand 703*e* is behind the virtual object 707 relative to the viewpoint of the user, the position of the hand 703*e* behind the virtual object 707 optionally causes at least a portion of the hand 703*e* to be visually obstructed by (e.g., not visible through) the fifth portion 718 of the virtual object 707, thereby creating a depth conflict in the three-dimensional environment 702. In some embodiments, as similarly described above, in accordance with the determination that the fifth portion 718 of the virtual object 707 has a depth conflict with the hand 703*e* after the movement of the hand (e.g., air gesture, touch gesture, or hand input) in the three-dimensional environment 702, the computer system 101 changes a visual appearance of the fifth portion 718 of the virtual object 707 in the three-dimensional environment 702. For example, the computer system changes visual properties (e.g., brightness, opacity, saturation, and/or coloration) of and/or ceases display of the fifth portion 718 of the virtual object 707 to resolve or reduce the depth conflict (e.g. and enable the hand 703*e* behind the virtual object 707 to be visible through the fifth portion 718 of the virtual object 707 relative to the viewpoint of the user). Additionally, as similarly discussed above, in some embodiments, in accordance with a determination that a sixth portion 720 of the virtual object 707 does encounter a depth conflict in response to the movement of the hand (e.g., air gesture, touch gesture, or hand input) 703*d*, the computer system maintains display of the sixth portion 720 of the virtual object 707 in the three-dimensional environment 702. For example, the computer system 101 forgoes changing a visual appearance of the sixth portion 720 of the virtual object 707 in the three-dimensional environment 702.

Additionally, in some embodiments, in response to detecting the movement of the hand (e.g., air gesture, touch gesture, or hand input) 705*a* away from the virtual object 727 relative to the virtual object 727 in the three-dimensional environment 702, the computer system 101 determines that the virtual object 727 no longer has a depth conflict with the hand 705*a*, as shown in the legend 709 in FIG. 7E. For example, as shown in FIG. 7E, the movement of the hand (e.g., air gesture, touch gesture, or hand input) 705*a* away from the virtual object 727 causes the hand 705*a* to no longer be contacting/intersecting a portion of the virtual object 727 in the three-dimensional environment 702. In some embodiments, in accordance with the determination that the virtual object 727 no longer has a depth conflict in the three-dimensional environment 702, the computer system 101 adjusts the change in visual appearance of the first portion (e.g., 730 in FIG. 7D) of the virtual object 727 in the three-dimensional environment 702. For example, as shown in FIG. 7E, the computer system 101 redisplays and/or makes fully visible the website content 728 (e.g., the previously non-displayed portions of the website content as shown in FIG. 7D) included in the first portion of the virtual object 727 in the three-dimensional environment 702 relative to the viewpoint of the user.

In FIG. 7E, the computer system 101 detects movement of the viewpoint of the user while the virtual object 707 has the depth conflict with the hand 703*e* in the three-dimensional environment 702. For example, as shown in FIG. 7E, the computer system 101 detects the hand 705*b* grip the computer system 101 and move in a leftward direction (e.g., a counterclockwise direction about a body of the user). In some embodiments, as described below, movement of the viewpoint of the user causes the portion of the three-dimensional environment 702, including the physical environment surrounding the display generation component 120, in the field of view of the user, to change in accordance with the movement of the viewpoint. In some embodiments, the input for changing the viewpoint of the user corresponds to a movement of the head of the user in the physical environment (e.g., movement of the head-mounted display worn by the user in the physical environment).

Figure 7F:
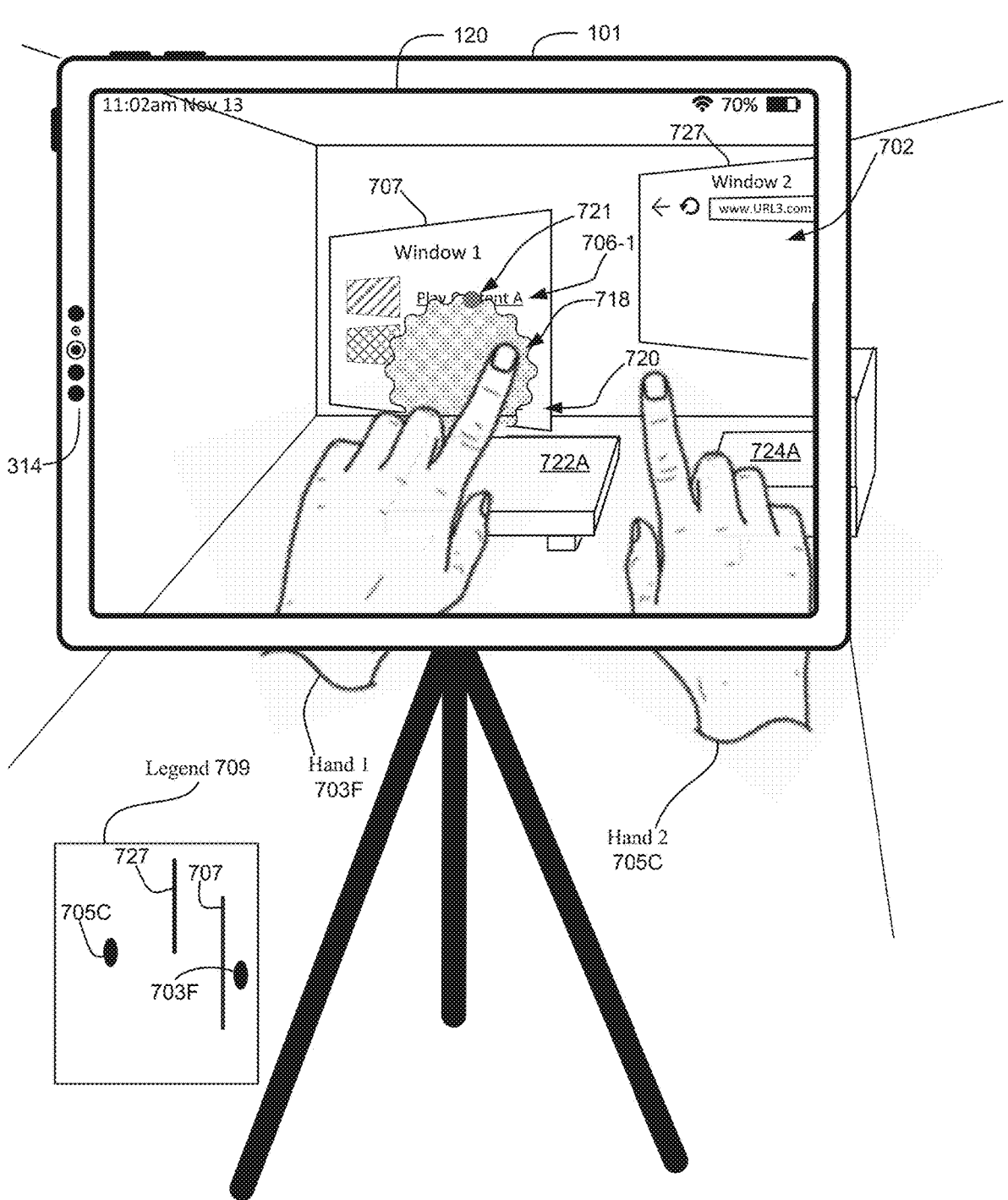

In some embodiments, as shown in FIG. 7F, in response to detecting movement of the hand (e.g., air gesture, touch gesture, or hand input) 705*b* in FIG. 7E, the computer system 101 updates display of the three-dimensional environment 702 relative to the new viewpoint of the user in accordance with the movement. For example, in FIG. 7F, the computer system 101 is moved/angled counterclockwise about the body of the user, such that the computer system 101 is facing the front-facing surfaces/portions of the virtual objects 707 and 727 at an angle in the three-dimensional environment 702. Accordingly, as shown in FIG. 7F, the computer system 101 optionally updates display of the orientations of the virtual object 707 and 727 such that the front-facing surface/portion of the virtual object 709*b* is angled rightward relative to the new viewpoint of the user. Additionally, as shown in FIG. 7F, when the viewpoint of the user moves, the portion of the physical environment that is visible via the display generation component 120 changes in accordance with the movement of the viewpoint (e.g., a smaller portion of the representation 724*a* of the sofa is visible in the three-dimensional environment 702 via the display generation component 120 relative to the new viewpoint of the user).

In some embodiments, the movement of the viewpoint of the user causes a degree of the depth conflict encountered by the virtual object 707 to change in the three-dimensional environment 702. For example, as mentioned above, the movement of the viewpoint of the user causes the orientations of the virtual objects 707 and 727 to change/shift in accordance with the movement of the viewpoint. Additional details regarding the shift in the orientations of the virtual objects 707 and 727 in accordance with the movement of the viewpoint of the user are given below with reference to method 800. In some embodiments, the shift in the orientation of the virtual object 707 increases or decreases the degree of the depth conflict between the fifth portion 718 of the virtual object 707 and the hand 703*e* in the three-dimensional environment 702. In some embodiments, when the movement of the viewpoint of the user causes the degree of depth conflict encountered by the virtual object 707 to change and/or causes the virtual object 707 to encounter a depth conflict in the three-dimensional environment 702, the computer system 101 changes the visual appearance of the portion of the virtual object 707 that has the depth conflict, as similarly described above. For example, as shown in FIG. 7F, the computer system 101 adjusts the change in visual appearance of the fifth portion 718 of the virtual object 707 that has the depth conflict with the hand 703*e* without changing the visual appearance of the sixth portion 720 of the virtual object 707 that does not have a depth conflict in the three-dimensional environment 702. In some embodiments, as shown in FIG. 7F, the amount of the fifth portion 718 of the virtual object 707 that has the changed visual appearance decreases in the three-dimensional environment 702 because the depth conflict between the fifth portion 718 of the virtual object 707 and the hand 703*e* appears to decrease from the new viewpoint of the user.

Additionally, in some embodiments, as shown in FIG. 7F, the movement of the viewpoint of the user does not cause the virtual object 727 to encounter a depth conflict in the three-dimensional environment 702 relative to the new viewpoint of the user. For example, as shown in FIG. 7D, the movement of the viewpoint of the user does not cause the virtual object 727 to at least partially contact/intersect a hand of the user (or another object) relative to the new viewpoint of the user. Accordingly, as shown in FIG. 7F, the computer system 101 optionally maintains display of the virtual object 727 and optionally does not change a visual appearance of any portions of the virtual object 727 in the three-dimensional environment 702.

In some embodiments, as described previously above with reference to FIG. 7A, the virtual object 707 includes content, such as a user interface of a media browsing application. For example, as shown in FIG. 7A, the virtual object 707 includes a plurality of selectable options 706-1 to 706-3 that are selectable to cause the computer system 101 to display content corresponding to the selectable options. As shown in FIG. 7F, the virtual object 707 optionally includes the selectable option 706-1. In some embodiments, as shown in FIG. 7F and as similarly described above, because the hand 703*f* of the user has the depth conflict with the fifth portion 718 of the virtual object 707, which includes a portion of the selectable option 706-1, the portion of the selectable option 706-1 has the changed visual appearance in the three-dimensional environment 702 (e.g., is not displayed or is not visible in the three-dimensional environment 702). As discussed below, input directed to the selectable option 706-1 optionally does not cause the computer system 101 to perform an operation associated with the selectable option 706-1.

In FIG. 7F, the computer system 101 detects a selection input directed to the selectable option 706-1 in the virtual object 707. For example, as shown in FIG. 7F, the computer system 101 detects an air gesture provided by the hand 703*f* (e.g., an air pinch gesture in which an index finger and thumb of the hand 703*f* come together and make contact), a tap gesture, or a button press while the attention (e.g., based on gaze 721) of the user is directed to the selectable option 706-1 in the three-dimensional environment 702. In some embodiments, as shown in FIG. 7F, the computer system 101 detects the hand 703*f* perform the air gesture while the hand 703*f* has the depth conflict with the virtual object 707 (e.g., is located behind the fifth portion 718 of the virtual object 707 relative to the viewpoint of the user) in the three-dimensional environment 702. Additionally or alternatively, in FIG. 7F, the computer system 101 detects an air gesture (e.g., an air pinch gesture), a tap gesture, or a button press provided by the hand 705*c* while the attention (e.g., based on the gaze 721) of the user is directed to the selectable option 706-1 in the three-dimensional environment 702.

Figure 7G:
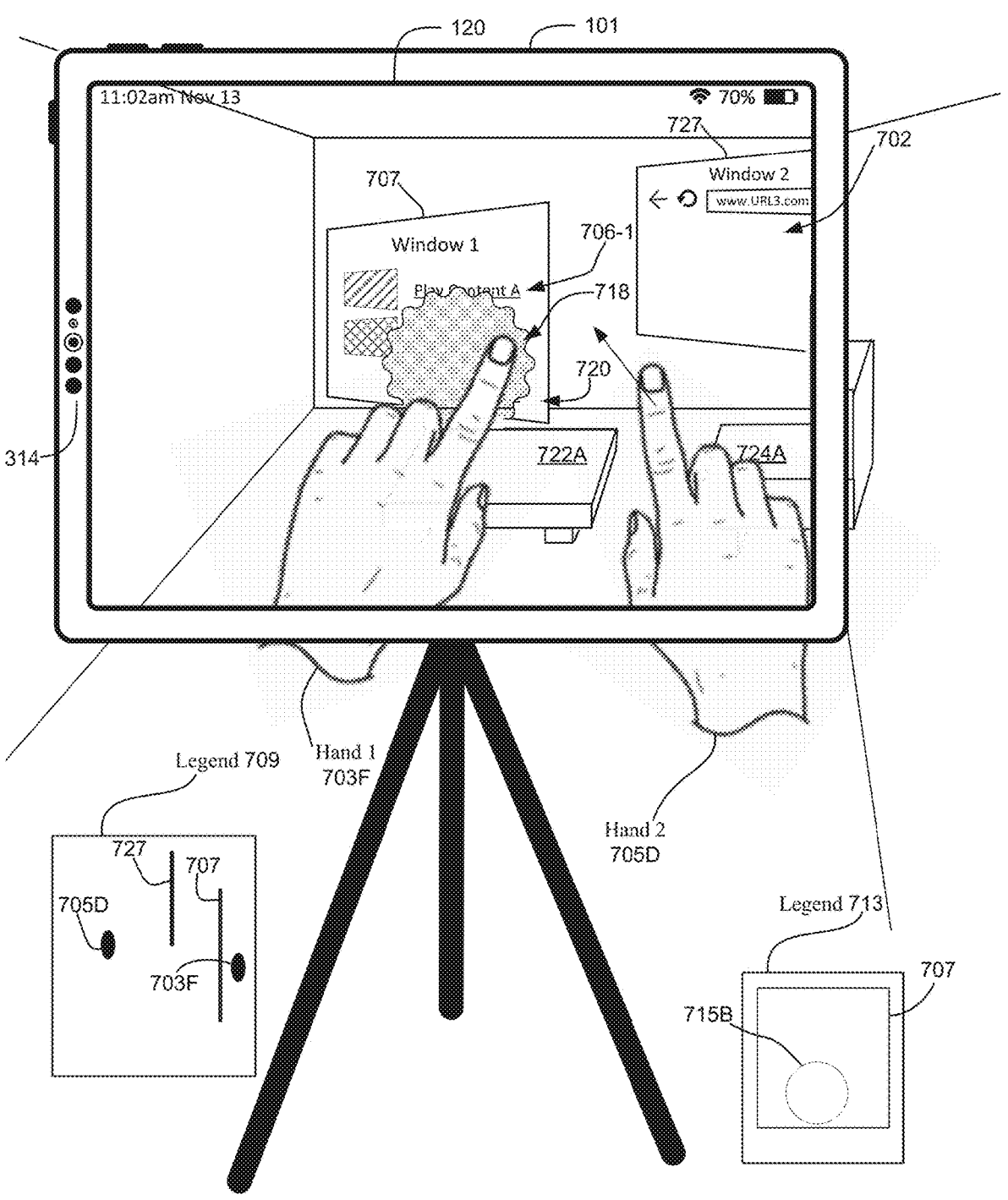

In some embodiments, as shown in FIG. 7G, in response to detecting the selection input provided by the hand 703*f* and/or the hand 705*c*, the computer system 101 forgoes activating (e.g., selecting) the selectable option 706-1 in the virtual object 707. For example, as shown in FIG. 7G, the computer system 101 forgoes displaying content (Content A) associated with the selectable option 706-1 in the virtual object 707 in the three-dimensional environment 702. As described previously above and as shown in FIG. 7G, a portion of the selectable option 706-1 is included in the fifth portion 718 of the virtual object 707 that is displayed with the changed visual appearance in the three-dimensional environment 702 (e.g., as a result of the depth conflict between the hand 703*f* and the virtual object 707). Thus, in some embodiments, because a portion of the selectable option 706-1 is included in the fifth portion 718 of the virtual object 707 that has the depth conflict with the hand 703*f*, the computer system 101 forgoes activating the selectable option 706-1 in the virtual object 707 (e.g., despite other portions of the selectable option 706-1 still being displayed and/or visible in the virtual object 707). As shown in FIG. 7G, the computer system 101 optionally performs no operation in the three-dimensional environment 702 in response to detecting the selection input above. It should be understood that the computer system 101 forgoes performing other operations in response to detecting other inputs directed to at least a portion of the fifth portion 718 of the virtual object 707. For example, if the computer system 101 alternatively detects an input corresponding to a request to scroll through content included in the fifth portion 718 of the virtual object 707, the computer system 101 would forgo scrolling the content of the virtual object 707 in the three-dimensional environment 702.

In FIG. 7G, the computer system 101 detects movement of the hand (e.g., air gesture, touch gesture, or hand input) 705*d* relative to the virtual object 707 in the three-dimensional environment 702. For example, as shown in FIG. 7G, the computer system 101 detects the hand 705*d* move away from the user (e.g., leftward and forward relative to the viewpoint of the user) and toward the virtual object 707 in the three-dimensional environment 702. In some embodiments, the computer system 101 detects the movement of the hand (e.g., air gesture, touch gesture, or hand input) 705*d* while the hand 703*f* has the depth conflict with the fifth portion 718 of the virtual object 707 in the three-dimensional environment 702 (e.g., while the hand 703*f* is located behind the virtual object 707 relative to the viewpoint of the user), as shown in FIG. 7G. Additionally, as similarly described above with reference to FIG. 7E, the hand 703*f* optionally has the second magnitude 715*b* of depth conflict with the virtual object 707, as indicated in the legend 713, when the movement of the hand (e.g., air gesture, touch gesture, or hand input) 705*a* is detected by the computer system 101.

Figure 7H:
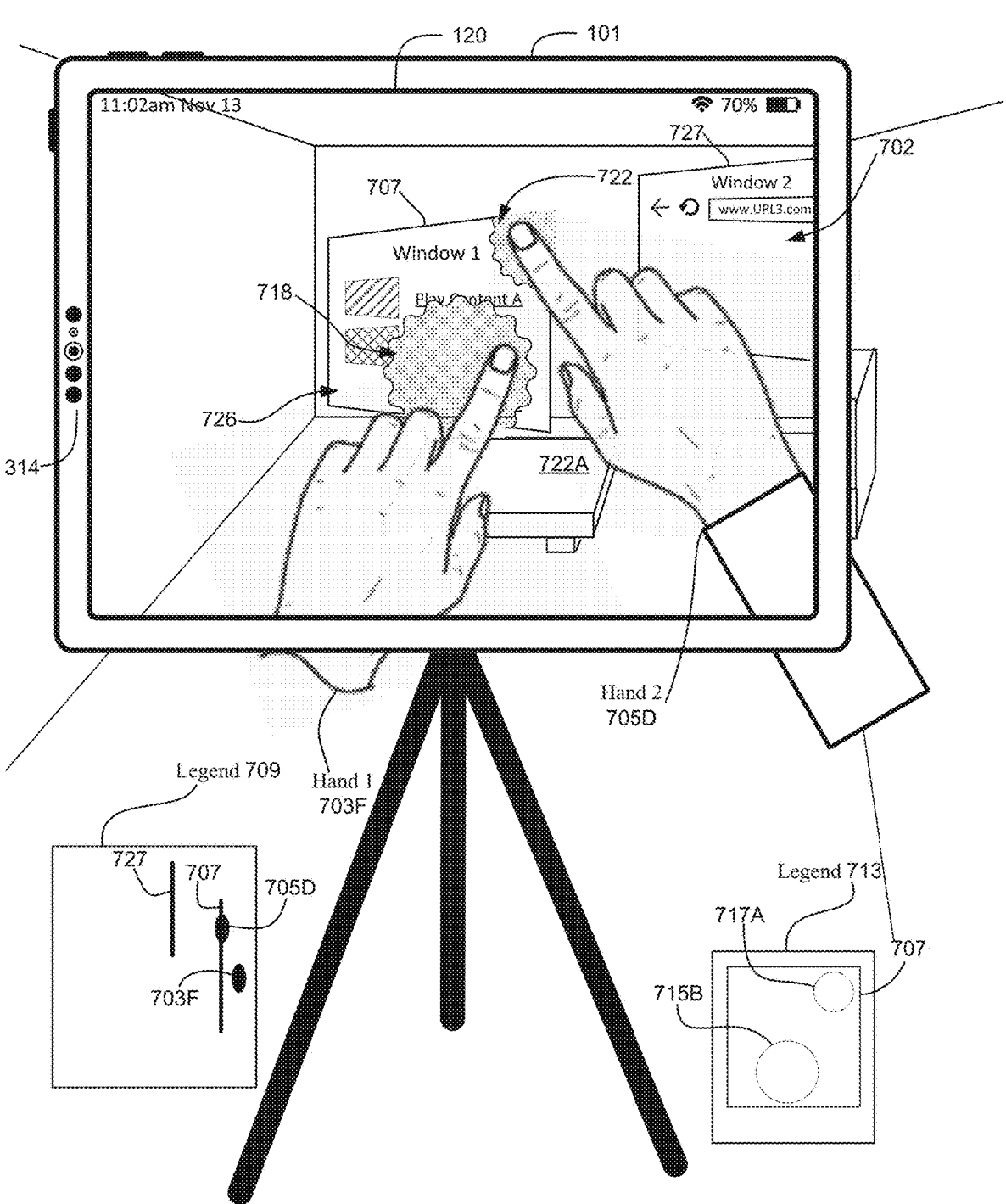

In some embodiments, in response to detecting the movement of the hand (e.g., air gesture, touch gesture, or hand input) 705*d* of the user toward the virtual object 707 relative to the virtual object 707, the computer system 101 determines that a seventh portion 722 of the virtual object 707 encounters a depth conflict with the hand 705*d*, as shown in FIG. 7H. For example, as similarly discussed above, the computer system 101 determines that, after the movement of the hand (e.g., air gesture, touch gesture, or hand input) 705*d* in the three-dimensional environment 702, the hand 705*d* at least partially contacts/intersects the seventh portion 722 of the virtual object 707. As shown in FIG. 7H, in accordance with the determination that the seventh portion 722 of the virtual object 707 encounters the depth conflict with the hand 705*d* after the movement of the hand (e.g., air gesture, touch gesture, or hand input) 705*d*, the computer system 101 changes a visual appearance of the seventh portion 722 of the virtual object 707, as similarly discussed above. For example, as shown in FIG. 7H, the computer system 101 changes visual properties (e.g., brightness, opacity, saturation, and/or coloration) of and/or ceases display of the seventh portion 722 of the virtual object 707 to resolve or reduce the depth conflict between the hand 705*d* and the seventh portion 722 of the virtual object 707. Additionally, in accordance with a determination that the movement of the hand (e.g., air gesture, touch gesture, or hand input) 705*d* does not cause an eighth portion 726 of the virtual object 707 to encounter a depth conflict with the hand 705*d* after the movement of the hand (e.g., air gesture, touch gesture, or hand input) 705*d*, the computer system 101 maintains display of the eighth portion 726 of the virtual object 707 in the three-dimensional environment 702. For example, as similarly described above, the computer system 101 forgoes changing a visual appearance of the eighth portion 726 of the virtual object 707 in the three-dimensional environment 702.

In some embodiments, as shown in the legend 709 in FIG. 7H, the computer system 101 detects that the hand 705*d* has the depth conflict with the seventh portion 722 of the virtual object 707 while the hand 703*f* concurrently has the depth conflict with the fifth portion 718 of the virtual object 707 in the three-dimensional environment 702. For example, as shown in FIG. 7H, the computer system 101 detects the hand 705*d* at least partially contact/intersect the seventh portion 722 of the virtual object 707 while the hand 703*f* is concurrently located behind the fifth portion 718 of the virtual object 707 relative to the viewpoint of the user. Accordingly, as shown in FIG. 7H, the computer system 101 concurrently displays the fifth portion 718 of the virtual object 707 with the changed visual appearance and the seventh portion 722 of the virtual object 707 with the changed visual appearance to resolve or reduce the depth conflicts from the hands 703*f* and 705*d*, respectively, in the three-dimensional environment 702. In some embodiments, the change in the visual appearance of the fifth portion 718 of the virtual object 707 is different from the change in the visual appearance of the seventh portion 722 of the virtual object 707 in the three-dimensional environment 702. For example, as shown in FIG. 7H, the amount of the fifth portion 718 of the virtual object that is displayed with reduced visual prominence is different from (e.g., greater than) the amount of the seventh portion 722 of the virtual object 707 that is displayed with reduced visual prominence. Further, the change of the visual properties (e.g., brightness, opacity, saturation, and/or coloration) of the fifth portion 718 of the virtual object 707 is optionally different from the change of the visual properties of the seventh portion 722 of the virtual object 707 (e.g., based on the content included in the portions 718 and 722 and/or the degree of the depth conflicts).

Additionally, in some embodiments, the magnitudes (e.g., amounts) of the portions of the hand 703*f* and the hand 705*d* that have the depth conflicts with the virtual object 707 are different. For example, as mentioned previously above, the hand 703*f* has the second magnitude 715*b* of depth conflict with the virtual object 707, as indicated in the legend 713. In some embodiments, the hand 705*d* has a third magnitude 717*a* of depth conflict, smaller than the second magnitude 715*b*, with the virtual object 707, as indicated in the legend 713. For example, as similarly discussed above, the portion of the hand 705*d* is contacting/intersecting a smaller surface area of the virtual object 707 than the portion of the hand 703*f* that is behind the virtual object 707 (e.g., relative to the viewpoint of the user). Accordingly, as described above and as shown in FIG. 7H, in some embodiments, the computer system 101 individually resolves or reduces the depth conflicts with the hands 703*f* and 705*d* based on the magnitude (e.g., amount) of each hand that is in conflict with the virtual object 707 in the three-dimensional environment 702.

It should be understood that, in some embodiments, the computer system 101 utilizes the above-described mitigation techniques (e.g., changing visual properties of a virtual object and/or ceasing display of a portion of the virtual object in a three-dimensional environment) to mitigate depth conflicts with other physical objects other than the hand(s) of the user of the computer system. For example, in response to detecting that a first virtual object encounters a depth conflict with a physical object other than a hand of the user (e.g., a hardware input device, such as a controller, keyboard, trackpad, pointer, and/or mouse, or another portion of the user other than the hand, such as an arm, foot, knee, and/or elbow) in a three-dimensional environment, the computer system utilizes the above-described techniques to reduce or resolve the depth conflict between the first virtual object and the physical object in the three-dimensional environment.

FIGS. 8A-8N is a flowchart illustrating an exemplary method 800 of facilitating depth conflict mitigation for a virtual object in a three-dimensional environment by reducing visual prominence of one or more portions of the virtual object in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at a computer system (e.g., 101) in communication with a display generation component (e.g., 120) and one or more input devices (e.g., 314). For example, the computer system is or includes a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users. In some embodiments, the one or more input devices include an electronic device or component capable of receiving a user input (e.g., capturing a user input or detecting a user input) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device, and/or a motion sensor (e.g., a hand tracking device, or a hand motion sensor). In some embodiments, the computer system is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, the computer system displays (802*a*), via the display generation component, a virtual object in a three-dimensional environment, such as virtual object 707 or virtual object 727 in three-dimensional environment 702 as shown in FIG. 7A. For example, the three-dimensional environment is generated, displayed, or otherwise caused to be viewable by the computer system (e.g., an extended reality (XR) environment such as a virtual reality (VR) environment, a mixed reality (MR) environment, or an augmented reality (AR) environment). In some embodiments, a physical environment surrounding the display generation component is visible through a transparent portion of the display generation component (e.g., true or real passthrough). For example, a representation of the physical environment is displayed in the three-dimensional environment via the display generation component (e.g., virtual or video passthrough), such as display of the captured portions of the physical environment surrounding the display generation component 120 in FIG. 7A. In some embodiments, the virtual object is generated by the computer system and/or is or includes content, such as a window of a web browsing application displaying content (e.g., text, images, or video), as similarly shown in virtual object 727 in FIG. 7A, a window displaying a photograph or video clip, a media player window for controlling playback of content items on the computer system, as similarly show in virtual object 707 in FIG. 7A, a contact card in a contacts application displaying contact information (e.g., phone number email address, and/or birthday) and/or a virtual boardgame of a gaming application. In some embodiments, the virtual object is displayed at a respective location in the three-dimensional environment that is in the field of view of a user of the computer system from a current viewpoint of the user of the three-dimensional environment. In some embodiments, the virtual object contains a plurality of portions, including a first portion and a second portion, which are different (e.g., non-overlapping) portions of the plurality of portions. For example, the first portion of the virtual object is or includes a top portion (e.g., a top half) of the virtual object relative to the viewpoint of the user, and the second portion of the virtual object is or includes a bottom portion (e.g., a bottom half) of the virtual object relative to the viewpoint of the user. As another example, the first portion of the virtual object is or includes outer edges of a first side of the virtual object relative to the viewpoint of the user, and the second portion of the virtual object is or includes outer edges of a second side, different from the first side, of the virtual object relative to the viewpoint of the user. In some embodiments, the first portion and the second portion of the virtual object have first visual properties (e.g., appearance) determined by the content (e.g., representations of pixels of the content) included in the virtual object. In some embodiments, the first visual properties are determined by a lighting effect, a darkening effect, a transparency effect, a blurring effect, a glowing effect, and/or a saturation effect each having a default value based on the content of the virtual object. For example, while the computer system displays the first portion and the second portion of the virtual object with the first visual properties, the first visual properties are automatically (e.g., as a default) determined based on and/or defined by the content of the virtual object, such as the media browsing content of virtual object 707 or the web browsing content of virtual object 727 as shown in FIG. 7A. In some embodiments, characteristics of the first visual properties do not include and/or are different from a size of the virtual object, a lighting of the virtual object, shadows associated with the virtual object (e.g., cast onto the virtual object by other objects), or other visual characteristics that automatically and/or would otherwise change based on changes in relative placement of the virtual object in the three-dimensional environment relative to the viewpoint of the user.

In some embodiments, while displaying the virtual object in the three-dimensional environment, the computer system detects (802*b*), via the one or more input devices, a first input that includes movement of a first portion (e.g., a first hand) of a user of the computer system relative to the virtual object in the three-dimensional environment, such as movement of hand 703*a* relative to the virtual object 707 as shown in FIG. 7A. For example, the computer system detects movement of the first hand (e.g., left hand or right hand) of the user of the computer system that is detected by the one or more input devices (e.g., a hand tracking device) in communication with the computer system. In some embodiments, the movement of the first hand of the user is detected without detecting an air pinch gesture performed by two or more fingers of the first hand of the user. For example, the computer system detects the first hand of the user move in space without detecting an index finger and thumb of the first hand come together and touch at the tips. In some embodiments, the computer system detects the first input via a hardware input device (e.g., a controller operable with six degree of freedom of movement, or a touchpad or mouse) in communication with the computer system. For example, the computer system detects movement of the controller in space, movement of a mouse across a surface (e.g., a tabletop), and/or movement of a finger of the hand of the user across the touchpad. In some embodiments, the movement of the hand (e.g., air gesture, touch gesture, or hand input) of the user is in a respective direction (e.g., in a vertical direction, a horizontal direction, or a diagonal direction) in space relative to the virtual object in the three-dimensional environment. For example, the computer system detects the first hand of the user move away from the body of the user and toward the portion of the three-dimensional environment that is visible via the display generation component (e.g., the portion of the three-dimensional environment that includes the virtual object), such as the movement of the hand (e.g., air gesture, touch gesture, or hand input) 703*a* toward the portion of the three-dimensional environment 702 that is visible via the display generation component 120 as shown in FIG. 7A. In some embodiments, the first input includes an attention-only and/or gaze-only input (e.g., not including input from one or more portions of the user other than those portions providing the attention input).

In some embodiments, in response to detecting the first input (802*c*), in accordance with a determination that at least a portion of the first portion of the user has a depth conflict with a first portion of the virtual object in the three-dimensional environment relative to a viewpoint of the user (e.g., after the movement of the first hand of the user in space, the first hand at least partially contacts or intersects with the first portion of the virtual object in the three-dimensional environment, or comes within a threshold distance (e.g., 0, 1, 2, 3, 5, 10, 15, 20, 25, 30, or 50 cm) of contacting or intersecting with the first portion of the virtual object), such as contact between the hand 703*c* and a first portion 708 of the virtual object 707 as shown in FIGS. 7C and 7C-1, and at least a portion of the first portion of the user does not have a depth conflict with a second portion of the virtual object in the three-dimensional environment relative to the viewpoint of the user after the movement of the first portion of the user (802*d*), the computer system reduces (802*e*) a visual prominence of the first portion of the virtual object in the three-dimensional environment relative to the second portion of the virtual object, such as changing a visual appearance of the first portion 708 of the virtual object 707 in the three-dimensional environment 702 as shown in FIGS. 7C and 7C-1. In some embodiments, when the first portion of the user at least partially contacts or intersects with the first portion of the virtual object, the first portion of the user creates a depth conflict with the first portion of the virtual object in the three-dimensional environment relative to the viewpoint of the user. In some embodiments, while the first portion of the virtual object has the depth conflict with the first portion of the user, the second portion of the virtual object does not have a depth conflict with the first portion of the user in the three-dimensional environment. For example, the first hand of the user is not at least partially contacting or intersecting with the second portion of the virtual object in the three-dimensional environment after the movement of the first hand of the user in space, such as the hand 703*c* not contacting a second portion 710 of the virtual object 707 as shown in FIGS. 7C and 7C-1. In some embodiments, in accordance with the determination that the first hand of the user at least partially contacts or intersects with the first portion of the virtual object in the three-dimensional environment, the computer system automatically updates display of the first portion of the virtual object to resolve or reduce the depth conflict in the three-dimensional environment. In some embodiments, reducing the visual prominence of the first portion of the virtual object relative to the second portion of the virtual object includes ceasing display of the first portion of the virtual object in the three-dimensional environment. For example, the computer system no longer displays the first portion of the virtual object with which the first hand of the user has the depth conflict in the three-dimensional environment to resolve the depth conflict in the three-dimensional environment (e.g., such that display of the virtual object no longer appears to be obstructed by the first hand of the user in the three-dimensional environment relative to the viewpoint of the user). In some embodiments, reducing the visual prominence of the first portion of the virtual object relative to the second portion of the virtual object includes ceasing display of a third portion of the virtual object that includes the first portion of the virtual object with which the first portion of the user has the depth conflict in the three-dimensional environment. For example, the computer system no longer displays a portion of the virtual object that is larger than (e.g., in amount) the first portion of the virtual object with which the first hand of the user has the depth conflict in the three-dimensional environment. In some embodiments, as discussed in more detail below, the first portion of the virtual object corresponds to a size of the first hand of the user, rather than just the portion of the first hand of the user that contacts the virtual object in the three-dimensional environment. For example, if the computer system detects that one or more fingers of the first hand of the user is contacting the virtual object in the three-dimensional environment, a size of the first portion of the virtual object that is no longer displayed in the three-dimensional environment corresponds to (e.g., is equal to or is proportional to) a size of the first hand of the user (e.g., including all fingers and the palm of the first hand of the user). In some embodiments, when the computer system reduces the visual prominence of the first portion of the virtual object relative to the second portion of the virtual object, the first portion of the user is visible through the virtual object in the three-dimensional environment relative to the viewpoint of the user. For example, when the computer system no longer displays the first portion of the virtual object in the three-dimensional environment, the portion of the first hand of the user that caused the depth conflict with the virtual object in the three-dimensional environment is no longer intersecting with or contacting the first portion of the virtual object relative to the viewpoint of the user. In some embodiments, as discussed below, when the computer system reduces the visual prominence of the first portion of the virtual object relative to the second portion of the virtual object, the second portion of the virtual object remains displayed in the three-dimensional environment. For example, the first hand of the user and the second portion of the virtual object are visible and unobstructed from the viewpoint of the user when the computer system ceases display of the first portion of the virtual object. In some embodiments, the computer system displays the first portion of the virtual object with an animation effect that causes the first portion of the virtual object to no longer be displayed in the three-dimensional environment when the first portion of the user contacts or intersects with the first portion of the virtual object in response to the first input. For example, as described in more detail below, the animation effect includes a feathering effect that, when the first hand of the user is in contact with the first portion of the virtual object, reveals the first hand of the user (e.g., when the first portion of the virtual object is no longer displayed, portions of the virtual object surrounding the first hand of the user are feathered relative to the viewpoint of the user). In some embodiments, reducing the visual prominence of the first portion of the virtual object relative to the second portion of the virtual object includes increasing transparency of the first portion relative to the second portion, decreasing brightness and/or color saturation of the first portion relative to the second portion, and/or increasing blur of the first portion relative to the second portion of the virtual object in the three-dimensional environment. In some embodiments, as discussed in more detail below, while the prominence of the first portion of the virtual object is reduced relative to the second portion of the virtual object, the computer system forgoes responding to input directed to the first portion of the virtual object. For example, if the computer system detects a selection input directed to the first portion of the virtual object, the computer system does not perform a selection operation on the first portion of the virtual object in response to detecting the input. In some embodiments, the computer system reduces the visual prominence of the first portion of the virtual object relative to the second portion of the virtual object for a duration of which the first portion of the user remains in contact with the first portion of the virtual object. For example, if the computer system detects movement of the first hand of the user away from the virtual object in the three-dimensional environment that causes the first portion of the virtual object to no longer have the depth conflict in the three-dimensional environment, the computer system redisplays the first portion of the virtual object with the first visual properties (e.g., redisplays the first portion of the virtual object in the three-dimensional environment). In some embodiments, when the computer system reduces the visual prominence of the first portion of the virtual object relative to the second portion of the virtual object in response to detecting the depth conflict between the first portion of the user and the first portion of the virtual object, the computer system does not reduce the visual prominence of other portions of the three-dimensional environment (e.g., objects surrounding the virtual object or portions of the physical environment) relative to the second portion of the virtual object and/or does not modify the visual properties of other portions of the three-dimensional environment.

In some embodiments, the computer system maintains (802f) display of the second portion of the virtual object in the three-dimensional environment, such as maintaining display of the second portion 710 of the virtual object 707 that does not have the depth conflict with the hand 703c as shown in FIGS. 7C and 7C-1. For example, in accordance with the determination that the first hand of the user does not at least partially contact or intersect with the second portion of the virtual object in the three-dimensional environment, the computer system maintains display of the second portion of the virtual object with the visual appearance it had before the first input. In some embodiments, the computer system concurrently displays the first portion of the virtual object with the reduced visual prominence relative to the second portion of the virtual object and the second portion of the virtual object with the first visual properties, as similarly shown in virtual object 707 in FIGS. 7C and 7C-1.

In some embodiments, in accordance with a determination that at least a portion of the first portion of the user does not have a depth conflict with the virtual object in the three-dimensional environment relative to the viewpoint of the user after the movement of the first portion of the user (e.g., the virtual object does not encounter a depth conflict with any portion of the first hand of the user, such as having no depth conflict with any fingers of the hand of the user after the movement of the first hand), such as the hand 703c not contacting the virtual object 727 as shown in FIGS. 7C and 7C-1, the computer system maintains (802g) display of the first portion and the second portion of the virtual object without reducing the visual prominence of the first portion of the virtual object in the three-dimensional environment relative to the visual prominence of the second portion of the virtual object, such as maintaining display of the virtual object 727 as shown in FIGS. 7C and 7C-1. For example, in accordance with the determination that the first portion and the second portion of the virtual object do not at least partially contact or intersect with the first hand of the user after movement of the first hand of the user in space relative to the viewpoint of the user, the computer system maintains display of the first portion and the second portion of the virtual object with the first visual properties discussed above. Changing visual properties of an object in a three-dimensional environment when the object encounters a depth conflict with a portion of the user based on movement of the portion of the user relative to the three-dimensional environment provides feedback that the display of the object is in conflict with the portion of the user, which facilitates user input for resolving or reducing the depth conflict and/or enables the user to continue interacting with the computer system while there is a depth conflict, thereby improving user-device interaction, and/or reduces the prominence of the depth conflict in the three-dimensional environment, which reduces eye strain of the user, thereby avoiding potential physical discomfort for the user caused by the depth conflict.

In some embodiments, while the visual prominence of the first portion of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, the computer system detects (804a), via the one or more input devices, a change in a position of the virtual object in the three-dimensional environment, similar to the difference in position between the virtual object 707 and the virtual object 727 as indicated in legend 709 in FIG. 7A. For example, while the hand of the user of the computer system has the depth conflict with the first portion of the virtual object in the three-dimensional environment, the computer system detects a change in the position of the virtual object in the three-dimensional environment. In some embodiments, the virtual object is located at a first location in the three-dimensional environment when the first input is detected and while the visual prominence of the first portion of the virtual object is reduced. In some embodiments, the computer system detects the virtual object move from the first location to a second location in the three-dimensional environment while the hand of the user has the depth conflict with the first portion of the virtual object. In some embodiments, the virtual object moves in response to user input. For example, the virtual object moves in response to input provided by a second hand of the user moving the virtual object to the second location in the three-dimensional environment (e.g., an air pinch gesture provided by the second hand of the user (e.g., in which an index finger and thumb of the second hand of the user come together to make contact) directed to the virtual object, followed by movement of the second hand of the user in a respective direction and with a respective magnitude in space). In some embodiments, the virtual object moves in response to detecting movement of the viewpoint of the user. For example, the virtual object is viewpoint-locked in the three-dimensional environment and movement of the viewpoint of the user causes the virtual object to move to the second location in accordance with the movement of the viewpoint.

In some embodiments, in response to detecting the change in the position of the virtual object in the three-dimensional environment (804b), in accordance with a determination that the change in the position of the virtual object in the three-dimensional environment causes at least a portion of the first portion of the user to have a depth conflict with a third portion, different from the first portion, of the virtual object in the three-dimensional environment relative to the viewpoint of the user (e.g., as similarly described above with reference to steps 802a-802g, after the virtual object changes position in the three-dimensional environment, the first hand of the user at least partially contacts or intersects with the third portion of the virtual object in the three-dimensional environment, or comes within a threshold distance (e.g., 0, 1, 2, 3, 5, 10, 15, 20, 25, 30, or 50 cm) of contacting or intersecting with the third portion of the virtual object) while at least a portion of the first portion of the user does not have a depth conflict with a fourth portion, different from the third portion, of the virtual object in the three-dimensional environment relative to the viewpoint of the user (804c), such as the hand 705a having the depth conflict with a first portion 730 of the virtual object 727 that is at a different location in the three-dimensional environment 702 than the virtual object 707 that has the depth conflict with the hand 703d in FIG. 7D, the computer system reduces (804d) a visual prominence of the third portion of the virtual object in the three-dimensional environment relative to the fourth portion of the virtual object in the three-dimensional environment, such as changing a visual appearance of the first portion 730 of the virtual object 727 as shown in FIG. 7D. In some embodiments, the first portion of the user no longer has the depth conflict with the first portion of the virtual object in the three-dimensional environment when the first portion of the user has the depth conflict with the third portion of the virtual object. In some embodiments, while the third portion of the virtual object has the depth conflict with the first portion of the user, the fourth portion of the virtual object does not have a depth conflict with the first portion of the user in the three-dimensional environment. For example, the first hand of the user is not at least partially contacting or intersecting with the fourth portion of the virtual object in the three-dimensional environment after the change in position of the virtual object in the three-dimensional environment. In some embodiments, as similarly described above with reference to steps 802a-802g, in accordance with the determination that the first hand of the user at least partially contacts or intersects with the third portion of the virtual object in the three-dimensional environment, the computer system automatically updates display of the third portion of the virtual object to resolve or reduce the depth conflict in the three-dimensional environment. In some embodiments, as similarly described above with reference to steps 802a-802g, reducing the visual prominence of the third portion of the virtual object relative to the fourth portion of the virtual object includes ceasing display of the third portion of the virtual object in the three-dimensional environment. For example, the computer system no longer displays the third portion of the virtual object with which the first hand of the user has the depth conflict in the three-dimensional environment to resolve the depth conflict in the three-dimensional environment. In some embodiments, as similarly described above with reference to steps 802a-802g, reducing the visual prominence of the third portion of the virtual object relative to the fourth portion of the virtual object includes increasing transparency of the third portion relative to the fourth portion, decreasing brightness and/or color saturation of the third portion relative to the fourth portion, and/or increasing blur of the third portion relative to the fourth portion of the virtual object in the three-dimensional environment. In some embodiments, when the computer system reduces the visual prominence of the third portion of the virtual object in the three-dimensional environment, the computer system no longer reduces the visual prominence of the first portion of the virtual object (e.g., which was done so in response to the first input, as previously discussed above). For example, the computer system redisplays the first portion of the virtual object in the three-dimensional environment and/or redisplays the first portion of the virtual object with the first visual properties described above with reference to steps 802a-802g.

In some embodiments, the computer system maintains (804e) display of the fourth portion of the virtual object in the three-dimensional environment, such as maintaining display of a second portion 732 of the virtual object 727 that does not have the depth conflict as shown in FIG. 7D. For example, as similarly discussed above with reference to steps 802a-802g, in accordance with the determination that the first hand of the user does not at least partially contact or intersect with the fourth portion of the virtual object in the three-dimensional environment when the virtual object changes position in the three-dimensional environment, the computer system maintains display of the fourth portion of the virtual object with the visual appearance it had before the change in the position of the virtual object. In some embodiments, in accordance with a determination that at least a portion of the first portion of the user does not have a depth conflict with the virtual object in the three-dimensional environment relative to the viewpoint of the user after the change in the position of the virtual object in the three-dimensional environment, the computer system maintains display of the third portion and the fourth portion of the virtual object without reducing the visual prominence of the third portion of the virtual object in the three-dimensional environment relative to the visual prominence of the fourth portion of the virtual object in the three-dimensional environment. Changing visual properties of an object in a three-dimensional environment when the object encounters a depth conflict with a portion of the user based on movement of the object in the three-dimensional environment provides feedback that the display of the object is in conflict with the portion of the user, which facilitates user input for resolving or reducing the depth conflict and/or enables the user to continue interacting with the computer system while there is a depth conflict, thereby improving user-device interaction, and/or reduces the prominence of the depth conflict in the three-dimensional environment, which reduces eye strain of the user, thereby avoiding potential physical discomfort for the user caused by the depth conflict.

In some embodiments, while the visual prominence of the first portion of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, the computer system detects (806*a*), via the one or more input devices, movement of the first portion of the user relative to the virtual object in the three-dimensional environment, such as movement of the hand (e.g., air gesture, touch gesture, or hand input) 703*c* relative to the virtual object 707 while the hand 703*c* has the depth conflict with the first portion 708 of the virtual object 707 as shown in FIGS. 7C and 7C-1. For example, while the hand of the user of the computer system has the depth conflict with the first portion of the virtual object in the three-dimensional environment, the computer system detects movement of the hand (e.g., air gesture, touch gesture, or hand input) of the user relative to the virtual object. In some embodiments, the computer system detects the hand of the user move in space in a respective direction and with a respective magnitude (e.g., of speed and/or distance). For example, while the hand of the user has the depth conflict with the first portion of the virtual object, the computer system detects the hand move upward or downward relative to the virtual object or laterally (e.g., leftward or rightward) relative to the virtual object in the three-dimensional environment, such as the leftward movement of the hand (e.g., air gesture, touch gesture, or hand input) 703*c* as shown in FIGS. 7C and 7C-1. In some embodiments, the computer system detects the hand of the user move irrespective of a location of the attention of the user in the three-dimensional environment.

In some embodiments, in response to detecting the movement of the first portion of the user (806*b*), in accordance with a determination that the movement of the first portion of the user causes at least a portion of the first portion of the user to have a depth conflict with a third portion, different from the first portion, of the virtual object in the three-dimensional environment relative to the viewpoint of the user (e.g., as similarly described above with reference to steps 802*a*-802*g*, after the first hand of the user moves relative to the virtual object in the three-dimensional environment, the first hand of the user at least partially contacts or intersects with the third portion of the virtual object in the three-dimensional environment, or comes within a threshold distance (e.g., 0, 1, 2, 3, 5, 10, 15, 20, 25, 30, or 50 cm) of contacting or intersecting with the third portion of the virtual object) while at least a portion of the first portion of the user does not have a depth conflict with a fourth portion, different from the third portion, of the virtual object in the three-dimensional environment relative to the viewpoint of the user (806*c*), such as the hand 703*d* encountering a depth conflict with a third portion 714 of the virtual object 707 as shown in FIG. 7D, the computer system reduces (806*d*) a visual prominence of the third portion of the virtual object in the three-dimensional environment relative to the fourth portion of the virtual object in the three-dimensional environment, such as changing a visual appearance of the third portion 714 of the virtual object 707 as shown in FIG. 7D. In some embodiments, the first portion of the user no longer has the depth conflict with the first portion of the virtual object in the three-dimensional environment when the first portion of the user has the depth conflict with the third portion of the virtual object, such as the hand 703*d* no longer having the depth conflict with the first portion 708 of the virtual object 707 as shown in FIG. 7D. In some embodiments, while the third portion of the virtual object has the depth conflict with the first portion of the user, the fourth portion of the virtual object does not have a depth conflict with the first portion of the user in the three-dimensional environment. For example, the first hand of the user is not at least partially contacting or intersecting with the fourth portion of the virtual object in the three-dimensional environment after the movement of the hand (e.g., air gesture, touch gesture, or hand input) relative to the virtual object in the three-dimensional environment, such as the hand 703*d* not contacting a fourth portion 716 of the virtual object 707 as shown in FIG. 7D. In some embodiments, as similarly described above with reference to steps 802*a*-802*g*, in accordance with the determination that the first hand of the user at least partially contacts or intersects with the third portion of the virtual object in the three-dimensional environment, the computer system automatically updates display of the third portion of the virtual object to resolve or reduce the depth conflict in the three-dimensional environment. In some embodiments, as similarly described above with reference to steps 802*a*-802*g*, reducing the visual prominence of the third portion of the virtual object relative to the fourth portion of the virtual object includes ceasing display of the third portion of the virtual object in the three-dimensional environment. For example, the computer system no longer displays the third portion of the virtual object with which the first hand of the user has the depth conflict in the three-dimensional environment to resolve the depth conflict in the three-dimensional environment. In some embodiments, as similarly described above with reference to steps 802*a*-802*g*, reducing the visual prominence of the third portion of the virtual object relative to the fourth portion of the virtual object includes increasing transparency of the third portion relative to the fourth portion, decreasing brightness and/or color saturation of the third portion relative to the fourth portion, and/or increasing blur of the third portion relative to the fourth portion of the virtual object in the three-dimensional environment. In some embodiments, when the computer system reduces the visual prominence of the third portion of the virtual object in the three-dimensional environment, the computer system no longer reduces the visual prominence of the first portion of the virtual object (e.g., which was done so in response to the first input, as previously discussed above), such as no longer changing the appearance of the first portion 708 of the virtual object 707 as shown in FIG. 7D. For example, the computer system redisplays the first portion of the virtual object in the three-dimensional environment and/or redisplays the first portion of the virtual object with the first visual properties described above with reference to steps 802*a*-802*g*.

In some embodiments, the computer system maintains (806*e*) display of the fourth portion of the virtual object in the three-dimensional environment, such as maintaining display of the fourth portion 716 of the virtual object 707 that does not have a depth conflict as shown in FIG. 7D. For example, as similarly discussed above with reference to steps 802*a*-802*g*, in accordance with the determination that the first hand of the user does not at least partially contact or intersect with the fourth portion of the virtual object in the three-dimensional environment when the hand of the user moves relative to the virtual object in the three-dimensional environment, the computer system maintains display of the fourth portion of the virtual object with the visual appearance it had before the movement of the hand (e.g., air gesture, touch gesture, or hand input) of the user. In some embodiments, in accordance with a determination that at least a portion of the first portion of the user does not have a depth conflict with the virtual object in the three-dimensional environment relative to the viewpoint of the user after the movement of the first portion of the user relative to the virtual object in the three-dimensional environment, the computer system maintains display of the third portion and the fourth portion of the virtual object without reducing the visual prominence of the third portion of the virtual object in the three-dimensional environment relative to the visual prominence of the fourth portion of the virtual object in the three-dimensional environment. Changing visual properties of an object in a three-dimensional environment when the object encounters a depth conflict with a portion of the user based on movement of the portion of the user relative to the object in the three-dimensional environment provides feedback that the display of the object is in conflict with the portion of the user, which facilitates user input for resolving or reducing the depth conflict and/or enables the user to continue interacting with the computer system while there is a depth conflict, thereby improving user-device interaction, and/or reduces the prominence of the depth conflict in the three-dimensional environment, which reduces eye strain of the user, thereby avoiding potential physical discomfort for the user caused by the depth conflict.

In some embodiments, while the visual prominence of the first portion of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, the computer system detects (808a), via the one or more input devices, movement of the viewpoint of the user relative to the virtual object in the three-dimensional environment, such as movement of the hand (e.g., air gesture, touch gesture, or hand input) 705b corresponding to movement of the display generation component 120 as shown in FIG. 7D. For example, while the hand of the user of the computer system has the depth conflict with the first portion of the virtual object in the three-dimensional environment, the computer system detects movement of the viewpoint of the user relative to the virtual object. In some embodiments, the computer system detects movement of the display generation component via which the three-dimensional environment, including the virtual object, is displayed for the user. For example, the computer system detects the display generation component move in space in a respective direction and with a respective magnitude (e.g., of speed and/or distance), such as leftward in space as shown in FIG. 7E. In some embodiments, the computer system includes a head-mounted display that is configurable to be worn on a head of the user. In some embodiments, detecting the movement of the viewpoint of the user includes detecting movement of the head of the user in space (e.g., in which the head of the user rotates clockwise or counterclockwise, causing the viewpoint of the user to move clockwise or counterclockwise accordingly). In some embodiments, the computer system detects the movement of the viewpoint of the user move irrespective of a location of the attention of the user in the three-dimensional environment.

In some embodiments, in response to detecting the movement of the viewpoint of the user (808b), in accordance with a determination that the movement of the viewpoint of the user causes at least a portion of the first portion of the user to have a depth conflict with a third portion, different from the first portion, of the virtual object in the three-dimensional environment relative to the viewpoint of the user (e.g., as similarly described above with reference to steps 802a-802g, after the viewpoint of the user moves relative to the virtual object in the three-dimensional environment, the first hand of the user at least partially contacts or intersects with the third portion of the virtual object in the three-dimensional environment, or comes within a threshold distance (e.g., 0, 1, 2, 3, 5, 10, 15, 20, 25, 30, or 50 cm) of contacting or intersecting with the third portion of the virtual object) while at least a portion of the first portion of the user does not have a depth conflict with a fourth portion, different from the third portion, of the virtual object in the three-dimensional environment relative to the viewpoint of the user (808c), such as the depth conflict between the hand 703f and the portion 718 of the virtual object 707 as shown in FIG. 7F, the computer system reduces (808d) a visual prominence of the third portion of the virtual object in the three-dimensional environment relative to the fourth portion of the virtual object in the three-dimensional environment, such as changing a visual appearance of the portion 718 of the virtual object 707 as shown in FIG. 7F. In some embodiments, in response to detecting the movement of the viewpoint of the user, the computer system updates display of the three-dimensional environment to display the virtual object from the new (e.g., updated) viewpoint of the user. For example, the movement of the viewpoint of the user causes the virtual object to visually appear to shift and/or rotate (e.g., based on the counterclockwise or clockwise movement of the viewpoint of the user) relative to the new viewpoint of the user, such as the rotation of the virtual object 707 relative to the viewpoint of the user in FIG. 7F. In some embodiments, when the virtual object shifts and/or rotates relative to the new viewpoint of the user, the third portion of the virtual object at least partially contacts and/or intersects with the first portion of the user in the three-dimensional environment. In some embodiments, the first portion of the user no longer has the depth conflict with the first portion of the virtual object in the three-dimensional environment when the first portion of the user has the depth conflict with the third portion of the virtual object. In some embodiments, while the third portion of the virtual object has the depth conflict with the first portion of the user, the fourth portion of the virtual object does not have a depth conflict with the first portion of the user in the three-dimensional environment. For example, the first hand of the user is not at least partially contacting or intersecting with the fourth portion of the virtual object in the three-dimensional environment after the movement of the viewpoint of the user relative to the virtual object in the three-dimensional environment, such as the hand 703f not contacting the portion 720 of the virtual object 707 as shown in FIG. 7F. In some embodiments, as similarly described above with reference to steps 802a-802g, in accordance with the determination that the first hand of the user at least partially contacts or intersects with the third portion of the virtual object in the three-dimensional environment, the computer system automatically updates display of the third portion of the virtual object to resolve or reduce the depth conflict in the three-dimensional environment. In some embodiments, as similarly described above with reference to steps 802a-802g, reducing the visual prominence of the third portion of the virtual object relative to the fourth portion of the virtual object includes ceasing display of the third portion of the virtual object in the three-dimensional environment. For example, the computer system no longer displays the third portion of the virtual object with which the first hand of the user has the depth conflict in the three-dimensional environment to resolve the depth conflict in the three-dimensional environment. In some embodiments, as similarly described above with reference to steps 802a-802g, reducing the visual prominence of the third portion of the virtual object relative to the fourth portion of the virtual object includes increasing transparency of the third portion relative to the fourth portion, decreasing brightness and/or color saturation of the third portion relative to the fourth portion, and/or increasing blur of the third portion relative to the fourth portion of the virtual object in the three-dimensional environment. In some embodiments, when the computer system reduces the visual prominence of the third portion of the virtual object in the three-dimensional environment, the computer system no longer reduces the visual prominence of the first portion of the virtual object (e.g., which was done so in response to the first input, as previously discussed above). For example, the computer system redisplays the first portion of the virtual object in the three-dimensional environment and/or redisplays the first portion of the virtual object with the first visual properties described above with reference to steps 802a-802g.

In some embodiments, the computer system maintains (808e) display of the fourth portion of the virtual object in the three-dimensional environment, such as maintaining display of the portion 720 of the virtual object 707 that does not have a depth conflict as shown in FIG. 7F. For example, as similarly discussed above with reference to steps 802a-802g, in accordance with the determination that the first hand of the user does not at least partially contact or intersect with the fourth portion of the virtual object in the three-dimensional environment when the viewpoint of the user moves relative to the virtual object in the three-dimensional environment, the computer system maintains display of the fourth portion of the virtual object with the visual appearance it had before the movement of the viewpoint of the user. In some embodiments, in accordance with a determination that at least a portion of the first portion of the user does not have a depth conflict with the virtual object in the three-dimensional environment relative to the viewpoint of the user after the movement of the viewpoint of the user relative to the virtual object in the three-dimensional environment, the computer system maintains display of the third portion and the fourth portion of the virtual object without reducing the visual prominence of the third portion of the virtual object in the three-dimensional environment relative to the visual prominence of the fourth portion of the virtual object in the three-dimensional environment. Changing visual properties of an object in a three-dimensional environment when the object encounters a depth conflict with a portion of the user based on movement of a viewpoint of the user relative to the object in the three-dimensional environment provides feedback that the display of the object is in conflict with the portion of the user, which facilitates user input for resolving or reducing the depth conflict and/or enables the user to continue interacting with the computer system while there is a depth conflict, thereby improving user-device interaction, and/or reduces the prominence of the depth conflict in the three-dimensional environment, which reduces eye strain of the user, thereby avoiding potential physical discomfort for the user caused by the depth conflict.

In some embodiments, reducing the visual prominence of the first portion of the virtual object in the three-dimensional environment relative to the second portion of the virtual object includes (810a), in accordance with a determination that an amount of the depth conflict between the first portion of the user and the first portion of the virtual object is a first amount, such as an amount of the depth conflict indicated by circle 715a in legend 707 in FIG. 7D, reducing a visual prominence of a first amount of the first portion of the virtual object in the three-dimensional environment (810b), such as the amount of the virtual object 707 that has the changed visual appearance as shown in FIG. 7D. For example, if the movement of the hand (e.g., air gesture, touch gesture, or hand input) of the user causes the first portion of the virtual object to have a depth conflict with the hand of the user in the three-dimensional environment, the computer system reduces the visual prominence of the first portion of the virtual object based on the amount of the depth conflict between the hand of the user and the first portion of the virtual object, such as the amount of the hand 703d contacting the third portion 714 of the virtual object 707 as shown in FIG. 7D. In some embodiments, as similarly described above with reference to steps 802a-802g, reducing the visual prominence of the first portion of the virtual object relative to the second portion of the virtual object includes ceasing display of the first portion of the virtual object in the three-dimensional environment and maintaining display of the second portion of the virtual object. In some embodiments, the amount of the first portion of the virtual object that is no longer displayed in the three-dimensional environment is based on (e.g., is proportional to) the amount of the hand of the user (e.g., a depth of the hand of the user relative to the virtual object) that is contacting and/or intersecting with the first portion of the virtual object in the three-dimensional environment. In some embodiments, the computer system determines that the hand of the user has the depth conflict with the first portion of the virtual object by a first amount, and thus visually reduces the first portion of the virtual object by a first amount. For example, the computer system ceases display of the first amount of the first portion of the virtual object in the three-dimensional environment.

In some embodiments, in accordance with a determination that the amount of the depth conflict between the first portion of the user and the first portion of the virtual object is a second amount, greater than the first amount, such as an amount of the depth conflict indicated by circle 715b in legend 707 in FIG. 7E, the computer system reduces a visual prominence of a second amount of the first portion of the virtual object in the three-dimensional environment, wherein the second amount of the first portion of the virtual object is greater than the first amount of the first portion of the virtual object (810c), such as the amount of the virtual object 707 that has the changed visual appearance as shown in FIG. 7E. For example, as described above, the amount of the first portion of the virtual object that the computer system reduces the visual prominence of is based on the amount of the depth conflict between the hand of the user and the first portion of the virtual object in the three-dimensional environment. In some embodiments, if the computer system determines that the hand of the user has a second amount of depth conflict, different from the first amount of depth conflict described above, with the first portion of the virtual object, the computer system reduces the visual prominence of a second amount of the first portion of the virtual object that is greater than the first amount of the first portion of the virtual object described above. For example, if a greater portion of the hand of the user has the depth conflict with the first portion of the virtual object than described above, such as a greater portion of the hand 703e in FIG. 7E than the portion of the hand 703d in FIG. 7D, the computer system ceases display of a greater portion of the first portion of the virtual object in the three-dimensional environment (e.g., to reduce and/or resolve the depth conflict relative to the viewpoint of the user, as similarly described above with reference to steps 802a-802g), such as the amount of the fifth portion 718 that has the changed visual appearance as shown in FIG. 7E. Changing visual properties of an object in a three-dimensional environment when the object encounters a depth conflict with a portion of the user based on an amount of the depth conflict between the object and the portion of the user provides feedback that the display of the object is in conflict with the portion of the user, which facilitates user input for resolving or reducing the depth conflict and/or enables the user to continue interacting with the computer system while there is a depth conflict, thereby improving user-device interaction, and/or reduces the prominence of the depth conflict in the three-dimensional environment, which reduces eye strain of the user, thereby avoiding potential physical discomfort for the user caused by the depth conflict.

In some embodiments, a position of the first portion of the user relative to the virtual object in the three-dimensional environment is a first position (e.g., a first position in space) (812a). In some embodiments, while the visual prominence of the first amount of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, the computer system detects (812b), via the one or more input devices, a second input that includes movement of the first portion of the user to a second position relative to the virtual object in the three-dimensional environment, such as movement of the hand (e.g., air gesture, touch gesture, or hand input) 703d farther into the virtual object 707 as shown in FIG. 7D. For example, while the first portion of the virtual object has the depth conflict with the hand of the user after the movement of the hand (e.g., air gesture, touch gesture, or hand input) relative to the virtual object, the computer system detects further movement of the hand (e.g., air gesture, touch gesture, or hand input) of the user relative to the virtual object in the three-dimensional environment. In some embodiments, the computer system detects the hand of the user move from the first position to the second position relative to the virtual object. In some embodiments, the computer system detects the hand of the user move in a respective direction and/or with a respective magnitude (e.g., of speed and/or distance) relative to the virtual object in the three-dimensional environment, such as movement of the hand (e.g., air gesture, touch gesture, or hand input) 703d forward in the three-dimensional environment relative to the viewpoint of the user as shown in FIG. 7D.

In some embodiments, in response to detecting the second input (812c), in accordance with a determination that the movement of the first portion of the user to the second position increases a degree of the depth conflict between the first portion of the user and the first portion of the virtual object in the three-dimensional environment, such as increasing the degree of the depth conflict between the hand 703e and the fifth portion 718 of the virtual object 707 as shown in FIG. 7E, the computer system reduces (812d) the visual prominence of the second amount, greater than the first amount, of the first portion of the virtual object in the three-dimensional environment, such as increasing the amount of the virtual object 707 that has the changed visual appearance, such as the amount of the fifth portion 718 as shown in FIG. 7E. For example, if the computer system determines that the movement of the hand (e.g., air gesture, touch gesture, or hand input) of the user to the second position relative to the virtual object increases the degree of the depth conflict in the three-dimensional environment, the computer system reduces the visual prominence of a greater amount of the first portion of the virtual object in the three-dimensional environment. In some embodiments, the movement of the hand (e.g., air gesture, touch gesture, or hand input) of the user to the second position corresponds to movement of the hand (e.g., air gesture, touch gesture, or hand input) of the user further into and/or behind the first portion of the virtual object in the three-dimensional environment relative to the viewpoint of the user (e.g., the computer system detects the hand of the user move farther away from the user in space), such as movement of the hand (e.g., air gesture, touch gesture, or hand input) 703e behind the virtual object 707 as shown in the legend 709 in FIG. 7E. In some embodiments, the computer system ceases display of the second amount of the first portion of the virtual object in the three-dimensional environment to resolve or reduce the increased depth conflict between the hand of the user and the first portion of the virtual object, as similarly discussed above with reference to steps 802a-802g. In some embodiments, the computer system changes visual properties (e.g., brightness, translucency, saturation, and/or coloration) of the second amount of the first portion of the virtual object in the three-dimensional environment to resolve or reduce the increased depth conflict between the hand of the user and the first portion of the virtual object, as similarly discussed above with reference to steps 802a-802g. Changing visual properties of an object in a three-dimensional environment when the object encounters a depth conflict with a portion of the user based on an amount of the depth conflict between the object and the portion of the user provides feedback that the display of the object is in conflict with the portion of the user, which facilitates user input for resolving or reducing the depth conflict and/or enables the user to continue interacting with the computer system while there is a depth conflict, thereby improving user-device interaction, and/or reduces the prominence of the depth conflict in the three-dimensional environment, which reduces eye strain of the user, thereby avoiding potential physical discomfort for the user caused by the depth conflict.

In some embodiments, a position of the first portion of the user relative to the virtual object in the three-dimensional environment is a first position (e.g., a first position in space) (814a). In some embodiments, while the visual prominence of the first amount of the virtual object is reduced in the three-dimensional environment in response to detecting the first input in accordance with the determination that at least a portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, such as while the hand 705a has the depth conflict with the first portion 730 of the virtual object 727 in FIG. 7D, the computer system detects (814b), via the one or more input devices, a second input that includes movement of the first portion of the user to a second position relative to the virtual object in the three-dimensional environment, such as movement of the hand (e.g., air gesture, touch gesture, or hand input) 705a away from the virtual object 727 relative to the viewpoint of the user as shown in FIG. 7D. For example, while the first portion of the virtual object has the depth conflict with the hand of the user after the movement of the hand (e.g., air gesture, touch gesture, or hand input) relative to the virtual object, the computer system detects further movement of the hand (e.g., air gesture, touch gesture, or hand input) of the user relative to the virtual object in the three-dimensional environment. In some embodiments, the computer system detects the hand of the user move from the first position to the second position relative to the virtual object. In some embodiments, the computer system detects the hand of the user move in a respective direction and/or with a respective magnitude (e.g., of speed and/or distance) relative to the virtual object in the three-dimensional environment, such as the backward movement of the hand (e.g., air gesture, touch gesture, or hand input) 705a relative to the viewpoint of the user in FIG. 7D.

In some embodiments, in response to detecting the second input (814c), in accordance with a determination that the movement of the first portion of the user to the second position decreases a degree of the depth conflict between the first portion of the user and the first portion of the virtual object in the three-dimensional environment, such as the hand 705b no longer having a depth conflict with the virtual object 727 as shown in FIG. 7E, the computer system reduces (814d) the visual prominence of the second amount, less than the first amount, of the first portion of the virtual object in the three-dimensional environment, such as no longer displaying the first portion 730 of the virtual object 727 with the changed visual appearance as shown in FIG. 7E. For example, if the computer system determines that the movement of the hand (e.g., air gesture, touch gesture, or hand input) of the user to the second position relative to the virtual object decreases the degree of the depth conflict in the three-dimensional environment, the computer system reduces the visual prominence of a smaller amount of the first portion of the virtual object in the three-dimensional environment. In some embodiments, the movement of the hand (e.g., air gesture, touch gesture, or hand input) of the user to the second position corresponds to movement of the hand (e.g., air gesture, touch gesture, or hand input) of the user away from and/or in front of the first portion of the virtual object in the three-dimensional environment relative to the viewpoint of the user (e.g., the computer system detects the hand of the user move toward the user in space). In some embodiments, the computer system ceases display of the second amount of the first portion of the virtual object in the three-dimensional environment to resolve or reduce the decreased depth conflict between the hand of the user and the first portion of the virtual object, as similarly discussed above with reference to steps 802a-802g. In some embodiments, the computer system changes visual properties (e.g., brightness, translucency, saturation, and/or coloration) of the second amount of the first portion of the virtual object in the three-dimensional environment to resolve or reduce the decreased depth conflict between the hand of the user and the first portion of the virtual object, as similarly discussed above with reference to steps 802a-802g. In some embodiments, if the movement of the first portion of the user causes the first portion of the virtual object to no longer have the depth conflict with the first portion of the user, the computer system ceases reducing the visual prominence of the first portion of the virtual object in the three-dimensional environment, as similarly shown in FIG. 7E. For example, the computer system redisplays the first portion of the virtual object in the three-dimensional environment and/or redisplays the first portion of the virtual object in the three-dimensional environment with the first visual properties described above with reference to steps 802a-802g. Changing visual properties of an object in a three-dimensional environment when the object encounters a depth conflict with a portion of the user based on an amount of the depth conflict between the object and the portion of the user provides feedback that the display of the object is in conflict with the portion of the user, which facilitates user input for resolving or reducing the depth conflict and/or enables the user to continue interacting with the computer system while there is a depth conflict, thereby improving user-device interaction, and/or reduces the prominence of the depth conflict in the three-dimensional environment, which reduces eye strain of the user, thereby avoiding potential physical discomfort for the user caused by the depth conflict.

In some embodiments, the determination that at least a portion of the first portion of the user (e.g., hand 703c in FIGS. 7C and 7C-1) has the depth conflict with the first portion of the virtual object in the three-dimensional environment relative to the viewpoint of the user is in accordance with a determination that a second portion of the user (e.g., hand 705a in FIGS. 7C and 7C-1) does not have a depth conflict with a respective virtual object (e.g., virtual object 707 in FIGS. 7C and 7C-1) in the three-dimensional environment relative to the viewpoint of the user (816). For example, the computer system detects that a first hand of the user is at least partially contacting and/or intersecting with the first portion of the virtual object and that a second hand of the user is not at least partially contacting and/or intersecting with any objects in the three-dimensional environment, such as the hand 703c having the depth conflict with the virtual object 707 and the hand 705a not having a depth conflict with any virtual objects as shown in FIGS. 7C and 7C-1. For example, the computer system determines that the second hand of the user does not have a depth conflict with the virtual object or another object (e.g., a second virtual object) in the three-dimensional environment. In some embodiments, the computer system forgoes reducing the visual prominence of a portion of the respective virtual object in the three-dimensional environment because the second hand of the user does not have a depth conflict with the respective virtual object, but does reduce the visual prominence of the first portion of the virtual object in the three-dimensional environment because the first hand of the user has the depth conflict with the first portion of the virtual object (e.g., as similarly described above with reference to steps 802a-802g). Changing visual properties of an object in a three-dimensional environment when the object encounters a depth conflict with a first portion of the user but not a second portion of the user provides feedback that the display of the object is in conflict with the first portion of the user, which facilitates user input for resolving or reducing the depth conflict and/or enables the user to continue interacting with the computer system while there is a depth conflict using the second portion of the user, thereby improving user-device interaction, and/or reduces the prominence of the depth conflict in the three-dimensional environment, which reduces eye strain of the user, thereby avoiding potential physical discomfort for the user caused by the depth conflict.

In some embodiments, while the visual prominence of the first portion of the virtual object is reduced relative to the second portion of the virtual object in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, such as while the hand 703*f* has the depth conflict with the portion 718 of the virtual object 707 in FIG. 7G, the computer system detects (818*a*), via the one or more input devices, a second input that includes movement of the second portion of the user relative to the respective virtual object in the three-dimensional environment, such as movement of the hand (e.g., air gesture, touch gesture, or hand input) 705*d* relative to the virtual object 707 as shown in FIG. 7G. For example, while the first hand of the user has the depth conflict with the first portion of the virtual object and the second hand of the user does not have a depth conflict with a respective virtual object in the three-dimensional environment, the computer system detects movement of the second hand of the user relative to the respective virtual object in the three-dimensional environment. In some embodiments, the computer system detects the second hand of the user move in a respective direction and/or with a respective magnitude (e.g., of speed and/or distance) in space, such as movement of the hand (e.g., air gesture, touch gesture, or hand input) 705*d* toward the virtual object 707 relative to the viewpoint of the user as shown in FIG. 7G. In some embodiments, the computer system detects the second hand of the user move without concurrently detecting the first hand of the user move in space, such as without detecting the hand 703*f* that has the depth conflict with the virtual object 707 move as shown in FIG. 7G.

In some embodiments, in response to detecting the second input (818*b*), in accordance with a determination that at least a portion of the second portion of the user has a depth conflict with a third portion of the respective virtual object in the three-dimensional environment relative to the viewpoint of the user (e.g., as similarly described above with reference to steps 802*a*-802*g*, after the movement of the second hand of the user moves relative to the respective virtual object in the three-dimensional environment, the second hand of the user at least partially contacts or intersects with the third portion of the respective virtual object in the three-dimensional environment, or comes within a threshold distance (e.g., 0, 1, 2, 3, 5, 10, 15, 20, 25, 30, or 50 cm) of contacting or intersecting with the third portion of the respective virtual object), such as the hand 705*d* contacting portion 722 of the virtual object 707 as shown in FIG. 7H, and at least a portion of the second portion of the user does not have a depth conflict with a fourth portion of the respective virtual object in the three-dimensional environment relative to the viewpoint of the user after the movement of the second portion of the user (818*c*), such as the hand 705*d* not contacting portion 726 of the virtual object 707 as shown in FIG. 7H, the computer system reduces (818*d*) the visual prominence of the third portion of the respective virtual object relative to the fourth portion of the respective virtual object in the three-dimensional environment while the visual prominence of the first portion of the virtual object is reduced relative to the second portion of the virtual object, such as changing the visual appearance of the portion 722 of the virtual object 707 while the portion 718 of the virtual object 707 is also displayed with the changed visual appearance as shown in FIG. 7H. For example, as similarly described above with reference to steps 802*a*-802*g*, if the computer system determines that the second hand of the user has a depth conflict with the third portion of the respective virtual object (e.g., the virtual object) in the three-dimensional environment, the computer system reduces the visual prominence of the third portion of the respective virtual object relative to the fourth portion of the respective virtual object in the three-dimensional environment. For example, as similarly described above with reference to steps 802*a*-802*g*, the computer system ceases display of the third portion of the respective virtual object in the three-dimensional environment and/or changes the visual properties (e.g., brightness, translucency, saturation, and/or coloration) of the third portion of the respective virtual object in the three-dimensional environment. In some embodiments, the first portion of the user has the depth conflict with the first portion of the virtual object (e.g., virtual object 707 in FIG. 7D) while the second portion of the user has the depth conflict with the third portion of the respective virtual object, such as virtual object 727 as shown in FIG. 7D. In some embodiments, the first portion of the user and the second portion of the user have the depth conflict with the same virtual object in the three-dimensional environment, such as the virtual object 707 as shown in FIG. 7H. For example, the first hand of the user has the depth conflict with the first portion of the virtual object and the second hand of the user has the depth conflict with the third portion of the virtual object, which is different from the first portion of the virtual object. In some embodiments, the computer system reduces the visual prominence of the third portion of the respective virtual object while the visual prominence of the first portion of the virtual object is reduced in the three-dimensional environment. Changing visual properties of a first portion of an object and a second portion of the object in a three-dimensional environment when the object encounters a depth conflict with a first portion of the user and a second portion of the user provides feedback that the display of the object is in conflict with the first portion and the second portion of the user, which facilitates user input for resolving or reducing the depth conflicts, thereby improving user-device interaction, and/or reduces the prominence of the depth conflicts in the three-dimensional environment, which reduces eye strain of the user, thereby avoiding potential physical discomfort for the user caused by the depth conflicts.

In some embodiments, reducing the visual prominence of the first portion of the virtual object relative to the second portion of the virtual object in the three-dimensional environment includes reducing the visual prominence of the first portion of the virtual object by a first magnitude (e.g., a first amount of the first portion of the virtual object) (820*a*), such as the magnitude indicated by circle 715*b* in legend 713 in FIG. 7H. For example, as similarly described above with reference to steps 818*a*-818*d*, the computer system concurrently detects the first hand of the user has a depth conflict with the first portion of the virtual object and the second hand of the user has a depth conflict with the third portion of the respective virtual object in the three-dimensional environment. In some embodiments, the computer system reduces the visual prominence of the first portion of the virtual object by the first magnitude that is based on a degree of the depth conflict between the first hand of the user and the first portion of the virtual object. For example, the first hand of the user has a first degree of depth conflict with the first portion of the virtual object that is based on an amount of the first hand that is contacting and/or intersecting with the first portion of the virtual object, such as the amount of the hand 703*f* that is contacting the portion 718 of the virtual object 707 in FIG. 7H. In some embodiments, as similarly described above with reference to steps 802*a*-802*g*, the computer system ceases display of the first magnitude of the first portion of the virtual object and/or changes the visual properties (e.g., brightness, translucency, saturation, and/or coloration) of the first magnitude of the first portion of the virtual object to resolve or reduce the depth conflict between the first hand of the user and the virtual object in the three-dimensional environment. In some embodiments, as described below, the first hand of the user and the second hand of the user have different degrees of depth conflict with the virtual object and the respective virtual object, respectively, in the three-dimensional environment.

In some embodiments, reducing the visual prominence of the third portion of the respective virtual object relative to the fourth portion of the respective virtual object in the three-dimensional environment includes reducing the visual prominence of the third portion of the respective virtual object by a second magnitude (e.g., a second amount of the first portion of the virtual object), different from the first magnitude (820*b*), such as the magnitude indicated by circle 717*a* in the legend 713 in FIG. 7H. In some embodiments, the computer system reduces the visual prominence of the third portion of the respective virtual object by the second magnitude that is based on a degree of the depth conflict between the second hand of the user and the third portion of the respective virtual object. For example, the second hand of the user has a second degree of depth conflict, different from the first degree of depth conflict discussed above, with the third portion of the respective virtual object that is based on an amount of the second hand that is contacting and/or intersecting with the third portion of the respective virtual object (e.g., the amount of the hand 703*f* that is contacting the portion 718 of the virtual object 707 is greater than the amount of the hand 705*d* that is contacting the portion 722 of the virtual object 707 as shown in FIG. 7H). In some embodiments, as similarly described above with reference to steps 802*a*-802*g*, the computer system ceases display of the second magnitude of the third portion of the respective virtual object and/or changes the visual properties (e.g., brightness, translucency, saturation, and/or coloration) of the second magnitude of the third portion of the respective virtual object to resolve or reduce the depth conflict between the second hand of the user and the respective virtual object in the three-dimensional environment. In some embodiments, the first hand of the user has a greater degree of depth conflict in the three-dimensional environment than the second hand of the user. For example, the first magnitude by which the visual prominence of the first portion of the virtual object is reduced relative to the second portion of the virtual object in the three-dimensional environment is greater than the second magnitude by which the visual prominence of the third portion of the respective virtual object is reduced relative to the fourth portion of the respective virtual object in the three-dimensional environment. In some embodiments, the first hand of the user has a smaller degree of depth conflict in the three-dimensional environment than the second hand of the user. For example, the first magnitude by which the visual prominence of the first portion of the virtual object is reduced relative to the second portion of the virtual object in the three-dimensional environment is less than the second magnitude by which the visual prominence of the third portion of the respective virtual object is reduced relative to the fourth portion of the respective virtual object in the three-dimensional environment, as indicated by the smaller size of the circle 717*a* compared to the size of the circle 715*b* in the legend 713 in FIG. 7H. Changing visual properties of a first portion of an object by a first magnitude and a second portion of the object by a second magnitude in a three-dimensional environment based when the object encounters a depth conflict with a first portion of the user and a second portion of the user provides feedback that the display of the object is in conflict with the first portion and the second portion of the user, which facilitates user input for resolving or reducing the depth conflicts, thereby improving user-device interaction, and/or reduces the prominence of the depth conflicts in the three-dimensional environment, which reduces eye strain of the user, thereby avoiding potential physical discomfort for the user caused by the depth conflicts.

In some embodiments, while the visual prominence of the first portion of the virtual object is reduced relative to the second portion of the virtual object in response to detecting the first input in accordance with the determination that the at least the portion of the first portion of the user has the depth conflict with the first portion of the virtual object in the three-dimensional environment relative to the viewpoint of the user, such as while the hand 703*c* has the depth conflict with the first portion 708 of the virtual object 707 in FIGS. 7C and 7C-1, and at least a portion of the first portion of the user does not have the depth conflict with the second portion of the virtual object in the three-dimensional environment relative to the viewpoint of the user after the movement of the first portion of the user, the computer system detects (822*a*), via the one or more input devices, a second input that includes movement of the first portion of the user laterally (e.g., leftward or rightward) relative to the virtual object in the three-dimensional environment, such as movement of the hand (e.g., air gesture, touch gesture, or hand input) 703*c* rightward relative to the virtual object 707 as shown in FIGS. 7C and 7C-1. For example, while the hand of the user has the depth conflict with the first portion of the virtual object in the three-dimensional environment, the computer system detects movement of the first hand of the user in space in a respective direction and/or with a respective magnitude (e.g., of speed and/or direction). In some embodiments, the computer system detects the hand of the user move laterally relative to the virtual object and/or the viewpoint of the user irrespective of a location of the attention of the user in the three-dimensional environment.

In some embodiments, in response to detecting the second input (822*b*), in accordance with a determination that the movement of the first portion of the user laterally relative to the virtual object causes at least a portion of the first portion of the user to have a depth conflict with a third portion, different from the first portion, of the virtual object relative to the viewpoint of the user in the three-dimensional environment (e.g., as similarly described above with reference to steps 802*a*-802*g*, after the hand of the user moves laterally (e.g., leftward or rightward) relative to the virtual object, the hand of the user at least partially contacts or intersects with the third portion of the virtual object in the three-dimensional environment, or comes within a threshold distance (e.g., 0, 1, 2, 3, 5, 10, 15, 20, 25, 30, or 50 cm) of contacting or intersecting with the third portion of the virtual object) while at least a portion of the first portion of the user does not have a depth conflict with a fourth portion of the virtual object after the movement of the first portion of the user in the second input (822c), such as the hand 703d contacting the third portion 714 of the virtual object 707 as shown in FIG. 7D, the computer system reduces (822d) a visual prominence of the third portion of the virtual object relative to the fourth portion of the virtual object in the three-dimensional environment, such as changing the visual appearance of the third portion 714 of the virtual object 707 as shown in FIG. 7D. For example, as similarly described above with reference to steps 802a-802g, in accordance with the determination that the hand of the user at least partially contacts or intersects with the third portion of the virtual object in the three-dimensional environment, the computer system automatically updates display of the third portion of the virtual object to resolve or reduce the depth conflict in the three-dimensional environment. In some embodiments, as similarly described above with reference to steps 802a-802g, reducing the visual prominence of the third portion of the virtual object relative to the fourth portion of the virtual object includes ceasing display of the third portion of the virtual object in the three-dimensional environment. In some embodiments, as similarly described above with reference to steps 802a-802g, reducing the visual prominence of the third portion of the virtual object relative to the fourth portion of the virtual object includes increasing transparency of the third portion relative to the fourth portion, decreasing brightness and/or color saturation of the third portion relative to the fourth portion, and/or increasing blur of the third portion relative to the fourth portion of the virtual object in the three-dimensional environment. In some embodiments, when the computer system reduces the visual prominence of the third portion of the virtual object in the three-dimensional environment, the computer system no longer reduces the visual prominence of the first portion of the virtual object (e.g., which was done so in response to the first input, as previously discussed above), such as no longer changing the visual appearance of the first portion 708 of the virtual object 707 as shown in FIG. 7D. For example, the computer system redisplays the first portion of the virtual object in the three-dimensional environment and/or redisplays the first portion of the virtual object with the first visual properties described above with reference to steps 802a-802g. Additionally, in some embodiments, the computer system maintains display of the fourth portion of the virtual object in the three-dimensional environment, such as maintaining display of the fourth portion 716 of the virtual object 707 as shown in FIG. 7D. For example, as similarly discussed above with reference to steps 802a-802g, in accordance with the determination that the first hand of the user does not at least partially contact or intersect with the fourth portion of the virtual object in the three-dimensional environment when the hand of the user moves laterally relative to the virtual object in the three-dimensional environment, the computer system maintains display of the fourth portion of the virtual object with the visual appearance it had before the movement of the hand (e.g., air gesture, touch gesture, or hand input) of the user. In some embodiments, in accordance with a determination that at least a portion of the first portion of the user does not have a depth conflict with the virtual object in the three-dimensional environment relative to the viewpoint of the user after the lateral movement of the first portion of the user relative to the virtual object in the three-dimensional environment, the computer system maintains display of the third portion and the fourth portion of the virtual object without reducing the visual prominence of the third portion of the virtual object in the three-dimensional environment relative to the visual prominence of the fourth portion of the virtual object in the three-dimensional environment. Changing visual properties of an object in a three-dimensional environment when the object encounters a depth conflict with a portion of the user based on lateral movement of the portion of the user relative to the object in the three-dimensional environment provides feedback that the display of the object is in conflict with the portion of the user, which facilitates user input for resolving or reducing the depth conflict and/or enables the user to continue interacting with the computer system while there is a depth conflict, thereby improving user-device interaction, and/or reduces the prominence of the depth conflict in the three-dimensional environment, which reduces eye strain of the user, thereby avoiding potential physical discomfort for the user caused by the depth conflict.

In some embodiments, reducing the visual prominence of the first portion of the virtual object relative to the second portion of the virtual object includes ceasing display of the first portion of the virtual object in the three-dimensional environment (e.g., while maintaining display of the second portion of the virtual object) (824a), such as ceasing display of the first portion 708 of the virtual object 707 as described with reference to FIGS. 7C and 7C-1. In some embodiments, in response to detecting the second input and in accordance with the determination that the movement of the first portion of the user laterally relative to the virtual object causes at least a portion of the first portion of the user to have the depth conflict with the third portion of the virtual object relative to the viewpoint of the user in the three-dimensional environment (e.g., as similarly described above with reference to steps 822a-822d, after the hand of the user moves laterally (e.g., leftward or rightward) relative to the virtual object, the hand of the user at least partially contacts or intersects with the third portion of the virtual object in the three-dimensional environment, or comes within a threshold distance (e.g., 0, 1, 2, 3, 5, 10, 15, 20, 25, 30, or 50 cm) of contacting or intersecting with the third portion of the virtual object) while at least a portion of the first portion of the user does not have a depth conflict with the fourth portion of the virtual object after the movement of the first portion of the user (824b), such as the hand 703d contacting the third portion 714 of the virtual object 707 as shown in FIG. 7D, the computer system redisplays (824c) the first portion of the virtual object in the three-dimensional environment (e.g., as similarly described above with reference to steps 822a-822d), such as redisplaying the first portion 708 of the virtual object 707 as shown in FIG. 7D. In some embodiments, redisplaying the first portion of the virtual object in the three-dimensional environment is gradual. For example, the computer system redisplays the first portion of the virtual object 0.25, 0.5, 0.75, 1, 2, 3, 4, 5, or 10 seconds of detecting that the hand of the user no longer has the depth conflict with the first portion of the virtual object in the three-dimensional environment. Redisplaying a portion of an object in a three-dimensional environment when the object or the portion of the object no longer has a depth conflict in the three-dimensional environment provides feedback that the portion of the object no longer has the depth conflict, which facilitates user input for interacting with the portion of the object that no longer has the depth conflict, and/or enables portions of the object that no longer have depth conflicts in the three-dimensional environment to be redisplayed automatically, thereby improving user-device interaction.

In some embodiments, the computer system detects (826a), via the one or more input devices, a second input directed to the first portion of the virtual object, such as an air pinch gesture provided by hand 703f and/or hand 705c directed to selectable option 706-1 included in portion 718 in the virtual object 707 as shown in FIG. 7F. For example, while the virtual object is displayed in the three-dimensional environment, the computer system detects an input corresponding to a request to perform a selection of the first portion of the virtual object. In some embodiments, the second input includes an air pinch gesture directed to the first portion of the virtual object. For example, the computer system detects an index finger and thumb of the user come together and make contact optionally while the attention (e.g., based on gaze, such as gaze 721 in FIG. 7F) of the user is directed to the first portion of the virtual object in the three-dimensional environment, such as a portion of the selectable option 706-1 of the virtual object 707 as shown in FIG. 7F. In some embodiments, the second input includes an interaction with a hardware input device (e.g., a controller) in communication with the computer system. For example, the computer system detects selection (e.g., a press) of a hardware button of the hardware input device directed to the first portion of the virtual object. In some embodiments, the second input corresponds to a request to scroll through content included in the virtual object. For example, the second input includes movement of the hand (e.g., air gesture, touch gesture, or hand input) of the user (e.g., after detecting the air pinch gesture and/or the interaction with the hardware input device) in space (e.g., in a respective direction and with a respective magnitude). In some embodiments, the second input is provided by the first portion of the user (e.g., the first hand of the user that has the depth conflict with the first portion of the virtual object). In some embodiments, the second input is provided by a second portion of the user (e.g., a second hand of the user that does not have a depth conflict with the virtual object in the three-dimensional environment). In some embodiments, the second input is provided by the attention of the user of the computer system. For example, the second input includes a dwell of the gaze of the user directed to the first portion of the virtual object (e.g., for a threshold amount of time, such as 0.5, 1, 2, 3, 5, 8, 10, 15, 20, or 30 seconds).

In some embodiments, in response to detecting the second input (826b), in accordance with a determination that the visual prominence of the first portion of the virtual object is reduced relative to the second portion of the virtual object in response to detecting the first input (e.g., the first portion of the virtual object is not displayed in the three-dimensional environment) in accordance with the determination that the at least the portion of the first portion of the user has the depth conflict with the first portion of the virtual object in the three-dimensional environment relative to the viewpoint of the user (e.g., as similarly described above with reference to steps 802a-802g, the hand of the user has a depth conflict with the first portion of the virtual object when the second input is detected), such as due to the contact between the hand 703f and the portion 718 of the virtual object 707 in FIG. 7F, and at least a portion of the first portion of the user does not have a depth conflict with the second portion of the virtual object in the three-dimensional environment relative to the viewpoint of the user after the movement of the first portion of the user (826c), the computer system forgoes (826d) performing a respective operation associated with the first portion of the virtual object in the three-dimensional environment, such as forgoing activating the selectable option 706-1 in the virtual object 707 as shown in FIG. 7G. For example, if the computer system detects the second input while the hand of the user has the depth conflict with the first portion of the virtual object, such as while the hand 703f has the depth conflict with the portion 719 of the virtual object 707 as shown in FIG. 7F, the computer system forgoes performing the respective operation associated with the first portion of the virtual object. In some embodiments, the respective operation includes selection. For example, as similarly described above with reference to steps 802a-802g, the virtual object is or includes content, which optionally includes one or more selectable options. In some embodiments, the second input corresponds to a request to select a selectable option that is at least partially included in the first portion of the virtual object. In some embodiments, because the first portion of the virtual object has the depth conflict with the first portion of the user (and is displayed with reduced visual prominence relative to the second portion of the virtual object) when the second input is detected, the computer system forgoes performing the selection directed to the first portion (e.g., a selectable option included in the first portion) of the virtual object. In some embodiments, the computer system does not perform any operation (e.g., such as a scrolling operation), including the respective operation, in response to detecting the second input.

In some embodiments, in accordance with a determination that the visual prominence of the first portion of the virtual object is not reduced relative to the second portion of the virtual object in response to detecting the first input (e.g., the first portion of the virtual object does not have a depth conflict with the hand of the user when the second input is detected) in accordance with the determination that the at least the portion of the first portion of the user does not have a depth conflict with the virtual object in the three-dimensional environment relative to the viewpoint of the user after the movement of the first portion of the user (826e), the computer system performs (826f) the respective operation associated with the first portion of the virtual object in the three-dimensional environment, such as activating the selectable option 706-2 in the virtual object 707 as described with reference to FIG. 7A. For example, if the computer system detects the second input while the hand of the user does not have a depth conflict with the virtual object in the three-dimensional environment, the computer system performs the respective operation associated with the first portion of the virtual object. As described above, the respective operation optionally includes selection of a selectable option that is displayed in the first portion of the virtual object. In some embodiments, in response to detecting the second input while the first portion of the user does not have a depth conflict with the virtual object, the computer system activates the selectable option included in the first portion of the virtual object. In some embodiments, the respective operation includes scrolling through the content included in the virtual object in the three-dimensional environment. In some embodiments, in response to detecting the second input while the first portion of the user does not have the depth conflict with the virtual object, the computer system scrolls through the content of the virtual object. Performing a respective operation associated with an object in a three-dimensional environment in response to input directed to the object based on whether the object has a depth conflict when the input is detected helps avoid unintentionally performing the respective operation when the object has the depth conflict and/or facilitates user input for resolving the depth conflict with the object before performing the respective operation, thereby improving user-device interaction.

In some embodiments, an amount of the first portion of the virtual object that has its visual prominence reduced relative to the second portion of the virtual object is based on an amount of the first portion of the user that has the depth conflict with the first portion of the virtual object in the three-dimensional environment, such as an amount of the hand 703c that is contacting the first portion 708 of the virtual object 707 in FIGS. 7C and 7C-1, and is independent of an amount of the first portion of the user that does not have the depth conflict with the first portion of the virtual object in the three-dimensional environment (828), such as an amount of the hand 703c that is not contacting the first portion 708 of the virtual object 707 in FIGS. 7C and 7C-1. For example, the amount of the first portion of the virtual object that is removed in the three-dimensional environment and/or is displayed with reduced visual prominence in the three-dimensional environment is based on the amount of the hand of the user that has the depth conflict with the virtual object in the three-dimensional environment, and not necessarily on a size of the hand of the user. As an example, when the first portion of the virtual object encounters the depth conflict with the hand of the user when the hand of the user is moved relative to the virtual object, one or more of the fingers of the hand of the user are contacting the virtual object (e.g., the fingers of the hand 703c in FIGS. 7C and 7C-1) while the palm of the hand is not. In such an example, while one or more fingers of the hand of the user are contacting the virtual object, the computer system optionally reduces the visual prominence of the amount of the first portion of the virtual object that corresponds to the amount (e.g., size) of the one or more fingers that are in contact with the virtual object, such as changing the visual appearance of the amount of the first portion 708 of the virtual object based on the fingers of the hand 703c contacting the virtual object 707, and not on the amount (e.g., size) of the portions of the hand that are not in contact with the virtual object (e.g., others of the one or more fingers and/or the palm of the hand). Changing visual properties of an object in a three-dimensional environment when the object encounters a depth conflict with a first portion of the user based on an amount of the first portion of the user that has the depth conflict independent of a second portion of the user that does not have the depth conflict provides feedback that the display of the object is in conflict with the first portion of the user, which facilitates user input for resolving or reducing the depth conflict and/or enables the user to continue interacting with the computer system while there is a depth conflict, thereby improving user-device interaction, and/or reduces the prominence of the depth conflict in the three-dimensional environment, which reduces eye strain of the user, thereby avoiding potential physical discomfort for the user caused by the depth conflict.

In some embodiments, an amount of the first portion of the virtual object that has its visual prominence reduced relative to the second portion of the virtual object is based on an amount of the first portion of the user that has the depth conflict with the first portion of the virtual object in the three-dimensional environment, such as an amount of the hand 705a that is contacting the first portion 730 of the virtual object 727 in FIG. 7D, and an amount of the first portion of the user that does not have the depth conflict with the first portion of the virtual object in the three-dimensional environment (830), such as an amount of the hand 705a that is not contacting the first portion 730 of the virtual object 727 in FIG. 7D. For example, the amount of the first portion of the virtual object that is removed in the three-dimensional environment and/or is displayed with reduced visual prominence in the three-dimensional environment is based on a size of the hand of the user, such as the size of the hand 705a in FIG. 7D, not only the amount of the hand of the user that has the depth conflict with the virtual object in the three-dimensional environment. As an example, when the first portion of the virtual object encounters the depth conflict with the hand of the user when the hand of the user is moved relative to the virtual object, one or more of the fingers of the hand of the user are contacting the virtual object while the palm of the hand is not. Even though only one or more fingers of the hand of the user are contacting the virtual object, the computer system optionally reduces the visual prominence of the amount of the first portion of the virtual object that corresponds to the amount (e.g., size) of the one or more fingers that are in contact with the virtual object and the amount (e.g., size) of the portions of the hand that are not in contact with the virtual object (e.g., others of the one or more fingers and/or the palm of the hand), such as visually changing the amount of the first portion 730 of the virtual object 727 based on the size of the whole hand 705a as shown in FIG. 7D. Changing visual properties of an object in a three-dimensional environment when the object encounters a depth conflict with a first portion of the user based on an amount of the first portion of the user that has the depth conflict and an amount of a second portion of the user that does not have the depth conflict provides feedback that the display of the object is in conflict with the first portion of the user, which facilitates user input for resolving or reducing the depth conflict and/or enables the user to continue interacting with the computer system while there is a depth conflict, thereby improving user-device interaction, and/or reduces the prominence of the depth conflict in the three-dimensional environment, which reduces eye strain of the user, thereby avoiding potential physical discomfort for the user caused by the depth conflict.

In some embodiments, reducing the visual prominence of the first portion of the virtual object relative to the second portion of the virtual object includes displaying a visual boundary between the first portion of the virtual object and the second portion of the virtual object, such as visual boundary 734 in the virtual object 707 in FIGS. 7C and 7C-1, wherein within the visual boundary a change in the visual prominence of the virtual object is gradual (832), as similarly described with reference to FIGS. 7C and 7C-1. For example, when the virtual object encounters a depth conflict with the hand of the user in response to the movement of the hand (e.g., air gesture, touch gesture, or hand input) of the user relative to the virtual object in the three-dimensional environment, the computer system displays a visual boundary between the first portion of the virtual object with which the hand of the user has the depth conflict, such as the first portion 708 of the virtual object 707 in FIGS. 7C and 7C-1, and the second portion of the virtual object with which the hand of the user does not have the depth conflict, such as the second portion 710 of the virtual object 707 in FIGS. 7C and 7C-1. In some embodiments, the visual boundary has a feathered appearance (e.g., the first portion and the second portion of the virtual object are separated by a jagged and/or nonlinear boundary), as similarly shown in FIGS. 7C and 7C-1. In some embodiments, the region of the virtual object that is within the visual boundary includes a gradual change from the reduced visual prominence of the first portion of the virtual object to the unreduced visual prominence of the second portion of the virtual object. For example, a central portion of the visual boundary is displayed with a visual prominence that is between the reduced visual prominence of the first portion of the virtual object and the unreduced visual prominence of the second portion of the virtual object. Displaying a visual boundary between a first portion of an object and a second portion of the object in a three-dimensional environment when the first portion of the object encounters a depth conflict with a portion of the user based on movement of the portion of the user relative to the object in the three-dimensional environment provides feedback that the display of the object is in conflict with the portion of the user, which facilitates user input for resolving or reducing the depth conflict and/or enables the user to continue interacting with the computer system while there is a depth conflict, thereby improving user-device interaction, and/or reduces the prominence of the depth conflict in the three-dimensional environment, which reduces eye strain of the user, thereby avoiding potential physical discomfort for the user caused by the depth conflict.

In some embodiments, while detecting the first input and before reducing the visual prominence of the first portion of the virtual object relative to the second portion of the virtual object in accordance with the determination that at least a portion of the first portion of the user has the depth conflict with the first portion of the virtual object in the three-dimensional environment relative to the viewpoint of the user ($834a$), such as while the hand $703a$ is moving relative to the virtual object 707 in FIG. 7A, the computer system moves ($834b$) the virtual object within the three-dimensional environment, such as the movement of the virtual object 707 backward in the three-dimensional environment 702 as shown in the legend 709 in FIG. 7B, based on a first portion of the movement of the first portion of the user to avoid the depth conflict between the first portion of the user and the virtual object until the movement of the first portion of the user towards the virtual object exceeds a threshold movement (e.g., a threshold distance of movement beyond the point of the contact between the hand of the user and the virtual object, such as 0.25, 0.5, 0.75, 1, 1.5, 2, 2, 5, 8, or 10 m, and/or a threshold amount of movement of the hand (e.g., air gesture, touch gesture, or hand input) of the user into the virtual object, such as 1, 2, 3, 4, 5, 10, 12, 15, 25, 30, 40, or 50 cm into the virtual object from the viewpoint of the user), such as threshold 712 in threshold bar 711 in FIG. 7B. For example, the computer system moves the virtual object within the three-dimensional environment in response to detecting that the movement of the hand (e.g., air gesture, touch gesture, or hand input) of the user causes the hand of the user to at least partially intersect with or contact the virtual object in the three-dimensional environment. In some embodiments, the computer system moves the virtual object within the three-dimensional environment based on the movement of the hand (e.g., air gesture, touch gesture, or hand input) of the user that is contacting the virtual object. For example, as similarly described above with reference to steps 802a-802g, the computer system detects the hand of the user move in space with a respective magnitude and in a respective direction relative to the virtual object in the three-dimensional environment. In some embodiments, the movement of the hand (e.g., air gesture, touch gesture, or hand input) corresponds to movement away from the user in a respective direction that is in the direction of the virtual object in the three-dimensional environment. In some embodiments, when the hand of the user contacts the virtual object in the three-dimensional environment, the hand optionally continues moving away from the user, which causes the virtual object to move backward in the three-dimensional environment and away from the user relative to the viewpoint of the user, such as the backward movement of the virtual object 707 as shown in FIG. 7B. In some embodiments, if the movement of the hand (e.g., air gesture, touch gesture, or hand input) corresponds to movement toward the user in a respective direction that is in the direction of the virtual object in the three-dimensional environment (e.g., if the hand of the user is behind the virtual object before the depth conflict occurs), the movement of the hand (e.g., air gesture, touch gesture, or hand input) causes the computer system to move the virtual object forward in the three-dimensional environment and toward the user relative to the viewpoint of the user.

In some embodiments, in response to the movement of the first portion of the user towards the virtual object exceeding (and/or meeting) the threshold movement (834b), the computer system ceases (834c) moving the virtual object within the three-dimensional environment, such as ceasing moving the virtual object 707 in the three-dimensional environment 702 as shown in FIGS. 7C and 7C-1. For example, the virtual object no longer moves in the three-dimensional environment based on the movement of the hand (e.g., air gesture, touch gesture, or hand input) of the user relative to the virtual object. In some embodiments, the virtual object ceases moving in the three-dimensional environment irrespective of further movement of the hand (e.g., air gesture, touch gesture, or hand input) of the user into and/or through the virtual object in the three-dimensional environment. For example, when the movement of the hand (e.g., air gesture, touch gesture, or hand input) of the user meets and/or exceeds the threshold movement discussed above, the computer system does not continue moving the virtual object in the three-dimensional environment if the hand of the user continues moving further into and/or through the virtual object in the three-dimensional environment.

In some embodiments, the computer system reduces (834d) the visual prominence of the first portion of the virtual object relative to the second portion of the virtual object in accordance with the determination that at least a portion of the first portion of the user has the depth conflict with the first portion of the virtual object in the three-dimensional environment relative to the viewpoint of the user (e.g., as similarly described above with reference to steps 802a-802g), such as changing the visual appearance of the first portion 708 of the virtual object 707 when the movement meets the threshold 712 as shown in FIGS. 7C and 7C-1. Moving an object in a three-dimensional environment when the object contacts a portion of the user based on movement of the user in the three-dimensional environment provides feedback that the movement of the portion of the user is in conflict with the object in the three-dimensional environment, which facilitates user input for preventing a depth conflict between the object and the portion of the user and/or enables the user to continue interacting with the computer system before there is a depth conflict, thereby improving user-device interaction.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIGS. 9A-9H illustrate examples of a computer system adjusting the visibility of one or more virtual objects in a three-dimensional environment by applying a visual effect to the one or more virtual objects in response to detecting one or more portions of a user in accordance with some embodiments.

Figure 9A:
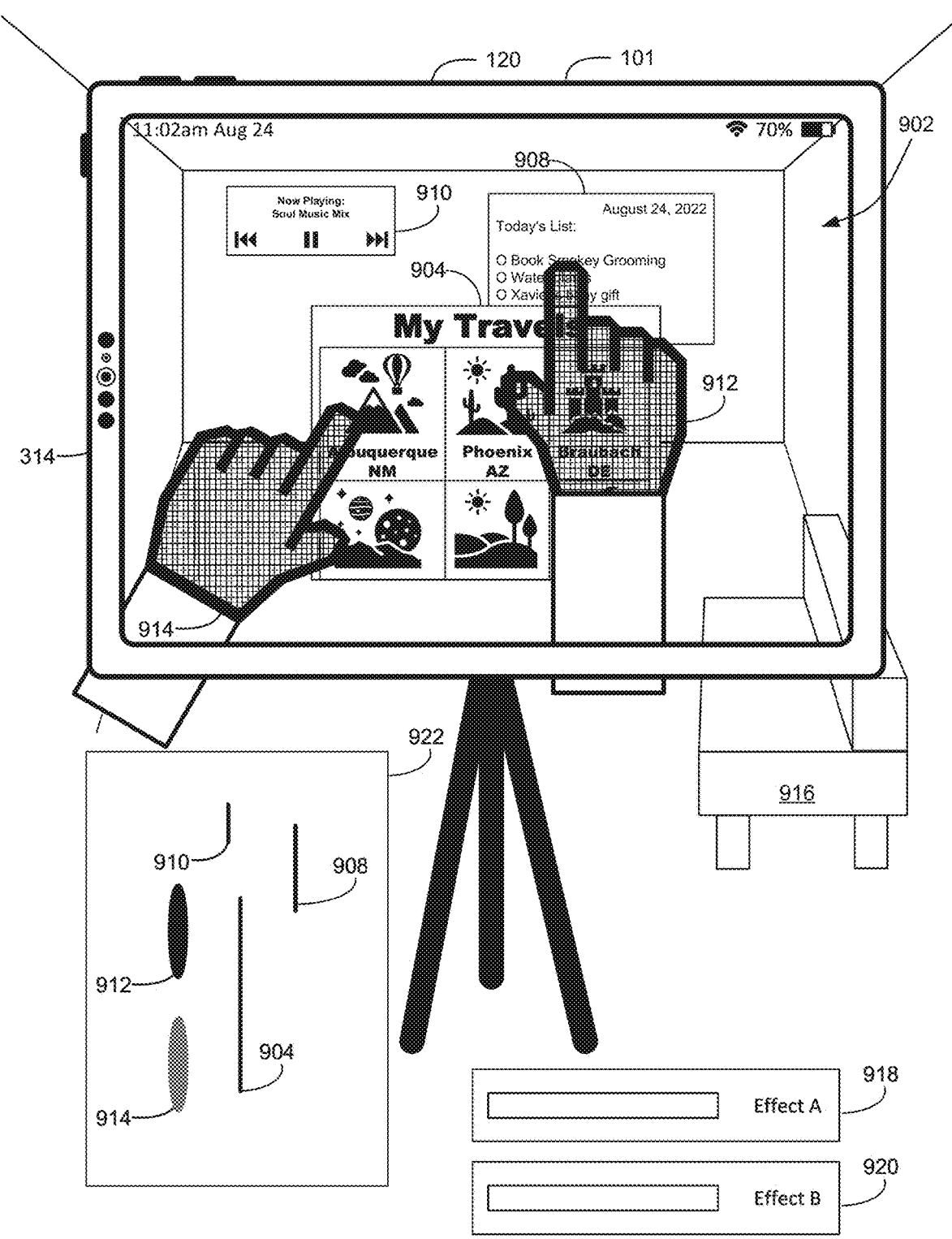

FIG. 9A illustrates a computer system 101 (e.g., an electronic device mounted atop a tripod) displaying, via a display generation component 120 (e.g., display generation component 120 of FIG. 1), a three-dimensional environment 902 from a viewpoint of the user of the computer system 101 (e.g., facing the back wall of the physical environment in which computer system 101 is located). As described with reference to FIGS. 1-6B, the computer system 101 optionally includes a display generation component 120 (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or attention (e.g., gaze) of the user (e.g., internal sensors facing inwards towards the face of the user).

As shown in FIG. 9A, computer system 101 captures one or more images of the physical environment around computer system 101 (e.g., operating environment 100 of FIG. 1), including one or more objects in the physical environment around computer system 101. In some embodiments, computer system 101 displays representations of the physical environment in three-dimensional environment 902 or the physical environment is visible via the display generation component 120. For example, three-dimensional environment 902 includes representations of the physical floor and back and side walls of the room in which computer system 101 is located. The three-dimensional environment 902 also includes a representation 916 of a sofa, which is optionally a representation of a physical sofa in the physical environment.

In FIG. 9A, three-dimensional environment 902 also includes virtual objects 904 (corresponding to object 904 in the side view 922), 908 (corresponding to object 908 in the side view 922), and 910 (corresponding to object 910 in the side view 922). In the examples illustrated in FIGS. 9A-9H, virtual objects 904, 908, and 910 are optionally one or more of user interfaces of applications containing content, two-dimensional objects, three-dimensional objects, or any other element displayed by computer system 101 that is not included in the physical environment of display generation component 120. For example, as shown in FIG. 9A, virtual object 904 is optionally a user interface of a photo management application. In some embodiments, as shown in FIG. 9A, virtual object 904 includes a plurality of content items (e.g., photos). Virtual object 908 is optionally a to-do list user interface that includes text content. Virtual object 910 is optionally a music player user that includes one or more selectable virtual objects to initiate playback of a first media item ("Soul Music Mix"). In some embodiments, the computer system 101 adjusts the visibility of virtual objects 904, 908, and 910 or portions of virtual objects 904, 908, and 910 by applying a visual effect to portions of the virtual objects 904, 908, and 910 (e.g., changing opacity and/or transparency properties of virtual objects 904, 908, and 910) in response to determining that hand(s) of the user (e.g., such as hand 912 or hand 914) detected in location(s) of the physical environment correspond to respective location(s) in the three-dimensional environment 902 that have depth conflicts with virtual objects 904, 908, and 910, as described in more detail with reference to method 1000.

Side view 922 illustrates a side view of a portion of the three-dimensional environment 902. The side view 922 indicates the locations of virtual objects 904, 908, and 910 and respective hand locations (e.g., hand 912 and hand 914) corresponding to locations of the user's hands. In side view 922, there is no depth conflict between virtual objects 904, 908, and 910 and hands 912 and 914. In response to no depth conflict, in FIG. 9A, the computer system 101 does not apply a visual effect to virtual objects 904, 908, and 910. This is further illustrated by effect indicators 918 and 920 having zero visual effect, and illustrated by hands 912 and 914 being shown with a pattern #00, for illustrative purposes, to indicate that the computer system does not display a visual effect corresponding to hands 912 and 914 in the three-dimensional environment 902. Effect indicator 918 indicates a magnitude of visual effect applied to virtual content corresponding to the respective location of hand 912 (e.g., portion(s) of virtual content that have depth conflicts with hand 912, such as a first portion of virtual object 904 as will be described later). Effect indicator 920 indicates a magnitude of visual effect applied to virtual content corresponding to the respective location of hand 914 (e.g., portion(s) of virtual content that have depth conflicts with hand 912, such as a second portion of virtual object 904 as will be described later).

Figure 9B:
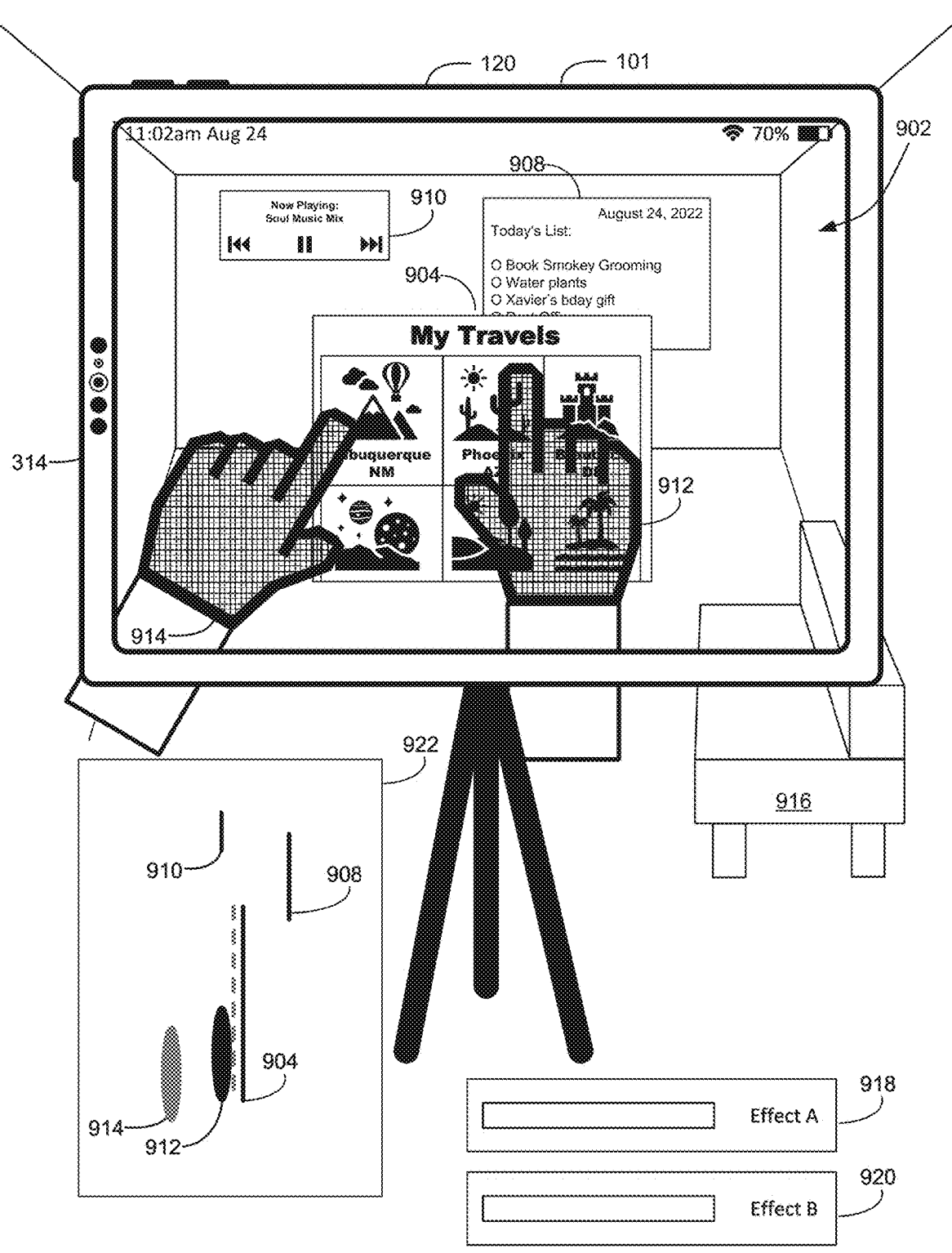

In some embodiments, the computer system 101 updates the locations of virtual objects 904, 908, and/or 910 to avoid depth conflict based on the movement of hands 912 and/or 914. For example, from FIG. 9A to 9B, the computer system 101 detects hand 912 moving to a location of the physical environment that corresponds to a respective location in the three-dimensional environment 902 towards virtual object 904. In FIG. 11B, virtual object 904 would otherwise be in depth conflict with hand 912 as described in more detail with reference to method 1000. However, in response to the movement of hand 912 towards virtual object 904, computer system 101 changes the location of virtual object 904 as shown in the side view 922 (e.g., moves virtual object 904 away from hand 912, away from the viewpoint of the user) where the dotted line of virtual object 904 indicates the previous location of virtual object 904 before the computer system 101 detected the hand moving to the location towards virtual object 904 and therefore, moved virtual object 904 to the location shown in FIG. 9B. In some embodiments, the movement of virtual object 904 to the location shown in the side view 922 of FIG. 9B is based on the movement of the hand (e.g., air gesture, touch gesture, or hand input) 912. For example, the computer system 101 optionally moves virtual object 904 backward in the three-dimensional environment 902 (e.g., away from the respective location of hand 912) in accordance with the movement of the corresponding hand of the user.

In some embodiments, the computer system 101 moves the virtual object 904 in the three-dimensional environment 902 based on the movement of the hand (e.g., air gesture, touch gesture, or hand input) 912 until the movement of the hand (e.g., air gesture, touch gesture, or hand input) 912 and/or object 904 exceeds a movement threshold (e.g., 0.1, 0.3, 0.5, 1, 3, 5, 10, 20, 50 or 100 cm) into the virtual object 904. For example, as shown in FIG. 9B, the movement of object 904 caused by the movement of the hand (e.g., air gesture, touch gesture, or hand input) 912 relative to the virtual object 904 in the three-dimensional environment 902 is below the above threshold. In some embodiments, if the movement of the hand (e.g., air gesture, touch gesture, or hand input) 912 relative to the virtual object 904 in the three-dimensional environment 902 exceeds the movement threshold, the computer system 101 adjusts the visibility of a portion of the virtual object 904 by applying a visual effect to the portion of the virtual object 904 to resolve or reduce the depth conflict in the three-dimensional environment 902, as described in more detail below.

Figure 9C:
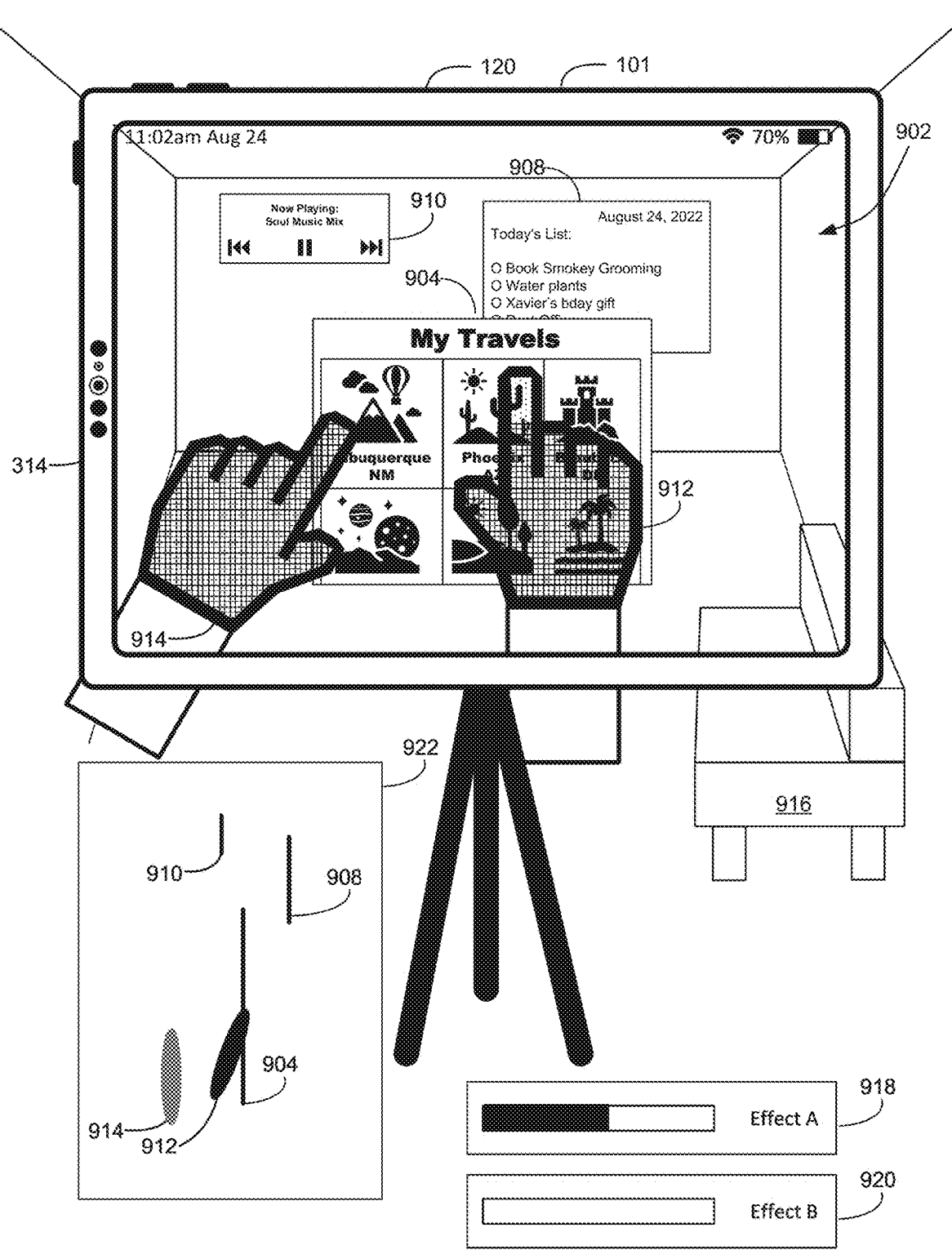

In FIG. 9C, the computer system 101 detects the respective location of hand 912 continuing moving towards and through the location of the virtual object 904 in the three-dimensional environment 902 relative to the viewpoint of the user. For example, as shown in FIG. 9C, the computer system 101 detects the hand 912 moving to a relative location with respect to the virtual object 904 such that there exists a first degree of depth conflict between the hand 912 and the virtual object 904 in the three-dimensional environment 902. Degrees of depth conflicts are described in more detail with reference to method 1000. In response, the computer system 101 applies a first visual effect having a first magnitude to a portion of the virtual object 904 (e.g., the portion of virtual object 904 in conflict with hand 912) such that a portion of the hand 912 (e.g., finger portion of the hand 912, if the finger is in conflict with object 904) has a visual appearance of being partially transparent. For example, for illustrative purposes, the portion of the virtual object 904 having the visual effect with the first magnitude corresponds to pattern #01 in the portion of the hand 912 as shown in FIG. 9C. Effect indicator 918 shown with a first fill value corresponds to the first portion of the virtual object 904 having a first magnitude of visual effect as shown in FIG. 9C. In this case, displaying the first portion of the virtual object 904 having the first visual effect with the first magnitude results in having the corresponding portion of the hand 912 appear partially transparent, optionally while content of the first portion of virtual object 904 remains at least partially visible and the portion of the hand 912 appears partially transparent.

In some embodiments, applying the first visual effect to the first portion of the virtual object 904 does not include applying the first visual effect to other portions of the virtual object that do not have a depth conflict at locations corresponding to the hand 912 even though the hand 912 is obscuring the other portions of the virtual object 904 by being positioned overlapping or blocking the virtual object 904 from the viewpoint of the user.

Figure 9D:
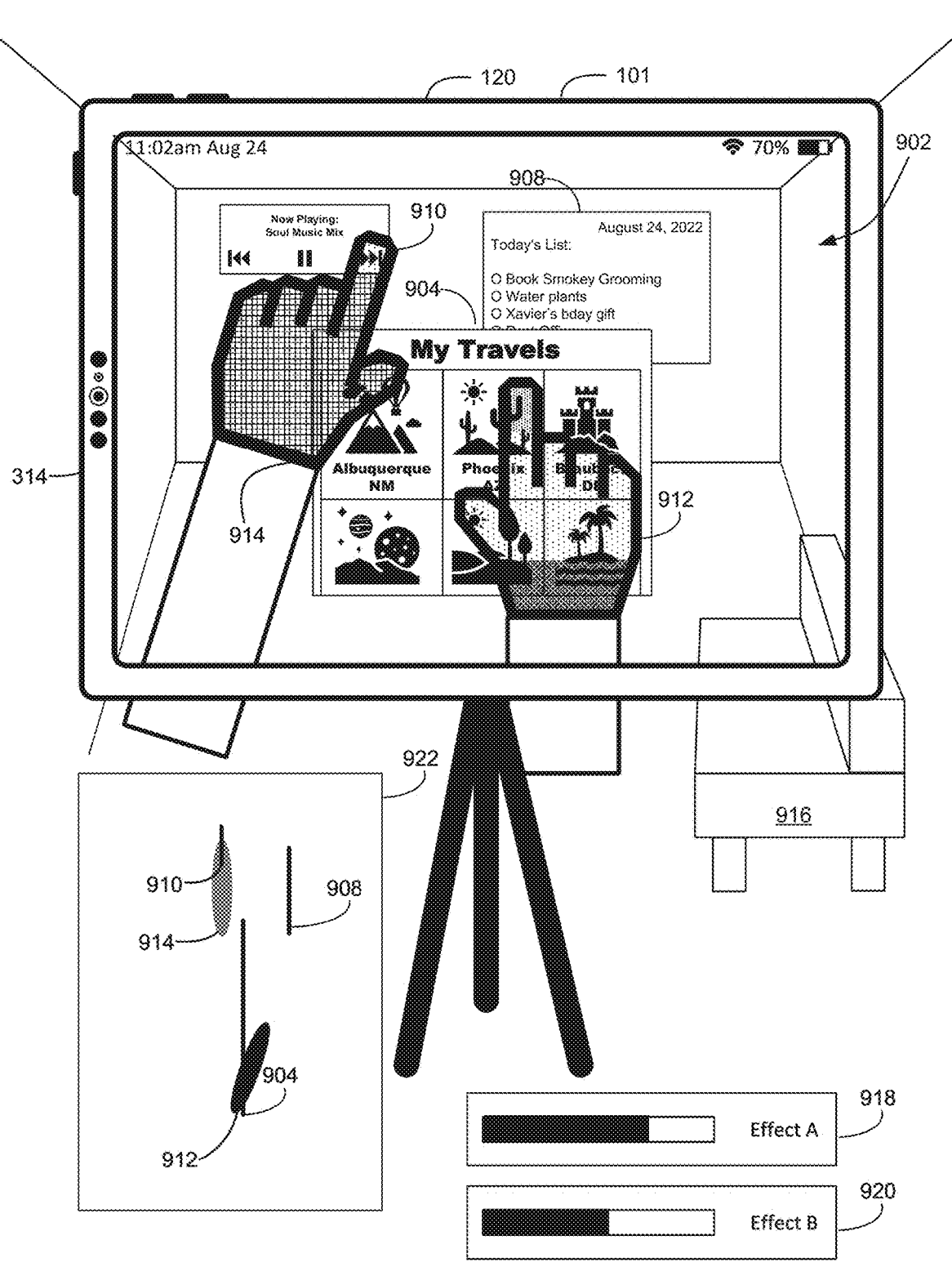

In some embodiments, the magnitudes of the visual effects applied to virtual objects 904, 908, and 910 differ based on the degree of depth conflict with hand 912 and/or hand 914, as described in more detail with reference to method 1000. For example, as shown in FIG. 9D, the computer system detects that the portion of the hand 912 (e.g., finger portion of the hand 912) has moved from a first location shown in side view 922 in FIG. 9C to a second location shown in side view 922 in FIG. 9D resulting in a greater degree of depth conflict with the respective portion of virtual object 904. In response, the computer system 101 applies the first visual effect having a second magnitude to the portion of the virtual object 904 that has the depth conflict with hand 912 such that the finger portion of the hand 912 appears as having a greater degree of transparency (e.g., visual effect with a second magnitude) as illustrated with pattern #02 and effect indicator 918 having an increased magnitude of visual effect in FIG. 9D. FIG. 9D also shows a second portion (e.g., corresponding to the upper palm of the hand 912) of the virtual object 904 with a visual effect having the first magnitude applied to the second portion of the virtual object 904 as illustrated with pattern #01. In FIG. 9D, the second portion of the virtual object 904 with the visual effect having the first magnitude corresponds to a respective location at which a second portion (e.g., upper palm of the hand 912) of hand 912 is detected by the computer system 101 as conflicting with the second portion of virtual object 904. As illustrated in FIG. 9D, the visual effects applied to the first and second portions of virtual object 904 give the appearance that the finger portion of the hand 912 is more transparent than the palm portion of the hand 912 because the computer system 101 detects that the finger portion of the hand 912 has a greater degree of depth conflict with the second portion of the virtual object 904 as compared to the upper palm portion of the hand 912.

In some embodiments, the computer system 101 applies the disclosed visual effects to both hands of the users depending on their corresponding degrees of conflict with respective portions of virtual objects. For example, in FIG. 9D, a first portion (e.g., finger portion) of hand 914 corresponding to the user's left hand is detected as having a first degree of depth conflict with a respective portion of virtual object 910. In response to the first degree of depth conflict, the computer system 101 applies a visual effect having the first magnitude to the first portion of the virtual object 910 as illustrated with pattern #01 and effect indicator 920 having a first magnitude of visual effect that is less than the magnitude of visual effect indicated by effect indicator 920 corresponding to the second magnitude of visual effect applied to the first portion of virtual object 904 at the location corresponding to the location of the first portion of hand 912. In some embodiments, while the first visual effect having the first magnitude is applied to the first portion of the virtual object 910, the computer system 101 does not apply the first visual effect having the first magnitude to portions of the virtual object other than the first portion of the virtual object 910 as shown in FIG. 9D. For example, the portions other than the first portion of hand 914 are illustrated with pattern #00 indicative of zero visual effect because there is no detected depth conflict between the portions other than the first portion of hand 914 and virtual object 910.

Figure 9E:
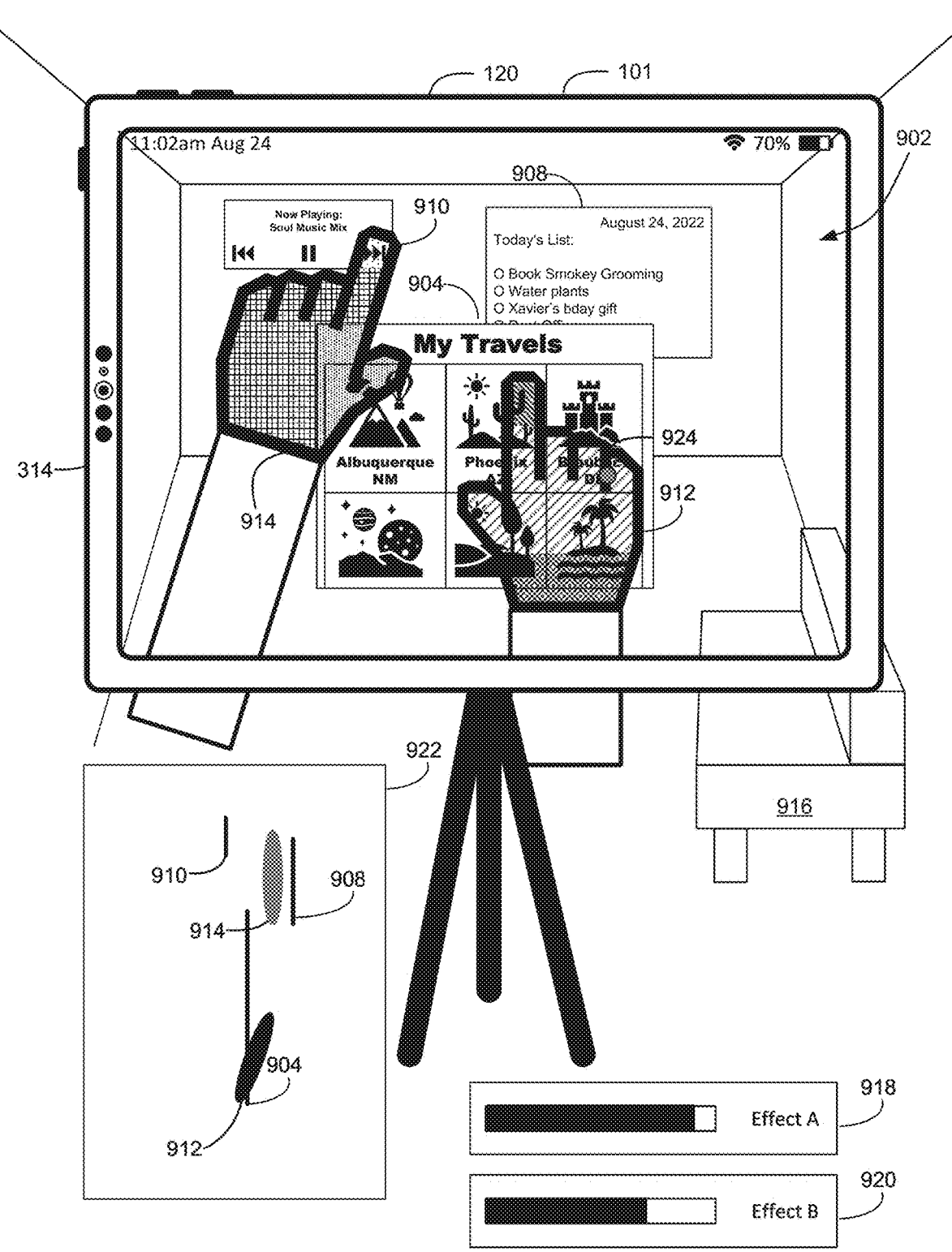

In some embodiments, the computer system 101 changes the degree of transparency of the virtual object or a respective portion of the virtual object in response to detecting attention of the user is directed to the hand that has the depth conflict with that virtual object. For example, from FIG. 9D to FIG. 9E, the computer system 101 detects attention 924 of the user directed to hand 912, while the location of hand 912 relative to virtual object 904 has not changed. In response, and as shown in FIG. 9D, the computer system 101 displays the virtual object 904 with a visual effect having a third magnitude (e.g., greater transparency than the second magnitude). For example, for illustrative purposes, the portion of the virtual object 904 having the visual effect with the third magnitude corresponds to pattern #03 in the finger portion of hand 912. The increased effect indicator 918 corresponding to the virtual object 904 indicates the third magnitude of visual effect that is now greater than the effect indicator 918 in FIG. 9D corresponding to the second magnitude of visual effect. In some embodiments, only the portion of the virtual object 904 corresponding to the respective location of the attention 924 of the user is changed as shown in FIG. 9E. In some embodiments, all portions of virtual object 904 having depth conflict with hand 912 are changed in visual appearance despite the respective location of the attention 924 of the user being directed to a particular portion of the virtual object 904 and/or a particular portion of the hand 912.

In FIG. 9E, the computer system 101 detects hand 914 moving to a location further behind virtual object 910 and virtual object 904 as depicted in the side view 922 causing a greater degree of conflict between the first portion of the virtual object 910 and the first portion of hand 914 than the degree of conflict between the first portion of the virtual object 910 and the first portion of hand 914 in FIG. 9D. From FIG. 9D to FIG. 9E, hand 914 is shown in side view 922 moving further behind virtual object 910 and to a location behind virtual object 904. In response, the computer system applies the first visual effect with a second magnitude to the first portion of virtual object 910 and the first visual effect with the first magnitude to a second portion of virtual object 904. In this way, the first portion of hand 914 is given the appearance of being more transparent than the second portion of hand 914 due to the respective degrees of depth conflict.

Figure 9F:
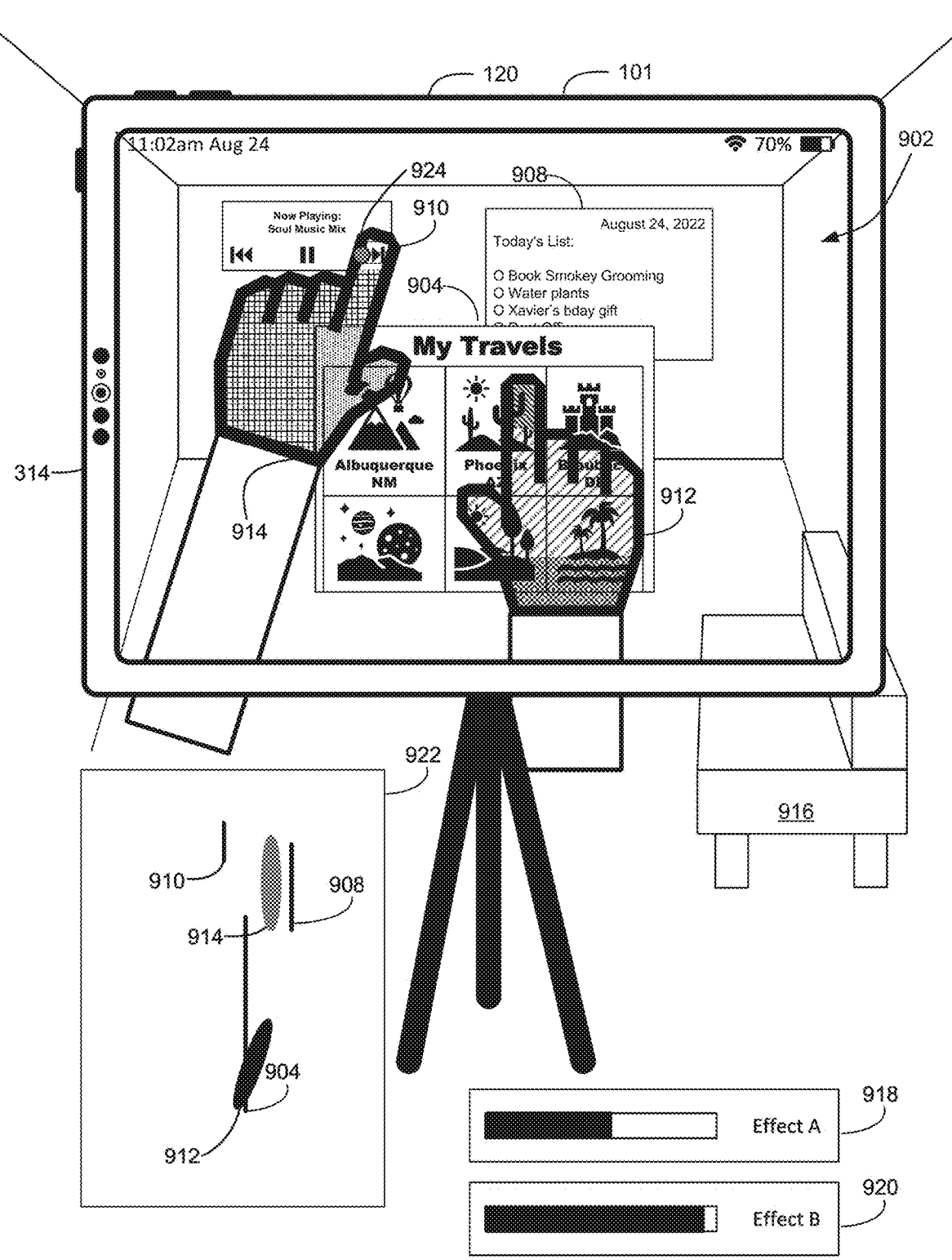
Figure 9G:
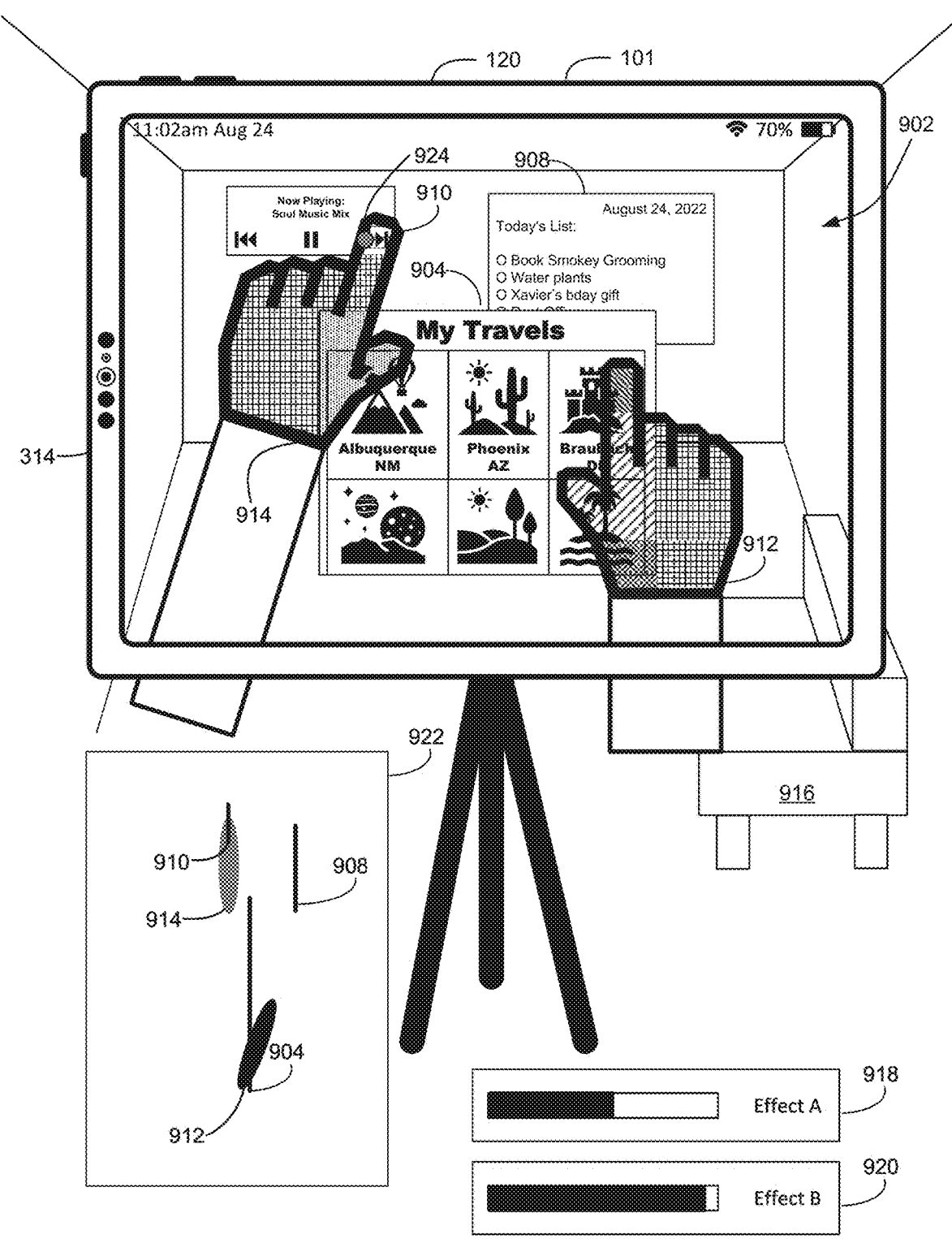

In FIG. 9F, the computer system 101 detects that the attention 924 of the user has moved from being directed to hand 912 to being directed to hand 914, while the relative locations of hands 912 and 914 relative to objects 904 and 910 has not changed. In response to the attention 924 of the user being directed to hand 914, the computer system displays the first portion of the virtual object 910 corresponding to the respective portion of the hand 914 with a visual effect having a fourth magnitude (e.g., greater transparency than the third magnitude). For example, for illustrative purposes, the first portion of the virtual object 910 having the visual effect with the fourth magnitude corresponds to pattern #04 in the respective portion of the hand 914. The effect indicator 920 corresponding to the fourth magnitude includes an even greater fill than in FIG. 9E corresponding to the third magnitude of visual effect. FIG. 9F further illustrates that in response to the attention 924 of the user moving from hand 912 to hand 914, the computer system 101 applies a visual effect to the portions of virtual object 904 having a magnitude that is less than when attention 924 was directed to hand 912. In some embodiments, the magnitude is less than the magnitude before attention was directed to hand 912 (e.g., less than as indicated by effect indicator 918 in FIG. 9D). In 9G, the computer system detects hand 914 moving to a location where the hand 914 is no longer in conflict with the second portion of virtual object 904 but the first portion of virtual object 910 includes a first degree of depth conflict with the first portion of the hand 914. In this case, if the computer system detects an activation input directed towards the first portion of the virtual object 910 (e.g., from hand 914 or another hand, such as an air pinch gesture while attention is directed to the first portion of the virtual object 910), the computer system does not perform an operation associated with virtual object 910.

Figure 9H:
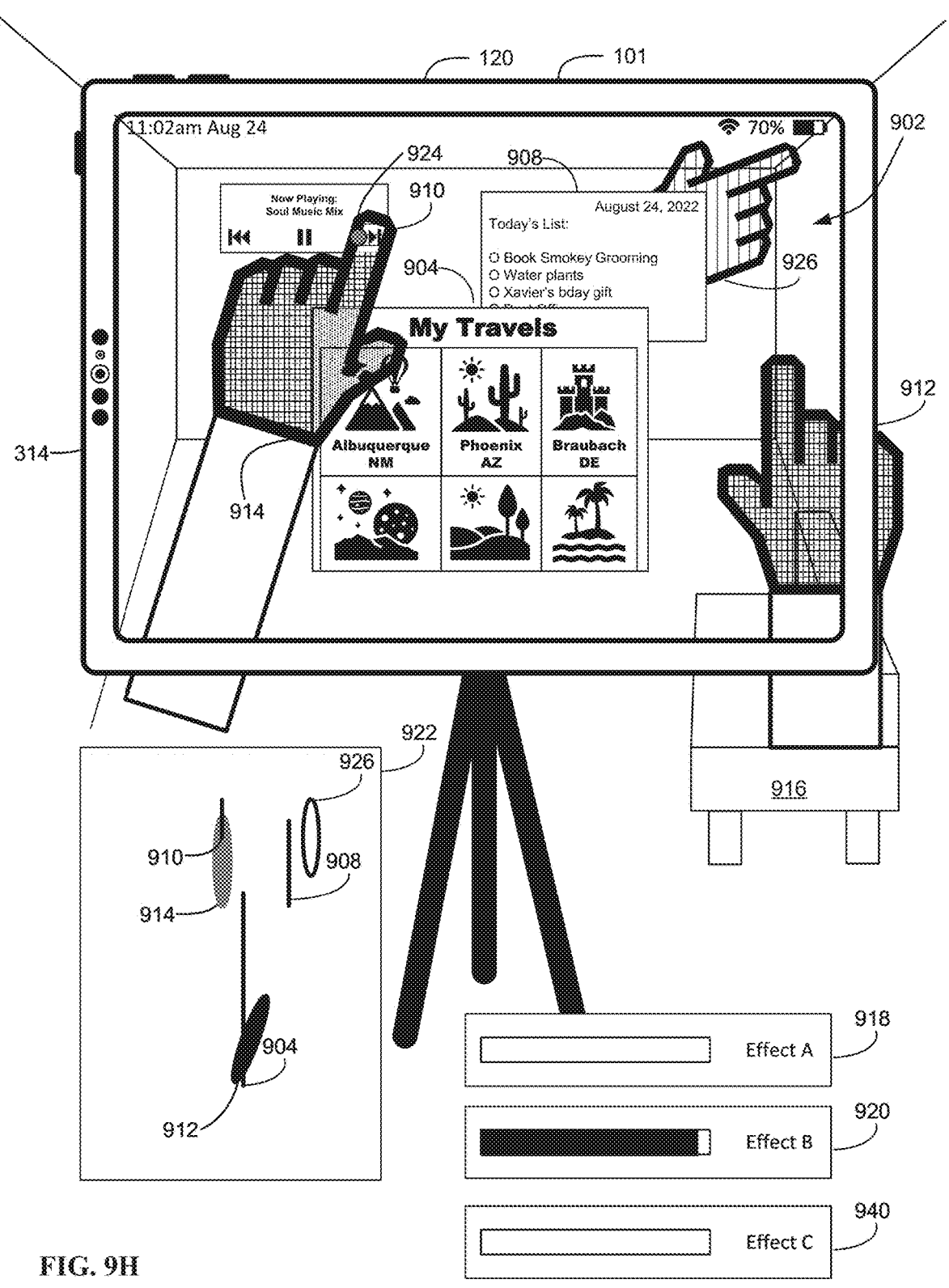
Figures 1, 9H:
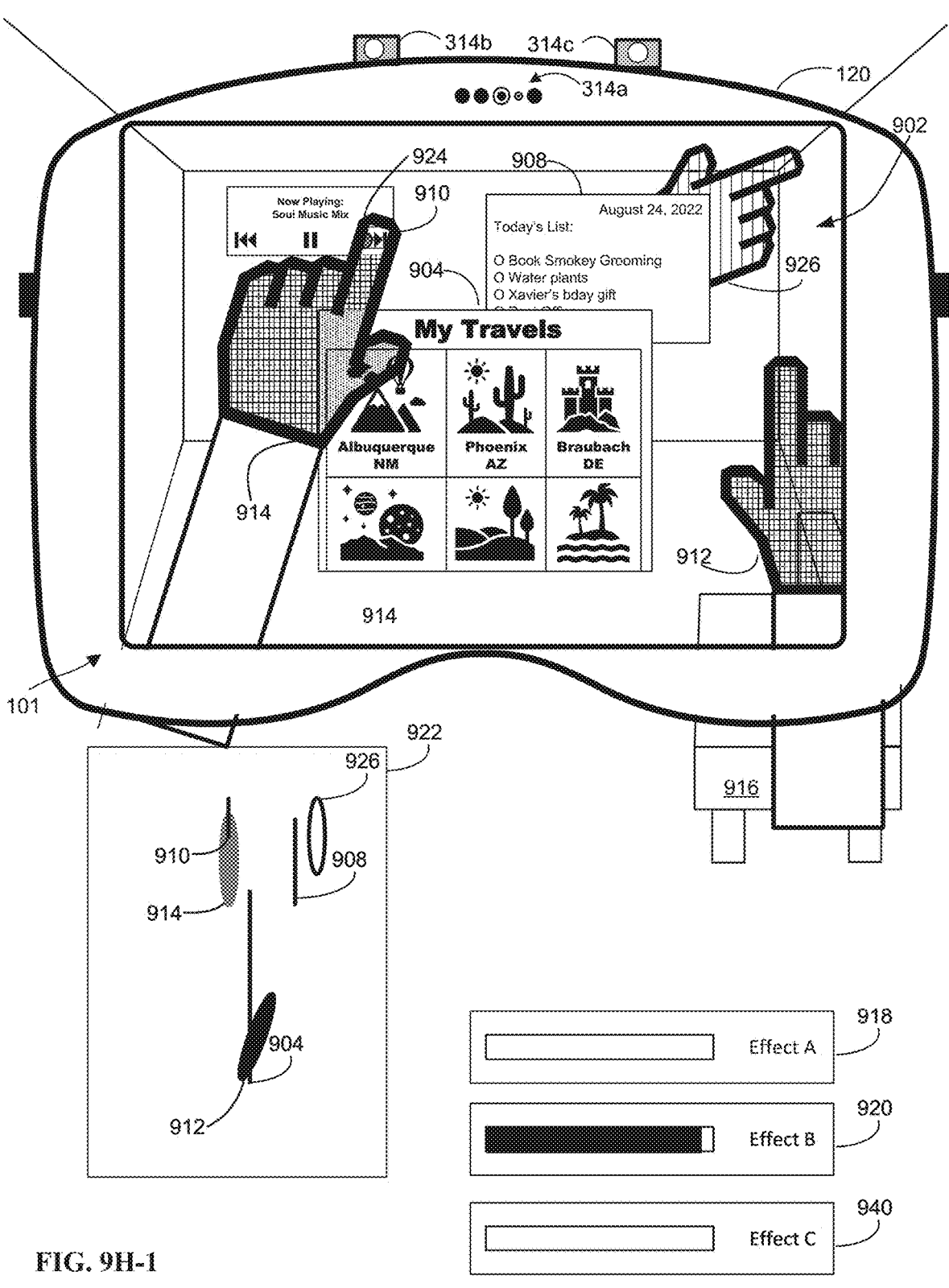
Figure 10B:
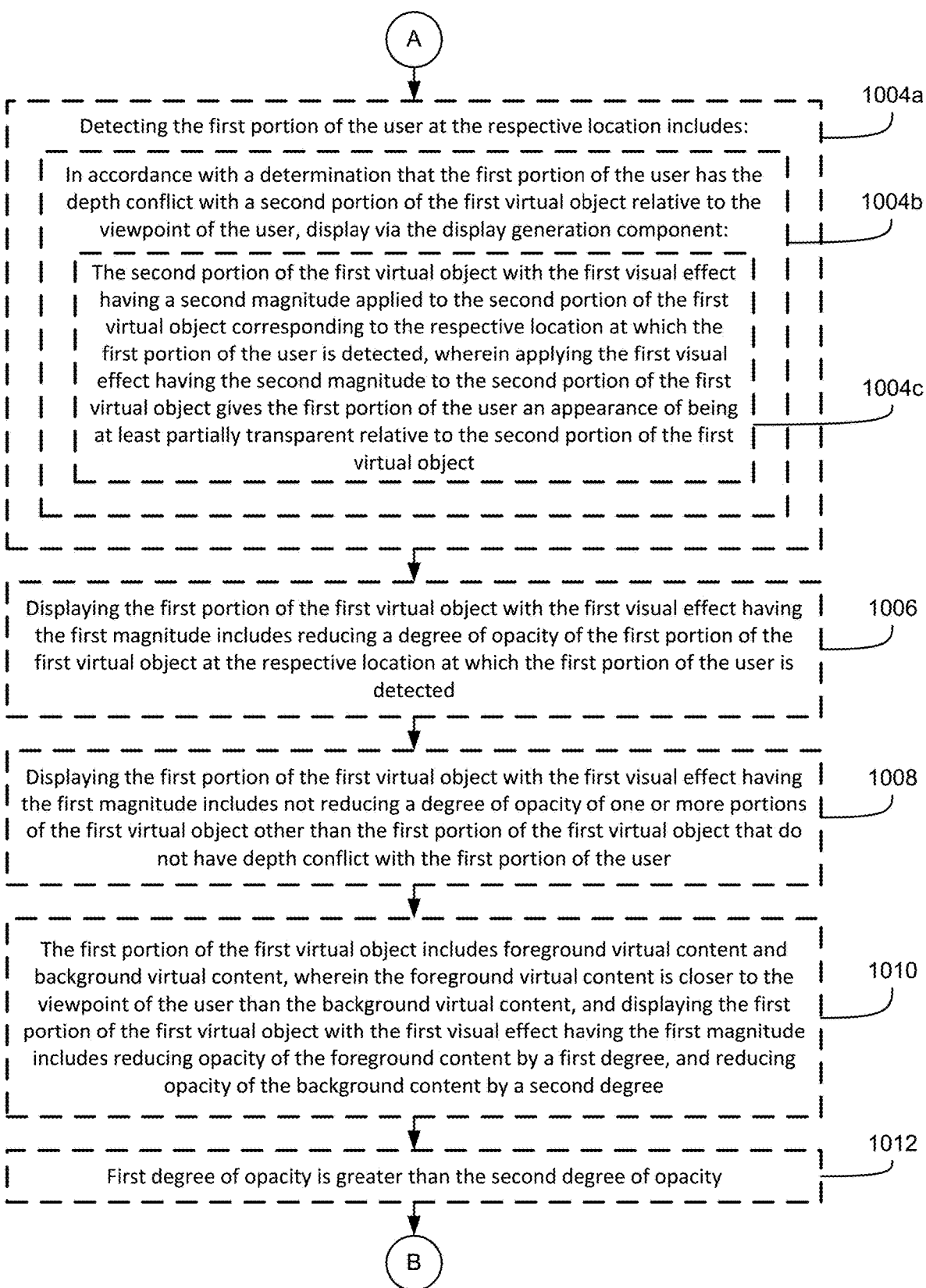
Figure 10D:
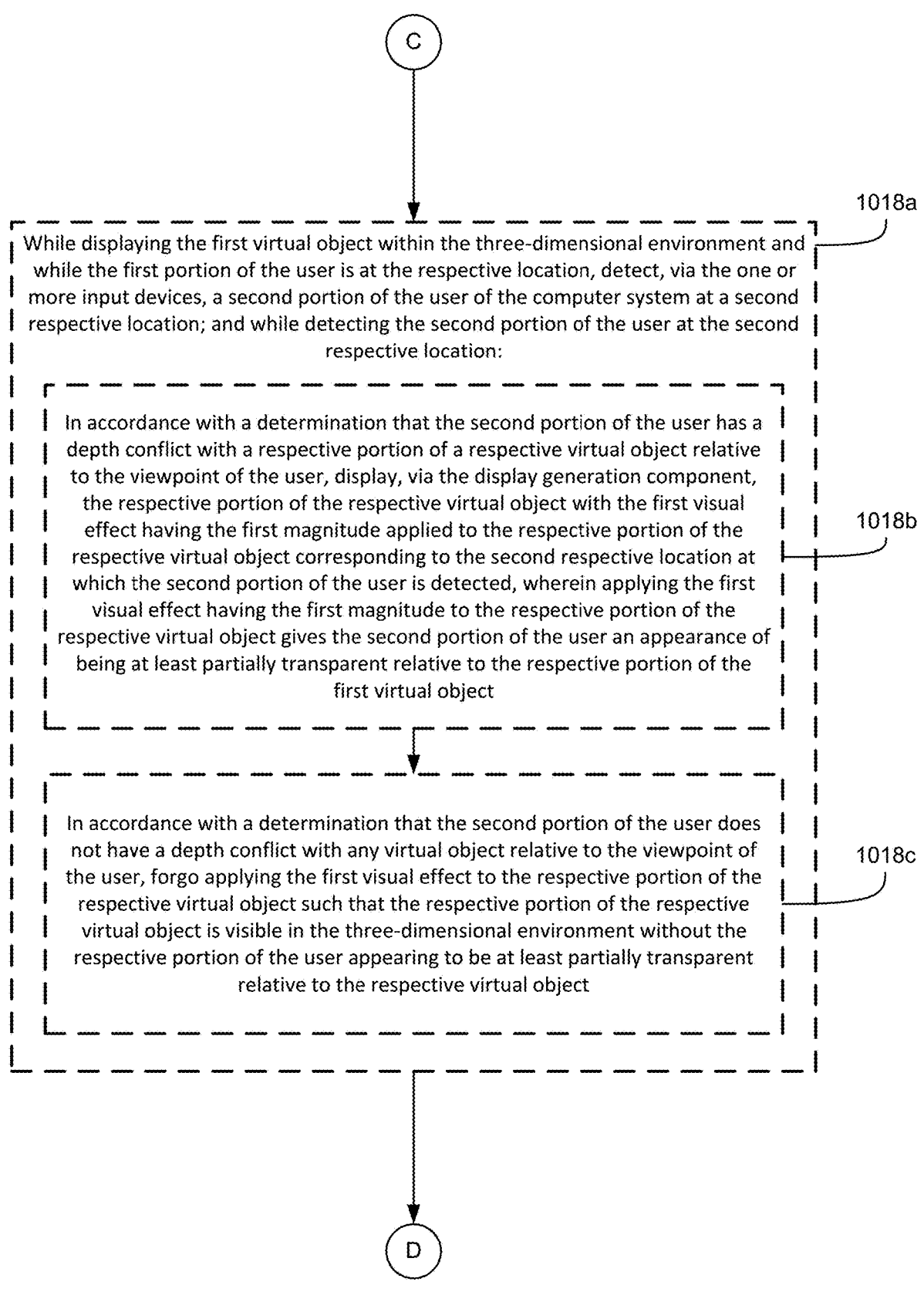
Figure 10G:
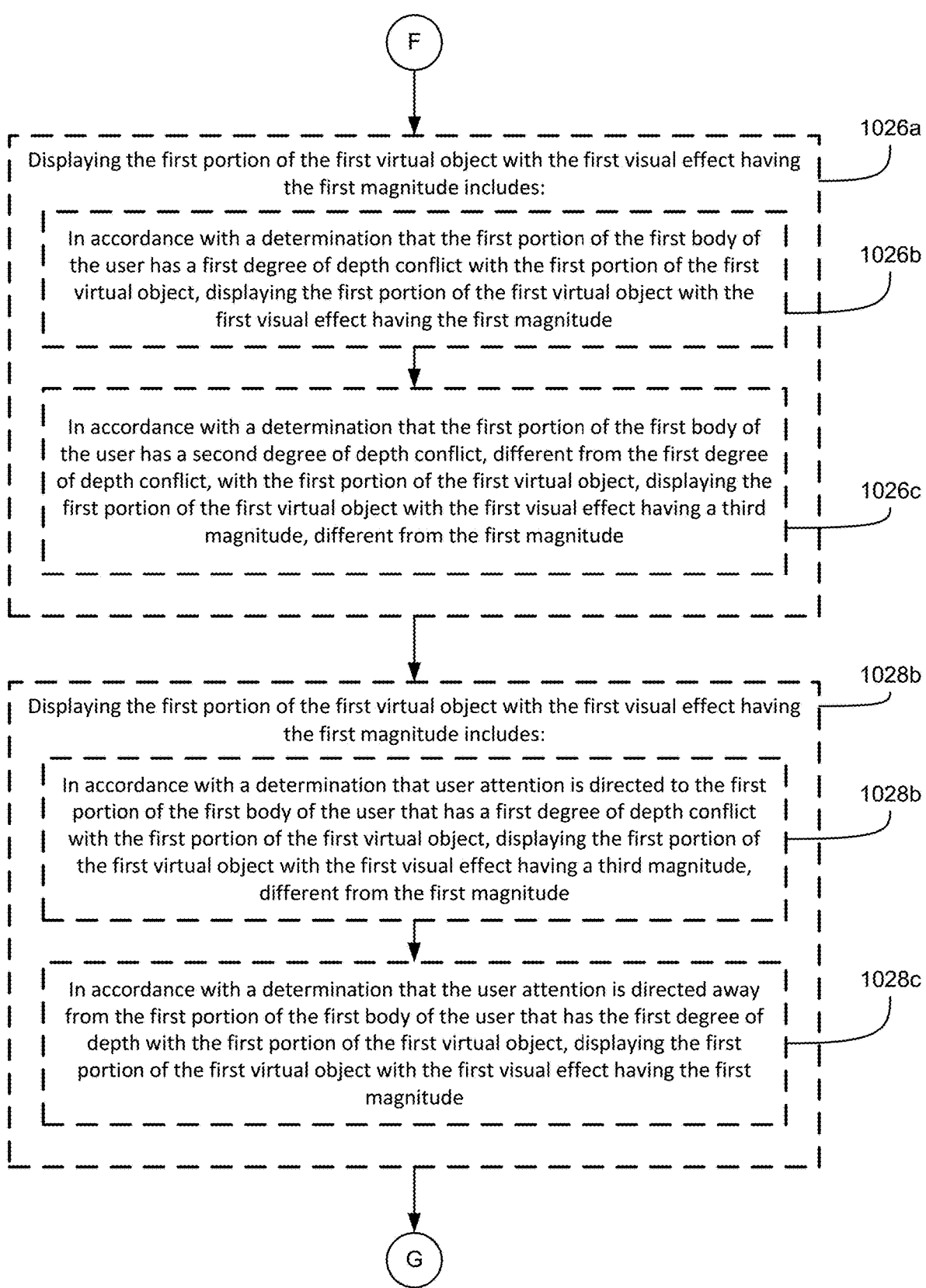
Figure 10K:
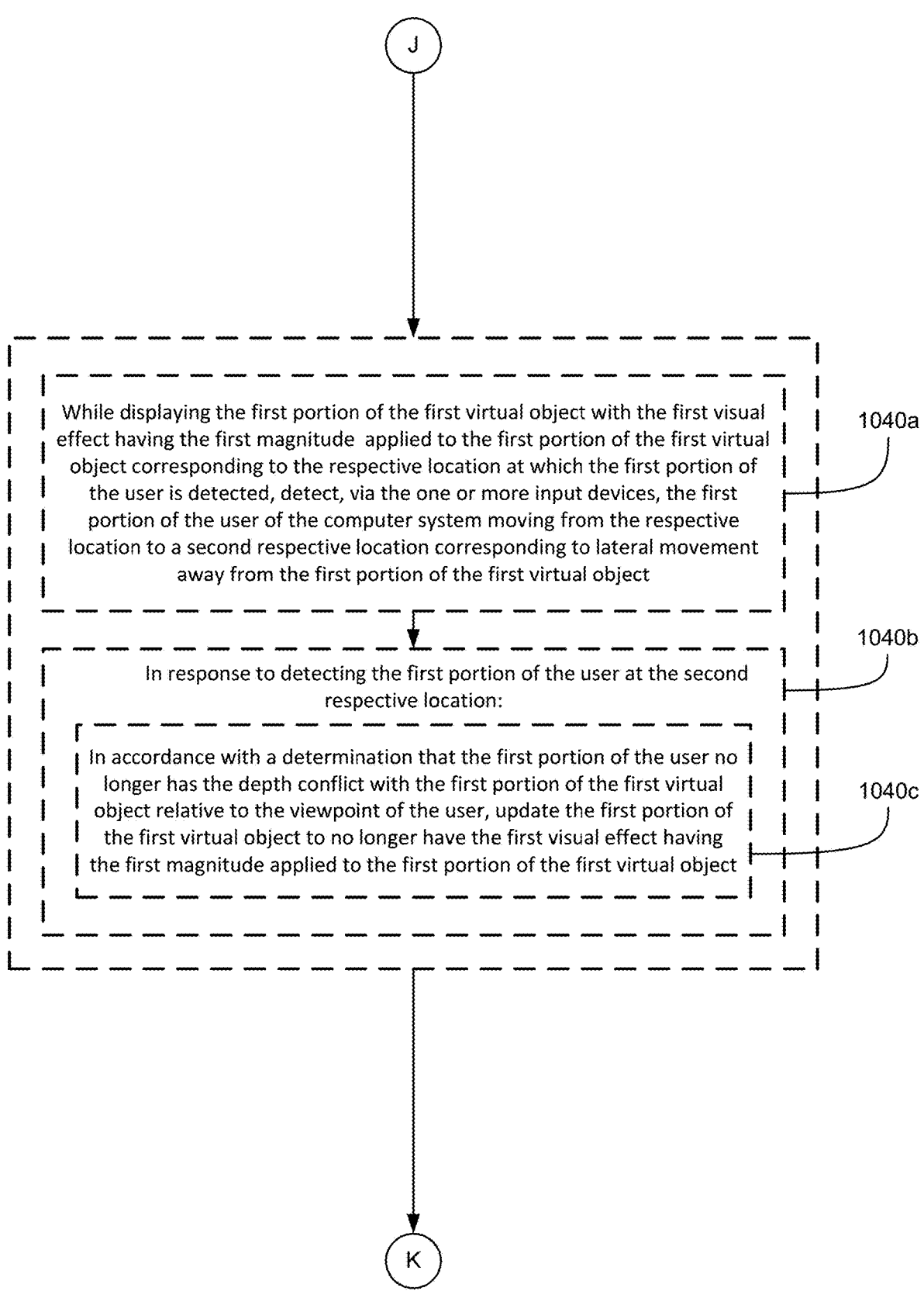
Figure 10L:
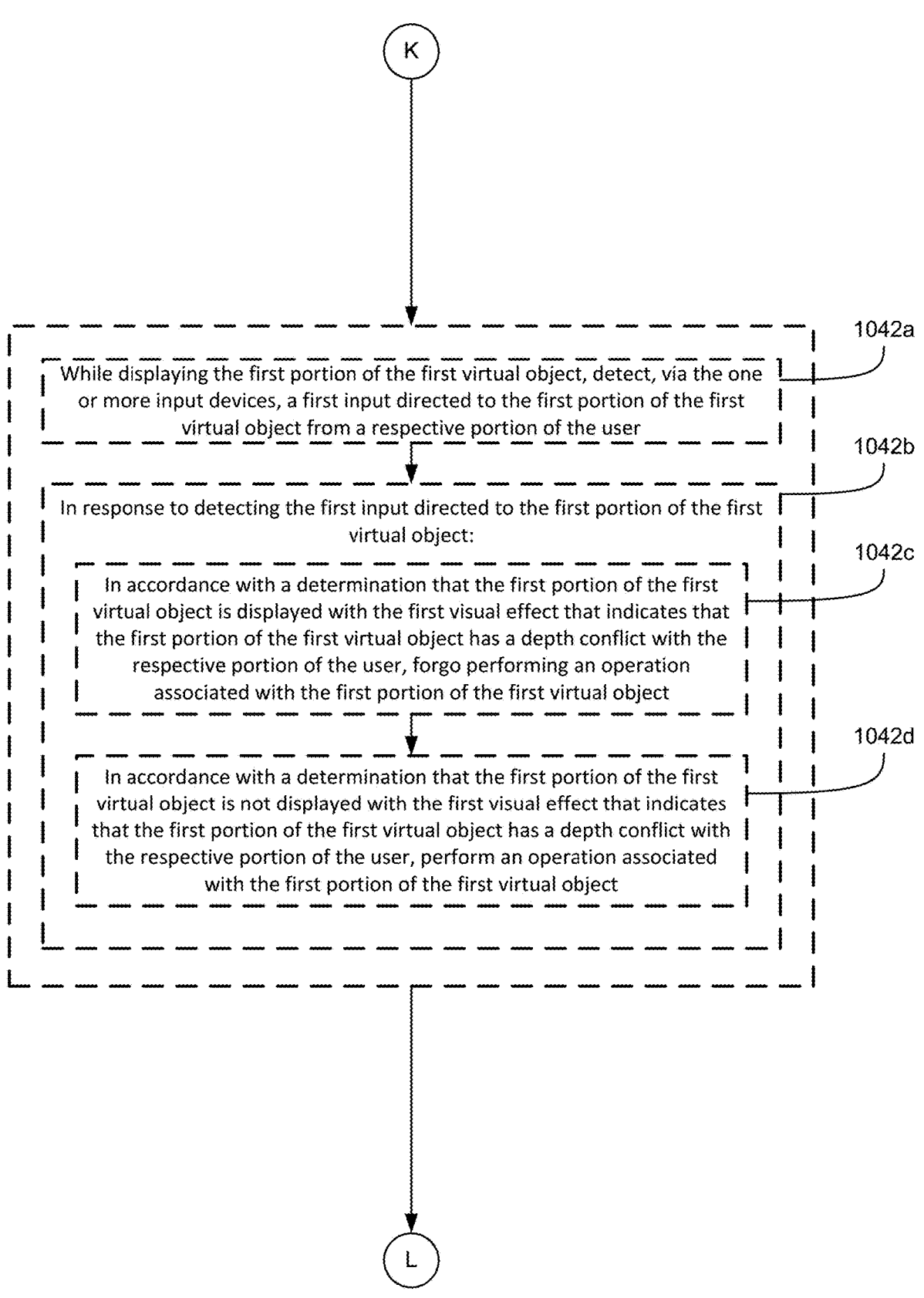

In some embodiments, the computer system 101 changes the degree of visual effect applied to the virtual object or portions of the virtual object in response to detecting the hand of the user moving in a lateral direction (e.g., with respect to the plane of the virtual object). For example, from FIG. 9F to FIG. 9G, the computer system 101 detects that the respective location of the hand 912 moves in a lateral direction relative to the viewpoint of the user away, resulting in fewer portions of hand 912 having a depth conflict with fewer portions of object 904. In response, the computer system 101 displays portions of the virtual object 904 with no depth conflict with hand 912 (e.g., which optionally had a depth conflict with hand 912 in FIG. 9F) having zero visual effect. As the computer system 101 continues to detect the hand 912 of the user moving in the lateral direction to a location where the hand 912 of the user is not in conflict with portions of virtual object 904, the computer displays virtual object 904 having zero visual effect, as illustrated in FIG. 9H. FIG. 9H further illustrates that if the computer system 101 detects other hands (e.g., hand 926) belonging to another user other than the user of computer system 101, the computer system 101 does not apply a visual effect to content that has a depth conflict with that hand despite portions of the virtual object (e.g., 908) being in depth conflict with such hands. In this case, as shown in FIG. 9H, effect indicator 940 corresponding to virtual object 908 does not indicate any visual effect applied to any portions of virtual object 908. Additional or alternative details of how and when the computer system 101 applies visual effects to virtual objects based on depth conflicts are provided with reference to method 1000.

FIG. 9H-1 illustrates similar and/or the same concepts as those shown in FIG. 9H (with many of the same reference numbers). It is understood that unless indicated below, elements shown in FIG. 9H-1 that have the same reference numbers as elements shown in FIGS. 9A-9H have one or more or all of the same characteristics. FIG. 9H-1 includes computer system 101, which includes (or is the same as) display generation component 120. In some embodiments, computer system 101 and display generation component 120 have one or more of the characteristics of computer system 101 shown in FIGS. 9H and 9A-9H and display generation component 120 shown in FIGS. 1 and 3, respectively, and in some embodiments, computer system 101 and display generation component 120 shown in FIGS. 9A-9H have one or more of the characteristics of computer system 101 and display generation component 120 shown in FIG. 9H-1.

In FIG. 9H-1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 9A-9H.

In FIG. 9H-1, display generation component 120 is illustrated as displaying content that optionally corresponds to the content that is described as being displayed and/or visible via display generation component 120 with reference to FIGS. 9A-9H. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 9H-1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 9H-1. Because display generation component 120 is optionally a head-mounted device, the field of view of display generation component 120 is optionally the same as or similar to the field of view of the user.

In FIG. 9H-1, the user is depicted as performing an air pinch gesture (e.g., with hand 914 or hand 912) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 9A-9H.

In some embodiments, computer system 101 responds to user inputs as described with reference to FIGS. 9A-9H.

In the example of FIG. 9H-1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 9A-9H and/or described with reference to the corresponding method(s) are optionally implemented on computer system 101 and display generation unit 120 in a manner similar or analogous to that shown in FIG. 9H-1.

FIGS. 10A-10M is a flowchart illustrating an exemplary method 1000 of adjusting the visibility of one or more virtual objects in a three-dimensional environment by applying a visual effect to the one or more virtual object in response to detecting one or more portions of a user in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

FIGS. 10A-10N is a flowchart illustrating an exemplary method 1000 of adjusting the visibility of one or more virtual objects in a three-dimensional environment by applying a visual effect to the one or more virtual objects in response to detecting one or more portions of a user in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, method 1000 is performed at a computer system (e.g., 101) in communication with a display generation component (e.g., 120) and one or more input devices (e.g., 314). For example, the computer system includes devices described with reference to method 800. In some embodiments, the display generation component includes a display as described with reference to method 800. In some embodiments, the one or more input devices include a device described with reference to method 800.

In some embodiments, the computer system displays (1002a), via the display generation component, a first virtual object within a three-dimensional environment, such as virtual object 904 or virtual object 910 in three-dimensional environment 902 as shown in FIG. 9A. In some embodiments, the three-dimensional environment is a three-dimensional environment described with reference to methods 800 and/or 1200. In some embodiments, the first virtual object is a virtual object described with reference to methods 800 and/or 1200.

In some embodiments, while displaying the first virtual object within the three-dimensional environment, the computer system detects (1002b), via the one or more input devices, a first portion (e.g., a hand, arm, and/or finger) of a user of the computer system at a respective location, such as hand 912 in FIG. 9B. In some embodiments, the computer system detects movement of the first portion of the user of the computer system as described with reference to methods 800 and/or 1200. In some embodiments, the computer system detects that the first portion of the user is at or within the first location for a predetermined threshold of time (e.g., 0.02, 0.03, 0.05, 0.1, 0.2, 0.3, 0.5, 0.7, 1, or 3 seconds). In some embodiments, detecting the first portion of the user includes detecting the first portion of the user at the first location within a threshold distance (e.g., 1, 3, 5, 7, 10, 13, 15, 20, 30, 40, 50, 60, 70, 80, 90, or 100 cm) of a location of the first virtual object within the three-dimensional environment. In some embodiments, the first location corresponds to a location of a viewpoint from which the computer system is displaying the three-dimensional environment, which optionally corresponds to a physical location in a physical environment of the user of the computer system. In some embodiments, the viewpoint from which the computer system displays the three-dimensional environment corresponds to a virtual location of the user of the computer system within the three-dimensional environment. The computer system optionally detects other types of inputs other than the first portion of the user, such as trackpad inputs (e.g., finger touching the trackpad and moving in a direction and/or with a magnitude) or an input device input (e.g., movement of a hand held input device that detects direction and/or magnitude of movement of the input device while it is being held in the hand of the user). Additional inputs are described with reference to methods 800 and/or 1200.

In some embodiments, while detecting the first portion of the user at the respective location (1002c), in accordance with a determination that the first portion of the user has a depth conflict (Detailed descriptions of depth conflicts are described with reference to method 800) with a first portion of the first virtual object relative to a viewpoint of the user (1002d), the computer system displays, via the display generation component, the first portion of the first virtual object with a first visual effect having a first magnitude applied to the first portion of the first virtual object corresponding to the respective location at which the first portion of the user is detected, wherein applying the first visual effect having the first magnitude to the first portion of the first virtual object gives the first portion of the user an appearance of being at least partially transparent relative to the first portion of the virtual object, such as hand 912 being shown with a pattern #01, as shown in FIG. 9C. Pattern numbering used herein is provided for illustrative purposes, and it should be understood that the visual effects described herein are optionally implemented with respect to the virtual objects that the hands are in conflict with. In some embodiments, the three-dimensional environment does not include a representation of the first portion of the user independent of whether or not the first portion of the user is in the physical environment of the computer system. In some embodiments, the computer system detects movement of the first portion of the user at a location of the physical environment that corresponds to a respective location in the three-dimensional environment. For example the first portion of the user is at a location relative to the computer system that optionally corresponds to a location that is within the threshold distance of contacting the first portion of the first virtual object described with reference to method 800. For example, when the first portion of the user is at least partially contacting or intersecting the first portion of the first virtual object, the first portion of the first virtual object optionally includes a first visual effect having a first magnitude (e.g., first degree of transparency) such that the first portion of the user appears partially transparent (e.g., translucent) relative to the first portion of the first virtual object. In some embodiments, the first portion of the first virtual object is partially visible when the first portion of the first virtual object has the depth conflict with the first portion of the user. In some embodiments, the computer system detects that the first portion of the user at a location relative to the first portion of the first virtual object includes a first depth (e.g., flat or flush) with respect to the first portion of the virtual object. In some embodiments, as will be described with reference to step(s) 1024-1032, the first visual effect having the first magnitude applied to the first portion of the first virtual object increases or decreases in accordance with the determined depth conflict the first portion of the user has with the first portion of the first virtual object relative to the viewpoint of the user, which gives the appearance that the first portion of the user appears more or less transparent, translucent, or opaque. For example, movement of the first portion of the user starting at the respective location towards the first portion of the first virtual object (or farther from the viewpoint of the user) optionally causes the first portion of the first virtual object to change from having a first visual effect having a first magnitude to the first visual effect having a second magnitude applied to it (e.g., greater transparency than the first degree of transparency). In some embodiments, as a result of said movement, the first portion of the user includes a second depth (e.g., shallow) further from the viewpoint of the user (or further from a point of view of the computer system). In some embodiments, even further movement corresponding to an even greater distance between the first portion of the user and the viewpoint of the user results in a third depth (e.g., medium or deep) and the first visual effect having a third magnitude applied to the first portion of the first virtual object at the location corresponding to the location of the first portion of the user. In some embodiments, the first visual effect having the third magnitude is greater than the first visual effect having the second magnitude (e.g., greater transparency than the second degree of transparency) applied to the first portion of the first virtual object.

In some embodiments, in accordance with a determination that the first portion of the user does not have a depth conflict with any virtual object relative to the viewpoint of the user (1002e), the first portion of the first virtual object is visible in the three-dimensional environment without the first portion of the user appearing to be at least partially transparent relative to the virtual object, such as with respect to hand 914 in FIG. 9C. In some embodiments, as a result of the first portion of the user having no depth conflict with any virtual object, the first portion of the first virtual object is visible behind, in front of and/or through the first portion of the user, and/or the first portion of the first virtual object is not displayed with the (or any) translucency as described above. Applying a visual effect to a portion of the virtual object in response to depth conflict with the first portion of the user reduces visual obstruction of virtual objects and provides feedback that the user is colliding with virtual objects, thereby increasing the likelihood that the user will resolve or reduce the depth conflict with the virtual object, and reducing errors in the interaction between the user and the computer system.

In some embodiments, detecting the first portion of the user at the respective location includes (1004a), in accordance with a determination that the first portion of the user has the depth conflict with a second portion of the first virtual object relative to the viewpoint of the user, the computer system displays (1004c), via the display generation component, the second portion of the first virtual object with the first visual effect having a second magnitude applied to the second portion of the first virtual object corresponding to the respective location at which the first portion of the user is detected, such as hands 912 and 914 having conflicts with object 904 in FIG. 9E, and corresponding visual effects applied to different portions of object 904. Detailed descriptions of depth conflicts are described with reference to method 800. In some embodiments, the second portion of the first virtual object includes a higher degree of depth conflict with the first portion of the user compared to the first portion of the first virtual object. In some embodiments, the second portion of the first virtual object includes a lesser degree of depth conflict with the first portion of the user compared to the first portion of the first virtual object. In some embodiments, the second portion of the first virtual object is different from the first portion of the first virtual object. For example, the second portion is optionally an upper portion, a lower portion, a left portion, a right portion, or a center portion of the first virtual object relative to the viewpoint of the user of the computer system. The first portion is optionally any portion other than the second portion. In some embodiments, the first portion and the second portion have different depths from the viewpoint of the user. For example, the second portion optionally includes a three-dimensional visual effect projecting from the first virtual object (e.g., having a depth or degree of separation (or distance) from the first virtual object so as to project outwards toward the user). The first portion is optionally presented as two-dimensional. In some embodiments, applying the first visual effect having the second magnitude to the second portion of the first virtual object gives the first portion of the user an appearance of being at least partially transparent relative to the second portion of the first virtual object, such as the palm portion of hand 912 being shown with a pattern #02 as shown in FIG. 9D. Pattern numbering used herein is provided for illustrative purposes, and it should be understood that the visual effects described herein are optionally implemented with respect to the virtual objects that the hands are in conflict with. In some embodiments, the first visual effect having the second magnitude is the same as the first visual effect having the first magnitude. In some embodiments, the first visual effect having the second magnitude is different from the first visual effect having the first magnitude. For example, the second magnitude optionally includes a second degree of opacity that is higher than the first degree of opacity and/or a second degree of transparency that is lower than the first degree of transparency. Applying a visual effect to a second portion of the virtual object in response to depth conflict with the first portion of the user reduces visual obstruction of virtual objects and provides feedback that the user is colliding with virtual objects, thereby increasing the likelihood that the user will resolve or reduce the depth conflict with the virtual object, and reducing errors in the interaction between the user and the computer system.

In some embodiments, displaying the first portion of the first virtual object with the first visual effect having the first magnitude includes reducing a degree of opacity (e.g., increasing the degree of transparency) of the first portion of the first virtual object at the respective location at which the first portion of the user is detected (1006), such as shown with respect to object 904 and hand 912 in FIG. 9C. In some embodiments, the computer system reduces the opacity or visibility (e.g., changing a degree of opacity and/or a degree of transparency or translucency) of the first portion of the first virtual object and not other portions of the first virtual object (e.g., maintains the visual appearance of the other portions). In some embodiments, the other portions of the first virtual object do not have depth conflict with the first portion of the user. Reducing the opacity of a portion of the virtual object in response to depth conflict with the first portion of the user reduces visual obstruction of virtual objects and provides feedback that the user is colliding with virtual objects, thereby increasing the likelihood that the user will resolve or reduce the depth conflict with the virtual object, and reducing errors in the interaction between the user and the computer system.

In some embodiments, displaying the first portion of the first virtual object with the first visual effect having the first magnitude includes not reducing a degree of opacity of one or more portions of the first virtual object other than the first portion of the first virtual object that do not have depth conflict with the first portion of the user (1008), such as not reducing the opacity of portions of object 904 in FIG. 9C that do not have the depth conflict with hand 912. In some embodiments, the degree of opacity of only the first portion of the first virtual object at the respective location at which the first portion of the user is detected is reduced, while the opacity of other portions of the first virtual object (e.g., portions having no depth conflict) remain unchanged. Reducing the opacity of a portion of the virtual object in response to depth conflict with the first portion of the user without reducing the one or more portion of the first virtual object that do not have depth conflict reduces visual obstruction of virtual objects and provides feedback that the user is colliding with virtual objects while maintaining visibility and/or ability to interact with other portions of the virtual object.

In some embodiments, the first portion of the first virtual object includes foreground virtual content, such as virtual object 910 in FIG. 9D and background virtual content, such as virtual object 908 in FIG. 9D, wherein the foreground virtual content is closer to the viewpoint of the user than the background virtual content, and displaying the first portion of the first virtual object with the first visual effect having the first magnitude includes reducing opacity of the foreground content by a first degree, such as finger portion of hand 912 being shown with a pattern #02 as shown in FIG. 9D and reducing opacity of the background content by a second degree (1010), such as finger portion of hand 914 being shown with a pattern #01 as shown in FIG. 9D. In some embodiments, applying the first visual effect having the first magnitude to the first portion of the first virtual object corresponding to the respective location at which the first portion of the user is detected includes determining whether a region in the first portion to which the first visual effect is applied corresponds to foreground virtual content or background virtual. For example, the computer system optionally reduces the opacity of foreground content by the first degree and the opacity of background content by a second degree that is higher than the first degree, lower than the first degree, or the same as the first degree. In some embodiments, the first portion of the user has a depth conflict with both the foreground virtual content and the background virtual content. Reducing the opacity of foreground virtual content and background virtual content to differing or same degrees in response to depth conflict with the first portion of the user reduces visual obstruction of virtual objects and provides feedback that the user is colliding with virtual objects, thereby increasing the likelihood that the user will resolve or reduce the depth conflict with the virtual object, and reducing errors in the interaction between the user and the computer system.

In some embodiments, the first degree of opacity is greater than the second degree of opacity (1012), such as reducing the opacity of object 904 more than the opacity of object 908 in FIG. 9D. For example, the first virtual object is displayed having a more transparent foreground (less opaque) content and a less transparent (more opaque) background content. Thus, the foreground content displayed having the first degree of opacity gives the first portion of the user an appearance of being more transparent (less opaque) relative to the background content of the first portion of the virtual object. Reducing the opacity of foreground virtual content more than background virtual content in response to depth conflict with the first portion of the user reduces visual obstruction of the background content by the foreground content.

In some embodiments, wherein reducing the opacity of the foreground content by the first degree includes maintaining display of the foreground content (1014*a*) and reducing the opacity of the background content by the second degree includes ceasing display of the background content (1014*b*), such as if object 908 were ceased to be displayed in FIG. 9D while object 904 remains displayed. In some embodiments, applying the first visual effect having the first magnitude to the first portion of the first virtual object includes temporarily ceasing to display the background content while maintaining display of the foreground content, albeit with increased translucency (but not total transparency). Eliminating the visual obstruction imposed by the background virtual content by ceasing to display the background content in response to depth conflict with the first portion of the user provides an efficient way of reducing visual clutter and cognitive burden on the user caused by content in the background, thereby increasing the likelihood that the user will resolve or reduce the depth conflict with the virtual object, and reducing errors in the interaction between the user and the computer system.

In some embodiments, the first portion of the first virtual object with the first visual effect having the first magnitude applied to the first portion of the first virtual object is separated from a second portion of the first virtual object without the first visual effect having the first magnitude applied to the second portion (1016), such as the portion of object 904 with the visual effect in FIG. 9C being separated from portions of object 904 without the visual effect. For example, in contrast to the first portion of the first virtual object having the first visual effect with the first magnitude applied to the first portion of the first virtual object, the second portion of the first virtual object optionally does not include the first visual effect with the first magnitude applied to the second portion of the first virtual object. The second portion of the first virtual object is thus optionally spatially separated and/or separated in appearance from the first portion even though the first portion and the second portion are part of the same first virtual object. In some embodiments, the first portion of the first virtual object with the first visual effect having the first magnitude is optionally displayed having a perimeter edge or boundary separating the first portion from the second portion. In some embodiments, the first portion of the first virtual object has a first degree of depth conflict with the first portion of the user and the second portion of the first virtual object has a second degree of depth conflict with the first portion of the user, different from the first degree of depth conflict. In some embodiments, in accordance with a determination that the second portion of the first virtual object has the second degree of depth conflict with the first portion of the user, the second portion of the first virtual object is displayed with the first visual effect having a second magnitude applied to the second portion of the first virtual object corresponding to the respective location at which the first portion of the user is detected. In some embodiments, the second magnitude corresponds to reducing the opacity of the second portion of the first virtual object by a second degree that is higher than the first degree, lower than the first degree, or the same as the first degree associated with the first magnitude visual effect applied to the first portion of the first virtual object. As such, the second portion of the first virtual object optionally appears separated in appearance from the first portion even though the first portion and the second portion are part of the same first virtual object. In some embodiments, the first portion of the first virtual object with the first visual effect having the first magnitude is optionally displayed having a perimeter edge or boundary separating the first portion from the second portion. In some embodiments, the second portion of the first virtual object with the first visual effect having the second magnitude is displayed having a perimeter edge or boundary separating the first portion from the second portion. In some embodiments, a transition of the first visual effect having the first magnitude from the first portion to the second portion of the first virtual object is gradual based on a distance from an edge of the first portion of the user, such as the transition between the portion of object 904 in FIG. 9C being feather or gradual. For example, the computer system displays a gradual transition of the first visual effect from the first portion to the second portion, optionally including a "feathering" or smoothing (e.g., increasing transparency) in a region of the first virtual object that is at a predetermined distance (e.g., 0.01, 0.02, 0.03, 0.04, 0.05, 0.07, 0.09, 1, 1.5, 2, 2.5, or 3 cm) from the edge of the first portion of the first virtual object with the first visual effect and/or through the perimeter edge and/or boundary of the first portion of the first virtual object. In some embodiments, the region corresponds to the region at which the first portion of the user is detected. Providing a gradual transition of the first visual effect from the first portion to the second portion of the first virtual object such that it is not noticeable to the user viewing the first portion as being clearly distinct or separated from the second portion in response to depth conflict with the first portion of the user allows the computer system to convey to the user content presented by the first virtual object despite the user colliding with the first virtual object, thereby increasing the likelihood that the user will resolve or reduce the depth conflict with the first virtual object, and reducing errors in the interaction between the user and the computer system.

In some embodiments, while displaying the first virtual object within the three-dimensional environment and while the first portion of the user is at the respective location, the computer system detects, via the one or more input devices, a second portion of the user of the computer system at a second respective location (1018*a*), such as hand 912 in FIG. 9E. In some embodiments, the second portion of the user corresponds to the user's first hand, arm, palm, and/or one or more fingers of the first hand (e.g., the left or right hand). In some embodiments, the first portion of the user corresponds to the user's second hand (e.g., opposite of the first hand of the user's two hands). In some embodiments, the computer system detects the first portion and the second portion of the user concurrently in the three-dimensional environment. In some embodiments, the second respective location is a different location from the first respective location at which the first portion of the user is detected.

In some embodiments, while detecting the second portion of the user at the second respective location, in accordance with a determination that the second portion of the user has a depth conflict with a respective portion of a respective virtual object (e.g., the first virtual object or a different virtual object) relative to the viewpoint of the user (e.g., as described with reference to step(s) 1002), the computer system displays, via the display generation component, the respective portion of the respective virtual object with the first visual effect having the first magnitude applied to the respective portion of the respective virtual object corresponding to the second respective location at which the second portion of the user is detected, wherein applying the first visual effect having the first magnitude to the respective portion of the respective virtual object gives the second portion of the user an appearance of being at least partially transparent relative to the respective portion of the first virtual object (1018*b*), such as the finger portion of hand 912 being shown with a pattern #03 as shown in FIG. 9E corresponding to the corresponding portion of object 910 being displayed with the visual effect. In some embodiments, the computer system applies visual effects including the first visual effect to virtual objects or portions of virtual objects corresponding to the respective locations of the user's hands or portions of the user's hands, as described herein with reference to step(s) 1002, optionally without applying visual effects to the virtual objects or portions of the virtual object corresponding to respective locations of other portions of the user as will be described in more detail in step(s) 1020. The first visual effect with the first magnitude is described in more detail with reference to step(s) 1002.

In some embodiments, in accordance with a determination that the second portion of the user does not have a depth conflict with any virtual object relative to the viewpoint of the user (e.g., as described with reference to step(s) 1002), forgoing applying the first visual effect to the respective portion of the respective virtual object such that the respective portion of the respective virtual object is visible in the three-dimensional environment without the respective portion of the user appearing to be at least partially transparent relative to the respective virtual object (1018*c*), such as with respect to hand 914 in FIG. 9C that does not have a depth conflict with any objects. In some embodiments, as a result of the second portion of the user having no depth conflict with any virtual object, the respective portion of the respective virtual object is visible behind, in front of and/or through the second portion of the user, and/or the respective portion of the respective virtual object is not displayed with the (or any) translucency, and/or the respective portion of the respective virtual object remains unchanged. Applying the disclosed visual effects to different portions of the user based on characteristics of those portions' depth conflicts with content conveys individualized depth conflict information, thereby facilitating individualized action to resolve or reduce the depth conflicts.

In some embodiments, the first portion of the user is a first type of portion of the user (1020*a*), such as hand 912 in FIG. 9C. In some embodiments, while displaying the first virtual object within the three-dimensional environment, the computer system detects (1020*b*), via the one or more input devices, a second portion of a second user (e.g., different from the user of the computer system, such as a person in the physical environment of the user other than the user) at a second respective location (e.g., detecting the hand of the second user), such as hand 926 in FIGS. 9H and 9H-1. In some embodiments, while detecting the second portion of the second user at the second respective location (1020*c*), in accordance with a determination that the second portion of the second user has a depth conflict with the first portion of the first virtual object relative to the viewpoint of the user, the first portion of the first virtual object is visible in the three-dimensional environment without the second portion of the second user appearing to be at least partially transparent relative to the first portion of first virtual object (1020*d*), such as hand 926 being shown with a pattern #11 as shown in FIGS. 9H and 9H-1 to indicate that the computer system does not display a visual effect corresponding to hand 926 on object 908. In some embodiments, the second user/person is different from the user of the computer system. In some embodiments, the second user is a user of a second computer system different from the computer system. In some embodiments, the second portion of the second user is the first type of portion of the user as described in step(s) 1018. In some embodiments, the second portion of the second user is the second type of portion of the second user as described in step(s) 1018. In some embodiments, despite a determination, by the computer system, that the second portion of the second user has a depth conflict with the first portion of the first virtual object, the computer system does not apply a visual effect including the first visual effect to the first portion of the first virtual object. Not applying a visual effect when portion(s) of users other than the portion of the user of system has depth conflict with a respective virtual object provides feedback that no one other than the user is colliding with virtual objects, and reduces interruption of display of virtual content by objects that the user cannot control, thereby reducing errors in the interaction between the user and the computer system.

In some embodiments, while displaying, via the display generation component, the first portion of the first virtual object with the first visual effect having the first magnitude applied to the first portion of the first virtual object corresponding to the respective location at which the first portion of the user is detected (1022*a*), such as upper palm portion of hand 912 being shown with a pattern #02 in FIG. 9D, the computer system detects, via the one or more input devices, a second portion of the user of the computer system at a second respective location (e.g., a second hand of the user), such as the finger portion of hand 912 in FIG. 9D or hand 914 in FIG. 9E, and while detecting the second portion of the user at the second respective location (1022*b*), in accordance with a determination that the second portion of the user has a depth conflict with a respective portion of a respective virtual object (e.g., the first virtual object or a second virtual object) relative to the viewpoint of the user, such as with object 904 in FIG. 9D or object 910 in FIG. 9E, the computer system displays, via the display generation component (1022*c*) the respective portion of the respective virtual object with the first visual effect having a second magnitude applied to the respective portion of the respective virtual object corresponding to the second respective location at which the second portion of the user is detected, wherein the second magnitude is different from the first magnitude applied to the first portion of the first virtual object, wherein applying the first visual effect having the second magnitude to the respective portion of the respective virtual object gives the second portion of the user an appearance of being at least partially transparent relative to the respective portion of the respective virtual object (1022*d*), such as finger portion of hand 912 being shown with a pattern #03 in FIG. 9D corresponding to the amount of visual effect applied to the portion of object 904 in conflict with the finger portion of hand 912. For example, the second portion of the user is optionally different from the first portion of the user as described herein. In some embodiments, the second portion of the user is in a second respective location that is different from the first respective location of the first portion of the user. In some embodiments, the first portion of the first virtual object is the same or different from the respective portion of the respective virtual object. In some embodiments, the second portion of the user includes a higher degree of depth conflict with the respective portion of the respective virtual object compared to the degree of conflict between the first portion of the user and the first portion of the first virtual object. In some embodiments, the second portion of the user includes a lesser degree of depth conflict with the respective portion of the respective virtual object compared to the degree of conflict between the first portion of the user and the first portion of the first virtual object. In some embodiments, the first visual effect having the second magnitude is different from the first visual effect having the first magnitude. For example, the second magnitude optionally includes a second degree of opacity that is higher than the first degree of opacity and/or a second degree of transparency that is lower than the first degree of transparency. In some embodiments, the respective portion of the respective virtual object with the first visual effect having the second magnitude and the first portion of the first virtual object with the first visual effect having the first magnitude are concurrently visible in the currently displayed viewpoint of the three-dimensional environment. In some embodiments, the computer system displays the respective portion of the respective virtual object without having the first visual effect with the second magnitude applied to the respective portion of the respective virtual object corresponding to the second respective location at which the second portion of the user is detected in accordance with a determination that the second portion of the user does not have a depth conflict with the respective portion of a respective virtual object (e.g., the first virtual object or a second virtual object) relative to the viewpoint of the user. For example, the computer system does not apply the first visual effect with the second magnitude until a point where the computer system detects that the second portion of the user has changed to a respective location that is in depth conflict with the respective portion of the respective virtual object. Applying a visual effect to visually distinguish a first portion of the user appearing transparent from a second portion of the user appearing more, less, or equally transparent in response to a respective depth conflict with a respective portion of a respective virtual object provides individualized feedback about the depth conflicts of the two portions of the user, thereby facilitating correct action by the user to resolve or reduce the depth conflicts.

In some embodiments, displaying the first portion of the first virtual object with the first visual effect having the first magnitude includes (1026*a*) in accordance with a determination that the first portion of the first body of the user has a first degree of depth conflict with the first portion of the first virtual object, displaying the first portion of the first virtual object with the first visual effect having the first magnitude (1026*b*), such as with respect to the finger of hand 912 in FIG. 9C, and in accordance with a determination that the first portion of the first body of the user has a second degree of depth conflict, different from the first degree of depth conflict, with the first portion of the first virtual object, displaying the first portion of the first virtual object with the first visual effect having a third magnitude, different from the first magnitude (1026*c*), such as with respect to the finger portion of hand 912 in FIG. 9D. In some embodiments, the first body of the user corresponds to the first hand (e.g., left hand or right hand). The first portion of the first body of the user having the second degree of depth conflict includes a higher degree of depth conflict with the first portion of the first virtual object compared to the first degree of conflict between the first portion of the first body of the user and the first portion of the first virtual object. In some embodiments, the third magnitude optionally includes a third degree of opacity that is lower than the first degree of opacity (of the first magnitude) and/or the second degree of transparency (of the second magnitude). In some embodiments, the computer system displays the respective portion of the respective virtual object with the first visual effect having the second magnitude in accordance with a determination that the second portion (e.g., of the first body) of the user has a second degree of depth conflict, different from the first degree of depth conflict, with the respective portion of the respective virtual object. In some embodiments, the second portion of the first body of the user includes a lesser degree of depth conflict with the respective portion of the respective virtual object compared to the degree of conflict between the first portion of the first body of the user and the first portion of the first virtual object. In some embodiments, the computer system displays different changes to the virtual objects (e.g., different magnitudes of visual effect) in accordance with a detected degree of depth conflict with the first and/or second portion of the first body of the user. In some embodiments, the computer system displays the respective portion of the respective virtual object with the first visual effect having the first magnitude in accordance with a determination that the first portion of a second body of the user has a first degree of depth conflict with the respective portion of the respective virtual object. In some embodiments, the second body of the user corresponds to the other hand, opposite the first hand (e.g., left hand or right hand). In some embodiments, the computer system displays the respective portion of the respective virtual object with the first visual effect having the third magnitude in accordance with a determination that the first portion of a second body of the user has the second degree of depth conflict with the respective portion of the respective virtual object. Applying a visual effect having a degree or level of magnitude to a respective portion of a respective virtual object in response to a corresponding degree of depth conflict with a portion of the body the user indicates a current location of the portion of the user, where the degree of depth conflict changes in accordance with the movement of the portion of the body of the user in the physical environment and provides feedback that the user is colliding with virtual objects and how much movement of the portion of the body of the user is needed to resolve or reduce the depth conflict with the virtual object.

In some embodiments, displaying the first portion of the first virtual object with the first visual effect having the first magnitude includes (1028*b*), in accordance with a determination that user attention is directed to the first portion of the first body of the user that has a first degree of depth conflict with the first portion of the first virtual object, displaying the first portion of the first virtual object with the first visual effect having a third magnitude, different from the first magnitude (1028*b*), such as with respect to hand 912 in FIG. 9E, and in accordance with a determination that the user attention is directed away from the first portion of the first body of the user that has the first degree of depth with the first portion of the first virtual object, displaying the first portion of the first virtual object with the first visual effect having the first magnitude (1028*c*), such as with respect to hand 912 in FIG. 9D. In some embodiments, when the computer system detects that the attention of the user is directed to the first portion of the first body of the user or detects an indication that the user wants to direct their attention to interact or engage with the first portion of the first body of the user, the computer system changes the magnitude of the visual effect (e.g., degree of opacity of the respective portion of the respective virtual object from a first degree of opacity to a second degree of opacity that is lower than the first degree of opacity and/or change the degree of transparency from a first degree to a second degree that is higher than the first degree of transparency). In some embodiments, when the computer system detects that the attention of the user is directed to a location that does not include the first portion of the first body of the user or detects an indication that the user wants to direct their attention to interact or engage with one or more virtual objects other than the respective virtual object, the degree of opacity of the respective portion of the respective virtual object remains unchanged and the visual effect with the degree of magnitude applied prior to detecting the attention of the user directed to the first portion of the first body of the user is presented. In some embodiments, when the computer system detects that the attention of the user is directed to the second portion of the first body of the user or detects an indication that the user wants to direct their attention to interact or engage with the second portion of the first body of the user, the computer system changes the degree of opacity of the first portion of the first virtual object from the first degree of opacity to the second degree of opacity that is lower than the first degree of opacity (e.g., change the degree of transparency from the first degree to the second degree that is higher than the first degree of transparency). Changing the visual effect based on the portion of the first body of the user to which attention is directed optionally has one or more of the characteristics described with reference to method 1200. In some embodiments, in accordance with a determination that user attention is directed to a first portion of a second body of the user that has a first degree of depth conflict with the respective portion of the respective virtual object, the computer system displays the respective portion of the respective virtual object with the first visual effect having the third magnitude. In some embodiments, the second body of the user corresponds to the other hand, opposite the first hand (e.g., left hand or right hand). In some embodiments, in accordance with a determination that the user attention is directed away from the first portion of the second body of the user that has the first degree of depth with the respective portion of the respective virtual object, the computer system displays the respective portion of the respective virtual object with the first visual effect having the first magnitude. Changing the magnitude of the visual effect in response to detecting that the attention of the user is directed to a portion of the first body of the user provides feedback that the computer system detects the attention of the user is being directed to the portion of the first body of the user and ensures that the portion on which the user is focused is easily visible, thereby enhancing the interaction between the user and the computer system.

In some embodiments, while displaying the first portion of the first virtual object with the first visual effect having the first magnitude applied to the first portion of the first virtual object corresponding to the respective location at which the first portion of the user is detected, the computer system detects (1030a), via the one or more input devices, the first portion of the user of the computer system moving from the respective location to a second respective location, wherein a depth of the first portion of the user relative to the first portion of the first virtual object at the respective location is different from the depth of the first portion of the user relative to the first portion of the first virtual object at the second location, such as the movement of hand 912 from FIG. 9C to FIG. 9D. In some embodiments, the depth of the first portion of the user relative to the first portion of the first virtual object at the respective location optionally corresponds to a depth shallower than, deeper than, or equal to the depth of the first portion of the first virtual object at the respective location relative to the viewpoint of the user. In some embodiments, the depth of the first portion of the user relative to the first portion of the first virtual object at the second location corresponds to a depth being deeper or shallower than the depth of the first portion of the user relative to the first portion of the first virtual object at the respective location.

In some embodiments, in response to detecting the first portion of the user at the second respective location (1030b), in accordance with a determination that the first portion of the user has the depth conflict with the first portion of the first virtual object relative to the viewpoint of the user, the computer system updates (1030c) the first portion of the first virtual object to be displayed with the first visual effect having a second magnitude applied to the first portion of the first virtual object corresponding to the second respective location at which the first portion of the user is detected, the second magnitude different from the first magnitude, such as the updated visual effect applied to the portion of object 904 that has the depth conflict with the finger portion of hand 912 from FIG. 9C to FIG. 9D. For example, if the depth of the first portion of the user relative to the first portion of the first virtual object at the second location corresponds to a depth that is more shallow than the depth of the first portion of the first virtual object at the respective location relative to the viewpoint of the user, the second magnitude optionally includes a second degree of opacity that is higher than the first degree of opacity and/or a second degree of transparency that is lower than the first degree of transparency. In some embodiments, the computer system changes the magnitude of the visual effect with which the first portion of the first virtual object is displayed in a first direction (e.g., increases the magnitude) in accordance with a determination that the depth conflict between the first portion of the first virtual object and the first portion of the user increases. In some embodiments, the computer system changes the magnitude of the visual effect with which the first portion of the first virtual object is displayed in a second direction, different from the first direction (e.g., decreases the magnitude) in accordance with a determination that the depth conflict between the first portion of the first virtual object and the first portion of the user increases. Changing the magnitude of the visual effect in response to detecting the depth of the first portion of the user relative to the respective portion of the respective virtual object at the respective location relative to the view point of the user provides feedback that the user is colliding more or less with virtual objects, thereby increasing the likelihood that the user will resolve or reduce the depth conflict with the virtual object, and reducing errors in the interaction between the user and the computer system.

In some embodiments, while displaying the first portion of the first virtual object with the first visual effect having the first magnitude applied to the first portion of the first virtual object corresponding to the respective location at which the first portion of the user is detected, wherein a degree of engagement of the first portion of the user is a first degree of engagement (e.g., as described with reference to method 1200), such as shown with respect to hand 912 in FIG. 9D, the computer system detects (1032a) the degree of engagement (e.g., frequency of user interaction and/or recency of user interaction) of the first portion of the user changing from the first degree of engagement to a second degree of engagement (e.g., as described with reference to method 1200), such as from FIG. 9D to FIG. 9E. One or more details of engagement and detecting changes of engagement of the portion of the user are described with reference to method 1200.

In some embodiments, in response to detecting the degree of engagement of the first portion of the user changing from the first degree of engagement to the second degree of engagement, the computer system displays (1032b) the first portion of the first virtual object with the first visual effect having a second magnitude, different from the first magnitude, applied to the first portion of the first virtual object corresponding to the respective location at which the first portion of the user is detected, such as the changed magnitude of the visual effect applied to the different portions of object 904 from FIG. 9D to FIG. 9E. In some embodiments, the first visual effect applied to the first portion of the first virtual object changes based on the degree of engagement. For example, the second magnitude optionally includes a second degree of opacity that is higher than the first degree of opacity and/or a second degree of transparency that is lower than the first degree of transparency. In some embodiments, the computer system displays the first visual effect with a changed magnitude (e.g., higher degree of transparency) in accordance with a determination of a changed degree of engagement (e.g., higher degree of engagement as described with reference to method 1200). In some embodiments, the computer system displays the first visual effect with a changed magnitude (e.g., lower degree of transparency) in accordance with a determination of a lower degree of engagement than the second degree of engagement. Applying a change to the visual effect having a different degree or level of magnitude to a respective portion of a respective virtual object in response to detecting user engagement reduces display clutter when the user is more engaged with the virtual objects, thereby reducing errors in interaction with the user interface.

In some embodiments, while displaying the first portion of the first virtual object, such as object 904 in FIG. 9B, the computer system detects (1034*a*), via the one or more input devices (e.g., a gaze tracking device, a hand tracking device, a remote control, one or more touch-sensitive surfaces, one or more buttons, dials, and/or knobs), a first input directed to the first portion of the first virtual object from the first portion of the user, such as from hand 912 or 914. In some embodiments, in response to detecting the first input directed to the first portion of the first virtual object, in accordance with a determination that the first input directed to the first portion of the first virtual object satisfies one or more criteria, the computer system performs (1034*b*) an operation associated with the first portion of the first virtual object, such as performing an operation in FIG. 9B in response to selection of a button in object 904. In some embodiments, the one or more criteria include a criterion that is satisfied when the computer system detects a hand air gesture/input from the user of the computer system directed to the first portion of the first virtual object to select the first portion of the first virtual object to perform the operation. In some embodiments, the first input includes an air pinch gesture while the attention of the user is directed to the first portion of the first virtual object (e.g., the index finger and thumb of the hand of the user coming together and touching at the tips). In some embodiments, the first input from the user includes a selection input (e.g., a tap, touch, or click) via the one or more input devices provided by one or more fingers of the hand of the user. The first input from the user optionally includes other types of inputs, such as trackpad inputs (e.g., finger touching a trackpad) or an input device input (e.g., selection via a handheld input device, such as a stylus or remote control). In some embodiments, the first input is an attention-only and/or gaze-only input (e.g., not including input from one or more portions of the user other than those portions providing the attention input), where the attention of the user is directed to the first portion of the first virtual object for longer than a time threshold. In some embodiments, the operation associated with the first portion of the first virtual object includes displaying content, displaying a webpage, displaying another virtual object, playing multimedia, launching an application, providing a menu, installing a program, scrolling through the first virtual object, moving the first virtual object or downloading content. Performing the operation in response to the user input directed to the first portion of the first virtual object provides efficient interaction with virtual objects.

In some embodiments, while displaying the first portion of the first virtual object with the first visual effect having the first magnitude applied to the first portion of the first virtual object corresponding to the respective location at which the first portion of the user is detected, wherein an amount of light within a physical environment of the user is a first amount of light (e.g., detected by a light sensor in communication with the computer system), such as the visual effect applied to object 904 in FIG. 9C, the computer system detects (1036*a*), via the one or more input devices, a second amount of light within the physical environment of the user, such as if the amount of light from FIG. 9C changes. In some embodiments, in response to detecting the second amount of light within the physical environment (1036*b*), in accordance with a determination that the second amount of light within the physical environment satisfies one or more low-light criteria (or time of day requirement), the computer system ceases (1036*c*) to apply the first visual effect having the first magnitude to the first portion of the first virtual object corresponding to the respective location at which the first portion of the user is detected, such as ceases to display object 904 in FIG. 9C with the visual effect, even if hand 912 remains in conflict with object 904. In some embodiments, the one or more low-light criteria is satisfied if the computer system's light sensor determines there is not sufficient light to capture with a predetermined degree of accuracy the first portion of the user (e.g., 0, 5, 10, 50, or 100 lux). In some embodiments, the time-of-day requirement is satisfied if the current time of day is (optionally 30 minutes, 45 minutes, 1 hour, or 2 hours) before sunrise and/or (optionally 30 minutes, 45 minutes, 1 hour, or 2 hours) after sunset. In some embodiments, while the computer device detects a low-light physical environment (e.g., average lumen output below a luminous threshold value (e.g., 5, 10, 15, 20, 25, 50, 60, 70, 80, 100, 125, 150, or 200 lumens)), visual effects including the first visual effect are disabled. Even so, the computer system is optionally configured to continue to monitor the first portion of the user and depth conflicts with virtual objects. In some embodiments, in accordance with a determination that the second amount of light within the physical environment does not satisfy the one or more low-light criteria, the computer system continues to display the first portion of the first virtual object with the first visual effect having the first magnitude. Ceasing to apply the first visual effect in response to a low-light physical environment reduces errors in the interaction between the user and the computer system, and reduces inputs needed to correct such errors.

In some embodiments, before detecting the first portion of the user at the respective location and before applying the first visual effect having the first magnitude to the first portion of the first virtual object, the first portion of the first virtual object is displayed with a first alpha value (1038*a*), such as with respect to object 904 in FIG. 9B, and applying the first visual effect having the first magnitude to the first portion of the first virtual object includes displaying (1038*b*) the first portion of the first virtual object with a second alpha value, different from the first alpha value, corresponding to an extent to which the first visual effect having the first magnitude is applied to the first portion of the first virtual object, wherein the first portion of the first virtual object corresponds to an area of the first virtual object occupied by the first portion of the user at the respective location, such as with respect to the portion of object 904 that has the depth conflict with the finger portion of hand 912 in FIG. 9C. In some embodiments, the way the visual effect is applied to the first (or other portions) of the virtual object is by the computer system applying different alpha values to the area and/or volume of the first portion of the user consumed in the user interface and/or three-dimensional environment. If the first visual effect is determined to have a higher magnitude, the computer system optionally applies a higher alpha value to the area and/or volume consumed by the first portion of the user, and if the first visual effect is determined to have a lower magnitude, the computer system optionally applies a lower alpha value to the area and/or volume consumed by the first portion of the user. In this way, virtual content (or portions of virtual content) that occupy the area and/or volume consumed by the hand of the user are displayed with more transparency within that area and/or volume. Changing the extent to which the visual effect is applied to the virtual object by changing an alpha value provides a quick and efficient means for manipulating the degree of transparency of a virtual object, which additionally reduces power usage of the computer system.

In some embodiments, while displaying the first portion of the first virtual object with the first visual effect having the first magnitude applied to the first portion of the first virtual object corresponding to the respective location at which the first portion of the user is detected, such as with respect to hand 912 in FIG. 9F, the computer system detects (1040*a*), via the one or more input devices, the first portion of the user of the computer system moving from the respective location to a second respective location corresponding to lateral movement (e.g., in physical space, substantially straight, and/or along an x-y plane) away from the first portion of the first virtual object, such as the movement of hand 912 from FIG. 9F to FIGS. 9H and 9H-1 (e.g., movement that moves more than a threshold amount (e.g., 1, 3, 5, 10, 100, 1000 or 10000 cm) in a direction orthogonal to the viewpoint of the user such as lateral relative to the viewpoint of the user, and less than the threshold amount in a direction parallel to the viewpoint of the user such as towards or away from the viewpoint of the user).

In some embodiments, in response to detecting the first portion of the user at the second respective location (1040*b*), in accordance with a determination that the first portion of the user no longer has the depth conflict with the first portion of the first virtual object relative to the viewpoint of the user, the computer system updates (1040*c*) the first portion of the first virtual object to no longer have the first visual effect having the first magnitude applied to the first portion of the first virtual object, such as show with respect to object 904 and the finger portion of hand 912 in FIGS. 9H and 9H-1. In some embodiments, updating the first portion of the first virtual object to no longer have the first visual effect having the first magnitude includes changing the first visual effect from the first magnitude to a second magnitude (e.g., from lower opacity of the first portion of the first virtual object to higher opacity or lower opacity of the first portion of the first virtual object depending on the current depth conflict of the first portion of the user with the first portion of the first virtual object). In some embodiments, updating the first portion of the first virtual object to no longer have the first visual effect having the first magnitude includes returning the first portion of the first virtual object to an appearance prior to applying the first visual effect having the first magnitude (e.g., the first portion of the first virtual object no longer has the first visual effect applied to it). In some embodiments, the computer system continues to display the first portion of the first virtual object having the first visual effect with the first magnitude in accordance with a determination that the first portion of the user continues to have the depth conflict with the first portion of the first virtual object relative to the viewpoint of the user. Applying a change to the visual effect in response to detecting that the portion of the user is moving in a lateral direction away from a respective portion of a respective virtual object provides feedback that the user is changing or reducing the depth conflict between the portion of the user and the respective virtual object, thereby providing feedback on how to reduce or resolve the conflict.

In some embodiments, while displaying the first portion of the first virtual object, the computer system detects, via the one or more input devices, a first input (e.g., a direct input or an indirect input) directed to the first portion of the first virtual object from a respective portion of the user (e.g., the first portion of the user or a second portion of the user), such as an input directed to a button in object 904. In some embodiments, the first input corresponds to the first input described in step(s) 1034. In some embodiments, the respective portion of the user corresponds to the user's right or left hand, arm, palm, and/or one or more fingers of the right hand or left hand.

In some embodiments, in response to detecting the first input directed to the first portion of the first virtual object (1042*b*), in accordance with a determination that the first portion of the first virtual object is displayed with the first visual effect that indicates that the first portion of the first virtual object has a depth conflict with the respective portion of the user, such as shown with respect to object 904 in FIG. 9C (e.g., in accordance with a determination that a portion of the user (e.g., the respective portion or a different portion of the user) has a depth conflict with the first portion of the first virtual object), the computer system forgoes (1042*c*) performing an operation associated with the first portion of the first virtual object, such as not allowing interaction with the portion of object 904 that has the depth conflict with the finger portion of hand 912 in FIG. 9C. In some embodiments, in accordance with a determination that the first portion of the first virtual object is not displayed with the first visual effect that indicates that the first portion of the first virtual object has a depth conflict with the respective portion of the user (e.g., because a portion of the user does not have (e.g., no portion of the user has) a depth conflict with the first portion of the first virtual object), the computer system performs (1042*d*) an operation associated with the first portion of the first virtual object, such as allowing interaction with portions of object 904 other than the portion of object 904 that has the depth conflict with the finger portion of hand 912 in FIG. 9C. For example, because no portion of the user has a depth conflict with the first portion of the first virtual object, the first portion of the first virtual object is optionally visible behind, in front of and/or through the first portion of the user, and/or the first portion of the first virtual object is not displayed with the (or any) translucency as described above. In this example, the first portion of the first virtual object is interactable (e.g., selectable) by the first input to perform the operation. Foregoing performing an operation associated with a respective portion of a respective virtual object when the respective portion includes a visual effect in response to input from a portion of the user reduces errors in the interaction between the user and the computer system and reducing inputs needed to correct such errors.

In some embodiments, while detecting movement of the first portion of the user to the respective location and before applying the first visual effect having the first magnitude to the first portion of the first virtual object in accordance with the determination that the first portion of the user has the depth conflict with the first portion of the first virtual object relative to the viewpoint of the user (1044*a*), such as the movement of hand 914 from FIG. 9A to FIG. 9B, the computer system moves (1044*b*) the first virtual object within the three-dimensional environment based on a first portion of the movement of the first portion of the user at the respective location to avoid the depth conflict between the first portion of the first virtual object and the first portion of the user until the movement of the first portion of the user towards the first portion of the first virtual object exceeds a threshold movement (e.g., as described in method 800), such as the movement of object 904 from FIG. 9A to FIG. 9B.

In some embodiments, in response to the movement of the first portion of the user towards the first portion of the first virtual object exceeding (and/or meeting) the threshold movement (1044*c*), the computer system ceases (1044*d*) moving the virtual object within the three-dimensional environment (e.g., as described in method 800), such as ceasing movement of object 904 in FIG. 9B, and the computer system applies (1044*e*) the first visual effect having the first magnitude to the first portion of the first virtual object in accordance with the determination that the first portion of the user has the depth conflict with the first portion of the first virtual object relative to the viewpoint of the user (e.g., as described in step(s) 1002), such as applying the visual effect to object 904 in FIG. 9C. Moving an object in a three-dimensional environment when the object contacts a portion of the user based on movement of the user in the three-dimensional environment provides feedback that the user is colliding with virtual objects while avoiding reducing visibility of the object, thereby increasing the likelihood that the user will resolve or reduce the depth conflict with the virtual object, and reducing errors in the interaction between the user and the computer system.

It should be understood that the particular order in which the operations in method 1000 have been described is merely exemplary and is not intended to indicate that the described order is the only order in which the operations could be performed. One of ordinary skill in the art would recognize various ways to reorder the operations described herein.

FIGS. 11A-11G illustrate examples of a computer system mitigating depth conflicts with one or more virtual objects in a three-dimensional environment based on levels of engagement in accordance with some embodiments.

Figure 11A:
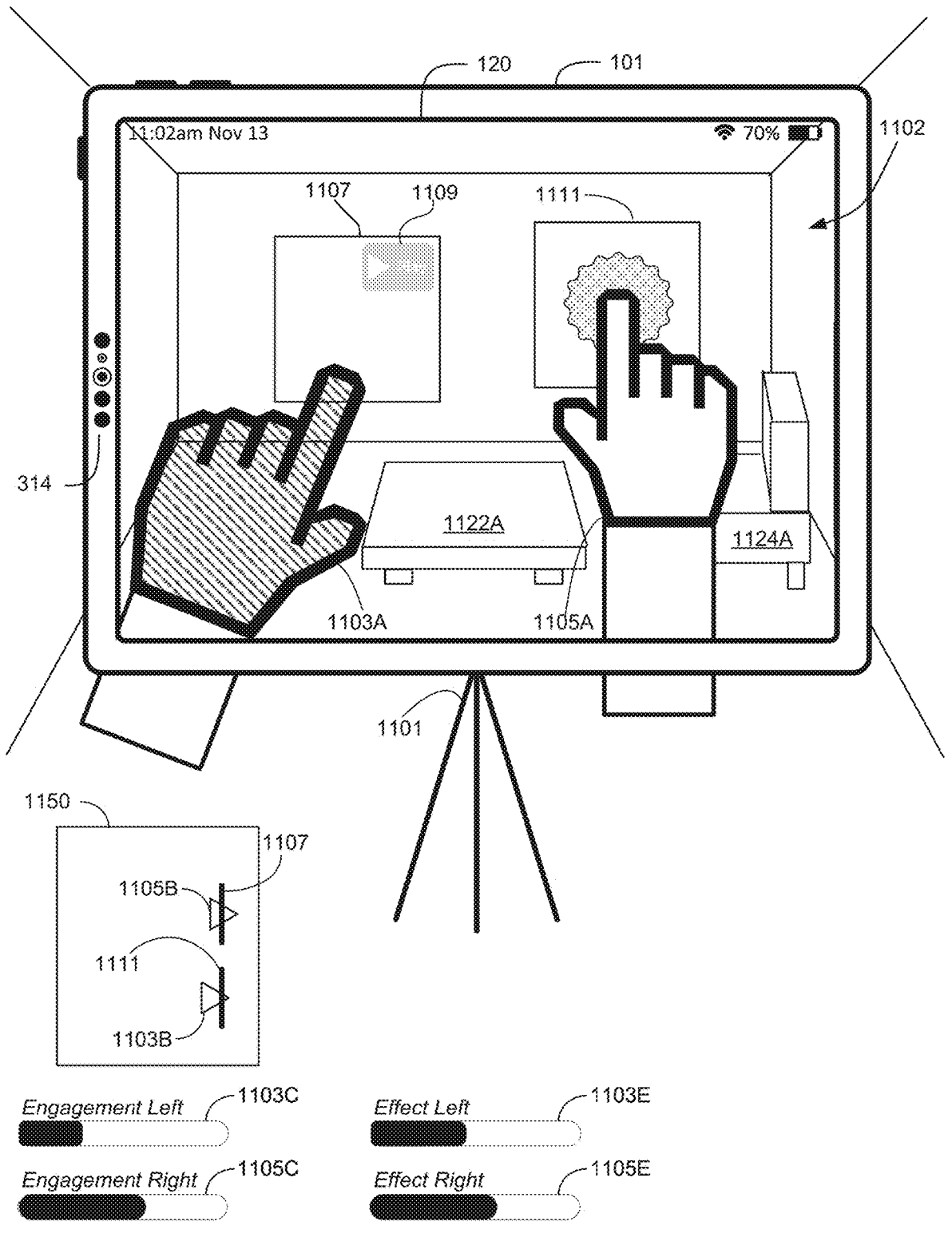
FIGS. 11A-11G illustrate examples of a computer system facilitating depth conflict mitigation for one or more virtual objects in accordance with user engagement in a three-dimensional environment in accordance with some embodiments.
Figure 11B:
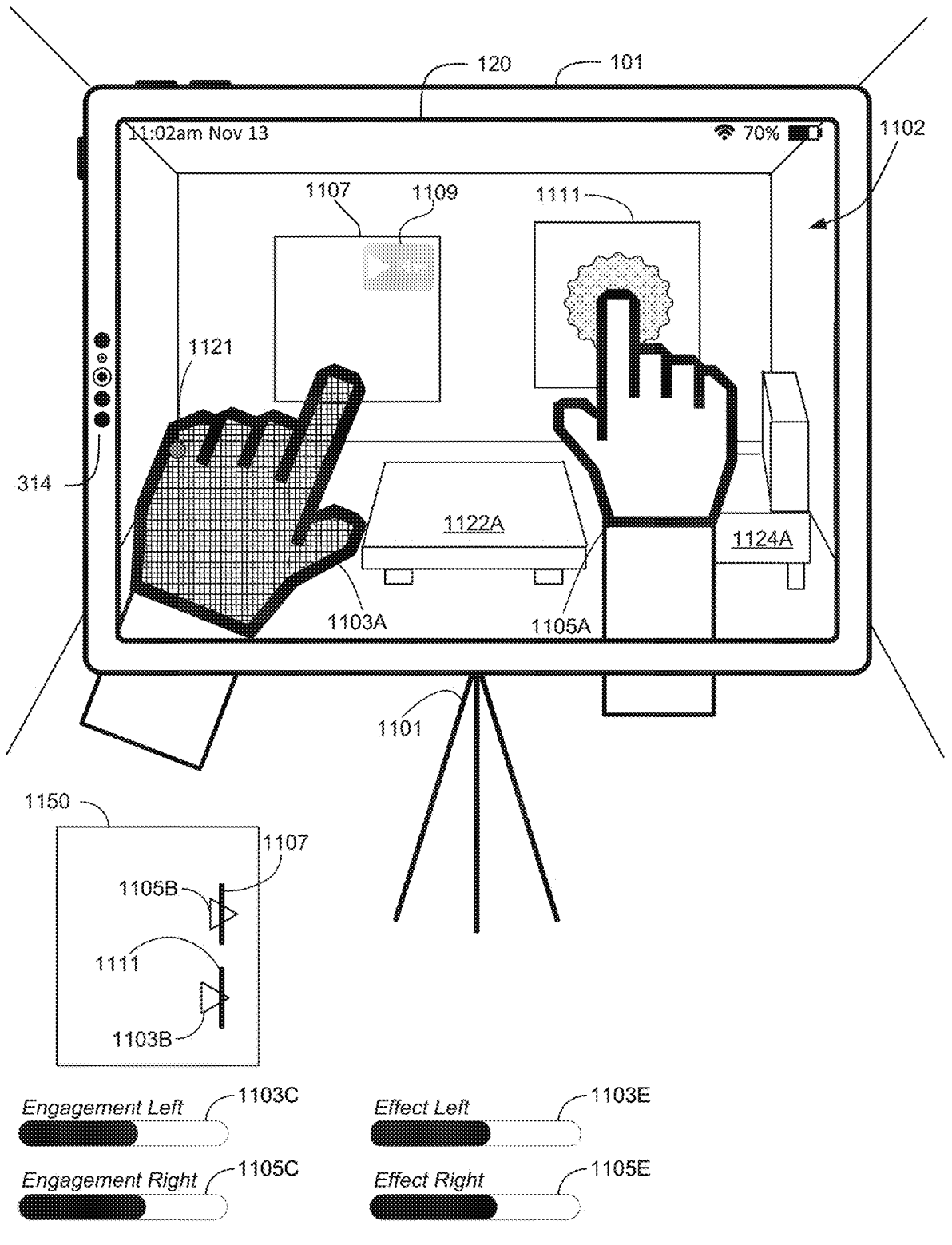
Figures 1, 11B:
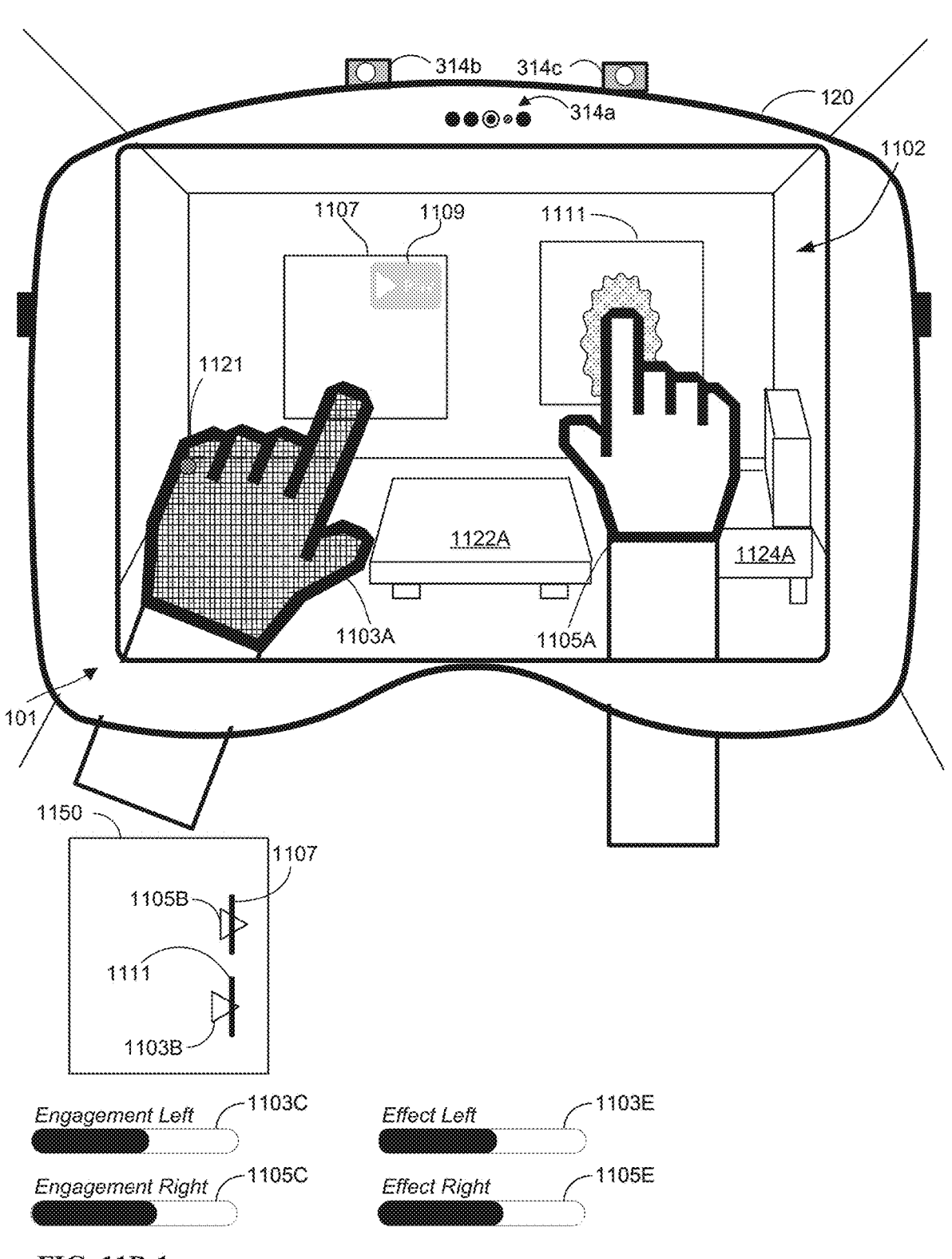

FIG. 11A illustrates a computer system 101 mounted on a tripod 1101 displaying, via a display generation component (e.g., display generation component 120 of FIG. 1), a three-dimensional environment 1102 from a viewpoint of user of the computer system. As described above with reference to FIGS. 1-6, the computer system 101 optionally includes a display generation component (e.g., a touch screen) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIG. 11A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1102 or portions of the physical environment are visible via the display generation component 120 of computer system 101. For example, three-dimensional environment 1102 includes portions of the left and right walls, the ceiling, and the floor in the physical environment of the user. In FIG. 11A, three-dimensional environment 1102 also includes real world objects. For example, table 1122A and couch 1124 are objects that exist in the user's physical environment and are visible via the display generation component of computer system 101.

In FIG. 11A, three-dimensional environment 1102 also includes virtual content, such as virtual content 1107 and virtual content 1111. Virtual content 1107 and virtual content

1111 are optionally one or more of a user interface of an application (e.g., messaging user interface, or content browsing user interface), a three-dimensional object (e.g., virtual clock, virtual ball, or virtual car), a virtual environment (e.g., an immersive visual experience entirely or nearly entirely comprising virtual content) or any other element displayed by computer system 101 that is not included in the physical environment of computer system 101.

It is understood that description of a visual effect "applied with respect to" a portion of the user's body (e.g., a hand, a finger included in a hand, and/or a palm of a hand) optionally corresponds to embodiments where a visual effect optionally is applied to a respective portion of virtual content that optionally has a visual depth conflict with such a portion of the user's body, and optionally corresponds to embodiments where a visual effect is additionally or alternatively applied to a visual representation (e.g., a digital representation) of the portion of the user's body. For example, computer system 101 optionally detects a visual depth conflict of a finger with a portion of a virtual window including virtual content. In response to detecting the visual depth conflict, computer system optionally reduces visual prominence of the respective virtual content at a location corresponding to the location of the finger relative to the user's current viewpoint (e.g., the portion of the virtual window increases in translucency at a location where the finger overlaps with the portion relative to the user's current field of view). Additionally or alternatively, if the representation of the user's hand is a digital representation such as an animated graphical representation of the user's hand emulating the hand's appearance and orientation, computer system 101 optionally decreases an opacity (e.g., increases a translucency) of the representation of the user's finger and/or the user's hand.

As referred to herein, a depth conflict and/or a visual depth conflict refers to visual conflicts of respective portions of the user's body (e.g., hands) and virtual content relative to a point of view of a user of computer system 101. It should be understood that when a virtual object is being described as intersecting with and/or contacting a portion of the user (e.g., a hand of the user), the intersection is a virtual intersection that describes an apparent spatial or depth conflict that would occur if the virtual object were displayed at a respective location relative to the portion of the user. As an example, a depth conflict optionally includes situations in which virtual content, such as a virtual application user interface, optionally is displayed at a position in an environment (e.g., a VR and/or XR environment) that is between a respective portion of the user (e.g., a user's hand) and the user's viewpoint. As referred to herein, virtual content "intersecting" the respective portion of the user relative to the user's viewpoint optionally is analogous to situations in which a real world object having a same size and position of the virtual content were placed between and intersecting with the respective portion of the user's body relative to the user's viewpoint. For example if a real world block was optionally obscuring and immediately in front of the user's hand, the real world block would present a visual depth conflict with the hand and intersect with the hand. Similarly, if computer system 101 optionally displayed a virtual block at a virtual position in an environment optionally obscuring and intersecting with the user's hand, the virtual block would similarly present a visual depth conflict with the hand. Embodiments described herein are directed to mitigating such visual depth conflicts, allowing the user to gain intuition as to their body relative to virtual content while simultaneously continuing to view portions of the virtual content, thereby guiding them to resolve/mitigate such depth conflicts. In some embodiments, in accordance with a determination that a respective hand is greater than a threshold distance (e.g., 0.01, 0.05 0.1, 0.5, 1, 5, 10, 15, 25, 50, or 100 m) away from respective virtual content, the computer system forgoes application of a visual effect to a portion of the respective virtual content, even if attention of the user is directed to the respective hand.

In some embodiments, the visual effects described with respect to FIGS. 7 and/or 9 and methods 800 and/or 1000, respectively, are applied with respect to hand 1103A and/or hand 1105A to resolve and mitigate visual depth conflicts. In some embodiments, such effects are respectively applied with respect to one or more of the hands. For example, a modification of visual prominence described with respect to FIGS. 7A-7H optionally is applied to portion(s) of virtual content visually conflicting with multiple portions of the user's body to mitigate visual depth conflicts. Similarly, the translucency visual effects described with respect to FIGS. 9A-9H optionally are applied to a portion of respective virtual content visually conflicting with multiple portions of the user's body to mitigate depth conflicts. Although illustrated in the alternative, it is understood that the visual effects optionally apply to depth conflicts caused by both hands, a single hand, and/or neither hand. For example, computer system 101 optionally applies translucency effects to virtual content visually conflicting with the right hand and the left hand, just the right hand, just the left hand, and/or neither the right nor the left hand.

In FIG. 11A, legend 1150 illustrates a profile view of the respective hands relative to the respective virtual content. Hand 1103A (corresponding to the hand 1103B in legend 1150) is depicted with a first respective depth with respect to virtual content 1107, and hand 1105A (corresponding to hand 1105B in legend 1150) is depicted with a second respective depth relative to virtual content 1111. In some embodiments, computer system 101 maintains and/or determines respective levels of engagement for the respective hands. Engagement 1103C, for example, corresponds to the level of engagement assigned to and/or detected as corresponding to hand 1103A. The computer system 101 optionally applies a magnitude of visual effect with respect to a respective hand based on the detected level of engagement. For example, the effect 1103E illustrates a first magnitude of visual effect (e.g., a translucency effect) applied to virtual content conflicting with hand 1103A based on the engagement 1103C. Similarly, right engagement 1105C reflects the level of engagement assigned to and/or detected with respect to right hand 1105A, and effect right 1105E illustrates a second magnitude of visual effect (e.g., reducing in visual prominence of respective virtual content) based on the right hand engagement 1105C.

In some embodiments, the computer system 101 assigns a shared level of engagement to the respective portions of the user's body (e.g., hand 1103A and hand 1105A). Thus, in some embodiments, despite a difference in respective depths of respective portions of the user relative to virtual content, the respective visual effects applied with respect to the respective portions of the user's body (e.g., hands) optionally are the same magnitude. In some embodiments, the computer system 101 assigns distinct levels of engagement to the respective portions of the user's body. In some embodiments, the magnitude of an applied visual effect is proportional (e.g., directly, inversely, and/or non-linearly proportional) to the level of engagement associated with a respective portion of the user's body (e.g., the corresponding hand).

In FIG. 11A, computer system 101 detects hand 1103A intersects with virtual content 1107 and hand 1105A intersects with virtual content 1111. To mitigate the respective depth conflicts, computer system 101 optionally applies a visual effect with respect to the respective hands. For example, a portion of virtual content 1107 is optionally displayed with a first translucency, corresponding to a first level of visual prominence with respect to hand 1103A. Similarly, computer system 101 optionally ceases display of a portion of virtual content 1111 with respect to hand 1105A, where a size of the portion of virtual content optionally corresponds to a second level of visual prominence with respect to hand 1105A. Thus, computer system 101 optionally indicates a degree of intersection of the user's hand with virtual content by modifying visual prominence of the virtual content, thereby providing feedback for mitigating the amount of the intersection while maintaining visibility of other portions of virtual content not subject to reduction in visual prominence.

As described previously, computer system 101 optionally determines a level of engagement with respect to respective hands of the user, and optionally modifies visual effects (e.g., modification of visual prominence including modifying translucency and/or ceasing display of virtual content) at least partially based on the level of engagement. For example, in addition to the depth of intersection of hand 1105A with virtual content 1111, computer system 101 optionally determines that hand 1105A is relatively close to a respective portion of virtual content 1111 (e.g., a center, a top, or a bottom), and optionally assigns a respective level of visual effect based on engagement 1105C. Additionally, computer system 101 detects that hand 1103A is relatively far away from a respective portion of virtual content 1107 (e.g., a center, a top, or a bottom), and thus assigns a respective level of engagement 1103C based on that spatial relationship. As described in further detail below and with reference to method 1200, in some embodiments, additional or alternative factors are included in determining and/or assigning engagement to one or more respective hands of the user.

In FIG. 11B, the computer system 101 detects attention of the user shift toward the hand 1103A, as indicated by attention indicator 1121 while the hands maintain the same spatial relationship (e.g., lateral and depth relationship) relative to virtual content 1107 and 1111 shown in FIG. 11A. In response to the attention shifting toward hand 1103A, in FIG. 11B, the computer system 101 increases the level of engagement assigned to hand 1103A, as reflected by the relative increase in engagement 1103C and visual effect right 1103E. As shown in legend 1150, engagement 1103C is equal, or nearly equal, to engagement 1105C despite the relatively greater depth conflict between the hand 1105A and virtual content 1111, because the attention of the user is directed to hand 1103A. In some embodiments, computer system 101 modifies the magnitude of the visual effect in accordance with the level of engagement. For example, engagement 1103C shares a nearly linearly proportional relationship with a magnitude of visual effect applied to virtual content visually conflicting with a respective portion of hand 1103A. In some embodiments, the visual effect is applied at respective portions of virtual content that conflict with respective portions of the hand. For example, a portion of the virtual content displayed at a location that would obscure a finger of the user (e.g., if the virtual content was fully opaque) optionally is displayed with a visual effect (e.g., a translucency, a ceasing display of respective content, and/or modifying colors of the respective content) to mitigate the depth conflict at the location of the finger.

In some embodiments, if the finger meets one or more criteria, such as a criterion satisfied when attention of the user is directed to the finger and/or hand 1103A that includes the finger, computer system 101 increases a magnitude of the displayed the visual effect (e.g., due to assigning increased engagement with hand 1103A due to the attention). The visual effect, for example, optionally is an increase in translucency of the portion of the virtual content having a similar size and/or shape of the finger, such that the finger of the user becomes at least partially visible through the virtual content. In some embodiments, the visual effect is applied to multiple portions of the virtual content with respect to locations corresponding to multiple portions of the user's body visually conflicting with the multiple portions of the virtual content in response to detecting attention directed to a respective portion of the virtual content that a respective portion of the user's body. For example, the computer system optionally applies a translucency effect at multiple portions of the virtual content with respect to multiple fingers of the user. Thus, in some embodiments, computer system 101 bolsters the degree to which a visual effect is applied at a location corresponding to a hand of the user in accordance with attention of the user. In some embodiments, computer system 101 maintains engagement 1105C and a magnitude of visual effect 1105E in accordance with a determination that hand 1105C has maintained a spatial relationship with respect to virtual content 1111 and/or is not a target of the user's attention. As described in method 1200, in some embodiments, additional factors can modify the level of engagement that is assigned to a respective hand in addition or in the alternative to as shown in FIG. 11B.

In some embodiments, in response to detecting attention of the user shift from a first respective portion of the user's body (e.g., a first finger of a hand) to a second respective portion of the user's body, wherein the first and the second respective portions of the user's body present a visual depth conflict with the same respective virtual content, computer system 101 optionally maintains the level of engagement and corresponding magnitude of visual effect. For example, computer system 101 optionally detects the user's attention shift from an index finger to a thumb of hand 1103A, both of which optionally present a depth conflict, and the computer system optionally maintains the level of engagement assigned to hand 1103A, despite the user's attention briefly shifting toward interstitial space between the fingers (e.g., to a space that does not include the user's body).

FIG. 11B-1 illustrates similar and/or the same concepts as those shown in FIG. 11B (with many of the same reference numbers). It is understood that unless indicated below, elements shown in FIG. 11B-1 that have the same reference numbers as elements shown in FIGS. 11A-11B have one or more or all of the same characteristics. FIG. 11B-1 includes computer system 101, which includes (or is the same as) display generation component 120. In some embodiments, computer system 101 and display generation component 120 have one or more of the characteristics of computer system 101 shown in FIGS. 11B and 11A-11G and display generation component 120 shown in FIGS. 1 and 3, respectively, and in some embodiments, computer system 101 and display generation component 120 shown in FIGS. 11A-11G have one or more of the characteristics of computer system 101 and display generation component 120 shown in FIG. 11B-1.

In FIG. 11B-1, display generation component 120 includes one or more internal image sensors 314a oriented towards the face of the user (e.g., eye tracking cameras 540 described with reference to FIG. 5). In some embodiments, internal image sensors 314a are used for eye tracking (e.g., detecting a gaze of the user). Internal image sensors 314a are optionally arranged on the left and right portions of display generation component 120 to enable eye tracking of the user's left and right eyes. Display generation component 120 also includes external image sensors 314b and 314c facing outwards from the user to detect and/or capture the physical environment and/or movements of the user's hands. In some embodiments, image sensors 314a, 314b, and 314c have one or more of the characteristics of image sensors 314 described with reference to FIGS. 11A-11G.

In FIG. 11B-1, display generation component 120 is illustrated as displaying content that optionally corresponds to the content that is described as being displayed and/or visible via display generation component 120 with reference to FIGS. 11A-11B. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 11B-1.

Display generation component 120 has a field of view (e.g., a field of view captured by external image sensors 314b and 314c and/or visible to the user via display generation component 120, indicated by dashed lines in the overhead view) that corresponds to the content shown in FIG. 11B-1. Because display generation component 120 is optionally a head-mounted device, the field of view of display generation component 120 is optionally the same as or similar to the field of view of the user.

In FIG. 11B-1, the user is depicted as performing an air pinch gesture (e.g., with hand 1103A or hand 1105A) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 11A-11G.

In some embodiments, computer system 101 responds to user inputs as described with reference to FIGS. 11A-11G.

In the example of FIG. 11B-1, because the user's hand is within the field of view of display generation component 120, it is visible within the three-dimensional environment. That is, the user can optionally see, in the three-dimensional environment, any portion of their own body that is within the field of view of display generation component 120. Further, as described herein, the size and/or shape of the portion of object 1111 whose visual appearance is modified due to conflict with hand 1105A is based on the size and/or shape of the portion of hand 1105A that has the conflict with object 1111. For example, in FIG. 11B-1, the portion of object 1111 is elongated and oriented corresponding to the size, shape and/or orientation of the finger of hand 1105A that has the conflict with object 1111. It is understood than one or more or all aspects of the present disclosure as shown in, or described with reference to FIGS. 11A-11G and/or described with reference to the corresponding method(s) are optionally implemented on computer system 101 and display generation unit 120 in a manner similar or analogous to that shown in FIG. 11B-1.

Figure 11C:
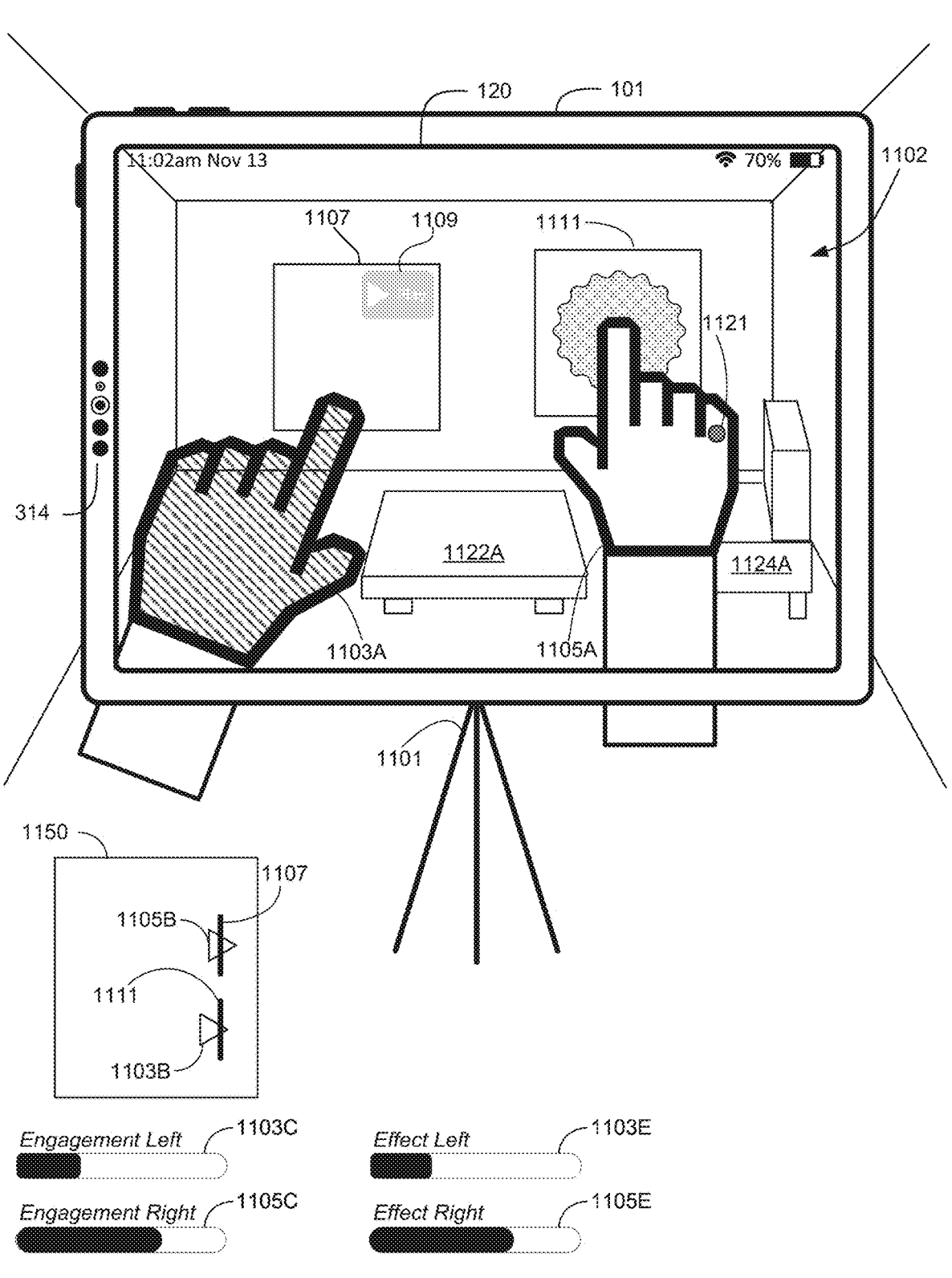

In FIG. 11C, the computer system 101 detects attention of the user shift away from the hand 1103A and toward hand 1105A.

In response to the attention shifting away from the hand 1103A, computer system 101 optionally decreases the level of engagement assigned to hand 1103A. In some embodiments, the attention shifting away from hand 1103A includes detecting the attention shift away from a respective point or portion of hand 1103A. For example, the computer system 101 optionally determines a center of the portion of the user's body that has a depth conflict with virtual content (e.g., the center of a fingertip visually conflicting with virtual content), and optionally decreases the level of engagement assigned to hand 1103A if attention of the user strays from the center of the portion of the user's body. In some embodiments, the assigning of a level of engagement is insensitive to shifts in attention away from a respective point or portion of a respective hand visually conflicting with virtual content if the attention shifts to a second respective point or portion of the user's hand that also conflicts with virtual content. For example, a finger of a user optionally has a visual depth conflict with virtual content, and a level of engagement assigned to the hand including the finger is maintained in response to attention of the user optionally shifting from a tip of the finger to a knuckle of the finger.

In some embodiments, in response to the attention 1121 shifting away from hand 1103A to hand 1105A in FIG. 11C, the corresponding magnitude of visual effect applied with respect to hand 1103A decreases in accordance with the level of engagement as described previously. In response to the attention 1121 shifting toward the hand 1105A in FIG. 11C, the level of engagement and corresponding magnitude of visual effect applied to virtual content conflicting with hand 1105A increases, similarly as described with respect to hand 1103A in FIG. 11B.

Figure 11D:
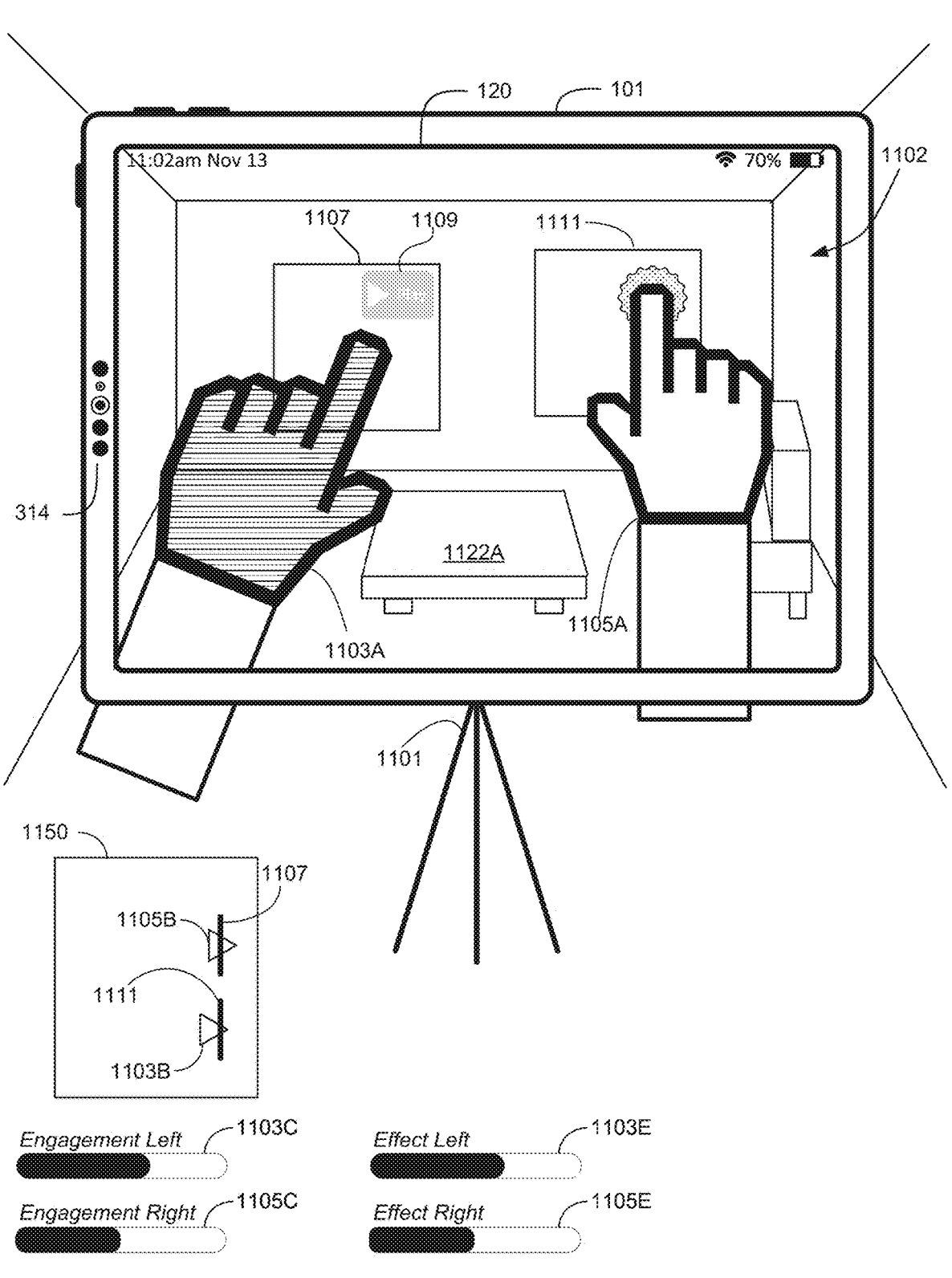

In FIG. 11D, the hands 1103A, 1105A of the user shift within a plane parallel to respective virtual content (e.g., while maintaining respective depths relative to the virtual content). In some embodiments, the level of engagement assigned to a respective portion of the body is at least partially based on a position of the hands relative to the virtual content (e.g., relative to the center point of the virtual content and/or other virtual content, such as interactable content). For example, in FIG. 11D, hand 1103A shifts from a lower edge of virtual content 1107 toward the center of virtual content 1107 and/or toward a virtual button 1109 (e.g., the interactable content) within virtual content 1107. In response to such a shift, computer system 101 optionally increases engagement 1103C because hand 1103A is closer to a particular portion of the virtual content 1107 (e.g., the center, the top, or the bottom) and/or because hand 1103A is closer to the virtual button 1109. In some embodiments, the computer system 101 forgoes modification of engagement in response to detecting a hand shift toward respective virtual content. For example, although not shown, virtual content 1107 optionally includes non-interactable content (e.g., a system clock, a battery indicator, and/or an icon representing network connectivity) that computer system 101 optionally does not treat as a reference point for modifying a level of engagement, and in response to detecting hand 1103A shift toward the non-interactable content, computer system 101 optionally does not increase engagement based on the shift toward the non-interactable content. In some embodiments, computer system 101 increases or decreases levels of engagement based on hand proximity to a plurality of portions of virtual content. For example, because hand 1103A is shifting toward the center of virtual content 1107 and toward virtual button 1109, computer system 101 optionally increases engagement 1103C more than if hand 1103A had shifted toward the center of virtual content when virtual button 1109 was not present, and similarly, more than if hand 1103A shifted toward the virtual button 1109 while not shifting toward the center of virtual content 1107.

Relative to as illustrated in FIG. 11C, in FIG. 11D, hand 1105A shifts away from a center of virtual content 1111, and computer system 101 decreases engagement 1105C assigned to hand 1105A accordingly. Additionally, attention of the user is no longer directed to hand 1105A, and engagement 1105C optionally decreases in response to attention shifting away from hand 1105A. In FIG. 11D, magnitudes of visual effects applied at respective locations of respective virtual content visually conflicting with hand 1103A and hand 1105A are modified in accordance with the modified level of engagement. For example, a magnitude of effect 1103E applied with respect to hand 1103A optionally is increased and a magnitude of effect 1105E applied with respect to hand 1105A optionally is decreased.

Figure 11E:
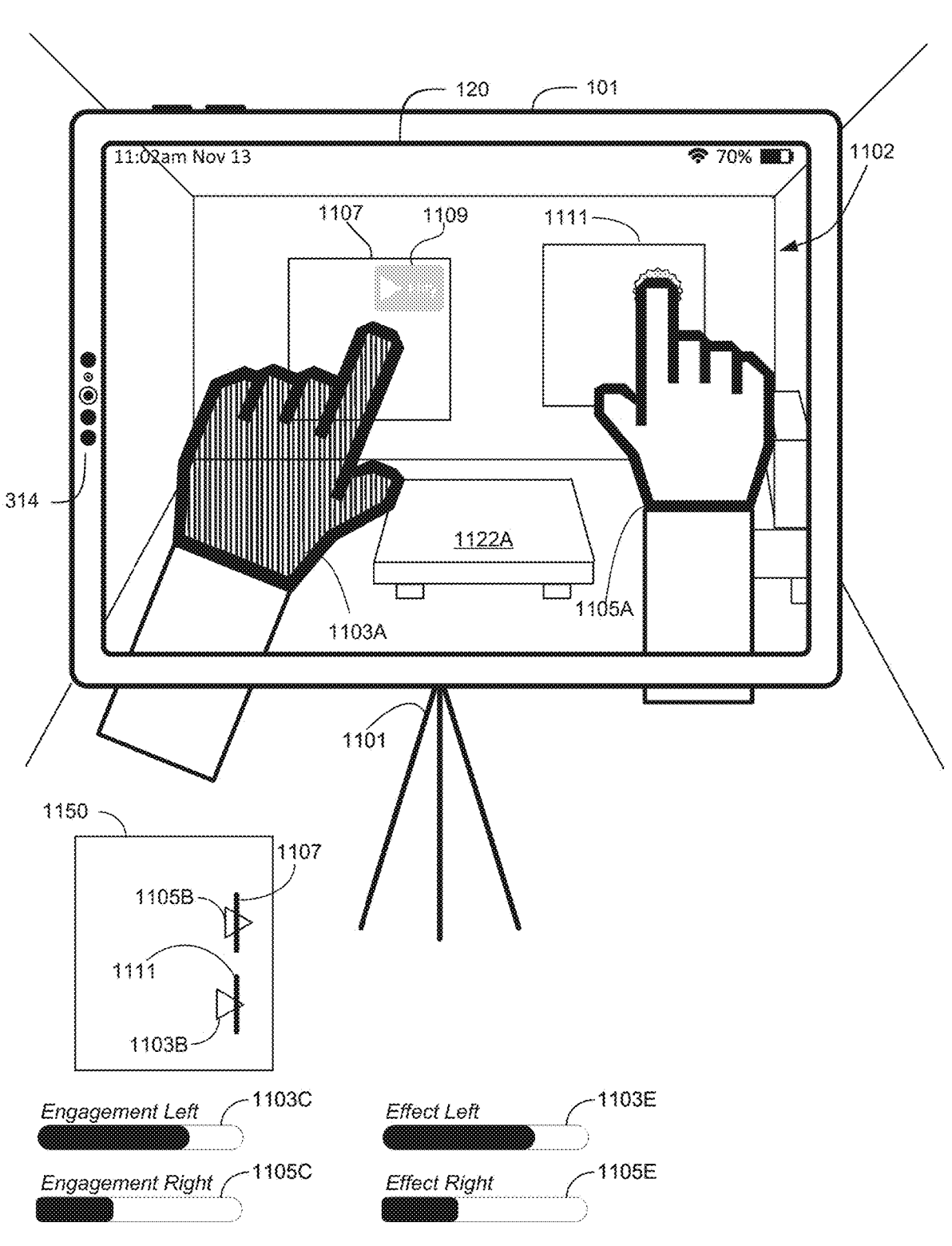

In FIG. 11E, the viewpoint of the user shifts to the left relative to virtual content 1107 and virtual content 1111 and hands 1103A and 1105A. Despite the shift in viewpoint, the positions of hand 1103A and hand 1105A relative to each other, and relative to virtual content 1107 and 1111, are maintained. For example, hand 1103A optionally remains near a center of virtual content 1107 and/or near virtual button 1109, and hand 1105A optionally remains near an upper right corner (e.g., away from the center) of virtual content 1111. In some embodiments, computer system 101 modifies the level of engagement assigned to respective hands based on a current viewpoint of the user. For example, computer system 101 detects that hand 1103A is relatively closer to a respective portion of the user's viewpoint, such as a center of the user's viewpoint (e.g., a "viewpoint center"), as a result of the leftward movement of the viewpoint of the user, and accordingly increases the engagement assigned to hand 1103A. In contrast, as a result of the leftward shift in the viewpoint of the user, hand 1105A becomes relatively further away from the viewpoint center. Accordingly, computer system 101 decreases engagement 1105C assigned to hand 1105.

In some embodiments, computer system 101 detects movement of the viewpoint of the user vertically, and similarly modifies engagement assigned to respective portions of the user in accordance with the relative positions of respective portions relative to the virtual content and/or the viewpoint of the user. For example, while a depth of hand 1103A relative to virtual content 1107 is maintained, computer system 101 detects the user's viewpoint shift downward, and in response to the downward shift, optionally decreases engagement 1103C (e.g., because hand 1103A is relatively further away from a center of the user's viewpoint).

Figure 11F:
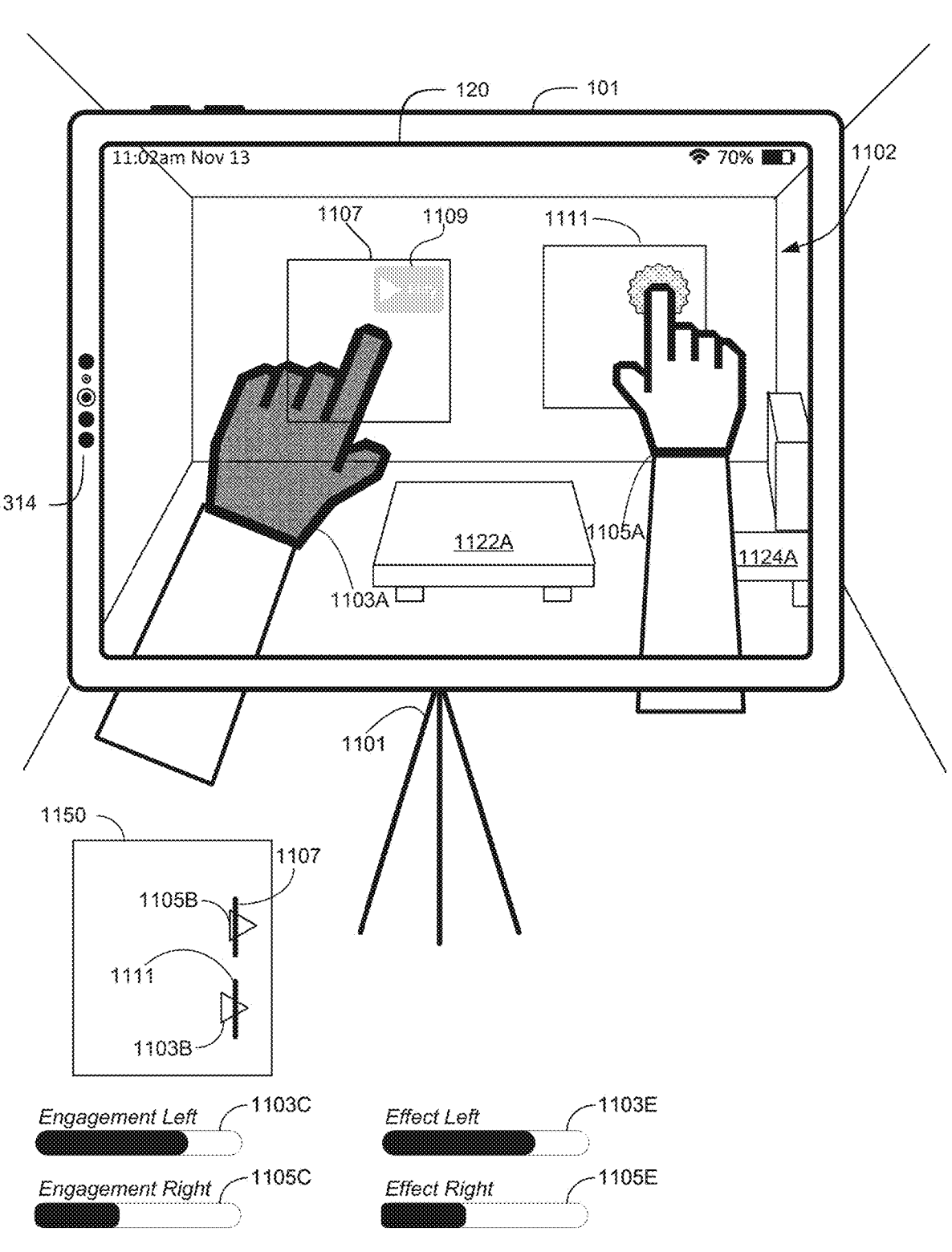

From FIG. 11E to FIG. 11F, hand 1103A and hand 1105A maintain respective lateral positions relative to respective virtual content but move further into or beyond respective virtual content. For example, hand 1103A moves further into virtual content 1107, optionally increasing the visual depth conflict with virtual content 1107, and computer system 101 optionally increases corresponding effect 1103E in response, but optionally maintains engagement 1103C (e.g., because hand 1103A is not the target of the user's attention, and/or brought closer to respective virtual content such as a center of virtual content 1107 within a lateral plane of virtual content 1107). Similarly, hand 1105A moves further toward virtual content 1111 and computer system 101 optionally increases effect 1105E and optionally maintains engagement 1105C in response to the movement of hand 1105A.

Figure 11G:
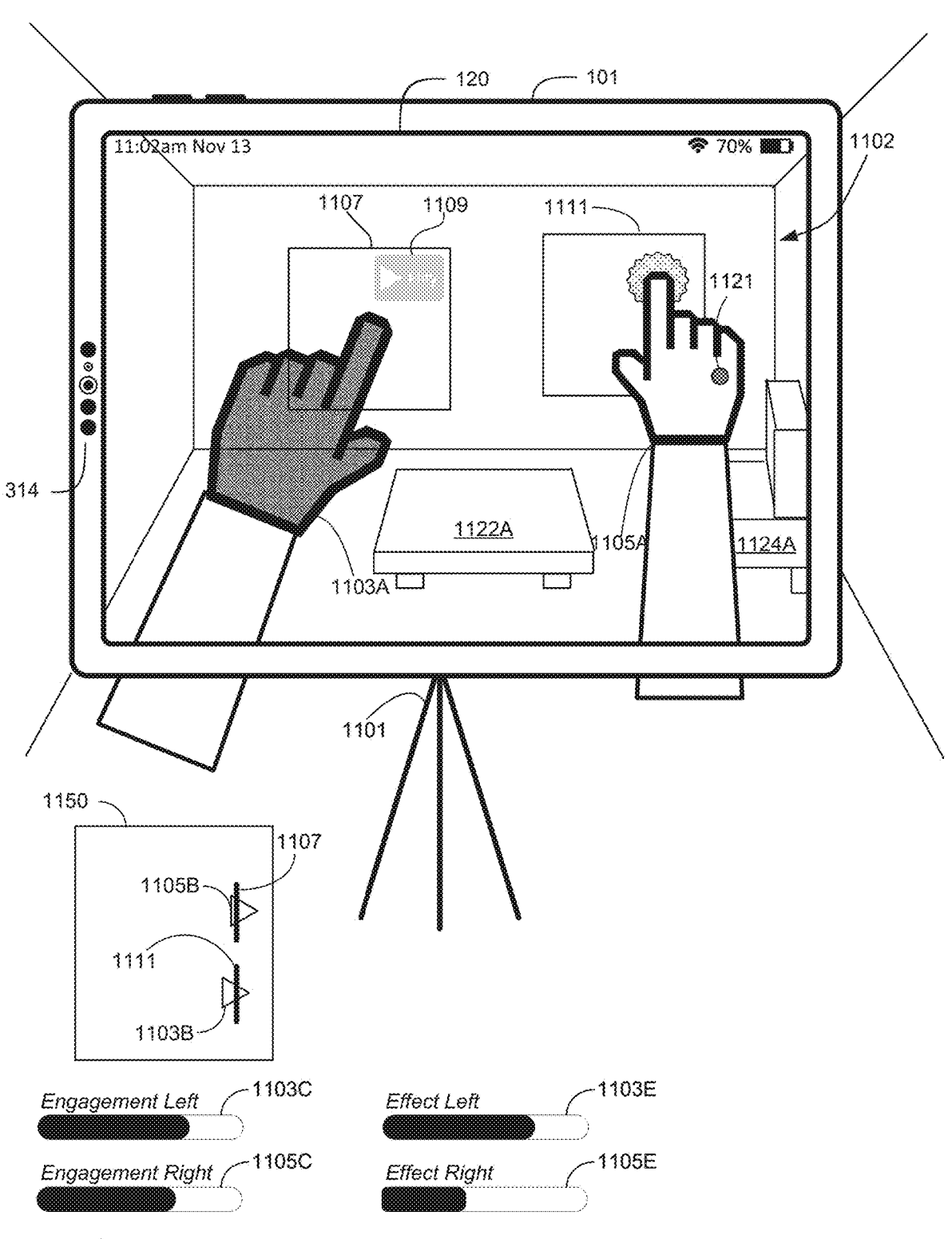
Figure 12C:
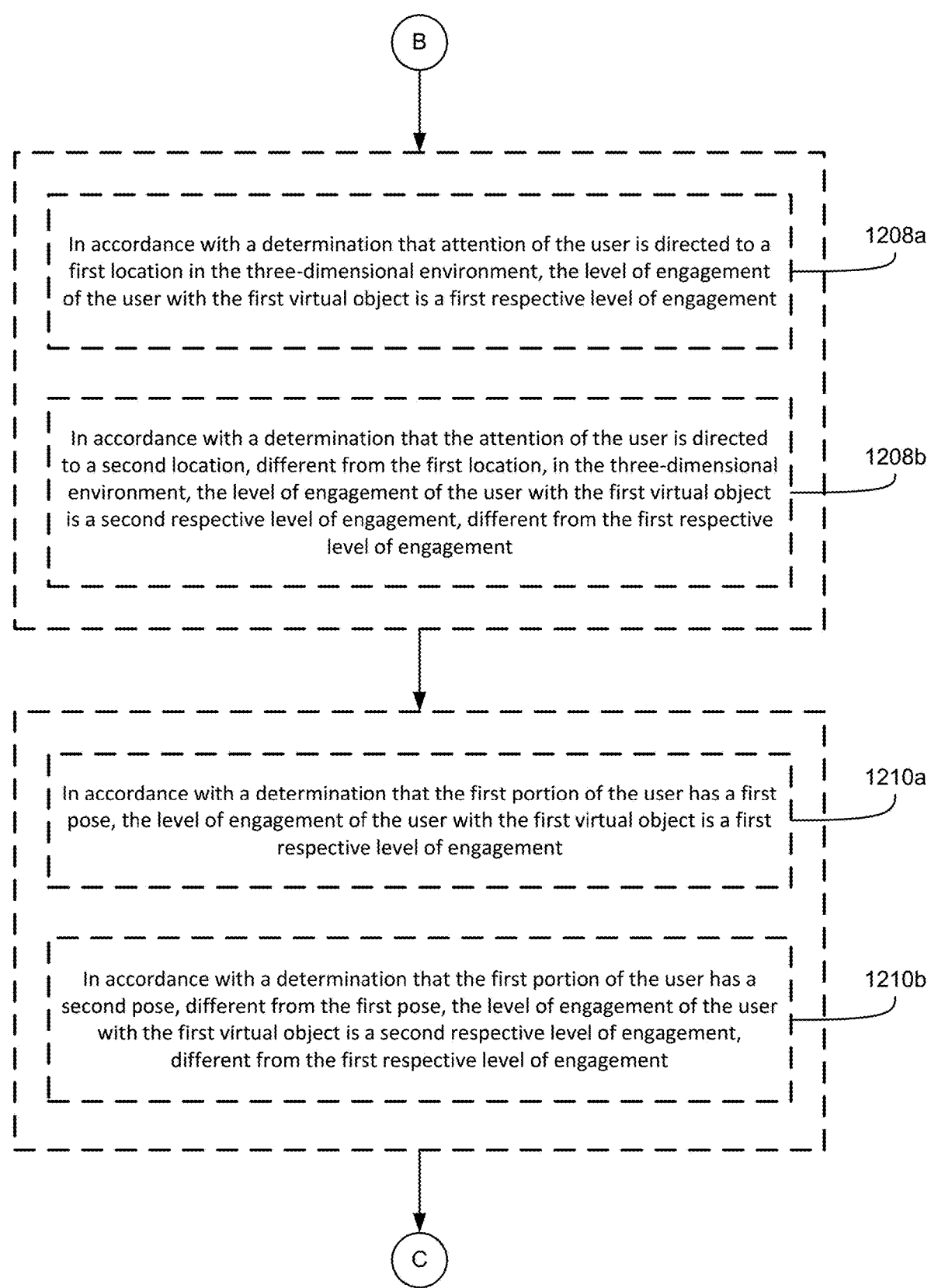

In FIG. 11G, attention 1121 of the user shifts to correspond to hand 1105A. In some embodiments, as described previously, computer system 101 does not increase or decrease a magnitude of a visual effect applied with respect to a portion of the user based on whether attention of the user is directed to that portion of the user. For example, computer system 101 optionally considers the location of that portion relative to virtual content and/or the location of that portion relative to the user's current viewpoint (as described with reference to FIG. 11F) as factors that modify the engagement assigned to that portion, and thus the magnitude of visual effect, but does not consider the location of attention 1121 when determining engagement assigned to that portion. Therefore, in such embodiments, as shown in FIG. 11G, computer system has not increased the magnitude of effect 1105E in response to attention 1121 shifting to hand 1105A.

FIGS. 12A-12G is a flowchart illustrating an exemplary method 1200 of facilitating depth conflict mitigation for a virtual object in a three-dimensional environment by reducing visual prominence of one or more portions of the virtual object based on a level of engagement with a portion of the user's body in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, method 1200 is performed at a computer system in communication with one or more input devices and a display generation component. In some embodiments, the computer system, the one or more input devices, and/or the display generation component has one or more of the characteristics of the computer system, the one or more input devices, and/or the display generation component of methods 800 and/or 1000.

In some embodiments, the computer system displays (1202a), via the display generation component, a first virtual object in a three-dimensional environment, such as virtual content 1107 in FIG. 11A. For example, the first virtual object optionally is a user interface of an application, such as a media playback application, an internet browsing application, a communication application, or the like. In some embodiments, the first virtual object is displayed at a respective location relative to the three-dimensional environment. In some embodiments, the three-dimensional environment corresponds to a real world, extended reality (XR), and/or a virtual reality environment. In some embodiments, the first virtual object has one or more of the characteristics of the virtual objects of methods 800 and/or 1000. In some embodiments, the three-dimensional environment has one or more of the characteristics of the three-dimensional environments of methods 800 and/or 1000.

In some embodiments the computer system displays via the display generation component, the first virtual object in the three-dimensional environment, wherein a first portion of a user of the computer system is visible in the three-dimensional environment (1202b) such as hand 1103A in FIG. 11A. For example, the computer system optionally is configured to detect movements, gestures, poses, and or arrangements of portions of the user such as one or more hands, fingers, arms, legs, or other suitable portions of the user. In some embodiments, the display generation component includes a visual passthrough such as a physical visual passthrough including one or more lenses and one or more mirrors and/or a digital passthrough corresponding to a view of one or more digital imaging components (e.g., cameras) included in the computer system configured to allow viewing of portions of the physical environment of the user that are not occluded by virtual content displayed by the computer system and/or to allow viewing of the first portion of the user.

In some embodiments, while the computer system displays (1202c) the first virtual object in the three-dimensional environment, in accordance with a determination that a level of engagement of the user with the first virtual object corresponds to a first level of engagement such as engagement 1103C, the computer system displays, via, the display generation component, a visual effect applied to the first virtual object at a location corresponding to the first portion of the user (e.g., a first hand, arm, or finger of the user), wherein the visual effect is displayed with a first magnitude such as effect 1103E. For example, the computer system optionally determines that the user of the computer system intends to interact with content using the previously described first hand, and accordingly determines a first level of engagement corresponding to the first hand. In some embodiments, the first level of engagement is a qualitative and/or quantitative descriptor corresponding to a level of user interaction with the first hand. For example, the computer system optionally determines a low, medium, high, or numerical level of engagement based on gaze of the user and/or spatial relationship between the first portion of the user and aspects of the three-dimensional environment, such as described in more detail below with reference to steps 1204a-1206a. Factors affecting the determined level of engagement optionally include viewpoint of the user, gaze of the user, duration of gaze of the user, position of the portion with respect to the first virtual object and/or a respective portion of the first virtual object, and/or velocity of the portion of the user with relative to the viewpoint of the user. In some embodiments, in response to determining the first level of engagement of the user with the first portion of the user, the computer system optionally displays a visual effect applied to the first virtual object at a location corresponding to the first portion of the user to reflect the first level of engagement. The visual effect optionally has one or more of the characteristics of the visual effects associated with hands of the user described with reference to methods 800 and/or 1000.

In some embodiments, while the computer system displays the first virtual object in the three-dimensional environment, in accordance with a determination that the level engagement of the user with the first virtual object corresponds to a second level of engagement such as effect 1103E in FIGS. 11B and 11B-1, different from the first level of engagement (e.g., greater than or lesser than the first level of engagement), the computer system displays (1202d), via the display generation component, the visual effect applied to the first virtual object at a location corresponding to the first portion of the user (e.g., a first hand, arm, or finger of the user), wherein the visual effect is displayed with a second magnitude, different from the first magnitude, such as shown in FIGS. 11B and 11B-1 relative to FIG. 11A. (e.g., greater than or lesser than the first magnitude). For example, the second level of engagement optionally corresponds to a relatively lesser or greater amount of engagement using the first portion, such as an absence of gaze directed to an area (e.g., of the first virtual object) corresponding to the first portion of the user. It is understood that the factors described with respect to the first level of engagement optionally similarly apply to the factors affecting the second level of engagement. In some embodiments, in response to determining that user engagement with the first portion corresponds to a second (e.g., lesser) level, the computer system displays the visual effect applied to the first virtual object at the location corresponding to the first portion of the user with the second magnitude reflecting the second level of engagement. For example, the computer system optionally displays a relatively more opaque visual effect applied to the first hand of the user optionally in response to determining that the user is not engaging, or is less engaged with the first hand of the user compared to the previously described first magnitude of the visual effect. Displaying the visual effect applied to the first virtual object at a location corresponding to the first portion of the user with a respective magnitude based on a level of engagement with the first portion improves user device interaction by providing appropriate visual feedback about potential depth conflicts between the first portion and virtual objects, thus potentially improving visibility of virtual content visually/spatially conflicting with the first portion and giving the user a better sense of their inputs relative to the virtual object, thereby reducing the likelihood of receiving erroneous inputs.

In some embodiments, the computer system displays (1204*a*), via the display generation component, the visual effect applied to the first virtual object at the location corresponding to the first portion of the user with a respective magnitude less than the first magnitude, such as engagement 1103C associated with hand 1103A in FIG. 11A. In some embodiments, while displaying the visual effect applied to the first virtual object at the location corresponding to the first portion of the user with a respective magnitude less than the first magnitude, the computer system detects, via the one or more input devices, the level of engagement of the user with the first virtual object increase to the first level of engagement, as shown by engagement 1103C in FIGS. 11B and 11B-1. For example, the computer system optionally detects that attention of the user optionally shifts from a respective position of the three-dimensional environment (e.g., from the second portion, from a space not including virtual content and/or objects, from a respective virtual object other than the first virtual object) to the first portion of the user, and in response, optionally modifies (e.g., increases) the first level of engagement. In some embodiments, the level of engagement of the user is modified in accordance with a determination that the user's attention has dwelled on the first portion of the user for an amount of time greater than a threshold amount of time (e.g., 0.0001, 0.001, 0.01, 0.1, 1, 10, or 100 seconds), and increases the level of engagement. In some embodiments, the one or more factors affecting the level of engagement described in steps 1202*a*-1202*d* affect the increase of the level of engagement. For example, the computer system optionally detects that the first portion of the user moves towards a respective portion of the virtual object (e.g., a center) and optionally increases the level of engagement in response to the movement. In some embodiments, a pose of the first portion, a gesture of the first portion, a shift in a viewpoint of the user (e.g., towards the first portion of the user), and/or current viewpoint of the user. In some embodiments, the level of engagement is modified in accordance with an increase of depth conflict (e.g., movement of the hand (e.g., air gesture, touch gesture, or hand input)s of the user away from or toward a viewpoint of the user).

In some embodiments, in response to detecting the level of engagement of the user with the first virtual object increase to the first level of engagement, the computer system displays (1204*b*), via the display generation component, the visual effect with first magnitude, such as effect 1103E in FIGS. 11B and 11B-1. For example, the computer system optionally displays the visual effect applied to the first virtual object at the location corresponding to the first portion of the user with a first degree of effect described with respect to methods 800 and/or 1000. Displaying the visual effect with the first magnitude in response to detecting the level of engagement of the user increase improves visibility of first portion of the user that visually conflicts with the virtual content, thereby allowing the user to continue to view the first virtual object and indicating a potential depth conflict between the user and the virtual content that the user may wish to rectify.

In some embodiments, while the computer system displays the first magnitude of the visual effect such as effect 1103E in FIGS. 11B and 11B-1 applied to the first virtual object at the location corresponding to the first portion of the user, the computer system detects (1206*a*), via the one or more input devices, the level of engagement of the user, such as engagement left 1103C in FIG. 11C with the first virtual object decrease to the second level of engagement. In some embodiments, the decrease in the level of engagement has one or more characteristics in opposition of the one or more factors described in steps 1204*a*-1204*b*. For example, the computer system optionally detects, the attention of the user shift away from a respective portion (e.g., center) of the first portion, cease dwelling on a respective portion of the first portion, the first portion of the user moves towards a respective portion of the virtual object (e.g., a center), cease maintaining a pose of the first portion, cease performing a gesture of the first portion, and/or a shift in a viewpoint of the user (e.g., away from the first portion of the user). In response to such a detection, the computer system optionally decreases the level of engagement to correspond to the second level of engagement.

In some embodiments, in response to detecting the level of engagement of the user with the first virtual object decrease to the second level of engagement, the computer system displays (1206*b*), via the display generation component, the visual effect with second magnitude, such as effect 1103E in FIG. 11C due attention 1121 shifting toward hand 1105A. For example, the computer system optionally displays the visual effect applied to the first virtual object at the location corresponding to the first portion of the user with a second degree of effect described with respect to methods 800 and/or 1000. Displaying the visual effect with the second magnitude in response to the level of engagement of the user decrease to the second level of engagement allows the user to more easily see an unobscured view of the virtual object and improves visual focus on respective virtual content that is not displayed at the location corresponding to the first portion of the user.

In some embodiments, in accordance with a determination that attention of the user such as attention 1121 is directed to a first location in the three-dimensional environment such as hand 1103A, the level of engagement of the user with the first virtual object is a first respective level of engagement (1208*a*) such as engagement 1103C in FIG. 11A. For example, the first location optionally corresponds to a respective portion of the first portion of the user, such as a finger, a palm, a center, and/or a knuckle of a hand of the user. In accordance with a determination that the user's attention meets one or more criteria including a criterion that is satisfied when the attention is directed to a respective portion of the first portion of the user (e.g., a center of a hand) and/or within a threshold distance (e.g., 0, 1, 2, 3, 5, 10, 15, 20, 25, 30, or 50 cm), the computer system optionally determines that the level of engagement is the first respective level of engagement (e.g., a relatively higher level of engagement than described below). Thus, in some embodiments, the computer system determines that the attention of the user is a first location in the three-dimensional environment that is directed to or is in proximity of a respective portion of the first portion of the user, and in response sets the level of engagement with the first virtual object to a first respective level of engagement. In some embodiments, the first location corresponds to a respective portion of the virtual object (e.g., a center of the virtual object and/or virtual content included within the virtual object). In some embodiments, the level of engagement is relatively decreased if the user's attention is further away from a respective portion of the first virtual object. For example, the computer system optionally detects that the user's attention is directed to a center of a hand of the user and/or the first virtual object, and optionally detects the attention shift to a tip of a finger of the hand and/or a location that does not include any part of the hand of the user and/or a location further from the center of the first virtual object, and in response to the detecting the attention shift, relatively decreases the level of engagement with the first virtual object. In some embodiments, similar or the same treatment is afforded to a second respective portion of a second portion of the user (e.g., a second hand) as described with respect to the first portion of the user In some embodiments, in accordance with a determination that the attention of the user is directed to a second location such as hand 1105A, different from the first location, in the three-dimensional environment, the level of engagement of the user with the first virtual object is a second respective level of engagement, different from the first respective level of engagement (1208*b*) such as effect 1103C associated with hand 1103A in FIGS. 11B and 11B-1. For example, the computer system optionally determines that the attention of the user is directed to a second location that optionally is not directed to the respective portion of the first portion of the user, and/or is directed further away from the respective portion of the user than the first location. In some embodiments the second location corresponds to empty space and/or virtual content. In some embodiments, the second location is not directed to—or is further away from—the respective portion of the virtual object. Modifying a respective level of engagement based on attention of the user affords an intuitive way to modulate engagement—and a corresponding visual effect—without requiring manual inputs to affect such modifications to engagement and/or a displayed visual effect.

In some embodiments, in accordance with a determination that the first portion of the user such as hand 1103A in FIG. 11A has a first pose (e.g., a ready state pose), the level of engagement of the user with the first virtual object is a first respective level of engagement (1210*a*). For example, the computer system optionally determines that one or more respective portions of the first portion of the user are optionally arranged in one or more air poses such as a splaying of one or more fingers, a straightening of one or more fingers, a closing of one or more fingers, a curling of one or more fingers, an air pinch including a contacting of two or more respective fingers, a pointing gesture (e.g., with an index finger), and/or a crossing of one or more fingers. In some embodiments, in response to determining that the first portion of the user (e.g., the hand) has assumed one or more of such air poses alone or in succession, the computer system sets the level of engagement with the first virtual object to correspond to the first respective level of engagement. In some embodiments, the computer system determines the absence of one or more of the air poses to correspond to a request to set the level of engagement to the first respective level of engagement. In some embodiments, the computer system determines that the first portion of the user has the first pose if the first portion of the user maintains the pose for a threshold amount of time (e.g., 0.0001, 0.001, 0.01, 0.1, 1, 10, or 100 seconds).

In some embodiments, in accordance with a determination that the first portion of the user has a second pose, different from the first pose (e.g., a pose other than the ready state pose), the level of engagement of the user with the first virtual object is a second respective level of engagement, different from the first respective level of engagement (1210*b*) (e.g., less than the first respective level of engagement). In some embodiments, the determination that the first portion of the user has the second pose and one or more characteristics of the second pose are similar or the same as described with respect to the first pose. For example, the computer system optionally detects that a different air pose than the first pose is established and/or maintained (e.g., and/or determines that the first portion of the user does not correspond to a respective air pose), the computer system optionally sets the respective level of engagement to the second respective level of engagement of the user. In some embodiments, the second respective level of engagement is relatively greater or lesser than the first respective level, such that the corresponding visual effect applied in accordance with the level of engagement is increased or decreased in accordance with the respective pose (e.g., first and/or second) of the first portion of the user. Determining the level of engagement in accordance with a respective pose of the first portion of the user frees the user to concurrently direct inputs to other virtual content and reduces the need for input to manually modify the engagement and/or visual effect applied to virtual content.

In some embodiments, in accordance with a determination that a current viewpoint of the user is a first viewpoint relative to the three-dimensional environment, such as a viewpoint of computer system 101 relative to environment 1102 in FIG. 11D, the level of engagement of the user such as engagement 1103C with the first virtual object is a first respective level of engagement (1212*a*), such as engagement 1103C in FIG. 11D due to the position of hand 1103A relative to the viewpoint of the computer system. In some embodiments, the current viewpoint of the user includes a location, orientation, and/or a field of view of the user relative to the three-dimensional environment. For example, the current viewpoint of the user optionally includes what is visible from a current orientation of a respective portion of the user (e.g., the user's head). In some embodiments, the computer system modifies the level of engagement based on the current viewpoint. For example, the computer system optionally determines that a respective portion of the virtual object and/or a respective portion of the first portion of the user has a spatial relationship relative to a respective portion of the user's field of view. The respective portion optionally is a center or central portion of the virtual object relative to a center or central portion of the user's field of view. In response to the user's viewpoint shifting (e.g., the respective portion of the user shifting) such that the center of the user's field of view draws closer to the center of the virtual object, for example, the computer system optionally determines that the user intends to interact with the first virtual object to a greater degree, and accordingly optionally increases the level of engagement of the user (e.g., to the first respective level of engagement). In some embodiments, as the user's viewpoint shifts away from the respective portion of the virtual object, the computer system decreases the determined level of engagement. In some embodiments, the rate of change of level of engagement of the user is uniform (or non-uniform) with respect to an equidistant displacement from the respective portion of the virtual object. Thus, the computer system optionally establishes a first respective level of engagement based on the current viewpoint of the user. Additionally or alternatively, the computer system determines a second spatial relationship relative to the respective portion of the user's field of view and the first portion of the user. The second spatial relationship and modifications to the level of engagement optionally are similar or the same as described with respect to the spatial relationship between respective portion(s) of the virtual object and/or the user's viewpoint (e.g., field of view). For example, the computer system optionally increases the level of engagement in response to detecting a shifting of the current viewpoint to align with a center of the first portion of the user, and optionally decreases the level of engagement in response to detecting the shifting of the current viewpoint away from the center of the first portion of the user.

In some embodiments, in accordance with a determination that the current viewpoint of the user is a second viewpoint relative to the three-dimensional environment, different from the first viewpoint, such as the viewpoint of computer system 101 relative to the environment 1102 in FIG. 11E, the level of engagement of the user with the first virtual object is a second respective level of engagement, different from the first respective level of engagement (1212b) such as engagement 1103 in FIG. 11E due to the modified viewpoint of the computer system. For example, as described with respect to the user's viewpoint shifting away or toward the respective portion of the virtual object, the first viewpoint optionally corresponds to an alignment or near alignment of a center of the user's first viewpoint and a center of the virtual object (e.g., corresponding to the first respective level of engagement), and the second viewpoint optionally corresponds to an offset of the center of the user's second viewpoint and the center of the virtual object (e.g., corresponding to the second respective level of engagement, lower than the first respective level). Determining respective levels of engagement based on viewpoint of the user improves visibility of respective portions of virtual objects of potential interest without input and/or movement of portions of the user's body, thus freeing such portions to otherwise interact with virtual content and reducing the need for inputs to manually modify visual prominence of the virtual object.

In some embodiments, while the computer system displays, via the display generation component, the first virtual object such as virtual content 1107 and while the first portion of the user such as hand 1107 is visible in the three-dimensional environment and the level of engagement with the first virtual object is the first respective level of engagement such as engagement 1103C in FIG. 11C, the computer system detects (1214a) a movement of the first portion of the user from the first position to a second position, different from the first position, relative to the current viewpoint of the user, such as by movement from hand 1103A in FIG. 11C to as shown in FIG. 11D. For example, similar to as described in steps 1212a-1212b, the computer system optionally determines a level of engagement at least partially based on a spatial relationship between a respective portion of the first virtual object and the first portion of the user. As such, in some embodiments, movement of the first portion of the user toward or away from a respective portion of the user's field of view modifies the determined level of engagement.

In some embodiments, in response to detecting the movement of the first portion of the user from the first position to the second position relative to the current viewpoint of the user, in accordance with a determination that the first portion of the user satisfies one or more criteria, including a criterion that is satisfied based on the movement of the first portion of the user such as closer to a center of virtual content 1107, the computer system modifies (1214b) the level of engagement with the first virtual object from the first respective level of engagement to the second respective level of engagement such as engagement 1103C in FIG. 11E. For example, while maintaining the current viewpoint of the user, the computer system optionally detects movement of the first portion (e.g., the hand) of the user shift from a first position toward a second position, such as a respective portion (e.g., a center) of the user's field of view. In response to detecting the movement, the computer system optionally modifies (e.g., increases) the level of engagement (e.g., to the first respective level of engagement). In some embodiments, the one or more criteria include a criterion that is satisfied when the movement brings the first portion of the user closer to the respective portion (e.g., center) of the user's field of view, and/or include a criterion that is satisfied when the movement pushes the first portion of the user away from the respective portion of the user's field of view and/or a respective portion of the first virtual object. In some embodiments, the level of engagement additionally or alternatively increases in response to a modification of depth of the first portion of the user with respect to the user's viewpoint and/or the first virtual object. In some embodiments, the one or more criteria include a criterion that is satisfied when the user moves the first portion of the user toward or away from respective virtual content (e.g., a virtual button, a text field, and/or media) included in the first virtual object. In some embodiments, the one or more criteria include a criterion that is satisfied when the first portion of the user is not visible, such that the computer system determines that the level of engagement is a default value (e.g., corresponding to a lack of engagement described in further detail in steps 1212a-1212b and steps 1220a-1220b). Modifying respective engagement levels based on movement of the first portion of the user provides an intuitive way of varying visual effect applied to the virtual content conflicting with the first portion of the user, ensures that the visual effect reflects the current position of the first portion of the user, and reduces the need for input to manually make such modifications.

In some embodiments, while the computer system displays the first virtual object and while the first portion of the user is visible in the three-dimensional environment and the level of engagement with the first virtual object is the first respective level of engagement, the computer system detects (1216*a*) a change in the current viewpoint of the user (e.g., as described in steps 1212*a*-1212*b*).

In some embodiments, in response to detecting the change in the current viewpoint of the user, in accordance with a determination that the first portion of the user satisfies one or more criteria, including a criterion that is satisfied based on the change in the current viewpoint of the user, the computer system modifies (1216*b*) the level of engagement with the first virtual object from the first respective level of engagement to the second respective level of engagement. (e.g., as described in steps 1212*a*-1212*b*). In some embodiments, the change in the current viewpoint not only includes a re-orientation of a portion of the user (e.g., their head), but additionally or alternatively includes movement of the user within the three-dimensional environment to a new position and/or a new orientation as described in steps 1204*a*-1206*a*, and movement of a respective portion of the user to a new position and/or orientation as described in steps 1212*a*-1212*b* and steps 1214*a*-1214*b*. Modifying a level of engagement with the first virtual object based on a change in a current viewpoint of the user visually indicates a position of the first portion of the user relative to the current viewpoint thereby emphasizing potential depth conflicts with virtual content the user may wish to resolve.

In some embodiments, in accordance with the determination that the current viewpoint of the user is the first viewpoint relative to the three-dimensional environment, such as a viewpoint of computer system 101 relative to environment 1102 in FIG. 11F, the level of engagement of the user with the first virtual object is the first respective level of engagement such as engagement 1103C in FIG. 11F, independent of a respective location of an attention of the user such as attention 1121 in FIG. 11G of the computer system in the three-dimensional environment (1218*a*). For example, while maintaining the current viewpoint of the user, the computer system detects the user's attention directed to a first location in the three-dimensional environment, determines that the level of engagement corresponds to the first respective level of engagement based on the current viewpoint of the user as described in steps 1212*a*-1216*b*, and detects a shift in the user's attention to a second location in the three-dimensional environment. In response to detecting the shift in the user's attention, the computer system optionally maintains the level of engagement (e.g., forgoes modification of the level of engagement, and/or modifications to the visual effect(s)). The first location and/or the second location optionally include a respective portion of virtual content, a respective portion of the user, and/or neither virtual content nor the respective portion of the user. Regardless, the computer system optionally forgoes modification of a determined level of engagement based on shift in the user's attention if the user's viewpoint is maintained, thereby making the level of engagement independent of a respective location of the user's attention.

In some embodiments, in accordance with a determination that the current viewpoint of the user is a second viewpoint relative to the three-dimensional environment such as shown in FIG. 11D, different from the first viewpoint, the level of engagement of the user with the first virtual object is a second respective level of engagement such as engagement 1103E in FIG. 11D, different from the first respective level of engagement, independent of the respective location of the attention of the user of the computer system in the three-dimensional environment (1218*b*). For example, the second viewpoint, level of engagement, and second location of the user's attention optionally has one or more characteristics described with respect to the first viewpoint. Maintaining independence of the level of engagement from the attention of the user provides a consistent visual experience while the user looks at virtual content within the three-dimensional environment, thereby reducing the need for the user to visually re-orient themselves with respect to virtual content.

In some embodiments, in accordance with a determination that the first portion of the user is at a first location such as the location of hand 1103A in the three-dimensional environment relative to the first virtual object such as virtual content 1107 in FIG. 11C, the level of engagement of the user with the first virtual object is a first respective level of engagement such as engagement 1103C in FIG. 11C (1220*a*). In some embodiments, similar to as described in steps 1212*a*-1214*b*, the computer system optionally modifies visual engagement based on a spatial relationship between the first portion of the user (e.g., a hand) and the first virtual object. In some embodiments, such modification of visual engagement similarly applies to a spatial relationship between respective virtual content within the first virtual object and the first portion of the user. For example, the computer system optionally detects a respective location of the first portion of the user to be a first location located at a first distance away from respective content included within the virtual object. The respective virtual content optionally includes a text entry field, a selectable option (e.g., "ok," "refresh," and/or "close" aspects of an application included in the first virtual object), and/or media content. It is understood that description of modifying visual engagement based on spatial relationships between the respective virtual content and the first portion of the user similarly applies to a similar spatial relationship between a respective portion of the first virtual object (e.g., a corner, border, body, center, and/or a region of the first virtual object). For example, the computer system optionally determines that the first portion of the user has a first displacement from the respective portion of the first virtual object (e.g., a center) and accordingly sets the level of engagement to the first respective level of engagement.

In some embodiments, in accordance with a determination that the first portion of the user is at a second location in the three-dimensional environment relative to the first virtual object in the three-dimensional environment such as the location of hand 1103A in FIG. 11D, the level of engagement of the user with the first virtual object is a second respective level of engagement such as engagement 1103C shown in FIG. 11D, different from the first respective level of engagement (1220*b*). For example, in response to detecting, via the one or more input devices, movement of the first portion of the user to a second respective location (e.g., laterally and/or at a depth that is closer or further away from a respective portion of the respective content and/or the first virtual object such as a corner or center of the respective content and/or the first virtual object relative to the user's current viewpoint), the computer system optionally modifies the level of engagement to correspond to a second respective level of engagement, greater than or less than the first respective level of engagement. In some embodiments, the level of engagement increases (and/or decreases) in response to movement of the first portion of the user closer to (and/or further away from) a respective portion of the respective content and/or the first virtual object. The respective portion optionally includes a border, a center, and/or a corner of the respective virtual content (e.g., a text entry field or a selectable option). In some embodiments, the computer system maintains the level of engagement if the first portion remains at a respective distance away from the respective content. For example, in response to detecting the first portion moving along a surface of a spherical region having the first virtual object at its center, the computer system optionally maintains (e.g., forgoes modification of) the level of engagement. It is understood that the foregoing embodiments described with respect to respective content optionally occur while a current viewpoint of the user is maintained. In some embodiments, the viewpoint of the user shifts while the relative displacement between the first portion of the user and the respective content is maintained, and in response to the shift, in accordance with a determination that the first portion of the user meets one or more criteria including a criterion that is satisfied when the first portion of the user remains within a threshold distance (e.g., 0, 1, 2, 3, 5, 10, 15, 20, 25, 30, or 50 cm) of respective content and/or a respective portion of the first virtual object, the computer system forgoes modification of the level of engagement. Modifying the level of engagement based on a respective location of the first portion of the user relative to the first virtual object gives feedback to the user to correctly orient the first portion of the user relative to the first virtual object, thus implicitly suggesting potential future movement to reduce visual conflicts between the first portion of the user and the first virtual object.

In some embodiments, while displaying, via the display generation component, the first virtual object in the three-dimensional environment, wherein the first portion of the user of the computer system is visible in the three-dimensional environment such as hand 1103A in FIG. 11A, and a second portion of the user such as hand 1107A in FIG. 11A, different from the first portion of the user, is visible in the three-dimensional environment (For example, a first hand, arm, finger, and/or palm of the user and a second hand, arm finger, and/or palm of the user different from the first optionally are visible), in accordance with a determination that one or more first criteria are satisfied, the computer system assigns (1222a) a first respective level of engagement based on one or more first characteristics associated with the first portion of the user to the first portion of the user and the second portion of the user, such as assigning engagement 1103C to engagement 1103E in FIG. 11A. In some embodiments, the one or more first criteria include a criterion that is satisfied when the first portion of the user is visible, one or more respective criteria based on determined levels of engagement with the first portion of the user as described in steps 1202a-1220b, and/or a criterion that is satisfied based on a relative relationship between a first respective level of engagement with the first portion of the user and a second respective level of engagement with the second portion of the user. For example, the computer system optionally determines respective levels of engagement for both portions of the user (e.g., the user is gazing at the first portion and thus sets a relatively high first respective level of engagement), and in accordance with a determination that the first portion of the user has a relatively greater or lesser respective level of engagement (e.g., first respective level) than a second respective level of engagement of the second portion of the user, the computer system optionally sets the respective levels of engagement corresponding to the respective portions of the user to the same level of engagement (e.g., the greater level of engagement or the lesser level of engagement).

In some embodiments, in accordance with the determination that one or more second criteria are satisfied, different from the one or more first criteria, the computer system assigns (1222b) a second respective level of engagement based on one or more second characteristics associated with the second portion of the user to the first portion of the user and the second portion of the user such as assigning engagement 1103E to engagement 1103C in FIG. 11A. In some embodiments, the one or more second criteria have one or more characteristics of the one or more first criteria, but with respect to the second portion of the user. For example, the computer system optionally determines that a second respective level of engagement is relatively greater than the first respective level of engagement, and in response, optionally sets the respective levels of engagement to the second respective level of engagement, wherein the second respective level of engagement is based on the one or more factors affecting engagement described with respect to the first hand of the user but applied to the second hand of the user. Assigning shared levels of engagement to multiple portions of the user improves user intuition as to spatial relationships between the portions of the user and the virtual object, thereby increasing and/or decreasing visual focus on the first virtual object without manual input to reduce the visual obstruction and indicating future movements to resolve potential depth conflicts.

In some embodiments, the one or more first criteria include a criterion that is satisfied when the first respective level of engagement such as engagement 1103C in FIG. 11D associated with the first portion of the user such as hand 1103A is greater than the second respective level of engagement such as engagement 1105C associated with the second portion of the user such as hand 1105A (1224). For example, as described in steps 1222a-1222b. In some embodiments, one or more second criteria, different from the first criterion, include a criterion that is satisfied when the respective level of engagement associated with a second portion of the user, is greater than the first respective level of engagement associated with the first portion of the user. Assigning shared levels of engagement to multiple portions of the user based on engagement with a single portion of the user reduces the level of visual obstruction caused by the portions of the user without requiring separate manual interactions directed to each portion of the user to reduce the visual obstruction caused by the multiple portions of the user.

In some embodiments, the one or more first criteria and the one or more second criteria include a criterion that is satisfied based on an attention of the user of the computer system such as attention 1121 in FIG. 11C (1226). For example, as described in steps 1208a-1208b and steps 1222a-1222b, if the computer system detects satisfaction of a criterion that is satisfied when the attention of the user is directed to the first portion of the user, the computer system optionally assigns the first respective level of engagement to the first portion of the user and the second portion of the user. Similarly, if the computer system detects satisfaction of a criterion that is satisfied when the attention of the user is directed to the second portion of the user, the computer system optionally assigns the second respective level of engagement to the first portion of the user and the second portion of the user. For example, the computer system optionally detects that the attention of the user is directed to the first portion of the user and optionally not to the second portion of the user, and optionally assigns the first respective level of engagement to the first and the second portions of the user. Assigning shared levels of engagement to multiple portions of the user based on attention directed to a single portion of the user reduces the level of visual obstruction caused by the portions of the user without requiring separate manual interactions directed to each portion of the user to reduce the visual obstruction caused by the multiple portions of the user.

In some embodiments, the one or more first criteria and the one or more second criteria include a criterion that is satisfied based on a respective pose of the first portion of the user or the second portion of the user such as the pose of hand 1103A and/or hand 1105A (1228). For example, as described in steps 1210*a*-1210*b* and steps 1222*a*-1222*b*, if the computer system detects satisfaction of a criterion that is satisfied when the first portion of the user assumes a first pose (or a second pose), the computer system optionally assigns the first respective level of engagement to the first portion of the user and the second portion of the user. Similarly, if the computer system detects satisfaction of a criterion that is satisfied when the second portion of the user assumes the first pose (or the second pose), the computer system optionally assigns the second respective level of engagement to the first portion of the user and the second portion of the user. For example, the computer system optionally detects that the first portion of the hand is arranged in an air pinch pose while the second portion of the user is not arranged in such a pose, and optionally assigns the first respective level of engagement to the first and the second portions of the user. In contrast, the one or more first criteria optionally are not satisfied when the first portion of the hand does not assume the first pose, and the one or more second criteria optionally are not satisfied when the first portion of the hand does not assume the first pose. For example, the first one or more criteria optionally are not satisfied if the computer system detects that the first portion of the hand is not arranged in an expected air pinch pose, and the second one or more criteria are optionally not satisfied when the second portion of the hand is not arranged in the expected air pinch pose. Assigning shared levels of engagement to multiple portions of the user based on a respective pose of a single portion of the user reduces the level of visual obstruction caused by the portions of the user without requiring separate poses of multiple portions of the user to reduce the visual obstruction caused by the multiple portions of the user.

In some embodiments, the one or more first criteria and the one or more second criteria include a criterion that is satisfied based on a respective movement of the first portion of the user such as hand 1103A or the second portion of the user such as hand 1105A relative to the three-dimensional environment (1230), such as movement of hand 1103A as shown from FIG. 11C to FIG. 11D. For example, as described in steps 1214*a*-1214*b* and steps 1222*a*-1222*b*, if the computer system detects satisfaction of a criterion that is satisfied when the first portion of the user moves to the second position relative to the current viewpoint of the user, the movement satisfying a respective criterion, the computer system optionally assigns the first respective level of engagement to the first portion of the user and the second portion of the user. Similarly, if the computer system detects satisfaction of a criterion that is satisfied when the second portion of the user moves to the second position relative to the current viewpoint of the user, the movement satisfying the respective criterion, the computer system optionally assigns the second respective level of engagement to the first portion of the user and the second portion of the user. For example, the computer system optionally detects that the first portion of has moved to the second position (e.g., close to a center of the first virtual object) while the second portion of the user has not moved to the second position and/or has not satisfied the respective criterion (e.g., has not moved closer to the center of the first virtual object and/or is not closer to the center than the first portion of the user), and optionally assigns the first respective level of engagement to the first and the second portions of the user. In some embodiments, the one or more first criteria are not satisfied when the first portion of the user does not move in a particular manner (e.g., does not perform an air gesture associated with indicating an increase in engagement of a respective portion of the user), and the one or more second criteria are not satisfied when the second portion of the user does not move in the particular manner (e.g., does not perform the air gesture). Assigning shared levels of engagement to multiple portions of the user based on respective movement of a single portion of the user reduces the level of visual obstruction caused by the portions of the user without requiring separate movements performed by multiple portions of the user to reduce the visual obstruction caused by the multiple portions of the user.

In some embodiments, the first portion of the user such as hand 1103A in FIG. 11D is associated with a first respective level of engagement such as engagement 1103C in FIG. 11D and a second portion of the user such as hand 1105A in FIG. 11D, different from the first portion of the user, is associated with a second respective level of engagement such as engagement 1105E in FIG. 11D, different from the first respective level of engagement (1232). For example, the computer system optionally maintains respective independent levels of engagement for the respective portion(s) of the user, such as a first level of engagement of the first portion of the user and a second level of engagement of the second portion of the user, where each level of engagement is determined in one or more of the manners described herein with reference to method 1200. In some embodiments, in response to satisfaction of one or more criteria as described in steps 1222*a*-1230, the computer system forgoes the assigning of the first respective level of engagement to the second portion of the user and/or forgoes the assigning of the second respective level of engagement to the first portion of the user. Thus, in some embodiments, the computer systems maintains independent levels of engagement for respective portions of the user. Assigning different levels of engagement to respective portions of the user reduces needless and/or undesired modifications of levels of engagement of the respective portions of the user, thus reducing processing and power consumption to make such modifications of the levels of engagement and corresponding levels of visual effect.

In some embodiments, the visual effect includes modifying a translucency of the first virtual object such as virtual content 1107 at the location corresponding to the first portion of the user such as shown in FIG. 11A as represented by effect 1103C (1234). In some embodiments, the visual effect has one or more characteristics of the visual effects described relative to method 1000. Modifying the translucency of the first virtual object improves visibility of first portion of the user at the location corresponding to the first portion of the user while preserving the user's ability to view and interact with the virtual content.

In some embodiments, the visual effect includes ceasing display of the first virtual object such as virtual content 1111 at the location corresponding to the first portion of the user relative to the three-dimensional environment such as shown in FIG. 11A as represented by effect 1105E (1236). In some embodiments, the visual effect has one or more characteristics of the visual effects described relative to method 800. Ceasing display of the first virtual object improves visibility of first portion of the user at the location corresponding to the first portion of the user while preserving the user's ability to view and interact with the virtual content that remains currently displayed.

It should be understood that the particular order in which the operations in method 1200 have been described is merely exemplary and is not intended to indicate that the described order is the only order in which the operations could be performed. One of ordinary skill in the art would recognize various ways to reorder the operations described herein. In some embodiments, aspects/operations of methods 800, 1000 and/or 1200 may be interchanged, substituted, and/or added between these methods. For example, various object manipulation and/or visual adjustment techniques of methods 800, 1000, and/or 1200 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:
   at a computer system in communication with a display generation component and one or more input devices:
   displaying, via the display generation component, a virtual object in a three-dimensional environment;
   while displaying the virtual object in the three-dimensional environment, detecting, via the one or more input devices, a first input that includes movement of a first portion of a user of the computer system relative to the virtual object in the three-dimensional environment; and in response to detecting the first input:

in accordance with a determination that at least a portion of the first portion of the user has a depth conflict with a first portion of the virtual object in the three-dimensional environment relative to a viewpoint of the user, and at least a portion of the first portion of the user does not have a depth conflict with a second portion of the virtual object in the three-dimensional environment relative to the viewpoint of the user after the movement of the first portion of the user:

reducing a visual prominence of the first portion of the virtual object in the three-dimensional environment relative to the second portion of the virtual object, wherein reducing the visual prominence of the first portion of the virtual object includes increasing a degree to which a portion of the three-dimensional environment, that is behind the first portion of the virtual object from the viewpoint of the user, is visible from the viewpoint of the user; and maintaining display of the second portion of the virtual object in the three-dimensional environment; and in accordance with a determination that at least a portion of the first portion of the user does not have a depth conflict with the virtual object in the three-dimensional environment relative to the viewpoint of the user after the movement of the first portion of the user, maintaining display of the first portion and the second portion of the virtual object without reducing the visual prominence of the first portion of the virtual object in the three-dimensional environment relative to the visual prominence of the second portion of the virtual object.

2. The method of claim 1, further comprising:

while the visual prominence of the first portion of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, a change in a position of the virtual object in the three-dimensional environment; and in response to detecting the change in the position of the virtual object in the three-dimensional environment:

in accordance with a determination that the change in the position of the virtual object in the three-dimensional environment causes at least a portion of the first portion of the user to have a depth conflict with a third portion, different from the first portion, of the virtual object in the three-dimensional environment relative to the viewpoint of the user while at least a portion of the first portion of the user does not have a depth conflict with a fourth portion, different from the third portion, of the virtual object in the three-dimensional environment relative to the viewpoint of the user:

reducing a visual prominence of the third portion of the virtual object in the three-dimensional environment relative to the fourth portion of the virtual object in the three-dimensional environment; and maintaining display of the fourth portion of the virtual object in the three-dimensional environment.

3. The method of claim 1, further comprising:

while the visual prominence of the first portion of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, movement of the first portion of the user relative to the virtual object in the three-dimensional environment; and in response to detecting the movement of the first portion of the user:

in accordance with a determination that the movement of the first portion of the user causes at least a portion of the first portion of the user to have a depth conflict with a third portion, different from the first portion, of the virtual object in the three-dimensional environment relative to the viewpoint of the user while at least a portion of the first portion of the user does not have a depth conflict with a fourth portion, different from the third portion, of the virtual object in the three-dimensional environment relative to the viewpoint of the user:

reducing a visual prominence of the third portion of the virtual object in the three-dimensional environment relative to the fourth portion of the virtual object in the three-dimensional environment; and maintaining display of the fourth portion of the virtual object in the three-dimensional environment.

4. The method of claim 1, further comprising:

while the visual prominence of the first portion of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, movement of the viewpoint of the user relative to the virtual object in the three-dimensional environment; and in response to detecting the movement of the viewpoint of the user:

in accordance with a determination that the movement of the viewpoint of the user causes at least a portion of the first portion of the user to have a depth conflict with a third portion, different from the first portion, of the virtual object in the three-dimensional environment relative to the viewpoint of the user while at least a portion of the first portion of the user does not have a depth conflict with a fourth portion, different from the third portion, of the virtual object in the three-dimensional environment relative to the viewpoint of the user:

reducing a visual prominence of the third portion of the virtual object in the three-dimensional environment relative to the fourth portion of the virtual object in the three-dimensional environment; and maintaining display of the fourth portion of the virtual object in the three-dimensional environment.

5. The method of claim 1, wherein:

reducing the visual prominence of the first portion of the virtual object in the three- dimensional environment relative to the second portion of the virtual object includes:

in accordance with a determination that an amount of the depth conflict between the first portion of the user and the first portion of the virtual object is a first amount, reducing a visual prominence of a first amount of the first portion of the virtual object in the three-dimensional environment; and in accordance with a determination that the amount of the depth conflict between the first portion of the user and the first portion of the virtual object is a second amount, greater than the first amount, reducing a visual prominence of a second amount of the first portion of the virtual object in the three-dimensional environment, wherein the second amount of the first portion of the virtual object is greater than the first amount of the first portion of the virtual object.

6. The method of claim 5, wherein a position of the first portion of the user relative to the virtual object in the three-dimensional environment is a first position, the method further comprising:

while the visual prominence of the first amount of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, a second input that includes movement of the first portion of the user to a second position relative to the virtual object in the three-dimensional environment; and in response to detecting the second input:

in accordance with a determination that the movement of the first portion of the user to the second position increases a degree of the depth conflict between the first portion of the user and the first portion of the virtual object in the three-dimensional environment, reducing the visual prominence of the second amount, greater than the first amount, of the first portion of the virtual object in the three-dimensional environment.

7. The method of claim 5, wherein a position of the first portion of the user relative to the virtual object in the three-dimensional environment is a first position, the method further comprising:

while the visual prominence of the first amount of the virtual object is reduced in the three-dimensional environment in response to detecting the first input in accordance with the determination that at least a portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, a second input that includes movement of the first portion of the user to a second position relative to the virtual object in the three-dimensional environment; and in response to detecting the second input:

in accordance with a determination that the movement of the first portion of the user to the second position decreases a degree of the depth conflict between the first portion of the user and the first portion of the virtual object in the three-dimensional environment, reducing the visual prominence of the second amount, less than the first amount, of the first portion of the virtual object in the three-dimensional environment.

8. The method of claim 1, wherein the determination that at least a portion of the first portion of the user has the depth conflict with the first portion of the virtual object in the three-dimensional environment relative to the viewpoint of the user is in accordance with a determination that a second portion of the user does not have a depth conflict with a respective virtual object in the three-dimensional environment relative to the viewpoint of the user.

9. The method of claim 8, further comprising:

while the visual prominence of the first portion of the virtual object is reduced relative to the second portion of the virtual object in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, a second input that includes movement of the second portion of the user relative to the respective virtual object in the three-dimensional environment; and in response to detecting the second input:

in accordance with a determination that at least a portion of the second portion of the user has a depth conflict with a third portion of the respective virtual object in the three-dimensional environment relative to the viewpoint of the user, and at least a portion of the second portion of the user does not have a depth conflict with a fourth portion of the respective virtual object in the three-dimensional environment relative to the viewpoint of the user after the movement of the second portion of the user:

reducing the visual prominence of the third portion of the respective virtual object relative to the fourth portion of the respective virtual object in the three- dimensional environment while the visual prominence of the first portion of the virtual object is reduced relative to the second portion of the virtual object.

10. The method of claim 9, wherein:

reducing the visual prominence of the first portion of the virtual object relative to the second portion of the virtual object in the three-dimensional environment includes reducing the visual prominence of the first portion of the virtual object by a first magnitude; and reducing the visual prominence of the third portion of the respective virtual object relative to the fourth portion of the respective virtual object in the three-dimensional environment includes reducing the visual prominence of the third portion of the respective virtual object by a second magnitude, different from the first magnitude.

11. The method of claim 1, further comprising:

while the visual prominence of the first portion of the virtual object is reduced relative to the second portion of the virtual object in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have the depth conflict with the second portion of the virtual object in the three-dimensional environment relative to the viewpoint of the user after the movement of the first portion of the user, detecting, via the one or more input devices, a second input that includes movement of the first portion of the user laterally relative to the virtual object in the three-dimensional environment; and in response to detecting the second input:

in accordance with a determination that the movement of the first portion of the user laterally relative to the virtual object causes at least a portion of the first portion of the user to have a depth conflict with a third portion, different from the first portion, of the virtual object relative to the viewpoint of the user in the three-dimensional environment while at least a portion of the first portion of the user does not have a depth conflict with a fourth portion of the virtual object after the movement of the first portion of the user in the second input:

reducing a visual prominence of the third portion of the virtual object relative to the fourth portion of the virtual object in the three-dimensional environment.

12. The method of claim 11, wherein reducing the visual prominence of the first portion of the virtual object relative to the second portion of the virtual object includes ceasing display of the first portion of the virtual object in the three-dimensional environment, the method further comprising:

in response to detecting the second input and in accordance with the determination that the movement of the first portion of the user laterally relative to the virtual object causes at least a portion of the first portion of the user to have the depth conflict with the third portion of the virtual object relative to the viewpoint of the user in the three-dimensional environment while at least a portion of the first portion of the user does not have a depth conflict with the fourth portion of the virtual object after the movement of the first portion of the user:

redisplaying the first portion of the virtual object in the three-dimensional environment.

13. The method of claim 1, further comprising:

detecting, via the one or more input devices, a second input directed to the first portion of the virtual object; and in response to detecting the second input:

in accordance with a determination that the visual prominence of the first portion of the virtual object is reduced relative to the second portion of the virtual object in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user:

forgoing performing a respective operation associated with the first portion of the virtual object in the three-dimensional environment; and in accordance with a determination that the visual prominence of the first portion of the virtual object is not reduced relative to the second portion of the virtual object in response to detecting the first input in accordance with the determination that the at least the portion of the first portion of the user does not have a depth conflict with the virtual object in the three-dimensional environment relative to the viewpoint of the user after the movement of the first portion of the user:

performing the respective operation associated with the first portion of the virtual object in the three-dimensional environment.

14. The method of claim 1, wherein an amount of the first portion of the virtual object that has its visual prominence reduced relative to the second portion of the virtual object is based on an amount of the first portion of the user that has the depth conflict with the first portion of the virtual object in the three-dimensional environment and is independent of an amount of the first portion of the user that does not have the depth conflict with the first portion of the virtual object in the three-dimensional environment.

15. The method of claim 1, wherein an amount of the first portion of the virtual object that has its visual prominence reduced relative to the second portion of the virtual object is based on an amount of the first portion of the user that has the depth conflict with the first portion of the virtual object in the three-dimensional environment and an amount of the first portion of the user that does not have the depth conflict with the first portion of the virtual object in the three-dimensional environment.

16. The method of claim 1, wherein reducing the visual prominence of the first portion of the virtual object relative to the second portion of the virtual object includes displaying a visual boundary between the first portion of the virtual object and the second portion of the virtual object, wherein within the visual boundary a change in the visual prominence of the virtual object is gradual.

17. The method of claim 1, further comprising:

while detecting the first input and before reducing the visual prominence of the first portion of the virtual object relative to the second portion of the virtual object in accordance with the determination that at least a portion of the first portion of the user has the depth conflict with the first portion of the virtual object in the three-dimensional environment relative to the viewpoint of the user:

moving the virtual object within the three-dimensional environment based on a first portion of the movement of the first portion of the user to avoid the depth conflict between the first portion of the user and the virtual object until the movement of the first portion of the user towards the virtual object exceeds a threshold movement; and in response to the movement of the first portion of the user towards the virtual object exceeding the threshold movement:

ceasing moving the virtual object within the three-dimensional environment; and reducing the visual prominence of the first portion of the virtual object relative to the second portion of the virtual object in accordance with the determination that at least a portion of the first portion of the user has the depth conflict with the first portion of the virtual object in the three-dimensional environment relative to the viewpoint of the user.

18. A computer system that is in communication with a display generation component and one or more input devices, the computer system comprising:

one or more processors;

memory; and one or more programs, wherein the one or more programs are stored in the memory and configured to be executed by the one or more processors, the one or more programs including instructions for:

displaying, via the display generation component, a virtual object in a three-dimensional environment;

while displaying the virtual object in the three-dimensional environment, detecting, via the one or more input devices, a first input that includes movement of a first portion of a user of the computer system relative to the virtual object in the three-dimensional environment; and in response to detecting the first input:

in accordance with a determination that at least a portion of the first portion of the user has a depth conflict with a first portion of the virtual object in the three-dimensional environment relative to a viewpoint of the user, and at least a portion of the first portion of the user does not have a depth conflict with a second portion of the virtual object in the three-dimensional environment relative to the viewpoint of the user after the movement of the first portion of the user:

reducing a visual prominence of the first portion of the virtual object in the three-dimensional environment relative to the second portion of the virtual object, wherein reducing the visual prominence of the first portion of the virtual object includes increasing a degree to which a portion of the three-dimensional environment, that is behind the first portion of the virtual object from the viewpoint of the user, is visible from the viewpoint of the user; and maintaining display of the second portion of the virtual object in the three-dimensional environment; and in accordance with a determination that at least a portion of the first portion of the user does not have a depth conflict with the virtual object in the three-dimensional environment relative to the viewpoint of the user after the movement of the first portion of the user, maintaining display of the first portion and the second portion of the virtual object without reducing the visual prominence of the first portion of the virtual object in the three-dimensional environment relative to the visual prominence of the second portion of the virtual object.

19. The computer system of claim 18, wherein the one or more programs include further instructions for:

while the visual prominence of the first portion of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, a change in a position of the virtual object in the three-dimensional environment; and in response to detecting the change in the position of the virtual object in the three-dimensional environment:

in accordance with a determination that the change in the position of the virtual object in the three-dimensional environment causes at least a portion of the first portion of the user to have a depth conflict with a third portion, different from the first portion, of the virtual object in the three-dimensional environment relative to the viewpoint of the user while at least a portion of the first portion of the user does not have a depth conflict with a fourth portion, different from the third portion, of the virtual object in the three-dimensional environment relative to the viewpoint of the user:

reducing a visual prominence of the third portion of the virtual object in the three-dimensional environment relative to the fourth portion of the virtual object in the three-dimensional environment; and maintaining display of the fourth portion of the virtual object in the three-dimensional environment.

20. The computer system of claim 18, wherein the one or more programs include further instructions for:

while the visual prominence of the first portion of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, movement of the first portion of the user relative to the virtual object in the three-dimensional environment; and in response to detecting the movement of the first portion of the user:

in accordance with a determination that the movement of the first portion of the user causes at least a portion of the first portion of the user to have a depth conflict with a third portion, different from the first portion, of the virtual object in the three-dimensional environment relative to the viewpoint of the user while at least a portion of the first portion of the user does not have a depth conflict with a fourth portion, different from the third portion, of the virtual object in the three-dimensional environment relative to the viewpoint of the user:

reducing a visual prominence of the third portion of the virtual object in the three-dimensional environment relative to the fourth portion of the virtual object in the three-dimensional environment; and maintaining display of the fourth portion of the virtual object in the three-dimensional environment.

21. The computer system of claim 18, wherein the one or more programs include further instructions for:

while the visual prominence of the first portion of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, movement of the viewpoint of the user relative to the virtual object in the three-dimensional environment; and in response to detecting the movement of the viewpoint of the user:

in accordance with a determination that the movement of the viewpoint of the user causes at least a portion of the first portion of the user to have a depth conflict with a third portion, different from the first portion, of the virtual object in the three-dimensional environment relative to the viewpoint of the user while at least a portion of the first portion of the user does not have a depth conflict with a fourth portion, different from the third portion, of the virtual object in the three-dimensional environment relative to the viewpoint of the user:

reducing a visual prominence of the third portion of the virtual object in the three-dimensional environment relative to the fourth portion of the virtual object in the three-dimensional environment; and maintaining display of the fourth portion of the virtual object in the three-dimensional environment.

22. The computer system of claim 18, wherein the one or more programs include further instructions for:

reducing the visual prominence of the first portion of the virtual object in the three- dimensional environment relative to the second portion of the virtual object includes:

in accordance with a determination that an amount of the depth conflict between the first portion of the user and the first portion of the virtual object is a first amount, reducing a visual prominence of a first amount of the first portion of the virtual object in the three-dimensional environment; and in accordance with a determination that the amount of the depth conflict between the first portion of the user and the first portion of the virtual object is a second amount, greater than the first amount, reducing a visual prominence of a second amount of the first portion of the virtual object in the three-dimensional environment, wherein the second amount of the first portion of the virtual object is greater than the first amount of the first portion of the virtual object.

23. The computer system of claim 22, wherein a position of the first portion of the user relative to the virtual object in the three-dimensional environment is a first position, the one or more programs include further instructions for:

while the visual prominence of the first amount of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, a second input that includes movement of the first portion of the user to a second position relative to the virtual object in the three-dimensional environment; and in response to detecting the second input:

in accordance with a determination that the movement of the first portion of the user to the second position increases a degree of the depth conflict between the first portion of the user and the first portion of the virtual object in the three-dimensional environment, reducing the visual prominence of the second amount, greater than the first amount, of the first portion of the virtual object in the three-dimensional environment.

24. The computer system of claim 22, wherein a position of the first portion of the user relative to the virtual object in the three-dimensional environment is a first position, the one or more programs include further instructions for:

while the visual prominence of the first amount of the virtual object is reduced in the three-dimensional environment in response to detecting the first input in accordance with the determination that at least a portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, a second input that includes movement of the first portion of the user to a second position relative to the virtual object in the three-dimensional environment; and in response to detecting the second input:

in accordance with a determination that the movement of the first portion of the user to the second position decreases a degree of the depth conflict between the first portion of the user and the first portion of the virtual object in the three-dimensional environment, reducing the visual prominence of the second amount, less than the first amount, of the first portion of the virtual object in the three-dimensional environment.

25. The computer system of claim 24, wherein the one or more programs include further instructions for:

while the visual prominence of the first portion of the virtual object is reduced relative to the second portion of the virtual object in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, the second input that includes movement of the second portion of the user relative to the respective virtual object in the three-dimensional environment; and in response to detecting the second input:

in accordance with a determination that at least a portion of the second portion of the user has a depth conflict with a third portion of the respective virtual object in the three-dimensional environment relative to the viewpoint of the user, and at least a portion of the second portion of the user does not have a depth conflict with a fourth portion of the respective virtual object in the three-dimensional environment relative to the viewpoint of the user after the movement of the second portion of the user:

reducing the visual prominence of the third portion of the respective virtual object relative to the fourth portion of the respective virtual object in the three-dimensional environment while the visual prominence of the first portion of the virtual object is reduced relative to the second portion of the virtual object.

26. The computer system of claim 18, wherein the one or more programs include further instructions for:

while the visual prominence of the first portion of the virtual object is reduced relative to the second portion of the virtual object in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have the depth conflict with the second portion of the virtual object in the three-dimensional environment relative to the viewpoint of the user after the movement of the first portion of the user, detecting, via the one or more input devices, a second input that includes movement of the first portion of the user laterally relative to the virtual object in the three-dimensional environment; and in response to detecting the second input: in accordance with a determination that the movement of the first portion of the user laterally relative to the virtual object causes at least a portion of the first portion of the user to have a depth conflict with a third portion, different from the first portion, of the virtual object relative to the viewpoint of the user in the three-dimensional environment while at least a portion of the first portion of the user does not have a depth conflict with a fourth portion of the virtual object after the movement of the first portion of the user in the second input:

reducing a visual prominence of the third portion of the virtual object relative to the fourth portion of the virtual object in the three-dimensional environment.

27. The computer system of claim 26, wherein reducing the visual prominence of the first portion of the virtual object relative to the second portion of the virtual object includes ceasing display of the first portion of the virtual object in the three-dimensional environment, the one or more programs include further instructions for:

in response to detecting the second input and in accordance with the determination that the movement of the first portion of the user laterally relative to the virtual object causes at least a portion of the first portion of the user to have the depth conflict with the third portion of the virtual object relative to the viewpoint of the user in the three-dimensional environment while at least a portion of the first portion of the user does not have a depth conflict with the fourth portion of the virtual object after the movement of the first portion of the user:

redisplaying the first portion of the virtual object in the three-dimensional environment.

28. The computer system of claim 18, wherein the one or more programs include further instructions for:

detecting, via the one or more input devices, a second input directed to the first portion of the virtual object; and in response to detecting the second input:

in accordance with a determination that the visual prominence of the first portion of the virtual object is reduced relative to the second portion of the virtual object in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user:

forgoing performing a respective operation associated with the first portion of the virtual object in the three-dimensional environment; and in accordance with a determination that the visual prominence of the first portion of the virtual object is not reduced relative to the second portion of the virtual object in response to detecting the first input in accordance with the determination that the at least the portion of the first portion of the user does not have a depth conflict with the virtual object in the three-dimensional environment relative to the viewpoint of the user after the movement of the first portion of the user:

performing the respective operation associated with the first portion of the virtual object in the three-dimensional environment.

29. A non-transitory computer readable storage medium storing one or more programs, the one or more programs comprising instructions, which when executed by one or more processors of a computer system that is in communication with a display generation component and one or more input devices, cause the computer system to perform a method comprising:

displaying, via the display generation component, a virtual object in a three-dimensional environment;

while displaying the virtual object in the three-dimensional environment, detecting, via the one or more input devices, a first input that includes movement of a first portion of a user of the computer system relative to the virtual object in the three-dimensional environment; and in response to detecting the first input:

in accordance with a determination that at least a portion of the first portion of the user has a depth conflict with a first portion of the virtual object in the three-dimensional environment relative to a viewpoint of the user, and at least a portion of the first portion of the user does not have a depth conflict with a second portion of the virtual object in the three-dimensional environment relative to the viewpoint of the user after the movement of the first portion of the user:

reducing a visual prominence of the first portion of the virtual object in the three-dimensional environment relative to the second portion of the virtual object, wherein reducing the visual prominence of the first portion of the virtual object includes increasing a degree to which a portion of the three-dimensional environment, that is behind the first portion of the virtual object from the viewpoint of the user, is visible from the viewpoint of the user; and maintaining display of the second portion of the virtual object in the three-dimensional environment; and in accordance with a determination that at least a portion of the first portion of the user does not have a depth conflict with the virtual object in the three-dimensional environment relative to the viewpoint of the user after the movement of the first portion of the user, maintaining display of the first portion and the second portion of the virtual object without reducing the visual prominence of the first portion of the virtual object in the three-dimensional environment relative to the visual prominence of the second portion of the virtual object.

30. The non-transitory computer readable storage medium of claim 29, wherein the one or more programs comprise further instructions, which when executed by the one or more processors of the computer system, cause the computer system to perform:

while the visual prominence of the first portion of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, a change in a position of the virtual object in the three-dimensional environment; and in response to detecting the change in the position of the virtual object in the three-dimensional environment:

in accordance with a determination that the change in the position of the virtual object in the three-dimensional environment causes at least a portion of the first portion of the user to have a depth conflict with a third portion, different from the first portion, of the virtual object in the three-dimensional environment relative to the viewpoint of the user while at least a portion of the first portion of the user does not have a depth conflict with a fourth portion, different from the third portion, of the virtual object in the three-dimensional environment relative to the viewpoint of the user:

reducing a visual prominence of the third portion of the virtual object in the three-dimensional environment relative to the fourth portion of the virtual object in the three-dimensional environment; and maintaining display of the fourth portion of the virtual object in the three-dimensional environment.

31. The non-transitory computer readable storage medium of claim 29, wherein the one or more programs comprise further instructions, which when executed by the one or more processors of the computer system, cause the computer system to perform:

while the visual prominence of the first portion of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, movement of the first portion of the user relative to the virtual object in the three-dimensional environment; and in response to detecting the movement of the first portion of the user:

in accordance with a determination that the movement of the first portion of the user causes at least a portion of the first portion of the user to have a depth conflict with a third portion, different from the first portion, of the virtual object in the three-dimensional environment relative to the viewpoint of the user while at least a portion of the first portion of the user does not have a depth conflict with a fourth portion, different from the third portion, of the virtual object in the three-dimensional environment relative to the viewpoint of the user:

reducing a visual prominence of the third portion of the virtual object in the three-dimensional environment relative to the fourth portion of the virtual object in the three-dimensional environment; and maintaining display of the fourth portion of the virtual object in the three-dimensional environment.

32. The non-transitory computer readable storage medium of claim 29, wherein the one or more programs comprise further instructions, which when executed by the one or more processors of the computer system, cause the computer system to perform:

while the visual prominence of the first portion of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, movement of the viewpoint of the user relative to the virtual object in the three-dimensional environment; and in response to detecting the movement of the viewpoint of the user:

in accordance with a determination that the movement of the viewpoint of the user causes at least a portion of the first portion of the user to have a depth conflict with a third portion, different from the first portion, of the virtual object in the three-dimensional environment relative to the viewpoint of the user while at least a portion of the first portion of the user does not have a depth conflict with a fourth portion, different from the third portion, of the virtual object in the three-dimensional environment relative to the viewpoint of the user:

reducing a visual prominence of the third portion of the virtual object in the three-dimensional environment relative to the fourth portion of the virtual object in the three-dimensional environment; and maintaining display of the fourth portion of the virtual object in the three-dimensional environment.

33. The non-transitory computer readable storage medium of claim 29, wherein the one or more programs comprise further instructions, which when executed by the one or more processors of the computer system, cause the computer system to perform:

reducing the visual prominence of the first portion of the virtual object in the three-dimensional environment relative to the second portion of the virtual object includes:

in accordance with a determination that an amount of the depth conflict between the first portion of the user and the first portion of the virtual object is a first amount, reducing a visual prominence of a first amount of the first portion of the virtual object in the three-dimensional environment; and in accordance with a determination that the amount of the depth conflict between the first portion of the user and the first portion of the virtual object is a second amount, greater than the first amount, reducing a visual prominence of a second amount of the first portion of the virtual object in the three-dimensional environment, wherein the second amount of the first portion of the virtual object is greater than the first amount of the first portion of the virtual object.

34. The non-transitory computer readable storage medium of claim 33, wherein a position of the first portion of the user relative to the virtual object in the three-dimensional environment is a first position, the one or more programs comprise further instructions, which when executed by the one or more processors of the computer system, cause the computer system to perform:

while the visual prominence of the first amount of the virtual object is reduced in the three-dimensional environment in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, a second input that includes movement of the first portion of the user to a second position relative to the virtual object in the three-dimensional environment; and in response to detecting the second input:

in accordance with a determination that the movement of the first portion of the user to the second position increases a degree of the depth conflict between the first portion of the user and the first portion of the virtual object in the three-dimensional environment, reducing the visual prominence of the second amount, greater than the first amount, of the first portion of the virtual object in the three-dimensional environment.

35. The non-transitory computer readable storage medium of claim 33, wherein a position of the first portion of the user relative to the virtual object in the three-dimensional environment is a first position, the one or more programs comprise further instructions, which when executed by the one or more processors of the computer system, cause the computer system to perform:

while the visual prominence of the first amount of the virtual object is reduced in the three-dimensional environment in response to detecting the first input in accordance with the determination that at least a portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, a second input that includes movement of the first portion of the user to a second position relative to the virtual object in the three-dimensional environment; and in response to detecting the second input:

in accordance with a determination that the movement of the first portion of the user to the second position decreases a degree of the depth conflict between the first portion of the user and the first portion of the virtual object in the three-dimensional environment, reducing the visual prominence of the second amount, less than the first amount, of the first portion of the virtual object in the three-dimensional environment.

36. The non-transitory computer readable storage medium of claim 35, wherein the one or more programs comprise further instructions, which when executed by the one or more processors of the computer system, cause the computer system to perform:

while the visual prominence of the first portion of the virtual object is reduced relative to the second portion of the virtual object in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user, detecting, via the one or more input devices, the second input that includes movement of the second portion of the user relative to the respective virtual object in the three-dimensional environment; and in response to detecting the second input:
  in accordance with a determination that at least a portion of the second portion of the user has a depth conflict with a third portion of the respective virtual object in the three-dimensional environment relative to the viewpoint of the user, and at least a portion of the second portion of the user does not have a depth conflict with a fourth portion of the respective virtual object in the three-dimensional environment relative to the viewpoint of the user after the movement of the second portion of the user:
    reducing the visual prominence of the third portion of the respective virtual object relative to the fourth portion of the respective virtual object in the three-dimensional environment while the visual prominence of the first portion of the virtual object is reduced relative to the second portion of the virtual object.

37. The non-transitory computer readable storage medium of claim 29, wherein the one or more programs comprise further instructions, which when executed by the one or more processors of the computer system, cause the computer system to perform:

while the visual prominence of the first portion of the virtual object is reduced relative to the second portion of the virtual object in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have the depth conflict with the second portion of the virtual object in the three-dimensional environment relative to the viewpoint of the user after the movement of the first portion of the user, detecting, via the one or more input devices, a second input that includes movement of the first portion of the user laterally relative to the virtual object in the three-dimensional environment; and in response to detecting the second input:
  in accordance with a determination that the movement of the first portion of the user laterally relative to the virtual object causes at least a portion of the first portion of the user to have a depth conflict with a third portion, different from the first portion, of the virtual object relative to the viewpoint of the user in the three-dimensional environment while at least a portion of the first portion of the user does not have a depth conflict with a fourth portion of the virtual object after the movement of the first portion of the user in the second input:

reducing a visual prominence of the third portion of the virtual object relative to the fourth portion of the virtual object in the three-dimensional environment.

38. The non-transitory computer readable storage medium of claim 37, wherein reducing the visual prominence of the first portion of the virtual object relative to the second portion of the virtual object includes ceasing display of the first portion of the virtual object in the three-dimensional environment, the one or more programs include further instructions for:

in response to detecting the second input and in accordance with the determination that the movement of the first portion of the user laterally relative to the virtual object causes at least a portion of the first portion of the user to have the depth conflict with the third portion of the virtual object relative to the viewpoint of the user in the three-dimensional environment while at least a portion of the first portion of the user does not have a depth conflict with the fourth portion of the virtual object after the movement of the first portion of the user:

redisplaying the first portion of the virtual object in the three-dimensional environment.

39. The non-transitory computer readable storage medium of claim 29, wherein the one or more programs comprise further instructions, which when executed by the one or more processors of the computer system, cause the computer system to perform:

detecting, via the one or more input devices, a second input directed to the first portion of the virtual object; and in response to detecting the second input:
  in accordance with a determination that the visual prominence of the first portion of the virtual object is reduced relative to the second portion of the virtual object in response to detecting the first input in accordance with the determination that the at least the portion of the first portion of the user has the depth conflict with the first portion of the virtual object in the three-dimensional environment relative to the viewpoint of the user, and at least a portion of the first portion of the user does not have a depth conflict with the second portion of the virtual object in the three-dimensional environment relative to the viewpoint of the user after the movement of the first portion of the user:
    forgoing performing a respective operation associated with the first portion of the virtual object in the three-dimensional environment; and
  in accordance with a determination that the visual prominence of the first portion of the virtual object is not reduced relative to the second portion of the virtual object in response to detecting the first input in accordance with the determination that the at least the portion of the first portion of the user does not have a depth conflict with the virtual object in the three-dimensional environment relative to the viewpoint of the user after the movement of the first portion of the user:

performing the respective operation associated with the first portion of the virtual object in the three-dimensional environment.

* * * * *